US012431545B1

(12) United States Patent
Ota et al.

(10) Patent No.: US 12,431,545 B1
(45) Date of Patent: Sep. 30, 2025

(54) SYSTEMS AND METHODS FOR MINIMIZING AND PREVENTING DENDRITE FORMATION IN ELECTROCHEMICAL CELLS

(71) Applicant: 24M Technologies, Inc., Cambridge, MA (US)

(72) Inventors: Naoki Ota, Lexington, MA (US); Junzheng Chen, Concord, MA (US); Michelle Robyn Brouwer, Woburn, MA (US); Julia Rifkin, Somerville, MA (US); Junhua Song, Sudbury, MA (US); Dhanya Puthusseri, Millis, MA (US); Frank Yongzhen Fan, Arlington, MA (US); Humberto Rojas, Roslindale, MA (US); Xiaoming Liu, Newton, MA (US); Daniel Salazar, Brookline, MA (US); Parth S. Patel, Boston, MA (US)

(73) Assignee: 24M Technologies, Inc., Cambridge, MA (US)

( * ) Notice: Subject to any disclaimer, the term of this patent is extended or adjusted under 35 U.S.C. 154(b) by 0 days.

(21) Appl. No.: 18/746,845

(22) Filed: Jun. 18, 2024

Related U.S. Application Data

(60) Provisional application No. 63/647,741, filed on May 15, 2024, provisional application No. 63/647,979, (Continued)

(51) Int. Cl.
*H01M 10/42* (2006.01)
*H01M 4/133* (2010.01)
(Continued)

(52) U.S. Cl.
CPC ....... *H01M 10/4235* (2013.01); *H01M 4/133* (2013.01); *H01M 4/134* (2013.01);
(Continued)

(58) Field of Classification Search
None
See application file for complete search history.

(56) References Cited

U.S. PATENT DOCUMENTS 3,625,771 A  12/1971  Arrance et al.
3,647,554 A   3/1972  Arrance et al.
(Continued)

FOREIGN PATENT DOCUMENTS

CA  2605874 A1  1/2007
CA  2886154 A1  4/2014
(Continued)

OTHER PUBLICATIONS

Notice of Allowance for U.S. Appl. No. 18/543,959 mailed Jul. 22, 2024, 9 pages.
(Continued)

*Primary Examiner* — Robert S Carrico
(74) *Attorney, Agent, or Firm* — Cooley LLP

(57) ABSTRACT

Embodiments described herein relate to electrochemical cells with dendrite prevention mechanisms, and methods of producing and operating the same. In some aspects, an electrochemical cell can include an anode and a cathode material disposed on a cathode current collector, the cathode material and the cathode current collector forming a cathode. The electrochemical cell further includes a first separator disposed on the anode, a second separator disposed on the cathode, and an interlayer disposed between the first separator and the second separator, the interlayer including electroactive material, the interlayer including a source of lithium ions, the lithium ions configured to migrate toward the anode upon a voltage difference between the interlayer and the anode exceeding a threshold value. In some embodiments, the anode can include an anode material disposed on
(Continued)

an anode current collector. In some embodiments, the anode material can include graphite, silicon, and/or hard carbon.

5 Claims, 66 Drawing Sheets

Related U.S. Application Data filed on May 15, 2024, provisional application No. 63/574,656, filed on Apr. 4, 2024, provisional application No. 63/569,880, filed on Mar. 26, 2024.

(51) Int. Cl.
*H01M 4/134* (2010.01)
*H01M 4/62* (2006.01)
*H01M 10/0525* (2010.01)
*H01M 10/0587* (2010.01)
*H01M 50/431* (2021.01)
*H01M 50/451* (2021.01)
*H01M 50/457* (2021.01)

(52) U.S. Cl.
CPC ....... *H01M 4/626* (2013.01); *H01M 10/0525* (2013.01); *H01M 10/0587* (2013.01); *H01M 50/431* (2021.01); *H01M 50/451* (2021.01); *H01M 50/457* (2021.01)

(56) References Cited

U.S. PATENT DOCUMENTS

| | | |
|---|---|---|
| 3,703,413 A | 11/1972 | Arrance |
| 4,338,177 A | 7/1982 | Withers et al. |
| 4,342,637 A | 8/1982 | Withers et al. |
| 4,670,110 A | 6/1987 | Withers et al. |
| 4,711,719 A | 12/1987 | Leenaars et al. |
| 4,826,743 A | 5/1989 | Nazri |
| 4,916,033 A | 4/1990 | Gourdine |
| 5,162,175 A | 11/1992 | Visco et al. |
| 5,194,341 A | 3/1993 | Bagley et al. |
| 5,314,765 A | 5/1994 | Bates |
| 5,326,391 A | 7/1994 | Anderson et al. |
| 5,340,669 A | 8/1994 | Chaloner-Gill et al. |
| 5,350,645 A | 9/1994 | Lake et al. |
| 5,415,954 A | 5/1995 | Gauthier et al. |
| 5,418,091 A | 5/1995 | Gozdz et al. |
| 5,439,760 A | 8/1995 | Howard et al. |
| 5,549,717 A | 8/1996 | Takeuchi et al. |
| 5,569,520 A | 10/1996 | Bates |
| 5,597,659 A | 1/1997 | Morigaki et al. |
| 5,691,005 A | 11/1997 | Morigaki et al. |
| 5,731,104 A | 3/1998 | Ventura et al. |
| 5,778,515 A | 7/1998 | Menon |
| 5,824,434 A | 10/1998 | Kawakami et al. |
| 5,840,087 A | 11/1998 | Gozdz et al. |
| 5,882,721 A | 3/1999 | Delnick |
| 5,888,431 A | 3/1999 | Tonar et al. |
| 5,894,656 A | 4/1999 | Menon et al. |
| 5,948,464 A | 9/1999 | Delnick |
| 5,983,488 A | 11/1999 | Erickson et al. |
| 6,148,503 A | 11/2000 | Delnick et al. |
| 6,153,337 A | 11/2000 | Carlson et al. |
| 6,156,190 A | 12/2000 | Xia et al. |
| 6,162,563 A | 12/2000 | Miura et al. |
| 6,172,795 B1 | 1/2001 | Carlson |
| 6,183,901 B1 | 2/2001 | Ying et al. |
| 6,190,426 B1 | 2/2001 | Thibault et al. |
| 6,194,098 B1 | 2/2001 | Ying et al. |
| 6,210,831 B1 | 4/2001 | Gorkovenko et al. |
| 6,224,846 B1 | 5/2001 | Hurlburt et al. |
| 6,268,087 B1 | 7/2001 | Kim et al. |
| 6,277,514 B1 | 8/2001 | Ying et al. |
| 6,277,981 B1 | 8/2001 | Tu et al. |
| 6,287,720 B1 | 9/2001 | Yamashita et al. |
| 6,306,545 B1 | 10/2001 | Carlson et al. |
| 6,328,770 B1 | 12/2001 | Gozdz |
| 6,344,293 B1 | 2/2002 | Geronov |
| 6,358,397 B1 | 3/2002 | Lyublinski |
| 6,387,564 B1 | 5/2002 | Yamashita et al. |
| 6,406,814 B1 | 6/2002 | Gorkovenko et al. |
| 6,410,182 B1 | 6/2002 | Ying et al. |
| 6,423,444 B1 | 7/2002 | Ying et al. |
| 6,423,447 B1 | 7/2002 | Ohsaki et al. |
| 6,432,586 B1 | 8/2002 | Zhang |
| 6,436,583 B1 | 8/2002 | Mikhaylik |
| 6,444,344 B1 | 9/2002 | Saito et al. |
| 6,451,484 B1 | 9/2002 | Han et al. |
| 6,488,721 B1 | 12/2002 | Carlson |
| 6,495,292 B1 | 12/2002 | Yen |
| 6,497,780 B1 | 12/2002 | Carlson |
| 6,589,692 B2 | 7/2003 | Takami |
| 6,679,926 B1 | 1/2004 | Kajiura et al. |
| 6,682,856 B1 | 1/2004 | Watanabe et al. |
| 6,723,467 B2 | 4/2004 | Yoshida et al. |
| 6,724,512 B2 | 4/2004 | Carlson et al. |
| 6,811,928 B2 | 11/2004 | Aihara et al. |
| 6,846,435 B1 | 1/2005 | Bohnen et al. |
| 6,883,347 B2 | 4/2005 | Ayub |
| 6,946,218 B2 | 9/2005 | Crouch, Jr. et al. |
| 6,962,182 B2 | 11/2005 | Cordonnier et al. |
| 6,991,874 B1 | 1/2006 | Möhwald et al. |
| 7,014,948 B2 | 3/2006 | Lee et al. |
| 7,029,796 B2 | 4/2006 | Choi et al. |
| 7,066,971 B1 | 6/2006 | Carlson |
| 7,070,632 B1 | 7/2006 | Visco et al. |
| 7,081,142 B1 | 7/2006 | Carlson |
| 7,115,339 B2 | 10/2006 | Nakajima et al. |
| 7,135,250 B2 | 11/2006 | Sasaki et al. |
| 7,160,603 B2 | 1/2007 | Carlson |
| 7,378,185 B2 | 5/2008 | Fujikawa et al. |
| 7,396,612 B2 | 7/2008 | Ohata et al. |
| 7,402,184 B2 | 7/2008 | Ikuta et al. |
| 7,419,743 B2 | 9/2008 | Fujikawa et al. |
| 7,422,825 B2 | 9/2008 | Inoue et al. |
| 7,470,488 B2 | 12/2008 | Lee et al. |
| 7,560,193 B2 | 7/2009 | Ikuta et al. |
| 7,575,606 B2 | 8/2009 | Fukumoto et al. |
| 7,595,130 B2 | 9/2009 | Kawabata et al. |
| 7,638,230 B2 | 12/2009 | Fujita et al. |
| 7,638,241 B2 | 12/2009 | Lee et al. |
| 7,662,517 B2 | 2/2010 | Lee et al. |
| 7,674,559 B2 | 3/2010 | Min et al. |
| 7,682,740 B2 | 3/2010 | Yong et al. |
| 7,682,751 B2 | 3/2010 | Kato et al. |
| 7,687,202 B2 | 3/2010 | Nishino et al. |
| 7,695,870 B2 | 4/2010 | Park et al. |
| 7,704,641 B2 | 4/2010 | Yong et al. |
| 7,709,140 B2 | 5/2010 | Hennige et al. |
| 7,709,152 B2 | 5/2010 | Kim et al. |
| 7,709,153 B2 | 5/2010 | Lee et al. |
| 7,745,042 B2 | 6/2010 | Fujino et al. |
| 7,745,050 B2 | 6/2010 | Kajita et al. |
| 7,754,375 B2 | 7/2010 | Fujikawa et al. |
| 7,754,377 B2 | 7/2010 | Ohata et al. |
| 7,758,998 B2 | 7/2010 | Ohata et al. |
| 7,759,004 B2 | 7/2010 | Ikuta et al. |
| 7,811,700 B2 | 10/2010 | Hennige et al. |
| 7,816,038 B2 | 10/2010 | Ohata et al. |
| 7,829,242 B2 | 11/2010 | Hörpel et al. |
| 7,981,548 B2 | 7/2011 | Mimura |
| 8,076,027 B2 | 12/2011 | Honda et al. |
| 8,277,981 B2 | 10/2012 | Kim et al. |
| 8,574,743 B2 | 11/2013 | Kim et al. |
| 8,722,226 B2 | 5/2014 | Chiang et al. |
| 8,722,227 B2 | 5/2014 | Chiang et al. |
| 8,778,552 B2 | 7/2014 | Chiang et al. |
| 8,883,347 B2 | 11/2014 | Baba et al. |
| 8,993,159 B2 | 3/2015 | Chiang et al. |
| 9,070,954 B2 | 6/2015 | Carlson et al. |
| 9,153,833 B2 | 10/2015 | Chiang et al. |
| 9,178,200 B2 | 11/2015 | Bazzarella et al. |
| 9,180,412 B2 | 11/2015 | Jo et al. |
| 9,184,464 B2 | 11/2015 | Chiang et al. |

(56) References Cited

U.S. PATENT DOCUMENTS

| | | |
|---|---|---|
| 9,203,092 B2 | 12/2015 | Slocum et al. |
| 9,293,781 B2 | 3/2016 | Chiang et al. |
| 9,350,009 B1 | 5/2016 | Lim et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,509,176 B2 | 11/2016 | Carter et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,522,870 B2 | 12/2019 | Tan et al. |
| 10,566,581 B2 | 2/2020 | Bazzarella et al. |
| 10,566,603 B2 | 2/2020 | Slocum et al. |
| 10,593,952 B2 | 3/2020 | Ota et al. |
| 10,601,239 B2 | 3/2020 | Taylor et al. |
| 10,637,038 B2 | 4/2020 | Zagars et al. |
| 10,734,672 B2 | 8/2020 | Chen et al. |
| 10,777,852 B2 | 9/2020 | Woodford et al. |
| 10,854,869 B2 | 12/2020 | Bazzarella et al. |
| 10,886,521 B2 | 1/2021 | Zagars et al. |
| 10,910,858 B2 | 2/2021 | Taylor et al. |
| 10,957,940 B2 | 3/2021 | Tan et al. |
| 10,964,973 B2 | 3/2021 | Tan et al. |
| 11,005,087 B2 | 5/2021 | Ota et al. |
| 11,018,365 B2 | 5/2021 | Chiang et al. |
| 11,024,903 B2 | 6/2021 | Ota et al. |
| 11,069,888 B2 | 7/2021 | Liu et al. |
| 11,094,487 B2 | 8/2021 | Lawrence et al. |
| 11,094,976 B2 | 8/2021 | Chiang et al. |
| 11,121,437 B2 | 9/2021 | Bazzarella et al. |
| 11,139,467 B2 | 10/2021 | Zagars et al. |
| 11,145,909 B2 | 10/2021 | Chiang et al. |
| 11,309,531 B2 | 4/2022 | Slocum et al. |
| 11,316,156 B2 | 4/2022 | Woo et al. |
| 11,342,567 B2 | 5/2022 | Chiang et al. |
| 11,394,023 B2 | 7/2022 | Ofer et al. |
| 11,394,049 B2 | 7/2022 | Tan et al. |
| 11,462,722 B2 | 10/2022 | Aranami et al. |
| 11,469,065 B2 | 10/2022 | Lawrence et al. |
| 11,476,551 B2 | 10/2022 | Tyler et al. |
| 11,552,368 B2 | 1/2023 | Holman et al. |
| 11,575,146 B2 | 2/2023 | Taylor et al. |
| 11,594,793 B2 | 2/2023 | Bazzarella et al. |
| 11,611,061 B2 | 3/2023 | Zagars et al. |
| 11,631,920 B2 | 4/2023 | Bazzarella et al. |
| 11,646,437 B2 | 5/2023 | Bazzarella et al. |
| 11,652,203 B2 | 5/2023 | Zagars et al. |
| 11,742,525 B2 | 8/2023 | Aranami et al. |
| 11,749,804 B2 | 9/2023 | Chen et al. |
| 11,757,129 B2 | 9/2023 | Tan et al. |
| 11,764,353 B2 | 9/2023 | Ota et al. |
| 11,799,085 B2 | 10/2023 | Chae et al. |
| 11,804,595 B2 | 10/2023 | Ota et al. |
| 11,811,119 B2 | 11/2023 | Chiang et al. |
| 11,831,026 B2 | 11/2023 | Ota et al. |
| 11,855,250 B2 | 12/2023 | Taylor et al. |
| 11,876,194 B2 | 1/2024 | Chiang et al. |
| 11,888,144 B2 | 1/2024 | Slocum et al. |
| 11,909,077 B2 | 2/2024 | Chiang et al. |
| 11,942,654 B2 | 3/2024 | Bazzarella et al. |
| 11,961,990 B2 | 4/2024 | Ota et al. |
| 11,984,564 B1 | 5/2024 | Chen |
| 12,009,551 B2 | 6/2024 | Bazzarella et al. |
| 12,119,458 B2 | 10/2024 | Chen et al. |
| 2001/0000485 A1 | 4/2001 | Ying et al. |
| 2001/0038938 A1 | 11/2001 | Takahashi et al. |
| 2001/0053475 A1 | 12/2001 | Ying et al. |
| 2002/0092155 A1 | 7/2002 | Carlson et al. |
| 2002/0141029 A1 | 10/2002 | Carlson et al. |
| 2003/0003363 A1 | 1/2003 | Daido et al. |
| 2003/0003369 A1 | 1/2003 | Dai |
| 2003/0035995 A1 | 2/2003 | Ohsaki et al. |
| 2003/0059675 A1 | 3/2003 | Sasaki et al. |
| 2003/0118910 A1 | 6/2003 | Carlson |
| 2003/0124429 A1* | 7/2003 | Okada ............... H01M 50/491 429/251 |
| 2003/0171784 A1 | 9/2003 | Dodd et al. |
| 2004/0038090 A1 | 2/2004 | Faris |
| 2004/0043295 A1 | 3/2004 | Rodriguez et al. |
| 2004/0058246 A1 | 3/2004 | Choi et al. |
| 2004/0175626 A1 | 9/2004 | Dasgupta et al. |
| 2004/0185335 A1 | 9/2004 | Carlson |
| 2004/0188880 A1 | 9/2004 | Bauer et al. |
| 2004/0241540 A1 | 12/2004 | Tsutsumi et al. |
| 2005/0022370 A1 | 2/2005 | Fu et al. |
| 2005/0026037 A1 | 2/2005 | Riley et al. |
| 2005/0221190 A1 | 10/2005 | Sudano et al. |
| 2005/0255345 A1 | 11/2005 | Gerritse et al. |
| 2005/0255769 A1 | 11/2005 | Henninge et al. |
| 2005/0266305 A1 | 12/2005 | Ohata et al. |
| 2006/0008698 A1 | 1/2006 | Kim et al. |
| 2006/0127753 A1 | 6/2006 | Nakashima et al. |
| 2006/0172158 A1 | 8/2006 | Min et al. |
| 2006/0172185 A1 | 8/2006 | Mimura |
| 2006/0177732 A1 | 8/2006 | Visco et al. |
| 2006/0222954 A1 | 10/2006 | Skotheim et al. |
| 2006/0275661 A1 | 12/2006 | Kim et al. |
| 2007/0009803 A1 | 1/2007 | Kim et al. |
| 2007/0065714 A1 | 3/2007 | Hambitzer et al. |
| 2007/0108120 A1 | 5/2007 | Carlson |
| 2007/0110990 A1 | 5/2007 | Carlson |
| 2007/0111070 A1 | 5/2007 | Carlson |
| 2007/0178384 A1 | 8/2007 | Kajita et al. |
| 2007/0184350 A1 | 8/2007 | Kim et al. |
| 2007/0189959 A1 | 8/2007 | Carlson et al. |
| 2007/0190408 A1 | 8/2007 | Inoue et al. |
| 2007/0204458 A1 | 9/2007 | Fujita et al. |
| 2007/0243460 A1 | 10/2007 | Carlson et al. |
| 2007/0269714 A1 | 11/2007 | Watanabe et al. |
| 2008/0032197 A1 | 2/2008 | Horpel et al. |
| 2008/0160412 A1 | 7/2008 | Kasamatsu et al. |
| 2008/0166202 A1 | 7/2008 | Dunlap et al. |
| 2008/0193845 A1 | 8/2008 | Muraoka et al. |
| 2008/0285208 A1 | 11/2008 | Sung et al. |
| 2009/0011337 A1 | 1/2009 | Kajita et al. |
| 2009/0017380 A1 | 1/2009 | Honda et al. |
| 2009/0029261 A1 | 1/2009 | Thomas-Alyea et al. |
| 2009/0067119 A1 | 3/2009 | Katayama et al. |
| 2009/0087728 A1 | 4/2009 | Less et al. |
| 2009/0098457 A1 | 4/2009 | Kwon et al. |
| 2009/0155676 A1 | 6/2009 | Zhamu et al. |
| 2009/0155678 A1 | 6/2009 | Less et al. |
| 2009/0197183 A1 | 8/2009 | Kato |
| 2009/0202912 A1 | 8/2009 | Baba et al. |
| 2009/0246631 A1 | 10/2009 | Hojo et al. |
| 2009/0246636 A1 | 10/2009 | Chiang et al. |
| 2009/0269489 A1 | 10/2009 | Hennige et al. |
| 2009/0290288 A1 | 11/2009 | Mitchell et al. |
| 2009/0311587 A1 | 12/2009 | Best et al. |
| 2010/0003592 A1 | 1/2010 | Baba et al. |
| 2010/0003595 A1 | 1/2010 | Issaev et al. |
| 2010/0047671 A1 | 2/2010 | Chiang et al. |
| 2010/0055370 A1 | 3/2010 | Diehl et al. |
| 2010/0104817 A1 | 4/2010 | Carlson |
| 2010/0175245 A1 | 7/2010 | Do et al. |
| 2010/0261065 A1 | 10/2010 | Babinec et al. |
| 2010/0285352 A1 | 11/2010 | Juzkow et al. |
| 2010/0323264 A1 | 12/2010 | Chiang et al. |

(56) References Cited

U.S. PATENT DOCUMENTS

| | | |
|---|---|---|
| 2011/0052987 A1 | 3/2011 | Katayama et al. |
| 2011/0097623 A1 | 4/2011 | Marinis, Jr. et al. |
| 2011/0189520 A1 | 8/2011 | Carter et al. |
| 2011/0200848 A1 | 8/2011 | Chiang et al. |
| 2011/0228385 A1 | 9/2011 | Avison et al. |
| 2011/0274948 A1 | 11/2011 | Duduta et al. |
| 2011/0281171 A1 | 11/2011 | Yong et al. |
| 2012/0028129 A1 | 2/2012 | Furuya |
| 2012/0050848 A1 | 3/2012 | Carlson et al. |
| 2012/0069429 A1 | 3/2012 | Barrett et al. |
| 2012/0107680 A1* | 5/2012 | Amiruddin ......... H01M 4/0447 29/623.1 |
| 2012/0115029 A1 | 5/2012 | Carlson |
| 2012/0135257 A1 | 5/2012 | Carlson et al. |
| 2012/0141877 A1 | 6/2012 | Choi et al. |
| 2012/0164499 A1 | 6/2012 | Chiang et al. |
| 2012/0189898 A1 | 7/2012 | Wakizaka et al. |
| 2012/0231321 A1 | 9/2012 | Huang et al. |
| 2012/0258348 A1 | 10/2012 | Hayakawa et al. |
| 2013/0055559 A1 | 3/2013 | Slocum et al. |
| 2013/0065122 A1 | 3/2013 | Chiang et al. |
| 2013/0089770 A1 | 4/2013 | Nishikawa |
| 2013/0149613 A1 | 6/2013 | Yoshikawa et al. |
| 2013/0171500 A1 | 7/2013 | Xu et al. |
| 2013/0260207 A1 | 10/2013 | Uemura |
| 2013/0309547 A1 | 11/2013 | Bazzarella et al. |
| 2013/0323542 A1 | 12/2013 | Wijayawardhana et al. |
| 2013/0337319 A1 | 12/2013 | Doherty et al. |
| 2013/0337349 A1 | 12/2013 | Brost et al. |
| 2013/0344367 A1 | 12/2013 | Chiang et al. |
| 2014/0004437 A1 | 1/2014 | Slocum et al. |
| 2014/0030623 A1 | 1/2014 | Chiang et al. |
| 2014/0039710 A1 | 2/2014 | Carter et al. |
| 2014/0065464 A1 | 3/2014 | Masarapu et al. |
| 2014/0154546 A1 | 6/2014 | Carter et al. |
| 2014/0170464 A1 | 6/2014 | Iwase |
| 2014/0170524 A1 | 6/2014 | Chiang et al. |
| 2014/0248521 A1 | 9/2014 | Chiang et al. |
| 2014/0315084 A1 | 10/2014 | Liu et al. |
| 2014/0315097 A1 | 10/2014 | Tan et al. |
| 2015/0024279 A1 | 1/2015 | Tan et al. |
| 2015/0030933 A1 | 1/2015 | Goetzen et al. |
| 2015/0056426 A1 | 2/2015 | Grouchko et al. |
| 2015/0129081 A1 | 5/2015 | Chiang et al. |
| 2015/0140371 A1 | 5/2015 | Slocum |
| 2015/0162586 A1 | 6/2015 | Fleischmann et al. |
| 2015/0171398 A1 | 6/2015 | Roumi |
| 2015/0171406 A1 | 6/2015 | Bazzarella et al. |
| 2015/0249249 A1 | 9/2015 | Ortega et al. |
| 2015/0280267 A1 | 10/2015 | Chiang et al. |
| 2015/0295272 A1 | 10/2015 | Chiang et al. |
| 2015/0299551 A1 | 10/2015 | Ota et al. |
| 2015/0340676 A1 | 11/2015 | Schmidhauser et al. |
| 2015/0357626 A1 | 12/2015 | Holman et al. |
| 2015/0364790 A1 | 12/2015 | Yonehara et al. |
| 2016/0006081 A1 | 1/2016 | Eaglesham et al. |
| 2016/0013461 A1 | 1/2016 | Mizuno et al. |
| 2016/0013507 A1 | 1/2016 | Chiang et al. |
| 2016/0054590 A1 | 2/2016 | Flitsch et al. |
| 2016/0056437 A1 | 2/2016 | Huang et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0141579 A1 | 5/2016 | Seok et al. |
| 2016/0141621 A1 | 5/2016 | Negishi et al. |
| 2016/0190536 A1 | 6/2016 | Park et al. |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0308218 A1 | 10/2016 | Ota et al. |
| 2016/0344006 A1 | 11/2016 | Ota et al. |
| 2016/0372784 A1* | 12/2016 | Hayner ................ H01M 4/131 |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0098857 A1 | 4/2017 | Carlson et al. |
| 2017/0149088 A1 | 5/2017 | Ueno et al. |
| 2017/0162863 A1 | 6/2017 | Doherty et al. |
| 2017/0187078 A1* | 6/2017 | Keates ............. H01M 10/0525 |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0271638 A1 | 9/2017 | Xu et al. |
| 2017/0288281 A1 | 10/2017 | Chiang et al. |
| 2017/0324073 A1 | 11/2017 | Herle |
| 2018/0034090 A1 | 2/2018 | Chiang et al. |
| 2018/0108893 A1 | 4/2018 | Yang |
| 2018/0175428 A1 | 6/2018 | Chiang et al. |
| 2018/0175445 A1 | 6/2018 | Tan et al. |
| 2018/0219250 A1 | 8/2018 | Delobel et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0044196 A1 | 2/2019 | Kang et al. |
| 2019/0058184 A1 | 2/2019 | Bazzarella et al. |
| 2019/0181496 A1 | 6/2019 | Visco et al. |
| 2019/0245242 A1 | 8/2019 | Tan et al. |
| 2019/0267598 A1 | 8/2019 | Xu et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0144686 A1* | 5/2020 | Jang .................... H01M 50/124 |
| 2020/0161688 A1 | 5/2020 | Chiang et al. |
| 2020/0207237 A1 | 7/2020 | Zuo et al. |
| 2020/0220118 A1 | 7/2020 | Bazzarella et al. |
| 2020/0220204 A1 | 7/2020 | Tan et al. |
| 2020/0259338 A1 | 8/2020 | Taylor et al. |
| 2020/0266407 A1 | 8/2020 | Honda et al. |
| 2020/0266479 A1 | 8/2020 | Hupfer et al. |
| 2020/0303707 A1* | 9/2020 | Zhou ................... H01M 50/457 |
| 2020/0321597 A1 | 10/2020 | Zagars et al. |
| 2020/0321601 A1 | 10/2020 | Slocum et al. |
| 2020/0358129 A1 | 11/2020 | Chen et al. |
| 2020/0395069 A1 | 12/2020 | Tang et al. |
| 2020/0395583 A1 | 12/2020 | Carlson et al. |
| 2020/0411825 A1 | 12/2020 | Bazzarella et al. |
| 2021/0080364 A1 | 3/2021 | Lee et al. |
| 2021/0091366 A1 | 3/2021 | Bazzarella et al. |
| 2021/0167351 A1 | 6/2021 | Zagars et al. |
| 2021/0226192 A1 | 7/2021 | Aranami et al. |
| 2021/0249678 A1 | 8/2021 | Chiang et al. |
| 2021/0249695 A1 | 8/2021 | Aranami et al. |
| 2021/0257679 A1 | 8/2021 | Tour et al. |
| 2021/0265631 A1 | 8/2021 | Chen et al. |
| 2021/0273268 A1 | 9/2021 | Yu et al. |
| 2021/0296733 A1 | 9/2021 | Carlson et al. |
| 2021/0359527 A1 | 11/2021 | Taylor et al. |
| 2021/0376380 A1 | 12/2021 | Tan et al. |
| 2021/0384516 A1 | 12/2021 | Lawrence et al. |
| 2022/0021019 A1 | 1/2022 | Tan et al. |
| 2022/0029207 A1 | 1/2022 | Chiang et al. |
| 2022/0037749 A1 | 2/2022 | Bazzarella et al. |
| 2022/0052403 A1 | 2/2022 | Chen et al. |
| 2022/0077445 A1 | 3/2022 | Ota et al. |
| 2022/0085440 A1 | 3/2022 | Ota et al. |
| 2022/0093929 A1 | 3/2022 | Chen et al. |
| 2022/0115710 A1 | 4/2022 | Zagars et al. |
| 2022/0172916 A1 | 6/2022 | Lawrence et al. |
| 2022/0173446 A1 | 6/2022 | Chiang et al. |
| 2022/0200306 A1 | 6/2022 | Kusachi et al. |
| 2022/0231274 A1 | 7/2022 | Zagars et al. |

(56) References Cited

U.S. PATENT DOCUMENTS

| | | | |
|---|---|---|---|
| 2022/0238923 A1 | 7/2022 | Chen et al. |
| 2022/0263104 A1 | 8/2022 | Chiang et al. |
| 2022/0263193 A1 | 8/2022 | Chen et al. |
| 2022/0278427 A1 | 9/2022 | Lawrence et al. |
| 2022/0285669 A1 | 9/2022 | Doherty et al. |
| 2022/0294079 A1 | 9/2022 | Zhang et al. |
| 2022/0299572 A1 | 9/2022 | Aoki |
| 2022/0344775 A1 | 10/2022 | Carlson et al. |
| 2022/0344776 A1 | 10/2022 | Carlson |
| 2022/0352597 A1 | 11/2022 | Chen et al. |
| 2022/0352598 A1 | 11/2022 | Avison et al. |
| 2023/0018078 A1 | 1/2023 | Slocum et al. |
| 2023/0022329 A1 | 1/2023 | Chen et al. |
| 2023/0085181 A1 | 3/2023 | Tan et al. |
| 2023/0090853 A1 | 3/2023 | Tyler et al. |
| 2023/0098274 A1 | 3/2023 | Carlson et al. |
| 2023/0118961 A1 | 4/2023 | Chen et al. |
| 2023/0133464 A1 | 5/2023 | Ota et al. |
| 2023/0170169 A1 | 6/2023 | Lawrence et al. |
| 2023/0178707 A1 | 6/2023 | Aranami et al. |
| 2023/0238562 A1 | 7/2023 | Kusachi et al. |
| 2023/0261247 A1* | 8/2023 | Ju .................. H01M 50/46 429/164 |
| 2023/0282906 A1 | 9/2023 | Chen et al. |
| 2023/0291063 A1 | 9/2023 | Holman et al. |
| 2023/0307803 A1 | 9/2023 | Bazzarella et al. |
| 2023/0327068 A1 | 10/2023 | Tyler et al. |
| 2023/0327077 A1 | 10/2023 | Zagars et al. |
| 2023/0327178 A1 | 10/2023 | Taylor et al. |
| 2023/0335748 A1 | 10/2023 | Chen et al. |
| 2023/0352755 A1 | 11/2023 | Aragon et al. |
| 2023/0369603 A1 | 11/2023 | Ota et al. |
| 2023/0369719 A1 | 11/2023 | Bazzarella et al. |
| 2023/0378512 A1 | 11/2023 | Bazzarella et al. |
| 2023/0395771 A1 | 12/2023 | Zagars et al. |
| 2023/0411695 A1 | 12/2023 | Narita et al. |
| 2024/0039001 A1 | 2/2024 | Kusachi et al. |
| 2024/0039120 A1 | 2/2024 | Carlson |
| 2024/0047689 A1 | 2/2024 | Hartzog et al. |
| 2024/0047772 A1 | 2/2024 | Hartzog et al. |
| 2024/0047810 A1 | 2/2024 | Hartzog et al. |
| 2024/0047832 A1 | 2/2024 | Hartzog et al. |
| 2024/0055702 A1 | 2/2024 | Ota et al. |
| 2024/0063417 A1 | 2/2024 | Chiang et al. |
| 2024/0079647 A1 | 3/2024 | Tan et al. |
| 2024/0088355 A1 | 3/2024 | Ota et al. |
| 2024/0106003 A1 | 3/2024 | Aranami et al. |
| 2024/0128541 A1 | 4/2024 | Nematollahi |
| 2024/0178502 A1 | 5/2024 | Ota |
| 2024/0204264 A1 | 6/2024 | Chen |
| 2024/0204288 A1 | 6/2024 | Nematollahi |
| 2024/0213572 A1 | 6/2024 | Nematollahi |
| 2024/0234705 A1 | 7/2024 | Ota et al. |
| 2024/0291088 A1 | 8/2024 | Nematollahi |
| 2024/0304882 A1 | 9/2024 | Kunanusont et al. |
| 2024/0304942 A1 | 9/2024 | Patel et al. |
| 2024/0372212 A1 | 11/2024 | Chen |
| 2024/0372213 A1 | 11/2024 | Chen |
| 2024/0372214 A1 | 11/2024 | Chen |
| 2024/0379930 A1 | 11/2024 | Axelsen et al. |
| 2024/0380061 A1 | 11/2024 | Zimmerman et al. |

FOREIGN PATENT DOCUMENTS

| | | | |
|---|---|---|---|
| CN | 1285084 A | 2/2001 | |
| CN | 1492523 A | 4/2004 | |
| CN | 1167163 C | 9/2004 | |
| CN | 1175505 C | 11/2004 | |
| CN | 101796668 A | 8/2010 | |
| CN | 101946344 A | 1/2011 | |
| CN | 102242464 A | 11/2011 | |
| CN | 102437302 A | 5/2012 | |
| CN | 102460772 A | 5/2012 | |
| CN | 102640329 A | 8/2012 | |
| CN | 102769116 A | 11/2012 | |
| CN | 102959765 A | 3/2013 | |
| CN | 101796668 B | 8/2013 | |
| CN | 103262305 A | 8/2013 | |
| CN | 103282408 A | 9/2013 | |
| CN | 103283060 A | 9/2013 | |
| CN | 102640329 B | 11/2015 | |
| CN | 105247703 A | 1/2016 | |
| EP | 0143562 A1 | 6/1985 | |
| EP | 0523840 A1 | 1/1993 | |
| EP | 0600718 A2 | 6/1994 | |
| EP | 0523840 B1 | 4/1996 | |
| EP | 0814520 A2 | 12/1997 | |
| EP | 0836238 A1 | 4/1998 | |
| EP | 0848435 A1 | 6/1998 | |
| EP | 0875950 A2 | 11/1998 | |
| EP | 0892449 A1 | 1/1999 | |
| EP | 0600718 B1 | 4/2000 | |
| EP | 1156544 A2 | 11/2001 | |
| EP | 0836238 B1 | 11/2005 | |
| EP | 0848435 B1 | 5/2007 | |
| EP | 3133671 A1 | 2/2017 | |
| EP | 4117104 A1 * | 1/2023 | ........ H01M 10/0525 |
| FR | 3007207 A1 | 12/2014 | |
| JP | S4610339 Y1 | 4/1971 | |
| JP | H05283108 A | 10/1993 | |
| JP | H0614077 A | 1/1994 | |
| JP | H06140077 A | 5/1994 | |
| JP | H06275313 A | 9/1994 | |
| JP | H087895 A | 1/1996 | |
| JP | H08255615 A | 10/1996 | |
| JP | H0927343 A | 1/1997 | |
| JP | H10214639 A | 8/1998 | |
| JP | H11233144 A | 8/1999 | |
| JP | 2000011986 A | 1/2000 | |
| JP | 2000323129 A | 11/2000 | |
| JP | 2001143690 A | 5/2001 | |
| JP | 2002042882 A | 2/2002 | |
| JP | 2002203542 A | 7/2002 | |
| JP | 2002532852 A | 10/2002 | |
| JP | 2003517418 A | 5/2003 | |
| JP | 2003223926 A | 8/2003 | |
| JP | 2004119367 A | 4/2004 | |
| JP | 2005022674 A | 1/2005 | |
| JP | 2005190785 A | 7/2005 | |
| JP | 2005235695 A | 9/2005 | |
| JP | 2006236994 A | 9/2006 | |
| JP | 2006269358 A | 10/2006 | |
| JP | 2007227136 A | 9/2007 | |
| JP | 2007258160 A | 10/2007 | |
| JP | 2008041404 A | 2/2008 | |
| JP | 2008048838 A | 3/2008 | |
| JP | 2008066094 A | 3/2008 | |
| JP | 2008123988 A | 5/2008 | |
| JP | 2008140551 A | 6/2008 | |
| JP | 2008171593 A | 7/2008 | |
| JP | 2008210541 A | 9/2008 | |
| JP | 2008226566 A | 9/2008 | |
| JP | 2008234879 A | 10/2008 | |
| JP | 2008266593 A | 11/2008 | |
| JP | 2009064566 A | 3/2009 | |
| JP | 2009176552 A | 8/2009 | |
| JP | 2009188037 A | 8/2009 | |
| JP | 4426721 B2 | 3/2010 | |
| JP | 2010056036 A | 3/2010 | |
| JP | 2010123383 A | 6/2010 | |
| JP | 2010202987 A | 9/2010 | |
| JP | 2011065849 A | 3/2011 | |
| JP | 2011233144 A | 11/2011 | |
| JP | 2012018773 A | 1/2012 | |
| JP | 2012069283 A | 4/2012 | |
| JP | 4932263 B2 | 5/2012 | |
| JP | 5183016 B2 | 4/2013 | |
| JP | 2013161684 A | 8/2013 | |
| JP | 2013535113 A | 9/2013 | |
| JP | 2013535773 A | 9/2013 | |
| JP | 2013211185 A | 10/2013 | |
| JP | 2014127440 A | 7/2014 | |
| JP | 2015018635 A | 1/2015 | |

(56) References Cited

FOREIGN PATENT DOCUMENTS

| | | |
|---|---|---|
| JP | 2015504234 A | 2/2015 |
| JP | 2015230796 A | 12/2015 |
| JP | 2016110886 A | 6/2016 |
| JP | 2016517161 A | 6/2016 |
| JP | 2016149202 A | 8/2016 |
| JP | 6275313 B2 | 2/2018 |
| JP | 2021093379 A | 6/2021 |
| KR | 20070069171 A | 7/2007 |
| KR | 20080063793 A | 7/2008 |
| KR | 20090026190 A | 3/2009 |
| KR | 20090052556 A | 5/2009 |
| KR | 20090123894 A | 12/2009 |
| KR | 20100137530 A | 12/2010 |
| KR | 20110079744 A | 7/2011 |
| KR | 20110116489 A | 10/2011 |
| KR | 20120062333 A | 6/2012 |
| KR | 20120110111 A | 10/2012 |
| KR | 20130036043 A | 4/2013 |
| KR | 20130054346 A | 5/2013 |
| KR | 20140024464 A | 2/2014 |
| KR | 20150108040 A | 9/2015 |
| WO | WO-9102385 A1 | 2/1991 |
| WO | WO-9103080 A1 | 3/1991 |
| WO | WO-9708763 A1 | 3/1997 |
| WO | WO-9931751 A1 | 6/1999 |
| WO | WO-9933125 A1 | 7/1999 |
| WO | WO-9957770 A1 | 11/1999 |
| WO | WO-0076011 A2 | 12/2000 |
| WO | WO-0103824 A1 | 1/2001 |
| WO | WO-0076011 A3 | 4/2001 |
| WO | WO-0139293 A2 | 5/2001 |
| WO | WO-0139303 A1 | 5/2001 |
| WO | WO-2005011043 A1 | 2/2005 |
| WO | WO-2005022674 A1 | 3/2005 |
| WO | WO-2006080265 A1 | 8/2006 |
| WO | WO-2006123892 A1 | 11/2006 |
| WO | WO-2007006011 A2 | 1/2007 |
| WO | WO-2007076011 A1 | 7/2007 |
| WO | WO-2007095348 A2 | 8/2007 |
| WO | WO-2007135790 A1 | 11/2007 |
| WO | WO-2007120763 A3 | 3/2008 |
| WO | WO-2008087966 A1 | 7/2008 |
| WO | WO-2008099468 A1 | 8/2008 |
| WO | WO-2008114727 A1 | 9/2008 |
| WO | WO-2008143005 A1 | 11/2008 |
| WO | WO-2008150070 A1 | 12/2008 |
| WO | WO-2009014388 A2 | 1/2009 |
| WO | WO-2009026467 A1 | 2/2009 |
| WO | WO-2009044741 A1 | 4/2009 |
| WO | WO-2009066946 A2 | 5/2009 |
| WO | WO-2009066946 A3 | 8/2009 |
| WO | WO-2009120812 A2 | 10/2009 |
| WO | WO-2010016881 A1 | 2/2010 |
| WO | WO-2010103824 A1 | 9/2010 |
| WO | WO-2010138176 A1 | 12/2010 |
| WO | WO-2010138177 A1 | 12/2010 |
| WO | WO-2010138179 A1 | 12/2010 |
| WO | WO-2011065849 A1 | 6/2011 |
| WO | WO-2012005139 A1 | 1/2012 |
| WO | WO-2012011157 A1 | 1/2012 |
| WO | WO-2012011944 A2 | 1/2012 |
| WO | WO-2012113157 A1 | 8/2012 |
| WO | WO-2013139303 A1 | 9/2013 |
| WO | WO-2013146126 A1 | 10/2013 |
| WO | WO-2014052533 A1 | 4/2014 |
| WO | WO-2014119665 A1 | 8/2014 |
| WO | WO-2014179355 A1 | 11/2014 |
| WO | WO-2015004069 A1 | 1/2015 |
| WO | WO-2015074065 A1 | 5/2015 |
| WO | WO-2016168715 A1 | 10/2016 |
| WO | WO-2017008081 A1 | 1/2017 |
| WO | WO-2018050067 A1 | 3/2018 |
| WO | WO-2019074925 A1 | 4/2019 |
| WO | WO-2019136467 A1 | 7/2019 |
| WO | WO-2021087465 A1 | 5/2021 |
| WO | WO-2022040103 A1 | 2/2022 |
| WO | WO-2022232625 A2 | 11/2022 |
| WO | WO-2024130246 A1 | 6/2024 |

OTHER PUBLICATIONS

Notice of Allowance for U.S. Appl. No. 18/650,789 mailed Jul. 19, 2024, 8 pages.
Co-pending U.S. Appl. No. 18/223,894, inventors Chen; Junzheng et al., filed Jul. 19, 2023.
Co-pending U.S. Appl. No. 18/372,308, inventors Naoki; Ota et al., filed Sep. 25, 2023.
Co-pending U.S. Appl. No. 18/510,473, inventor Taylor; Tony L., filed Nov. 15, 2023.
Co-pending U.S. Appl. No. 18/526,405, inventor Chiang; Yet-Ming, filed Dec. 1, 2023.
Co-pending U.S. Appl. No. 18/543,515, inventor Junzheng; Chen, filed Dec. 18, 2023.
Co-pending U.S. Appl. No. 18/584,292, inventor Nematollahi; Khosrow, filed Feb. 22, 2024.
Co-pending U.S. Appl. No. 18/596,235, inventor Kunanusont; Nattanai, filed Mar. 5, 2024.
Co-pending U.S. Appl. No. 18/629,597, inventors Ota; Naoki et al., filed Apr. 8, 2024.
Co-pending U.S. Appl. No. 18/649,698, inventors Axelsen; Neil et al., filed Apr. 29, 2024.
Co-pending U.S. Appl. No. 18/650,789, inventor Chen; Junzheng, filed Apr. 30, 2024.
Co-pending U.S. Appl. No. 18/655,863, inventors Jacob; Zimmerman et al., filed May 6, 2024.
Co-pending U.S. Appl. No. 18/741,165, inventor Chen; Junzheng, filed Jun. 12, 2024.
Co-pending U.S. Appl. No. 18/741,181, inventor Chen; Junzheng, filed Jun. 12, 2024.
Co-pending U.S. Appl. No. 18/742,860, inventor Nematollahi; Khosrow, filed Jun. 13, 2024.
Co-pending U.S. Appl. No. 18/747,106, inventor Song; Junhua, filed Jun. 18, 2024.
Co-pending U.S. Appl. No. 18/763,907, inventors Bazzarella; Ricardo et al., filed Jul. 3, 2024.
Gomez-Martin et al., "Opportunities and Challenges of Li2C4O4 as Pre-Lithiation Additive for the Positive Electrode in NMC622∥Silicon/Graphite Lithium Ion Cells," Advanced Science, Aug. 2022, 9(24):2201742, 15 pages.
Ikezawa A., et al., "Performance of Li4Ti5O12-based Reference Electrode for the Electrochemical Analysis of All-solid-state Lithium-ion Batteries," Electrochemistry Communications, Jul. 2020, vol. 116: 106743, 5 pages.
International Preliminary Report on Patentability for Application No. PCT/US2020/058564, mailed May 12, 2022, 9 pages.
International Preliminary Report on Patentability for International Application No. PCT/US2022/027104 dated Nov. 9, 2023, 8 pages.
International Search Report and Written Opinion for Application No. PCT/US2022/027104, mailed Dec. 13, 2022, 12 pages.
International Search Report and Written Opinion for International Application No. PCT/US2020/058564, mailed Feb. 1, 2021, 12 pages.
International Search Report and Written Opinion for International Application No. PCT/US2023/084611 dated Apr. 18, 2024, 9 pages.
Lawrence et al., U.S. Appl. No. 63/622,201, titled "Systems and methods of folding electrochemical cell tabs for energy density improvement", filed Jan. 28, 2024, 23 pages.
Liu et al., "Controllable long-term lithium replenishment for enhancing energy density and cycle life of lithium-ion batteries," Energy & Environmental Science, 2024, 17(3):1163-1174.
Matsuzaki et al., "Application of Na2CO3 as a Sacrificial Electrode Additive in Na-ion Batteries to Compensate for the Sodium Deficiency in Na⅔[Fe½Mn½]O2," Batteries & Supercaps, May 2024, 7(5):e202400009, 9 pages.
Non-Final Office Action for U.S. Appl. No. 18/543,515 dated Feb. 9, 2024, 14 pages.

(56) References Cited

OTHER PUBLICATIONS

Non-Final Office Action for U.S. Appl. No. 18/543,959 dated May 1, 2024, 8 pages.
Notice of Allowance for U.S. Appl. No. 18/543,515 dated Apr. 4, 2024, 10 pages.
Piana M., et al., "Stability of a Pyrrolidinum-Based Ionic Liquid in Li-0 2 Cells," Journal of the Electrochemical Society, Jan. 2014, vol. 161(14), pp. A1992-A2001.
Co-pending U.S. Appl. No. 18/896,564, inventor Zagars; Raymond, filed Sep. 25, 2024.
Co-pending U.S. Appl. No. 18/911,725, inventors Kusachi; Yuki et al., filed Oct. 10, 2024.
Holtmann et al., "Boehmite-based ceramic separator for lithium-ion batteries," Journal of Applied Electrochemistry, Jan. 2016, vol. 46, pp. 69-76.
Kim et al., "Preparation of a Trilayer Separator and its Application to Lithium-ion Batteries", Journal of Power Sources, Elsevier SA, CH, Jul. 2, 2010, vol. 195, No. 24, pp. 8302-8305.
Nestler et al., "Separators—Technology Review: Ceramic based Separators for Secondary Batteries," AIP Conference Proceedings, Jan. 1, 2014, vol. 1597(1), pp. 155-184, New York, US, ISSN: 3084-243X, DOI: 10,1063/1.4878486.
Steven et al., U.S. Appl. No. 60/773,487 titled "Methods of preparing separators for electrochemical cells," filed Feb. 15, 2006, 30 pages.
Takemura et al., "A Powder Particle Size Effect on Ceramic Powder Based Separator for Lithium Rechargeable Battery," Journal of Power Sources, Aug. 2005, vol. 146(102), pp. 779-783.
Uhlhorn, et al., "Synthesis of Ceramic Membranes: Part I Synthesis of non-supported and supported γ-alumina membranes without defects," Journal of Materials Science, Jan. 1992, 27, pp. 527-537.
Zhang et al., "Sulfonated polyimide/AlOOH composite membranes with decreased vanadium permeability and increased stability for vanadium redox flow battery", Journal of Solid State Electrochemistry, Springer, Berlin, DE, vol. 18, No. 12, Jul. 18, 2014, pp. 3479-3490.
U.S. Appl. No. 18/928,925, filed Oct. 28, 2024, by Song et al.
U.S. Appl. No. 19/029,226, filed Jan. 17, 2025, by Zagars et al.
U.S. Appl. No. 19/029,542, filed Jan. 17, 2025, by Lawrence et al.
U.S. Appl. No. 19/040,104, filed Jan. 1, 2025, by Song et al.
U.S. Appl. No. 19/044,982, filed Feb. 4, 2024, by Lawrence et al.
U.S. Appl. No. 19/058,363, filed Feb. 20, 2025, by Hartzog et al.

\* cited by examiner

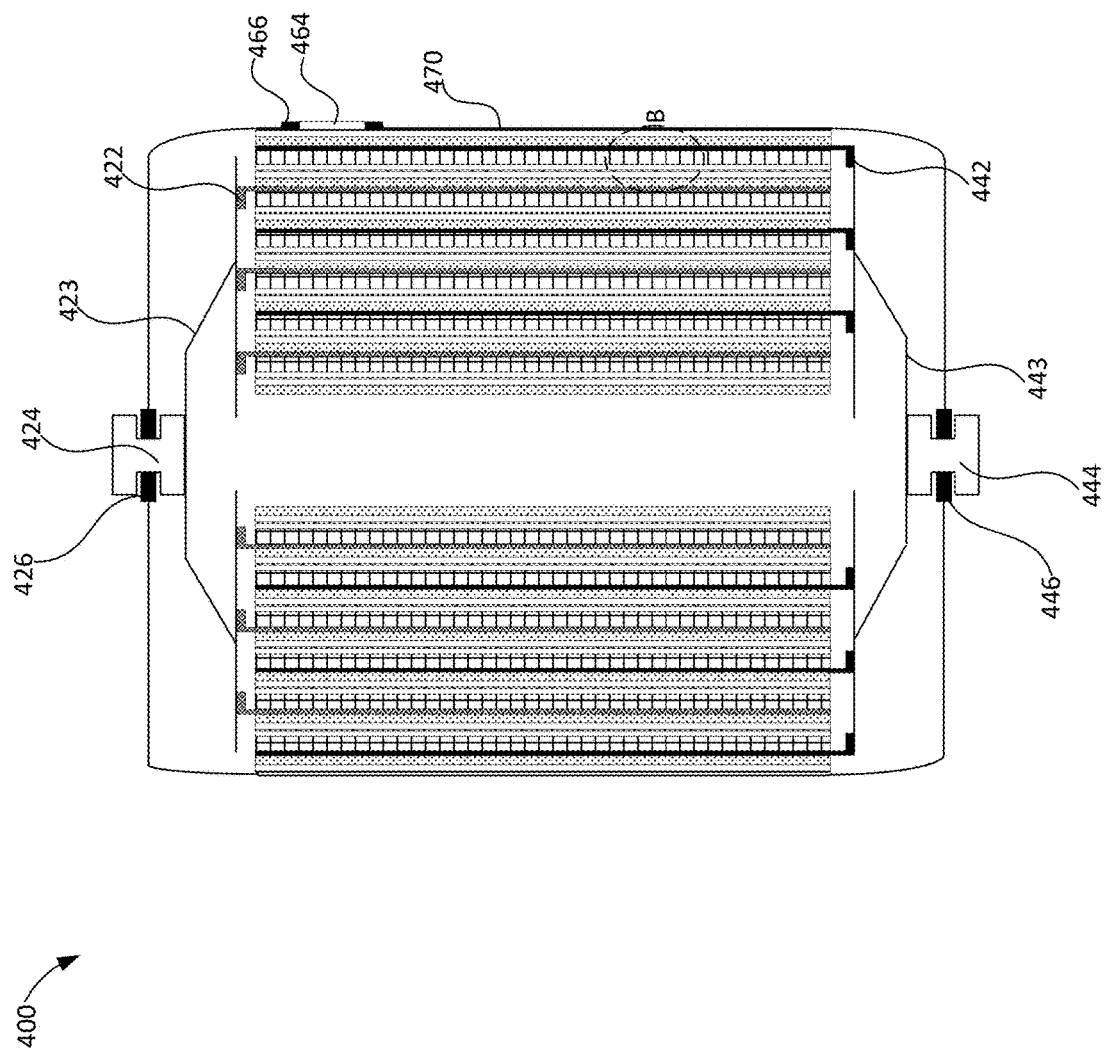

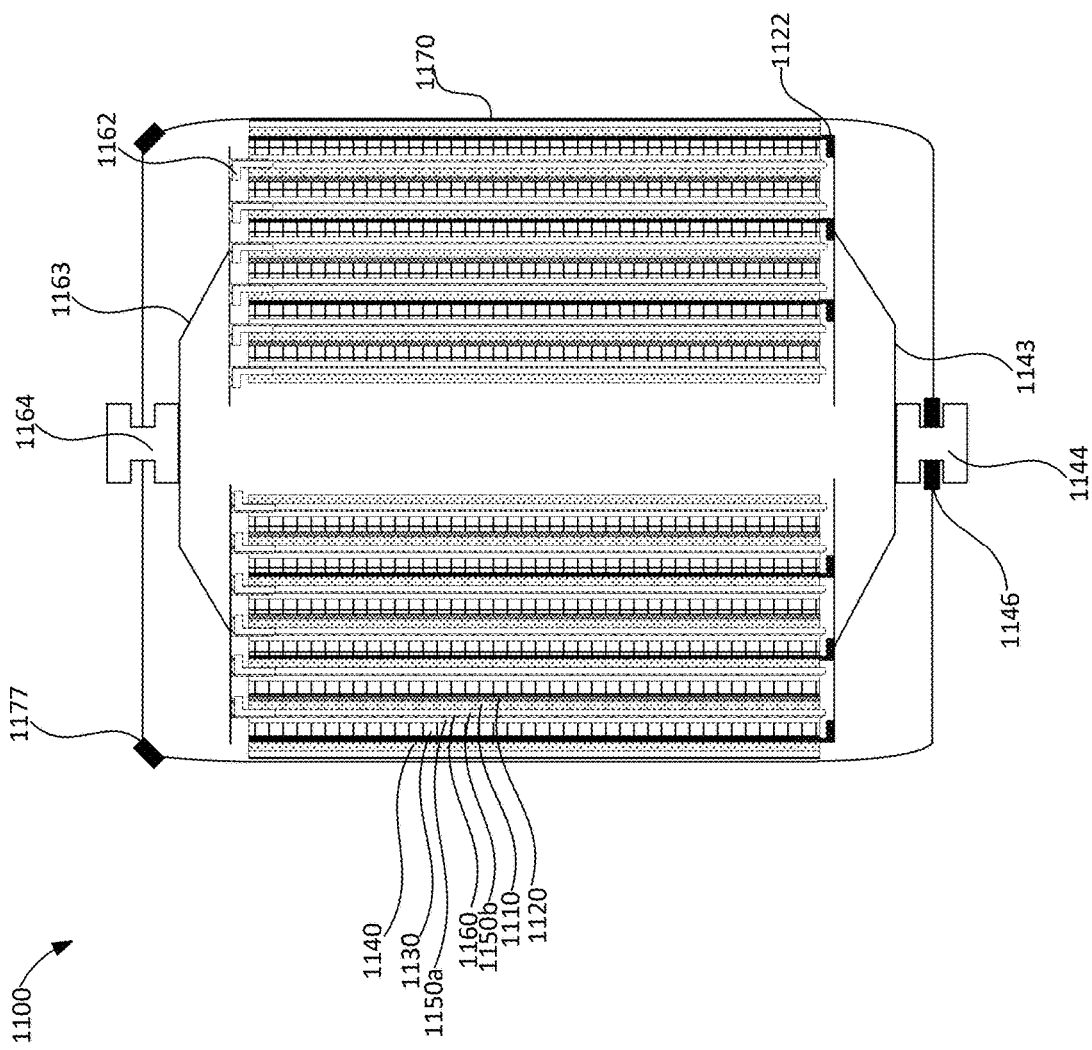

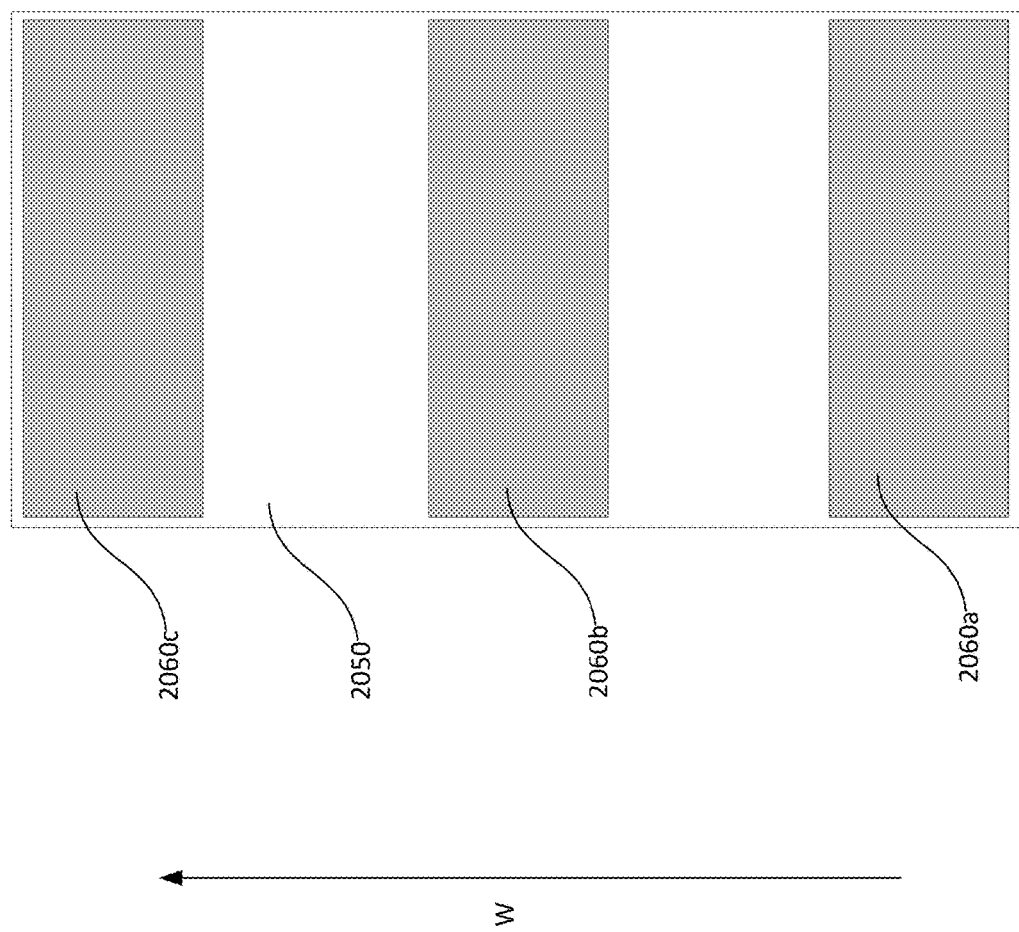

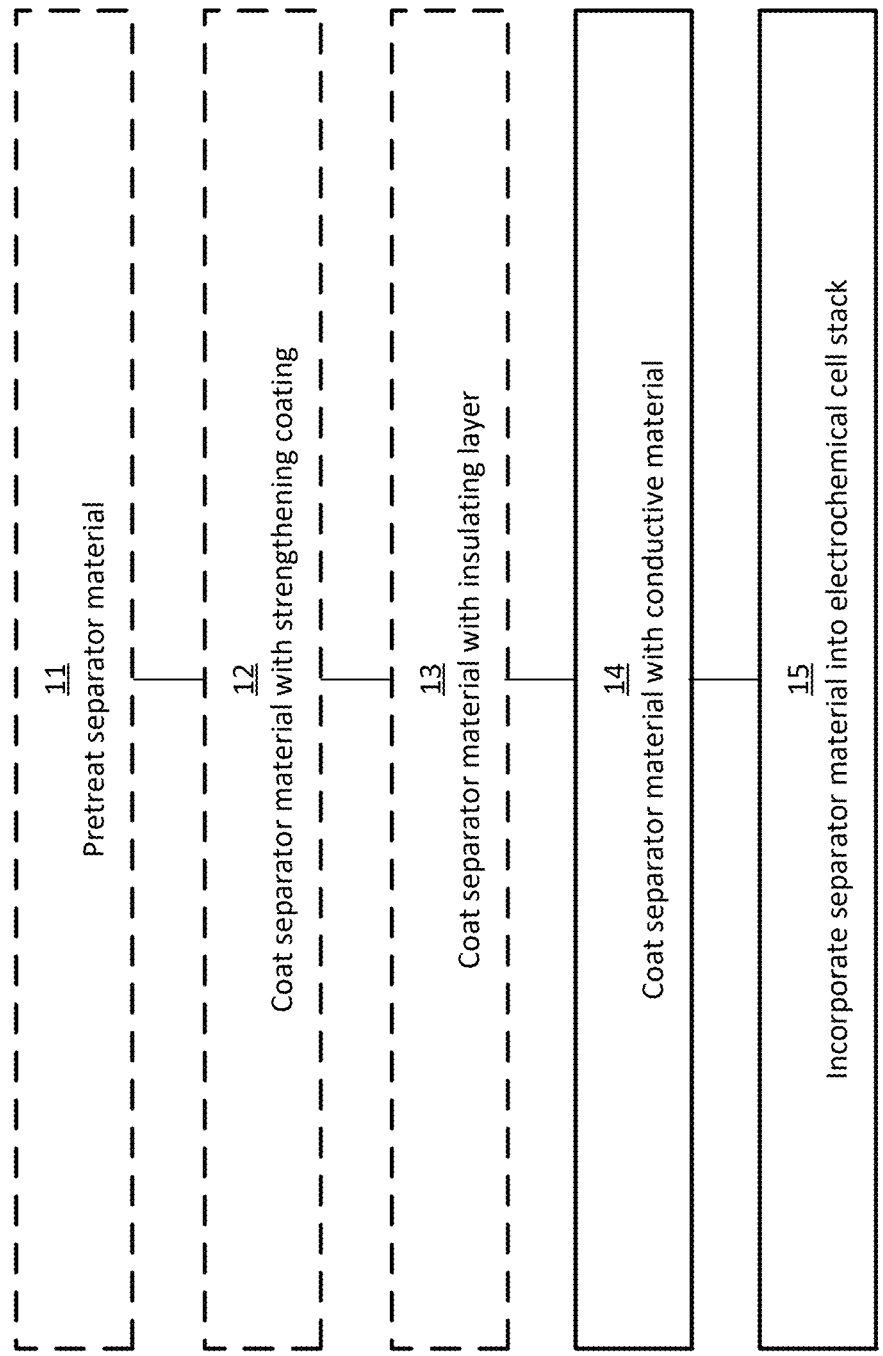

FIG. 28
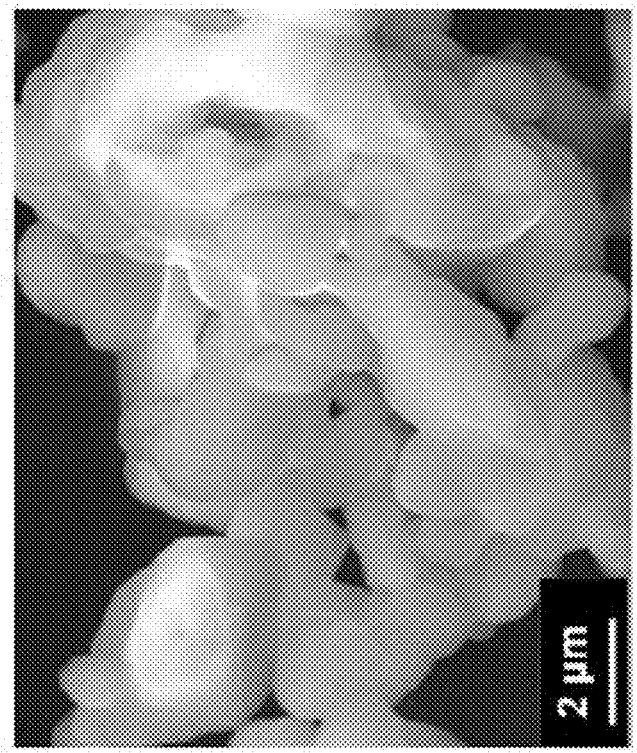
$$Na_2CO_3 \rightarrow 2Na^+ + 2e^- + CO_2 + 1/2O_2$$
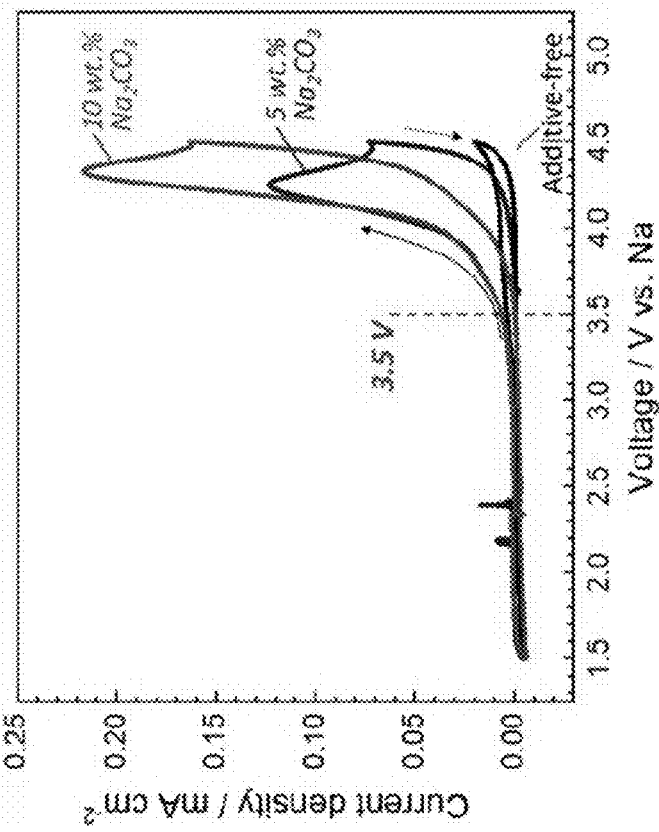

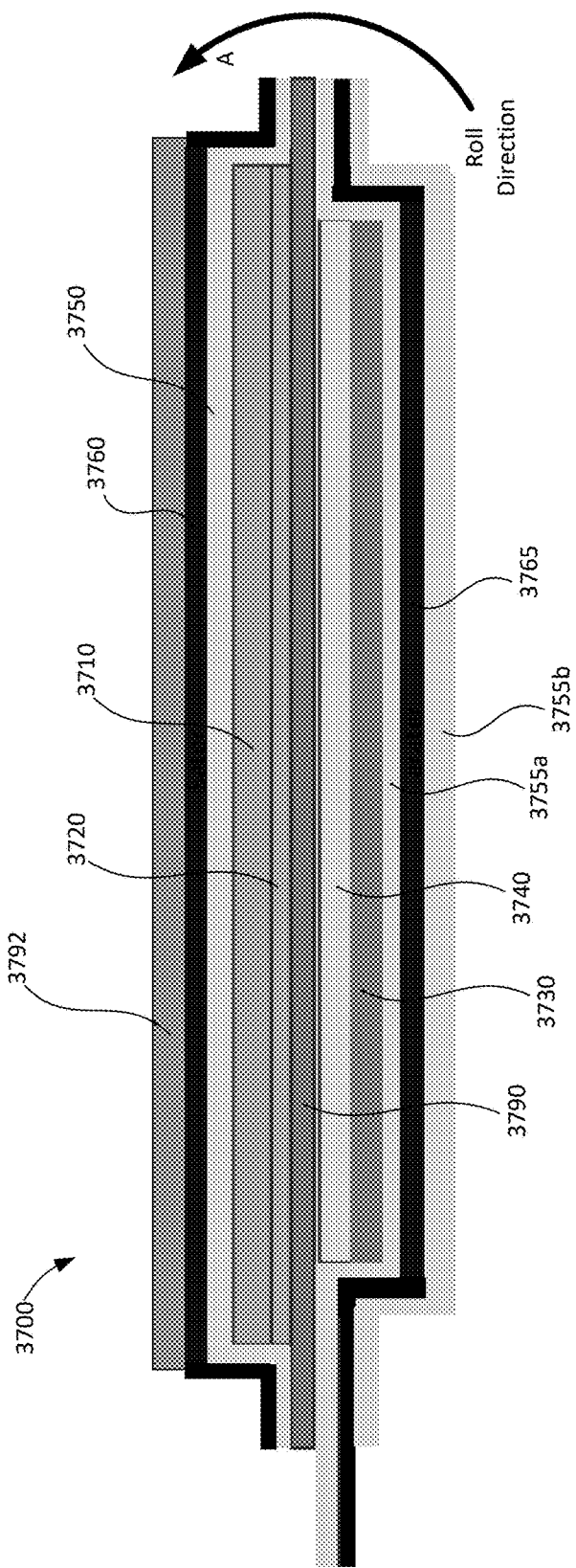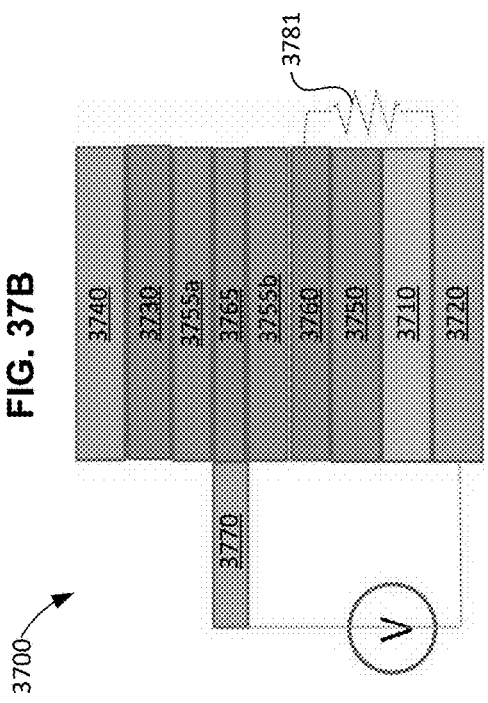
FIG. 37A
FIG. 37B

SYSTEMS AND METHODS FOR MINIMIZING AND PREVENTING DENDRITE FORMATION IN ELECTROCHEMICAL CELLS

CROSS-REFERENCE TO RELATED APPLICATIONS

This application claims priority to and benefit of U.S. Provisional Application No. 63/569,880, filed Mar. 26, 2024, and entitled "Systems and methods for minimizing and preventing dendrite formation in electrochemical cells," U.S. Provisional Application No. 63/574,656, filed Apr. 4, 2024, and entitled "Systems and methods for minimizing and preventing dendrite formation in electrochemical cells," U.S. Provisional Application No. 63/647,741, filed May 15, 2024, and entitled "Systems and methods for minimizing and preventing dendrite formation in electrochemical cells," and U.S. Provisional Application No. 63/647,979, filed May 15, 2024, and entitled "Systems and methods for minimizing and preventing dendrite formation in electrochemical cells," the entire disclosures of which are hereby incorporated by reference herein in their entirety.

TECHNICAL FIELD

Embodiments described herein relate to electrochemical cells formulated to minimize damage from dendrite formation.

BACKGROUND

Dendrite formation in electrochemical cells can lead to short circuiting and heat generation. Heat generation in electrochemical cells is a safety issue that can have dangerous results. Thermal runaway can lead to fires and thermal decomposition of the electrochemical cell materials. By minimizing the size to which dendrites can grow, significant safety issues can be avoided.

SUMMARY

Embodiments described herein relate to electrochemical cells with dendrite prevention mechanisms, and methods of producing and operating the same. In some aspects, an electrochemical cell can include an anode and a cathode material disposed on a cathode current collector, the cathode material and the cathode current collector forming a cathode. The electrochemical cell further includes a first separator disposed on the anode, a second separator disposed on the cathode, and an interlayer disposed between the first separator and the second separator, the interlayer including electroactive material, the interlayer including a source of lithium ions, the lithium ions configured to migrate toward the anode upon a voltage difference between the interlayer and the anode exceeding a threshold value. In some embodiments, the anode can include an anode material disposed on an anode current collector. In some embodiments, the anode material can include graphite, silicon, and/or hard carbon. In some embodiments, the source of lithium ions can include $Li_2C_4O_4$, $Li_2C_2O_4$, $Li_2O$, and/or $Li_2NiO_2$. In some embodiments, the anode can include an anode current collector without an anode material disposed thereon. In embodiments, the electroactive materials in the interlayer can include $Li_xMPO_4$ (wherein x=0.9-1.05 and M=Fe, Mn, Co, or any combination thereof), layered $Li_xTMO_2$ (wherein x=0.95-1.2 and TM=Ni, Mn, Co, Al, Ti, Sn, or any combination thereof), spinel $Li_xTM_2O_4$ (wherein x=0.95-1.02 and TM=Ni, Mn, Co, Al, Ti, Sn, Sb, or any combination thereof), and their delithiated analogies, where $0 \leq x \leq 1$. The electroactive materials can further include materials that are electrochemically active towards lithium ion at voltages greater than about 2V, which can include sulfur, $Fe_2O_3$, $V_2O_5$, $TiO_2$.

In some embodiment, an electrochemical cell includes: an anode material disposed on an anode current collector; a cathode material disposed on a cathode current collector; a first separator disposed on the anode material; a second separator disposed on the cathode material; an interlayer disposed between the first separator and the second separator, the interlayer including electroactive material; and a housing configured to contain the anode material, the anode current collector, the cathode material, the cathode current collector, the first separator, the second separator, and the interlayer, wherein the anode material is electrically coupled to a first portion of the housing, the cathode material is electrically coupled to a second portion of the housing, and the interlayer is electrically coupled to a third portion of the housing.

In some embodiments, an electrochemical cell includes: an anode material disposed on an anode current collector; a cathode material disposed on a cathode current collector; a separator disposed between the anode and the cathode; an interlayer coupled to the separator; and a conductive coating disposed on the interlayer.

In some embodiments, an electrochemical cell includes: an anode material disposed on an anode current collector; a cathode material disposed on a cathode current collector; an insulator layer disposed between the anode current collector and the cathode current collector; a separator disposed on the anode; and an interlayer disposed on the separator, wherein the electrochemical cell is configured to be rolled into a wound configuration.

BRIEF DESCRIPTION OF THE DRAWINGS

FIGS. 4A-4B are illustrations of an electrochemical cell with an interlayer, according to an embodiment.

FIG. 11 is an illustration of an electrochemical cell with an interlayer, according to an embodiment.

FIGS. 20A-20B are illustrations of the production of an electrochemical cell stack with interlayers, according to an embodiment.

FIG. 21 is a flow diagram of a method of forming an electrochemical cell stack with one or more interlayers, according to an embodiment.

FIG. 28 shows functionalization of FIRS systems and associated data.

FIGS. 37A-37B are illustrations of an electrochemical cell with interlayers and a center tube, according to an embodiment.

DETAILED DESCRIPTION

Figure 1:
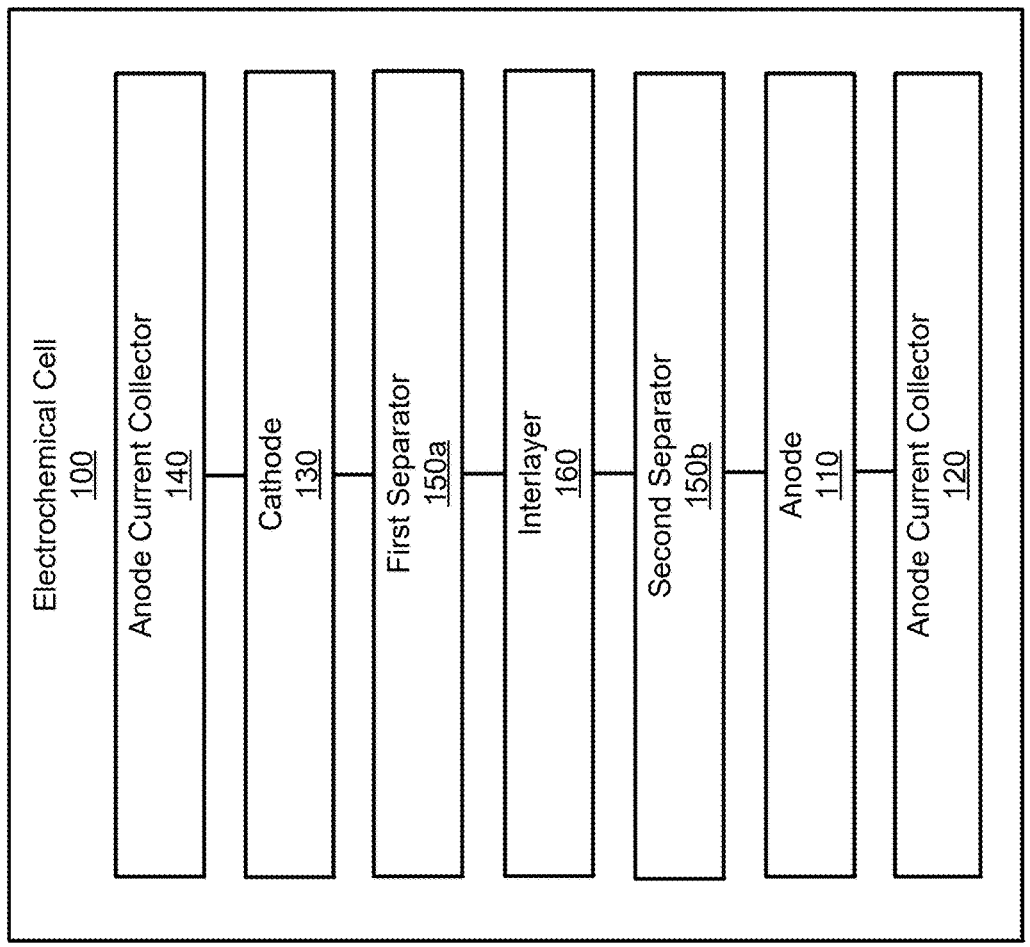
FIG. 1 is a block diagram of an electrochemical cell with an interlayer, according to an embodiment.

Embodiments described herein relate to electrochemical cells with interlayers, and methods of operating the same. An interlayer can include a layer of electroactive material placed between an anode and a cathode of an electrochemical cell. The interlayer can be disposed between a first separator and a second separator. Interlayers can be used to detect dendrites before they grow too large, such that the dendrites would cause safety hazards. A battery management system (BMS) can be connected to the electrochemical cell to detect when a dendrite enters the interlayer and safely discharge the remaining energy in the electrochemical cell. In some embodiments, the discharge energy can be used to power other devices, such as heaters, removing cell energy to create a safe condition.

In some embodiments, the BMS can be used to draw energy through the interlayer, causing the dendrite to dissolve. This effectively removes the dendrite from the electrochemical cell. In some embodiments, energy for dissolution of the dendrite can be produced via a power supply in the BMS. In some embodiments, energy for dissolution of the dendrite can be produced by drawing energy from the cathode to increase the interlayer voltage relative to the anode.

In some embodiments, the BMS can be used to detect the voltage of the interlayer with respect to the anode, in order to detect the formation of the dendrite. The detection can include the estimation of the relative voltage of the interlayer to both the anode and the cathode. If the voltage of the interlayer decreases with respect to the cathode (e.g., if the voltage difference between the interlayer and the cathode is greater than about 0.1 V, greater than about 0.2 V, greater than about 0.3 V, greater than about 0.4 V, greater than about 0.5 V, greater than about 0.6 V, greater than about 0.7 V, greater than about 0.8 V, greater than about 0.9 V, greater than about 1 V, greater than about 1.5 V, greater than about 2 V, greater than about 2.5 V, or greater than about 3 V, inclusive of all values and ranges therebetween), a signal can be provided to a vehicle housing the electrochemical cell to set a warning that the vehicle needs service. The threshold voltage can be a function of the design of the electrochemical cell and the interlayer. In some embodiments, the voltage difference between the interlayer and the anode can be used to trigger the service warning. In some embodiments, a combination of voltages between the anode, cathode, and/or the interlayer can be used to trigger the service warning. In some embodiments, a rate of change of the voltage of the interlayer can be used to evaluate warnings and faults in the electrochemical cell and/or in the vehicle. In some embodiments, the rate of change of the interlayer voltage can be used to perform control functions to eliminate the dendrite.

In some embodiments, a significant voltage difference between the interlayer and the cathode (e.g., at least about 0.5 V, at least about 1 V, at least about 1.5 V, at least about 2 V, at least about 2.5 V, at least about 3 V, at least about 3.5 V, at least about 4 V, at least about 4.5 V, or at least about 5 V, inclusive of all values and ranges therebetween) can trigger a warning signal that electrochemical cell failure and/or vehicle failure is imminent. In some embodiments, the BMS can limit discharge current of the electrochemical cell to create a reduction of power to the vehicle. This can be by directly limiting power and/or by communication of limits to a vehicle controller or another controller in the vehicle, depending on the vehicle's design.

In some embodiments, voltage can be measured between the anode and the interlayer. In some embodiments, the voltage can be measured between the cathode and the interlayer. In some embodiments, the voltages can be measured via a proportional-integral (PI) loop. The voltage between the anode and the interlayer and the voltage between the cathode and the interlayer preferably remain consistent throughout a charging process. In some embodiments, an external component can be used to maintain the interlayer near the cathode voltage. In some embodiments, the external component can include a diode, a resistor, a fuse, a transistor (Bi junction, field-effect transistor (FET), etc.), or any combination thereof.

In some embodiments, the interlayer can be chemically configured to remove the dendrite as the dendrite protrudes into the interlayer. For example, a high potential applied to the interlayer can oxidize and dissolve the dendrite. In some embodiments, the interlayer can include one or more solid layers that physically block dendrites from penetrating the interlayer. In some embodiments, the solid layer can include a solid-state electrolyte.

In some embodiments, a resistance can be applied to the interlayer. The resistance can provide a continuous excitation of the interlayer such that a dendrite would not be able to form across the dendrite and both separator layers. Such a prevention method can be used as part of an overall control strategy where the voltage potential, current, resistance to interlayer could be changed based on a control algorithm.

A control system can act in an active prevention mode, where the potential of the interlayer is modulated or changed to apply different voltage potentials. The voltage potentials can be increased (i.e., changed to be more similar to cathode side) or decreased (changed to be more similar to anode side) to maintain the cell function. When the dendrite forms and interfaces with the interlayer, the voltage of the interlayer is increased to be more similar to the cathode potential, with respect to the anode. The dendrite is dissolved or remediated, and the voltage potential of the interlayer returns to near the voltage potential of the cathode with respect to the anode.

Dendrite growth in lithium cells is often detected via a thermal event (i.e., a sudden spike in temperature). In many cases, cell damage has already occurred once the thermal event is detected. Embodiments described herein relate to measurement of voltage potential of a separator layer (i.e., including an interlayer) relative to the anode and/or the cathode. Voltage potential is used to detect dendrite growth into the separator layer. Dendrite growth causes a voltage change in the separator layer relative to the anode and/or the cathode. Detection of the voltage change allows direct sensing of the dendrite growth before a safety event occurs. In some embodiments, the voltage potential of the interlayer can be altered or modulated to stop the growth of the dendrite or make the dendrite shrink. The voltage can be actively changed by a control system to remediate the dendrite formation at a separator layer. Voltage increases relative to an anode can prevent dendritic growth through a separator. Voltage decreases relative to an anode can dissolve dendritic growth in the active area.

Some embodiments described herein include incorporating electrochemical cells with interlayers into cylindrical geometries. In some embodiments, one or more of the current collectors of the electrochemical cell can be tables, such that the anode current collector and/or the cathode current collector can be directly coupled to terminals on opposing caps or buttons. Alternatively one current collector can be directly coupled to a cap, while the other is connected to a battery case. The interlayer can be electrically coupled to a cap or button, or to the battery case.

Some embodiments described herein include a functional ion replenishable separator (FIRS) system with materials capable of producing ions incorporated into the interlayer. In some embodiments, the ions can be lithium ions that migrate toward the anode when a voltage difference between the interlayer and the anode surpasses a threshold value. In other words, a lithium source can be incorporated into the interlayer. In some embodiments, the lithium source can include a sacrificial salt. Desired properties in the lithium source include high capacity, stability in air, lack of solubility in the electrolyte, low cost, low toxicity, low activation voltage, and a lack of reaction byproducts.

Repetitive and irreversible loss of lithium ions during cycling can occur due to formation of a solid-electrolyte interface (SEI) layer, a side reaction, electrolyte decomposition, and/or phase transition of active materials. Initial irreversible capacity loss due to SEI formation can occur in electrochemical cells with graphite anodes. However, higher initial capacity losses can occur in cells with high capacity, phase-changing, and/or volume-expanding materials. These materials can include silicon, tin, antimony, hard carbon, high concentration nickel layered oxide (Ni>80%). Using traditional electrochemical cells, it can be extremely difficult to replenish lithium ions in a formed or in-service cell. Existing pre-lithiation methods are costly, complicated, and often include an alteration to an established manufacturing process. Further, dendrites are difficult to detect and prevent using modern technologies.

Repetitive and irreversible loss of lithium ions during cycling can lead to low coulombic efficiency. The loss of an active ion can lead to an increasing N/P ratio, which can compromise safety, cost, cycle life, and energy density. A high energy density material often requires the use of a thinner lithium anode (e.g., <20 µm), which can be challenging to produce at scale. Handling and storage of thin lithium metal comprises practicality for mass manufacturing. In such systems, a dendrite can be difficult to detect and prevent.

Additionally, sodium-ion batteries can exhibit irreversible loss of sodium ions during cycling due to SEI formation, side reactions, electrolyte decomposition, and/or phase transition of active materials. Initial irreversible capacity loss due to SEI formation can occur in electrochemical cells with graphite anodes. Higher capacity losses can occur in cells with high capacity, phase-changing, and/or volume-expanding materials. Such materials can include phosphorus, tin, antimony, hard carbon, and/or a sodium-deficient layered oxide cathode. Replenishment of sodium ions in a formed and in-service cell can be difficult or even impossible in traditional builds. Existing presodation methods can be costly, complicated, and established manufacturing processes are usually modified to allow for re-satiation. Further, detection and prevention of dendrites in such systems can be very difficult.

Additionally, potassium-ion batteries can exhibit irreversible loss of potassium ions during cycling due to SEI formation, side reactions, electrolyte decomposition, and/or phase transition of active materials. Initial irreversible capacity loss due to SEI formation can occur in electrochemical cells with graphite anodes. Higher capacity losses can occur in cells with high capacity, phase-changing, and/or volume-expanding materials. Such materials can include phosphorus, tin, antimony, hard carbon, layered oxide, and/ or Prussian blue/white cathodes. Replenishment of potassium ions in a formed and in-service cell can be difficult or impossible in traditional builds. Existing pre-potassiation methods are costly, complicated, and are often implemented as changes to established manufacturing processes. Further, detection and prevention of dendrites in such systems can be very difficult.

Batteries with solid-state electrolytes can suffer similar issues as those noted above. In some embodiments, electrochemical cells described herein can include zinc-ion, aluminum ion, magnesium ion, fluorine ion, and/or dual ion chemistries. Developing a system that addresses the aforementioned challenges and meets all performance expectations (e.g., energy density, cycle life, power, cycle life, power, fast charge, low temperature, safety, stable interphase, etc.) would be an improvement to currently existing cells. Such a system that can be incorporated into existing manufacturing processes can bring improvements to manufactured cells without adding additional process steps.

By incorporating a selected sacrificial salt that releases the active ion (e.g., Li, Na, K, etc.) via voltage activation, electrochemical cells described herein can have additional capacity unlocked. Embodiments described herein enable zero-loss formation. Upon releasing additional active ions in the systems described herein, the sacrificial salt can compensate the loss of active ions during formation and aging due to formation of SEI and cathode-electrolyte interphase (CEI). This improves the energy density of cells by using fewer active materials (e.g., a lower N/P ratio) and production consistency. Embodiments described herein can also extend cycle life. Upon releasing additional active ions, the sacrificial salt can compensate for the loss of active ions during cycling due to repetitive SEI/CEI formation and irreversible active material degradation. Embodiments described herein can enable production of cells without alkaline metal as anode active material. Upon releasing additional active ions, the sacrificial salt can assist in forming a thin film of alkali metal on a bare current collector during formation. The thickness of the metal film can be designed depending on the desired application of the electrochemical cell. Such electrochemical cells can provide active ions to extend cycle life and enable storage/handling free of alkaline metal sheets or powders for cell manufacturing. Embodiments described herein can lower production cost and improve cell performance.

Further descriptions of electrochemical cells with multiple separators and interlayers can be found in U.S. Patent Publication No. 2022/0352597 ("the '597 publication"), filed Apr. 29, 2022, and titled "Electrochemical Cells with Multiple Separators and Methods of Producing the Same," the disclosure of which is hereby incorporated by reference in its entirety. Further descriptions of electrochemical cells with interlayers can be found in U.S. patent application Ser. No. 18/543,515 ("the '515 application"), filed Dec. 18, 2023, and titled, "Systems and Methods for Minimizing and Preventing Dendrite Formation in Electrochemical Cells," the disclosure of which is hereby incorporated by reference in its entirety.

Further descriptions of pertinent systems are described in U.S. Pat. No. 11,394,023, U.S. Patent Publication No. 2018/0219250, U.S. Pat. Nos. 11,316,156, 10,497,935, 11,069,888, and 11,799,085, the full disclosures of which are hereby incorporated by reference in their entireties.

In some embodiments, electrodes described herein can include conventional solid electrodes. In some embodiments, the solid electrodes can include binders. In some embodiments, electrodes described herein can include semi-solid electrodes. Semi-solid electrodes described herein can be made: (i) thicker (e.g., greater than 100 μm-up to 2,000 μm or even greater) due to the reduced tortuosity and higher electronic conductivity of the semi-solid electrode, (ii) with higher loadings of active materials, and (iii) with a simplified manufacturing process utilizing less equipment. These relatively thick semi-solid electrodes decrease the volume, mass and cost contributions of inactive components with respect to active components, thereby enhancing the commercial appeal of batteries made with the semi-solid electrodes. In some embodiments, the semi-solid electrodes described herein are binderless and/or do not use binders that are used in conventional battery manufacturing. Instead, the volume of the electrode normally occupied by binders in conventional electrodes, is now occupied by: 1) electrolyte, which has the effect of decreasing tortuosity and increasing the total salt available for ion diffusion, thereby countering the salt depletion effects typical of thick conventional electrodes when used at high rate, 2) active material, which has the effect of increasing the charge capacity of the battery, or 3) conductive additive, which has the effect of increasing the electronic conductivity of the electrode, thereby countering the high internal impedance of thick conventional electrodes. The reduced tortuosity and a higher electronic conductivity of the semi-solid electrodes described herein, results in superior rate capability and charge capacity of electrochemical cells formed from the semi-solid electrodes. Since the semi-solid electrodes described herein, can be made substantially thicker than conventional electrodes, the ratio of active materials (i.e., the semi-solid cathode and/or anode) to inactive materials (i.e., the current collector and separator) can be much higher in a battery formed from electrochemical cell stacks that include semi-solid electrodes relative to a similar battery formed form electrochemical cell stacks that include conventional electrodes. This substantially increases the overall charge capacity and energy density of a battery that includes the semi-solid electrodes described herein.

In some embodiments, the electrode materials described herein can be a flowable semi-solid or condensed liquid composition. In some embodiments, the electrode materials described herein can be binderless or substantially free of binder. A flowable semi-solid electrode can include a suspension of an electrochemically active material (anodic or cathodic particles or particulates), and optionally an electronically conductive material (e.g., carbon) in a non-aqueous liquid electrolyte. Said another way, the active electrode particles and conductive particles are co-suspended in an electrolyte to produce a semi-solid electrode. Examples of battery architectures utilizing semi-solid suspensions are described in International Patent Publication No. WO 2012/024499, entitled "Stationary, Fluid Redox Electrode," and International Patent Publication No. WO 2012/088442, entitled "Semi-Solid Filled Battery and Method of Manufacture," the entire disclosures of which are hereby incorporated by reference.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, the term "semi-solid" refers to a material that is a mixture of liquid and solid phases, for example, such as a particle suspension, a slurry, a colloidal suspension, an emulsion, a gel, or a micelle.

FIG. 1 is a block diagram of an electrochemical cell 100 with an interlayer 160, according to an embodiment. As shown, the electrochemical cell 100 includes an anode 110 disposed on an anode current collector 120, a cathode 130 disposed on a cathode current collector 140, a first separator 150*a*, and a second separator 150*b* disposed between the anode 110 and the cathode 130, with the interlayer 160 disposed between the first separator 150*a* and the second separator 150*b*. In some embodiments, the electrochemical cell 100 can be formed into a cylindrical cell. In some embodiments, the electrochemical cell 100 can be formed into a prismatic cell. In some embodiments, the electrochemical cell 100 can be formed into a pouch cell.

In some embodiments, the anode 110 and/or the cathode 130 can include at least about 0.1%, at least about 0.2%, at least about 0.3%, at least about 0.4%, at least about 0.5%, at least about 0.6%, at least about 0.7%, at least about 0.8%, at least about 0.9%, at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 16%, at least about 17%, at least about 18%, at least about 19%, at least about 20%, at least about 21%, at least about 22%, at least about 23%, or at least about 24% by volume of liquid electrolyte solution. In some embodiments, the anode 110 and/or the cathode 130 can include no more than about 25%, no more than about 24%, no more than about 23%, no more than about 22%, no more than about 21%, no more than about 20%, no more than about 19%, no more than about 18%, no more than about 17%, no more than about 16%, no more than about 15%, no more than about 14%, no more than about 13%, no more than about 12%, no more than about 11%, no more than about 10%, no more than about 9%, no more than about 8%, no more than about 7%, no more than about 6%, no more than about 5%, no more than about 4%, no more than about 3%, no more than about 2%, no more than about 1%, no more than about 0.9%, no more than about 0.8%, no more than about 0.7%, no more than about 0.6%, no more than about 0.5%, no more than about 0.4%, no more than about 0.3%, or no more than about 0.2% by volume of liquid electrolyte solution.

Combinations of the above-referenced volumetric percentages of liquid electrolyte solution in the anode 110 and/or the cathode 130 are also possible (e.g., at least about 0.1% and no more than about 25% or at least about 5% and no more than about 10%), inclusive of all values and ranges therebetween. In some embodiments, the anode 110 and/or the cathode 130 can include about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, or about 25% by volume of liquid electrolyte solution.

In some embodiments, the anode current collector 120 and/or the cathode current collector 140 can be composed of copper, aluminum, titanium, or other metals that do not form alloys or intermetallic compounds with lithium, carbon, and/or coatings comprising such materials disposed on another conductor. In some embodiments, the anode current collector 120 and/or the cathode current collector 140 can have a thickness of at least about 1 µm, at least about 5 µm, at least about 10 µm, at least about 15 µm, at least about 20 µm, at least about 25 µm, at least about 30 µm, at least about 35 µm, at least about 40 µm, or at least about 45 µm. In some embodiments, the anode current collector 120 and/or the cathode current collector 140 can have a thickness of no more than about 50 µm, no more than about 45 µm, no more than about 40 µm, no more than about 35 µm, no more than about 30 µm, no more than about 25 µm, no more than about 20 µm, no more than about 15 µm, no more than about 10 µm, or no more than about 5 µm. Combinations of the above-referenced thicknesses of the anode current collector 120 and/or the cathode current collector 140 are also possible (e.g., at least about 1 µm and no more than about 50 µm or at least about 10 µm and no more than about 30 µm), inclusive of all values and ranges therebetween. In some embodiments, the anode current collector 120 and/or the cathode current collector 140 can have a thickness of about 1 µm, about 5 µm, about 10 µm, about 15 µm, about 20 µm, about 25 µm, about 30 µm, about 35 µm, about 40 µm, about 45 µm, or about 50 µm.

In some embodiments, the anode 110 can include a first electrolyte and the cathode 130 can include a second electrolyte. In other words, and the anode 110 can include an anolyte and the cathode 130 can include a catholyte. In some embodiments, the electrochemical cell 100 can include an anolyte disposed on the anode side of the separators 150. In some embodiments, the electrochemical cell 100 can include a catholyte disposed on the cathode side of the separators 150. In some embodiments, the electrochemical cell 100 can include a selectively permeable membrane. In some embodiments, the selectively permeable membrane can be disposed between the first separator 150*a* and the second separator 150*b*. Electrochemical cells with anolytes, catholytes, and/or selectively permeable membranes are described in U.S. Pat. No. 10,734,672 ("the '672 patent"), filed Jan. 8, 2019, and titled, "Electrochemical Cells Including Selectively Permeable Membranes, Systems and Methods of Manufacturing the Same," the disclosure of which is hereby incorporated by reference in its entirety.

As shown, the first separator 150a is disposed on the anode 110 while the second separator 150b is disposed on the cathode 130. In some embodiments, the separators 150 can be disposed on their respective electrodes during production of the electrochemical cell 100. In some embodiments, the first separator 150a and/or the second separator 150b can be composed of polyethylene, polypropylene, high density polyethylene, polyethylene terephthalate, polystyrene, a thermosetting polymer, hard carbon, a thermosetting resin, a polyimide, a ceramic coated separator, an inorganic separator, cellulose, glass fiber, polyimide, polyolefin, polytetrafluoroethylene (PTFE), polyvinylidene fluoride (PVDF), a polyethylenoxide (PEO) polymer in which a lithium salt is complexed to provide lithium conductivity, NAFION™ membranes which are proton conductors, or any other suitable separator material, or combinations thereof.

In some embodiments, the first separator 150a and/or the second separator 150b can include a ceramic. In some embodiments, the first separator 150a and/or the second separator 150b can include a ceramic coating. In some embodiments, the ceramic coating can include $Al_2O_3$, boehmite, $TiO_2$, and/or $SiO_2$. In some embodiments, the first separator 150a and/or the second separator 150b can include $Al_2O_3$. In some embodiments, the first separator 150a can include polyethylene, the interlayer 160 can include a carbonaceous material, and the second separator 150b can include a ceramic (e.g., in powder form). This sequence provides ease of material handling during production. Specifically, the carbonaceous material bonds to the first separator 150a while the second separator 150b bonds to the carbonaceous material in the interlayer 160. In some embodiments, the first separator 150a and/or the second separator 150b can include an ion permeable material. In some embodiments, the electrochemical cell 100 can include a third separator (not shown) and a second interlayer (not shown) between the second separator 150b and the third separator. In such cases, the first interlayer 160 and the second interlayer can include carbonaceous material, the central separator (i.e., the second separator 150b) can include a ceramic material, and the outer separators (i.e., the first separator 150a and the third separator) can include a polymer (e.g., polyethylene). In some embodiments, the first separator 150a can be composed of the same material as the second separator 150b. In some embodiments, the first separator 150a can be composed of a different material from the second separator 150b.

In some embodiments, the separators 150 and the interlayer 160 can detect a wrinkled separator 150a/150b due to the sensitivity of the interlayer 160 to electric fields. Also, the interlayer 160 can aid in finding gradients in salt concentration at open voltages. In some embodiments, misalignments can be detected via edge ceramic coatings on the anode material 110 and/or the cathode material 130.

In some embodiments, the first separator 150a and/or the second separator 150b can have a porosity of at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, or at least about 90%. In some embodiments, the first separator 150a and/or the second separator 150b can have a porosity of no more than about 95%, no more than about 90%, no more than about 85%, no more than about 80%, no more than about 75%, no more than about 70%, no more than about 65%, no more than about 60%, no more than about 55%, no more than about 50%, no more than about 45%, no more than about 40%, no more than about 35%, no more than about 30%, no more than about 25%, no more than about 20%, or no more than about 15%.

Combinations of the above-referenced porosity percentages of the first separator 150a and/or the second separator 150b are also possible (e.g., at least about 10% and no more than about 95% or at least about 20% and no more than about 40%), inclusive of all values and ranges therebetween. In some embodiments, the first separator 150a and/or the second separator 150b can have a porosity of about 10%, about 15%, about 20%, about 25%, about 30%, about 35%, about 40%, about 45%, about 50%, about 55%, about 60%, about 65%, about 70%, about 75%, about 80%, about 85%, about 90%, or about 95%.

In some embodiments, the first separator 150a can have a different porosity from the second separator 150b. In some embodiments, the porosities of the first separator 150a and the second separator 150b can be selected based on the difference between the anolyte and the catholyte. For example, if the catholyte has a higher vapor pressure and faster evaporation properties than the anolyte, then the second separator 150b can have a lower porosity than the first separator 150a. The lower porosity of the second separator 150b can at least partially prevent the catholyte from evaporating during production.

In some embodiments, the first separator 150a can be composed of a different material from the second separator 150b. In some embodiments, the materials of the first separator 150a and the second separator 150b can be selected to facilitate wettability of the first separator 150a with the anolyte and the second separator 150b with the catholyte. For example, an ethylene carbonate/propylene carbonate-based catholyte can wet a polyethylene separator better than a polyimide separator, based on the molecular properties of the materials. An ethylene carbonate/di-methyl carbonate-based anolyte can wet a polyimide separator better than a polyethylene separator. A full wetting of the first separator 150a and the second separator 150b can give way to better transport of electroactive species via the separators 150. This transport can be facilitated particularly well when the first separator 150a physically contacts the second separator 150b.

As shown, the electrochemical cell 100 includes two separators 150. In some embodiments, the electrochemical cell 100 can include 3, 4, 5, 6, 7, 8, 9, 10, or more than about 10 separators 150. In some embodiments, a layer of liquid electrolyte (not shown) can be disposed between the first separator 150a and the second separator 150b. A layer of liquid electrolyte can promote better adhesion between the separators 150.

In some embodiments, the first separator 150a and/or the second separator 150b can have a thickness of at least about 0.5 µm, at least about 1 µm, at least about 2 µm, at least about 3 µm, at least about 4 µm, at least about 5 µm, at least about 6 µm, at least about 7 µm, at least about 8 µm, at least about 9 µm, at least about 10 µm, at least about 15 µm, at least about 20 µm, or at least about 25 µm. In some embodiments, the first separator 150a and/or the second separator 150b can have a thickness of no more than about 30 µm, no more than about 25 µm, no more than about 20 µm, no more than about 15 µm, no more than about 10 µm, no more than about 9 µm, no more than about 8 µm, no more than about 7 µm, no more than about 6 µm, no more than about 5 µm, no more than about 4 µm, no more than about 3 µm, no more than about 2 µm, or no more than about 1 µm. Combinations of the above-referenced thicknesses of the first separator 150a and/or the second separator 150b are also possible (e.g., at least about 0.5 µm and no more than about 30 µm or at least about 5 µm and no more than about 20 µm), inclusive of all values and ranges therebetween. In some embodiments, the first separator 150a and/or the second separator 150b can have a thickness of about 0.5 µm, about 1 µm, about 2 µm, about 3 µm, about 4 µm, about 5 µm, about 6 µm, about 7 µm, about 8 µm, about 9 µm, about 10 µm, about 15 µm, about 20 µm, about 25 µm, or about 30 µm. In some embodiments, the first separator 150a can have a thickness the same or substantially similar to the thickness of the second separator 150b. In some embodiments, the first separator 150a can have a thickness greater or less than a thickness of the second separator 150b.

In some embodiments, the first separator 150a, the second separator 150b, and the interlayer 160 can form a film. In some embodiments, the film can have a total thickness of at least about 5 µm, at least about 6 µm, at least about 7 µm, at least about 8 µm, at least about 9 µm, at least about 10 µm, at least about 15 µm, at least about 20 µm, at least about 25 µm, at least about 30 µm, at least about 35 µm, at least about 40 µm, or at least about 45 µm. In some embodiments, the film can have a total thickness of no more than about 50 µm, no more than about 45 µm, no more than about 40 µm, no more than about 35 µm, no more than about 30 µm, no more than about 25 µm, no more than about 20 µm, no more than about 15 µm, no more than about 10 µm, no more than about 9 µm, no more than about 8 µm, no more than about 7 µm, or no more than about 6 µm. Combinations of the above-referenced thicknesses are also possible (e.g., at least about 5 µm and no more than about 50 µm or at least about 10 µm and no more than about 40 µm), inclusive of all values and ranges therebetween. In some embodiments, the film can have a total thickness of about 5 µm, about 6 µm, about 7 µm, about 8 µm, about 9 µm, about 10 µm, about 15 µm, about 20 µm, about 25 µm, about 30 µm, about 35 µm, about 40 µm, about 45 µm, or about 50 µm.

In some embodiments, the first separator 150a and/or the second separator 150b can include a solid-state electrolyte sheet. In some embodiments, the solid-state electrolyte sheet can replace the first separator 150a and/or the second separator 150b. In some embodiments, the first separator 150a and/or the second separator 150b can be made with a separator film. In some embodiments, the first separator 150a and/or the second separator 150b can include a coating polymer, a spray polymer, and/or a print polymer. In some embodiments, the first separator 150a and/or the second separator 150b can include a ceramic powder. In some embodiments, the first separator 150a and/or the second separator 150b can be absent of a ceramic powder. In some embodiments, the first separator 150a and/or the second separator 150b can include a ceramic with a liquid electrolyte and/or a solid-state electrolyte. In some embodiments, the electrochemical cell 100 can include a third separator and a second interlayer, a fourth separator and a third interlayer, a fifth separator and a fourth interlayer, a sixth separator and a fifth interlayer, etc. (not shown). In some embodiments, the second separator 150b can be in contact with the first separator 150a. In some embodiments, the third separator can be in contact with the second separator 150b. In some embodiments, the second separator 150b can be in contact with the interlayer 160 and not in contact with the first separator 150a. In some embodiments, the third separator can be in contact with the second separator 150b. In some embodiments, the third separator can be in contact with the second interlayer and not in contact with the second separator 150b. In some embodiments, the first separator 150a can have the same or a substantially similar size (i.e., length and width) to the second separator 150b. In some embodiments, the first separator 150a can have a different size from the second separator 150b. In some embodiments, the third separator can have the same or different sizes to the first separator 150a and/or the second separator 150b.

The interlayer 160 can dissolve dendrites via voltage manipulation. In other words, current can be supplied to the interlayer 160, the anode 110, and/or the cathode 130 to create a potential difference between the interlayer 160 and the anode 110 or the interlayer 160 and the cathode 130 that dissolves dendrites that have formed in the interlayer 160. In some embodiments, the interlayer 160 can include a conductive layer. In some embodiments, the interlayer 160 can include a liquid electrolyte. In some embodiments, the interlayer 160 can include a solid-state electrolyte. In some embodiments, the interlayer 160 can include electrically conductive components. In some embodiments, the interlayer 160 can include Ketjen Black, AA-stacked graphene, AB-stacked graphene, carbon, hard carbon, soft carbon, graphite, carbon nanofibers, carbon nanotubes, conductive metals, lithium iron phosphate (LFP), lithium manganese iron phosphate (LMFP), lithium manganese oxide (LMO), $LiNiO_2$ (LNO), nickel manganese cobalt (NMC), lithium nickel manganese oxide (LNMO), lithium cobalt oxide (LCO), Iron (III) fluoride ($FeF_3$), sulfur, vanadium (V) oxide ($V_2O_5$), bismuth trifluoride ($BiF_3$), iron (IV) sulfate ($FeS_2$), platinum, gold, aluminum, palladium, conductive polymers, polyacetylene (PA), polyaniline (PANI), polypyrrole (PPy), polythiophene (PTH), poly(para-phenylene) (PPP), poly (phenylenevinylene) (PPV), polyfuran (PF), or any combination thereof. In some embodiments, the interlayer 160 can create a physical block that prevents vertical growth of the dendrite, such that the dendrite is forced to grow horizontally. In some embodiments, the interlayer 160 can be coated on the first separator 150a. In some embodiments, the interlayer 160 can be coated on the second separator 150b. In some embodiments, the interlayer 160 can have the same or a substantially similar size (i.e., length and width) as the first separator 150a and/or the second separator 150b. In some embodiments, the interlayer 160 can have a larger size than the first separator 150a and/or the second separator 150b.

In some embodiments, the interlayer 160 can include an electroactive material. In some embodiments, the interlayer 160 can include $Li_xMPO_4$ (wherein x=about 0.9, about 0.91, about 0.92, about 0.93, about 0.94, about 0.95, about 0.96, about 0.97, about 0.98, about 0.99, about 1.0, about 1.01, about 1.02, about 1.03, about 1.04, or about 1.05, inclusive of all values and ranges therebetween and M=Fe, Mn, Co, or any combination thereof), layered $Li_xTMO_2$ (wherein x=about 0.95, about 0.96, about 0.97, about 0.98, about 0.99, about 1.0, about 1.01, about 1.02, about 1.03, about 1.04, about 1.05, about 1.06, about 1.07, about 1.08, about 1.09, about 1.1, about 1.11, about 1.12, about 1.13, about 1.14, about 1.15, about 1.16, about 1.17, about 1.18, about 1.19, or about 1.2, inclusive of all values and ranges therebetween and TM=Ni, Mn, Co, Al, Ti, Sn, or any combination thereof), spinel $Li_xTM_2O_4$ (wherein x=about 0.95, about 0.96, about 0.97, about 0.98, about 0.99, about 1.0, about 1.01, or about 1.02, inclusive of all values and ranges therebetween and TM=Ni, Mn, Co, Al, Ti, Sn, Sb, or any combination thereof), and their delithiated analogies, where $0 \leq x \leq 1$. The electroactive materials can further include materials that are electrochemically active towards lithium ion at voltages greater than about 2V, which can include sulfur, $Fe_2O_3$, $V_2O_5$, $TiO_2$.

In some embodiments, the interlayer 160 can have a resistivity of at least about 1 m Ω/square, at least about 5 m Ω/square, at least about 10 m Ω/square, at least about 50 m Ω/square, at least about 100 mΩ/square, at least about 500 mΩ/square, at least about 1 Ω/square, at least about 5 Ω/square, at least about 10 Ω/square, at least about 50 Ω/square, at least about 100/square, or at least about 500 Ω/square. In some embodiments, the interlayer 160 can have a resistivity of no more than about 1,000 Ω/square, no more than about 500 Ω/square, no more than about 100 Ω/square, no more than about 50 Ω/square, no more than about 10 Ω/square, no more than about 5 Ω/square, no more than about 1 Ω/square, no more than about 500 m Ω/square, no more than about 100 mΩ/square, no more than about 50 m Ω/square, no more than about 10 mΩ/square, or no more than about 5 m Ω/square. Combinations of the above-referenced resistivities are also possible (e.g., at least about 1 mΩ/square and no more than about 1,000 (2/square or at least about 50 m Ω/square and no more than about 50 Ω/square), inclusive of all values and ranges therebetween. In some embodiments, the interlayer 160 can have a resistivity of about 1 mΩ/square, about 5 mΩ/square, about 10 mΩ/square, about 50 mΩ/square, about 100 mΩ/square, about 500 mΩ/square, about 1 Ω/square, about 5 Ω/square, about 10 Ω/square, about 50 Ω/square, about 100 Ω/square, about 500 Ω/square, or about 1,000 Ω/square.

In some embodiments, the permeability of the interlayer 160 can be at least about 10 s/50 mL air, at least about 20 s/50 mL air, at least about 30 s/50 mL air, at least about 40 s/50 mL air, at least about 50 s/50 mL air, at least about 60 s/50 mL air, at least about 70 s/50 mL air, at least about 80 s/50 mL air, at least about 90 s/50 mL air, at least about 100 s/50 mL air, at least about 200 s/50 mL air, at least about 300 s/50 mL air, at least about 400 s/50 mL air, at least about 500 s/50 mL air, at least about 600 s/50 mL air, at least about 700 s/50 mL air, at least about 800 s/50 mL air, or at least about 900 s/50 mL air. In some embodiments, the permeability of the interlayer 160 can be no more than about 1,000 s/50 mL air, no more than about 900 s/50 mL air, no more than about 800 s/50 mL air, no more than about 700 s/50 mL air, no more than about 600 s/50 mL air, no more than about 500 s/50 mL air, no more than about 400 s/50 mL air, no more than about 300 s/50 mL air, no more than about 200 s/50 mL air, no more than about 100 s/50 mL air, no more than about 90 s/50 mL air, no more than about 80 s/50 mL air, no more than about 70 s/50 mL air, no more than about 60 s/50 mL air, no more than about 50 s/50 mL air, no more than about 40 s/50 mL air, no more than about 30 s/50 mL air, or no more than about 20 s/50 mL air. Combinations of the above-referenced permeabilities are also possible (e.g., at least about 10 s/50 mL air and no more than about 1,000 s/50 mL air or at least about 50 s/50 mL air and no more than about 500 s/50 mL air), inclusive of all values and ranges therebetween. In some embodiments, the permeability of the interlayer 160 can be about 10 s/50 mL air, about 20 s/50 mL air, about 30 s/50 mL air, about 40 s/50 mL air, about 50 s/50 mL air, about 60 s/50 mL air, about 70 s/50 mL air, about 80 s/50 mL air, about 90 s/50 mL air, about 100 s/50 mL air, about 200 s/50 mL air, about 300 s/50 mL air, about 400 s/50 mL air, about 500 s/50 mL air, about 600 s/50 mL air, about 700 s/50 mL air, about 800 s/50 mL air, about 900 s/50 mL air, or about 1,000 s/50 mL air.

In some embodiments, the interlayer 160 can include an intercalate cathode (e.g., LMOP, LNO, NMC, LFP, LNMO, LCO, and/or LMFP). In some embodiments, the interlayer 160 can include a convertible cathode (e.g., $FeF_3$, sulfur, $V_2O_5$, $BiF_3$, $FeS_2$). In some embodiments, the interlayer 160 can include a high voltage bearable anode. In some embodiments, the interlayer 160 can include a traditional anode (e.g., hard carbon, graphite, and/or silicon). In some embodiments, the interlayer 160 can include a metal. In some embodiments, the interlayer 160 can include a metal alloy. In some embodiments, the metal alloy can include lithium, tin, aluminum, silver, and/or copper. In some embodiments, the interlayer 160 can include a metal oxide. In some embodiments, the metal oxide can include silicon oxide (SiO), zinc oxide (ZnO), copper oxide ($Cu_2O$), lithium titanate (LTO), and/or titanium (IV) oxide ($TiO_2$). In some embodiments, the interlayer 160 can include a semi-solid electrode. In some embodiments, the interlayer 160 can include a coating, a spray, and/or a print polymer. In some embodiments, the interlayer 160 can include a ceramic powder. In some embodiments, the interlayer 160 can include a premade film with a solid-state electrolyte.

In some embodiments, the interlayer 160 can include conductive materials. In some embodiments, the interlayer 160 can include allotropes of carbon including activated carbon, hard carbon, soft carbon, Ketjen, carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene, graphene sheets or aggregates of graphene sheets, and materials comprising fullerenic fragments, or any combination thereof. In some embodiments, the interlayer 160 can include a solid-state electrolyte material. In some embodiments, the solid-state electrolyte can include an oxide-based electrolyte. In some embodiments, the solid-state electrolyte material can include lithium lanthanum zirconium oxide (LLZO), $Li_{1.3}Al_{0.3}Ti_{1.7}(PO_4)_3$(LATP), lithium phosphorus oxynitride (LiPON), li-ion conducting solid-state electrolyte ceramics (LLTO), and/or $Li_3BO_3$—$Li_2SO_4$—$Li_2CO_3$(LiBSCO). In some embodiments, the solid-state electrolyte material can include one or more oxide-based solid electrolyte materials including a garnet structure, a perovskite structure, a phosphate-based Lithium Super Ionic Conductor (LISICON) structure, a glass structure such as $La_{0.51}Li_{0.34}TiO_{2.94}$, $Li_{1.3}Al_{0.3}Ti_{1.7}(PO_4)_3$, $Li_{1.4}Al_{0.4}Ti_{1.6}(PO_4)_3$, $Li_2La_3Zr_2O_{12}$, $Li_{6.66}La_3Zr_{1.6}Ta_{0.4}O_{12.9}$ (LLZO), $50Li_4SiO_4 \cdot 50Li_3BO_3$, $Li_{2.9}PO_{3.3}N_{0.46}$ (lithium phosphorousoxynitride, LiPON), $Li_{3.6}Si_{0.6}P_{0.4}O_4$, $Li_3BN_2$, $Li_3BO_3$—$Li_2SO_4$, and/or sulfide containing solid electrolyte materials including a thio-LISICON structure, a glassy structure and a glass-ceramic structure such as $Li_{1.07}Al_{0.69}Ti_{1.46}(PO_4)_3$, $Li_{1.5}Al_{0.5}Ge_{1.5}(PO_4)_3$, $Li_{10}GeP_2S_{12}$ (LGPS), $30Li_2S \cdot 26B_2S_{3.44}LiI$, $63Li_2S \cdot 36SiS_{2.1}Li_3PO_4$, $57Li_2S \cdot 38SiS_{2.5}Li_4SiO_4$, $70Li_2S \cdot 30P_2S_5$, $50Li_2S \cdot 50GeS_2$, $Li_2P_3S_{11}$, $Li_{3.25}P_{0.95}S_4$, and $Li_{9.54}Si_{1.74}P_{1.44}S_{11.7}Cl_{0.3}$, and/or closo-type complex hydride solid electrolyte, $LiBH_4$—LiI, $LiBH_4$—$LiNH_2$, $LiBH_4$—$P_2S_5$, $Li(CB_xH_{X+1})$—LiI, $Li(CB_9H_{10})$—and/or LiI. In some embodiments, the solid-state electrolyte material can be sulfide-based. In some embodiments, the solid-state electrolyte can include lithium phosphorus sulfide (LPS), $Li_{10}GeP_2S_{12}$ (LGPS), lithium tin phosphorus sulfide (LSPS), and/or $Li_{5.5}PS_{4.5}Cl_{1.5}$(LPSCI). In some embodiments, the solid-state electrolyte material can include a complex hydride solid electrolyte. In some embodiments, the solid-state electrolyte material can include $LiBH_4$—LiI and/or $LiBH_4$—$P_2S_5$.

In some embodiments, when the interlayer 160 includes a solid-state electrolyte, the interlayer 160 can have a porosity of at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, or at least about 90%. In some embodiments, when the interlayer 160 includes a solid-state electrolyte, the interlayer 160 can have a porosity of no more than about 95%, no more than about 90%, no more than about 85%, no more than about 80%, no more than about 75%, no more than about 70%, no more than about 65%, no more than about 60%, no more than about 55%, no more than about 50%, no more than about 45%, no more than about 40%, no more than about 35%, no more than about 30%, no more than about 25%, no more than about 20%, or no more than about 15%. Combinations of the above-referenced porosities are also possible (e.g., at least about 0% and no more than about 95% or at least about 10% and no more than about 50%), inclusive of all values and ranges therebetween. In some embodiments, when the interlayer includes a solid-state electrolyte, the interlayer 160 can have a porosity of about 10%, about 15%, about 20%, about 25%, about 30%, about 35%, about 40%, about 45%, about 50%, about 55%, about 60%, about 65%, about 70%, about 75%, about 80%, about 85%, about 90%, or about 95%.

In some embodiments, when the interlayer 160 includes a liquid electrolyte, the interlayer 160 can have a porosity of at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, or at least about 90%. In some embodiments, when the interlayer 160 includes a liquid electrolyte, the interlayer 160 can have a porosity of no more than about 95%, no more than about 90%, no more than about 85%, no more than about 80%, no more than about 75%, no more than about 70%, no more than about 65%, no more than about 60%, no more than about 55%, no more than about 50%, no more than about 45%, no more than about 40%, no more than about 35%, no more than about 30%, no more than about 25%, no more than about 20%, or no more than about 15%. Combinations of the above-referenced porosities are also possible (e.g., at least about 0% and no more than about 95% or at least about 10% and no more than about 50%), inclusive of all values and ranges therebetween. In some embodiments, when the interlayer includes a liquid electrolyte, the interlayer 160 can have a porosity of about 10%, about 15%, about 20%, about 25%, about 30%, about 35%, about 40%, about 45%, about 50%, about 55%, about 60%, about 65%, about 70%, about 75%, about 80%, about 85%, about 90%, or about 95%.

In some embodiments, the interlayer 160 can be precoated onto the first separator 150a and/or the second separator 150b. In some embodiments, the interlayer 160 can aid in identifying a contamination amount of lithium or another metal via a BMS. The BMS can then add more voltage and current to the interlayer 160 to dissolve the contamination. The BMS can keep the state of charge (SOC) of the interlayer 160 between a lower bound (e.g., about 10%, about 15%, about 20%, about 25%, about 30%, about 35%, or about 40%, inclusive of all values and ranges therebetween) and an upper bound (e.g., about 60%, about 65%, about 70%, about 75%, about 80%, about 85%, or about 90%, inclusive of all values and ranges therebetween).

Keeping the interlayer 160 between a lower bound and an upper bound of voltage can aid in diminishing dendrite formation while the electrochemical cell 100 is not in use (i.e., via addition of voltage and/or current). In some embodiments, the interlayer 160 can include a tab (not shown) that can be used to monitor the voltage of the interlayer 160 while the electrochemical cell is hot pressed (e.g., via a two-sided hot press or a four-sided hot press with a jelly roll design to fit into a prismatic can).

In some embodiments, the voltage between the anode 110 and the interlayer 160 (and/or the voltage between the anode 110 and the cathode 130) can be kept above a threshold (e.g., about 2 V, about 2.1 V, about 2.2 V, about 2.3 V, about 2.4 V, about 2.5 V, about 2.6 V, about 2.7 V, about 2.8 V, about 2.9 V, about 3 V, about 3.1 V, about 3.2 V, about 3.3 V, about 3.4 V, about 3.5 V, about 3.6 V, about 3.7 V, about 3.8 V, about 3.9 V, or about 4 V, inclusive of all values and ranges therebetween). Keeping the cell voltage above a threshold can prevent dendrite formation. At a low state of charge (SOC), the interlayer 160 can have a voltage lower than a voltage necessary to dissolve dendrites. In some embodiments, a BMS can be activated to provide extra voltage to the interlayer 160 to ensure the voltage is high enough for metal dissolution. If no extra power is available to deliver to the interlayer 160, cycling conditions can be narrowed (e.g., to about 5%, about 10%, about 15%, or about 20% SOC, inclusive of all values and ranges therebetween) in order to limit the formation of dendrites. In some embodiments, the voltage between the anode 110 and the interlayer 160 can be kept above the threshold value by monitoring the potential of the anode 110 and the interlayer 160 and controlling the SOC (i.e., by monitoring and adjusting the cycling). In some embodiments, the voltage between the anode 110 and the interlayer 160 can be maintained by keeping a fixed SOC (e.g., at least about 15%, at least about 20%, at least about 25%, inclusive of all values and ranges therebetween).

In some embodiments, the BMS can include a circuit that connects the cathode material 130 to the interlayer 160. In some embodiments, the circuit connecting the cathode material 130 to the interlayer 160 can have a resistance of at least about 100 Ω, at least about 500 Ω, at least about 1 kΩ, at least about 5 kΩ, at least about 10 kΩ, at least about 50 kΩ, at least about 100 kΩ, at least about 500 kΩ, at least about 1 MΩ, at least about 5 MΩ, at least about 10 MΩ, at least about 50 MΩ, at least about 100 MΩ, or at least about 500 MΩ. In some embodiments, the circuit connecting the cathode material 130 to the interlayer 160 can have a resistance of no more than about 1 G Ω, no more than about 500 MΩ, no more than about 100 MΩ, no more than about 50 Ω, no more than about 10 MΩ, no more than about 5 MΩ, no more than about 1 MΩ, no more than about 500 kΩ, no more than about 100 kΩ, no more than about 50 kΩ, no more than about 10 kΩ, no more than about 5 kΩ, no more than about 1 kΩ, or no more than about 500 Ω. Combinations of the above-referenced resistances are also possible (e.g., at least about 100 Ω and no more than about 1 G Ω or at least about 100 kΩ and no more than about 100 M Ω, inclusive of all values and ranges therebetween. In some embodiments, the circuit connecting the cathode material 130 to the interlayer 160 can have a resistance of about 100 Ω, about 500 Ω, about 1 kΩ, about 5 kΩ, about 10 kΩ, about 50 kΩ, about 100 kΩ, about 500 kΩ, about 1 MΩ, about 5 MΩ, about 10 MΩ, about 50 MΩ, about 100 MΩ, about 500 MΩ, or about 1 GΩ.

In some embodiments, the BMS can apply a constant voltage to the interlayer 160 relative to the anode material 110 or the cathode material 130. In some embodiments, the constant voltage can be at least about 0 V, at least about 0.5 V, at least about 1 V, at least about 1.5 V, at least about 2 V, at least about 2.5 V, at least about 3 V, at least about 3.5 V, at least about 4 V, or at least about 4.5 V. In some embodiments, the constant voltage can be no more than about 5 V, no more than about 4.5 V, no more than about 4 V, no more than about 3.5 V, no more than about 3 V, no more than about 2.5 V, no more than about 2 V, no more than about 1.5 V, no more than about 1 V, or no more than about 0.5 V. Combinations of the above-referenced voltages are also possible (e.g., at least about 0 V and no more than about 5 V or at least about 1 V and no more than about 4 V), inclusive of all values and ranges therebetween. In some embodiments, the constant voltage can be about 0 V, about 0.5 V, about 1 V, about 1.5 V, about 2 V, about 2.5 V, about 3 V, about 3.5 V, about 4 V, about 4.5 V, or about 5 V.

By holding the interlayer 160 at a constant voltage that is similar to or even larger than the voltage of the cathode material 130, cations (e.g., $Li^+$, $S^+$, $Mn^{2+/4+}$) are concentrated at the surface of the anode material 110 and/or the cathode material 130, while anions are concentrated in the interlayer 160. In some embodiments, upon charging and/or discharging, there is little or no ion flux through the interlayer 160. However, the intercalation and/or lithiation process at the cathode material 130 and/or the anode material 110 occurs through a local concentrated cation. Thus, metal migration from the cathode material 130 can be blocked, reducing the risk of dendrite formation by metal contamination or metal dissolution.

Holding the interlayer 160 at a potential of about 0 V to about 5 V can aid in preventing dissolved metal ions (e.g., $Mn^{2+/4+}$, $Ni^{4+}$, $Co^{3+/4+}$, $Al^{3+}$, etc.) in the electrolyte from migrating to the anode material 110 through the second separator 150b. The interlayer 160 can prevent any ion (except for the active ion) contained in the cathode material 130 from dissolving and migrating to the anode material 110. For example, in the case of sodium-ion batteries with a $Na_3V_2(PO_4)_2F_3$ cathode, the interlayer 160 can prevent $V^{3+/4+}$ from dissolving and migration to the anode.

Holding the interlayer 160 at a potential of about 0 V to about 5 V can be used to prevent polysulfides dissolved in the electrolyte from migrating through the separators 150 when the electrochemical cell 100 includes sulfur as an active material (e.g., when the cathode material 130 incudes elemental sulfur, lithium sulfide, sodium sulfide, doped lithium sulfide, iron sulfide, cobalt sulfide, tin sulfide, antimony sulfide, copper sulfide, or a combination thereof).

The interlayer 160 can be implemented in a broad range of cell chemistries. In some embodiments, the electrochemical cell 100 can be zinc based. In some embodiments, the electrochemical cell 100 can include a lithium-ion battery. In some embodiments, the electrochemical cell 100 can include a sodium-ion battery. In some embodiments, the electrochemical cell 100 can include a potassium-ion battery. In some embodiments, the electrochemical cell 100 can include a nickel-metal-hydride battery. In some embodiments, the electrochemical cell 100 can include a lead acid battery.

In some embodiments, the interlayer 160 can include a binder and/or a surfactant. In some embodiments, the interlayer 160 can include polyethylene, polypropylene, polyimide, cellulose, PEO polymer, glass fiber, polyolefin, polystyrene, polyethylene terephthalate, PTFE, PVDF, a ceramic, or any combination thereof. In some embodiments, the interlayer 160 can include a ceramic coating. In some embodiments, the ceramic coating can include $Al_2O_3$, boehmite, $TiO_2$, and/or $SiO_2$.

In some embodiments, the interlayer 160 can be functional within a wide temperature range. In some embodiments, the interlayer 160 can be mechanically stable without shrinkage or pore closing within a wide temperature range. In some embodiments, the interlayer 160 can be functional and/or mechanically stable at a temperature of at least about $-70°$ C., at least about $-60°$ C., at least about $-50°$ C., at least about $-40°$ C., at least about $-30°$ C., at least about $-20°$ C., at least about $-10°$ C., at least about $0°$ C., at least about $20°$ C., at least about $40°$ C., at least about $60°$ C., at least about $80°$ C., at least about $100°$ C., at least about $120°$ C., at least about $140°$ C., at least about $160°$ C., at least about $180°$ C., at least about $200°$ C., at least about $220°$ C., at least about $240°$ C., at least about $260°$ C., at least about $280°$ C., at least about $300°$ C., at least about $320°$ C., at least about $340°$ C., at least about $360°$ C., or at least about $380°$ C. In some embodiments, the interlayer 160 can be functional and/or mechanically stable at a temperature of no more than about $400°$ C., no more than about $380°$ C., no more than about $360°$ C., no more than about $340°$ C., no more than about $320°$ C., no more than about $300°$ C., no more than about $280°$ C., no more than about $260°$ C., no more than about $240°$ C., no more than about $220°$ C., no more than about $200°$ C., no more than about $180°$ C., no more than about $160°$ C., no more than about $140°$ C., no more than about $120°$ C., no more than about $100°$ C., no more than about $80°$ C., no more than about $60°$ C., no more than about $40°$ C., no more than about $20°$ C., no more than about $0°$ C., no more than about $-10°$ C., no more than about $-20°$ C., no more than about $-30°$ C., no more than about $-40°$ C., no more than about $-50°$ C., or no more than about $-60°$ C. Combinations of the above-referenced temperatures are also possible (e.g., at least about $-70°$ C. and no more than about $400°$ C. or at least about $0°$ C. and no more than about $100°$ C.), inclusive of all values and ranges therebetween. In some embodiments, the interlayer 160 can be functional and/or mechanically stable at a temperature of about $-70°$ C., about $-60°$ C., about $-50°$ C., about $-40°$ C., about $-30°$ C., about $-20°$ C., about $-10°$ C., about $0°$ C., about $20°$ C., about $40°$ C., about $60°$ C., about $80°$ C., about $100°$ C., about $120°$ C., about $140°$ C., about $160°$ C., about $180°$ C., about $200°$ C., about $220°$ C., about $240°$ C., about $260°$ C., about $280°$ C., about $300°$ C., about $320°$ C., about $340°$ C., about $360°$ C., about $380°$ C., or about $400°$ C.

In a zinc-based battery, the anode current collector 120 and/or the cathode current collector 140 can be composed of nickel, stainless steel, titanium, tin, silver, gold, platinum, or any combination thereof. In some embodiments, the anode material 110 can include zinc metal foil, zinc powder, zinc paste (including zinc powder and binder), indium-doped zinc metal, porous zinc metal, or any combination thereof. In some embodiments, the cathode material 130 can include NiOOH, silver, $MnO_2$, polymorphs, various tunnel structures ($\alpha$, $\gamma$—$MnO_2$), layer structure ($\delta$ and birnessite $MnO_2$), 3D structure ($\lambda$—$MnO_2$), spinel $Mn_3O_4$, $ZnMn_2O_4$, $LiMn_2O_4$, $Zn_{0.25}V_2O_5 \cdot nH_2O$, $V_2O_5 \cdot nH_2O$, $Ca_{0.20}$—$V_2O_5 \cdot 0.80H_2O$ nickel-based double hydroxides (Ni-DH), NiCo—DH, $\alpha$—$Ni(OH)_2$, $Co_3O_4$, sulfur heterocyclic quinone dibenzo[b,i]thian-threne-5,7,12,14-tetraone (DTT), calix(4) quinone, P-chloranil, or any combination thereof.

In a zinc-based battery, the electrolyte can include $ZnCl_2$, zinc fluoride ($ZnF_2$), zinc nitrate ($Zn(NO_3)_2$), zinc sulfate ($ZnSO_4$), zinc perchlorate ($Zn(ClO_4)_2$) and organic compounds, including zinc trifluoromethanesulfonate ($Zn(CF_3$—$SO_3)_2$), Trifluoromethanesulfonic anhydride ($Zn(N(CF_3SO_2)_2)_2$), zinc di[bis(trifluoromethylsulfonyl)imide]. ($Zn(TFSI)_2$), zinc acetate ($Zn(CH_3COO)_2$) and zinc tetrafluoroborate ($Zn(BF_4)_2$), sodium hydroxide (NaOH) or potassium hydroxide (KOH), ZnO, $NH_4Cl$, or any combination thereof. In some embodiments, the electrolyte can include sodium super ion conducting ceramic (NASICON) $Na_{1+x}Zr_2Si_xP_{3-x}O_{12}$, 0<x<3, polyethylene glycol, or any combination thereof.

In a zinc-based battery, the electrolyte can include an electrolyte additive. In some embodiments, the electrolyte additive can include $MnSO_4$, ZnO, lithium hydroxide (LiOH), potassium silicate ($K_2SiO_3$), potassium fluoride (KF), potassium carbonate ($K_2CO_3$), calcium hydroxide ($Ca(OH)_2$), cetyltrimethylammonium bromide (CTAB), sodium dodecyl sulfate (SDS), polyethylene-glycol (PEG-8000), and thiourea (TU), $Li_2SO_4$, benzotriazole (BTA), thiourea ($CH_4N_2S$) and sodium dodecyl benzene sulfonate (SDBS), LiTFSI, polyvinyl alcohol (PVA), polyethylene glycol (PEG), carboxymethyl cellulose (CMC), or any combination thereof. In some embodiments, the electrolyte solvent can include water.

In a zinc-based battery, the separator 150 can include polyolefin nonwovens, polyethylene, Polypropylene, glass fiber, cellulose, or any combination thereof.

In a Li, Na, or K-based battery, the anode current collector 120 and/or the cathode current collector 140 can be composed of copper, aluminum, stainless steel, titanium, tin, nickel, silver, gold, platinum, or any combination thereof.

In a Li, Na, or K-based battery, the anode material 110 can include graphite, lithium metal (Li), sodium metal (Na), potassium metal (K), silicon oxide (SiO), graphite, silicon, carbon, hard carbon, lithium-intercalated carbon, lithium nitrides, lithium alloys, lithium alloy forming compounds, sodium-intercalated carbon, sodium nitrides, sodium alloys, sodium alloy forming compounds, potassium-intercalated carbon, potassium nitrides, potassium alloys, potassium alloy forming compounds, or any combination thereof.

In a Li-based battery, the cathode material 130 can include a metal-oxide such as $LiCoO_2$ (lithium cobalt oxide, LCO), Li(Ni, Mn, Co) $O_2$ (lithium nickel manganese cobalt oxide, NMC, which is also referred to herein as NCM), $LiNi_{0.8}CO_{0.15}Al_{0.05}O_2$ (lithium nickel cobalt aluminum oxide, NCA), $LiMn_2O_4$ (lithium manganese oxide, LMO), $LiCoPO_4$ (lithium cobalt phosphate, LCP), $LiNiPO_4$ (lithium nickel phosphate, LNP), $LiFePO_4$ (lithium iron phosphate, LFP), $LiMnPO_4$ (lithium manganese phosphate, LMP), $LiMn_{0.85}Fe_{0.15}PO_4$ (lithium manganese iron phosphate, LMFP), and/or $Li_4Ti_5O_{12}$ (lithium titanate, LTO).

In a Na-based battery, the cathode material 130 can include a metal-oxide such as $NaCoO_2$ (sodium cobalt oxide, Na(Ni, Mn, Co) $O_2$ (sodium nickel manganese cobalt oxide), $NaNi_{0.8}CO_{0.15}Al_{0.05}O_2$ (sodium nickel cobalt aluminum oxide), $NaMn_2O_4$ (sodium manganese oxide), $NaCoPO_4$ (sodium cobalt phosphate), $NaNiPO_4$ (sodium nickel phosphate), $NaFePO_4$ (sodium iron phosphate), $NaMnPO_4$ (sodium manganese phosphate), $NaMn_{0.85}Fe_{0.15}PO_4$ (sodium manganese iron phosphate), $Na_4Ti_5O_{12}$ (sodium titanate), sodium manganese oxide, sodium vanadium oxide, sodium sulfur compounds, and/or Prussian blue/white analogues.

In a K-based battery, the cathode material 130 can include a metal-oxide such as $KCoO_2$ (potassium cobalt oxide, K(Ni, Mn, Co) $O_2$ (potassium nickel manganese cobalt oxide), $KNi_{0.8}CO_{0.15}Al_{0.05}O_2$ (potassium nickel cobalt aluminum oxide), $KMn_2O_4$ (potassium manganese oxide), $KCoPO_4$ (potassium cobalt phosphate), $KNiPO_4$ (potassium nickel phosphate), $KFePO_4$ (potassium iron phosphate), $KMnPO_4$ (potassium manganese phosphate), $KMn_{0.85}Fe_{0.15}PO_4$ (potassium manganese iron phosphate), $K_4Ti_5O_{12}$ (potassium titanate), Prussian blue/white analogues, potassium cobalt oxide (KCO), potassium iron phosphate (KFP), potassium nickel cobalt manganese oxide (KNMC), potassium manganese oxide, potassium vanadium oxide, or any combination thereof.

In a Li-based battery, the electrolyte salt can include lithium bis(fluorosulfonyl)imide ($LiF_2LiNO_4S_2$), lithium bis(trifluoromethylsulfonyl)imide ($LiC_2F_6NO_4S_2$), lithium bis(oxalato) borate, lithium hexafluorophosphate ($LiPF_6$), lithium hexafluoroarsenate ($LiAsF_6$), lithium bis(trifluoromethane) sulfonimide ($LiN(SO_2CF_3)_2$), lithium trifluoromethanesulfonate ($LiCF_3SO_3$), lithium perchlorate ($LiClO_4$), lithium difluoro oxalato borate anion ($LiBF_2(C_2O_4)$), lithium iodide (LiI), lithium bromide (LiBr), lithium chloride (LiCl), lithium hydroxide (LiOH), lithium nitrate ($LiNO_3$), and lithium sulfate ($LiSO_4$) and lithium 2-trifluoromethyl-4,5-dicyanoimidazole (LiTDI), lithium sulfate ($LiSO_4$), and/or lithium difluorophosphate ($LiPO_2F_2$).

In a Na-based battery, the electrolyte salt can include sodium bis(fluorosulfonyl)imide ($NaF_2LiNO_4S_2$), sodium bis(trifluoromethylsulfonyl)imide ($NaC_2F_6NO_4S_2$), sodium bis(oxalato) borate, sodium hexafluorophosphate ($NaPF_6$), sodium hexafluoroarsenate ($NaAsF_6$), sodium bis(trifluoromethane) sulfonimide ($NaN(SO_2CF_3)_2$), sodium trifluoromethanesulfonate ($NaCF_3SO_3$), sodium perchlorate ($NaClO_4$), sodium difluoro oxalato borate anion ($NaBF_2(C_2O_4)$), sodium iodide (NaI), sodium bromide (NaBr), sodium chloride (NaCl), sodium hydroxide (NaOH), sodium nitrate ($NaNO_3$), and sodium sulfate ($NaSO_4$) and sodium 2-trifluoromethyl-4,5-dicyanoimidazole (NaTDI), sodium sulfate ($NaSO_4$), and/or sodium difluorophosphate ($NaPO_2F_2$).

In a K-based battery, the electrolyte salt can include potassium bis(fluorosulfonyl)imide ($KF_2LiNO_4S_2$), potassium bis(trifluoromethylsulfonyl)imide ($KC_2F_6NO_4S_2$), potassium bis(oxalato) borate, potassium hexafluorophosphate ($KPF_6$), potassium hexafluoroarsenate ($KAsF_6$), potassium bis(trifluoromethane) sulfonimide ($KN(SO_2CF_3)_2$), potassium trifluoromethanesulfonate ($KCF_3SO_3$), potassium perchlorate ($KClO_4$), potassium difluoro oxalato borate anion ($KBF_2(C_2O_4)$), potassium iodide (KI), potassium bromide (KBr), potassium chloride (KCl), potassium hydroxide (KOH), potassium nitrate ($KNO_3$), and potassium sulfate ($KSO_4$) and potassium 2-trifluoromethyl-4,5-dicyanoimidazole (KTDI), potassium sulfate ($KSO_4$), and/or potassium difluorophosphate ($KPO_2F_2$).

In a Li, Na, or K-based battery, electrolyte additives can include tris-(trimethylsilyl)phosphate (TMSP), trimethoxy (3,3,3-trifluoropropyl) silane (TTS), pentafluorophenyltriethoxysilane (TPS), boric acid tris(trimethylsilyl) ester (TMSB), tris-(pentafluorophenyl) silane (TPFPS), 1,10-sulfonyldiimidazole (SDM), and/or (pentafluorophenyl)diphenylphosphine (PFPDPP), cetyltrimethylammonium bromide (CTAB), sodium dodecyl sulfate (SDS), polyethyleneglycol (PEG-8000), and thiourea (TU), benzotriazole (BTA), thiourea ($CH_4N_2S$), sodium dodecyl benzene sulfonate (SDBS), LiTFSI, PVA, PEG, CMC, or any combination thereof. In some embodiments, the electrolyte solvent can include water. In some embodiments, the separator 150 can include polyolefin nonwovens, polyethylene, polypropylene, glass fiber, cellulose, or any combination thereof.

In a Ni-MH battery chemistry, the anode current collector 120 and/or the cathode current collector 140 can be composed of nickel, stainless steel, titanium, tin, silver, gold, platinum, or any combination thereof.

In a Ni-MH battery, the anode material 110 can include cadmium, NiFe, MgNi $LaNi_5$, TiFe, $ZnMn_2$, AB5 type alloys where A is selected from rare-earth metals, especially metals in the lanthanum group, and B is selected from nickel, cobalt, manganese, or aluminum. In a Ni-MH battery, the cathode material 130 can include $Ni(OH)_2$.

In a Ni-MH battery, the electrolyte salt can include sodium hydroxide (NaOH) and/or potassium hydroxide (KOH). In some embodiments, the electrolyte additive can include lithium hydroxide (LiOH), potassium silicate ($K_2SiO_3$), $NaBO_2 \cdot 4H_2O$, potassium fluoride (KF), potassium carbonate ($K_2CO_3$), calcium hydroxide ($Ca(OH)_2$), cetyltrimethylammonium bromide (CTAB), sodium dodecyl sulfate (SDS), polyethylene-glycol (PEG-8000), thiourea (TU), $Li_2SO_4$, benzotriazole (BTA), thiourea ($CH_4N_2S$) and sodium dodecyl benzene sulfonate (SDBS), LiTFSI, PVA, PEG, CMC, or any combination thereof. In some embodiments, the electrolyte solvent can include water. In some embodiments, the separator 150 can include polyolefin nonwovens, polyethylene, polypropylene, glass fiber, cellulose, or any combination thereof.

In a lead-acid battery chemistry, the anode current collector 120 and/or the cathode current collector 140 can include lead-antimony alloys to lead calcium tin, lead tin and pure lead, nickel, stainless steel, titanium, Sn, Ag, Au, Pt, or any combination thereof. In some embodiments, the anode material 110 can include lead, lead paste with addition of carbon black, barium sulfate), lignosulfonate, calcium sulfonated naphthalene, sulfur, copper, arsenic and selenium, tin, or any combination thereof. In some embodiments, the cathode material 130 can include lead oxide (PbO), rad lead ($Pb_3O_4$), and/or corresponding paste mixing with sulfuric acid and $H_2O$. In a lead acid battery chemistry, the electrolyte can include a mixture of water and sulfuric acid. In some embodiments, the separator 130 can include PVC, polyolefin nonwovens, polyethylene, Polypropylene, glass fiber, cellulose, Wood, rubber, or any combination thereof.

Figure 2A:
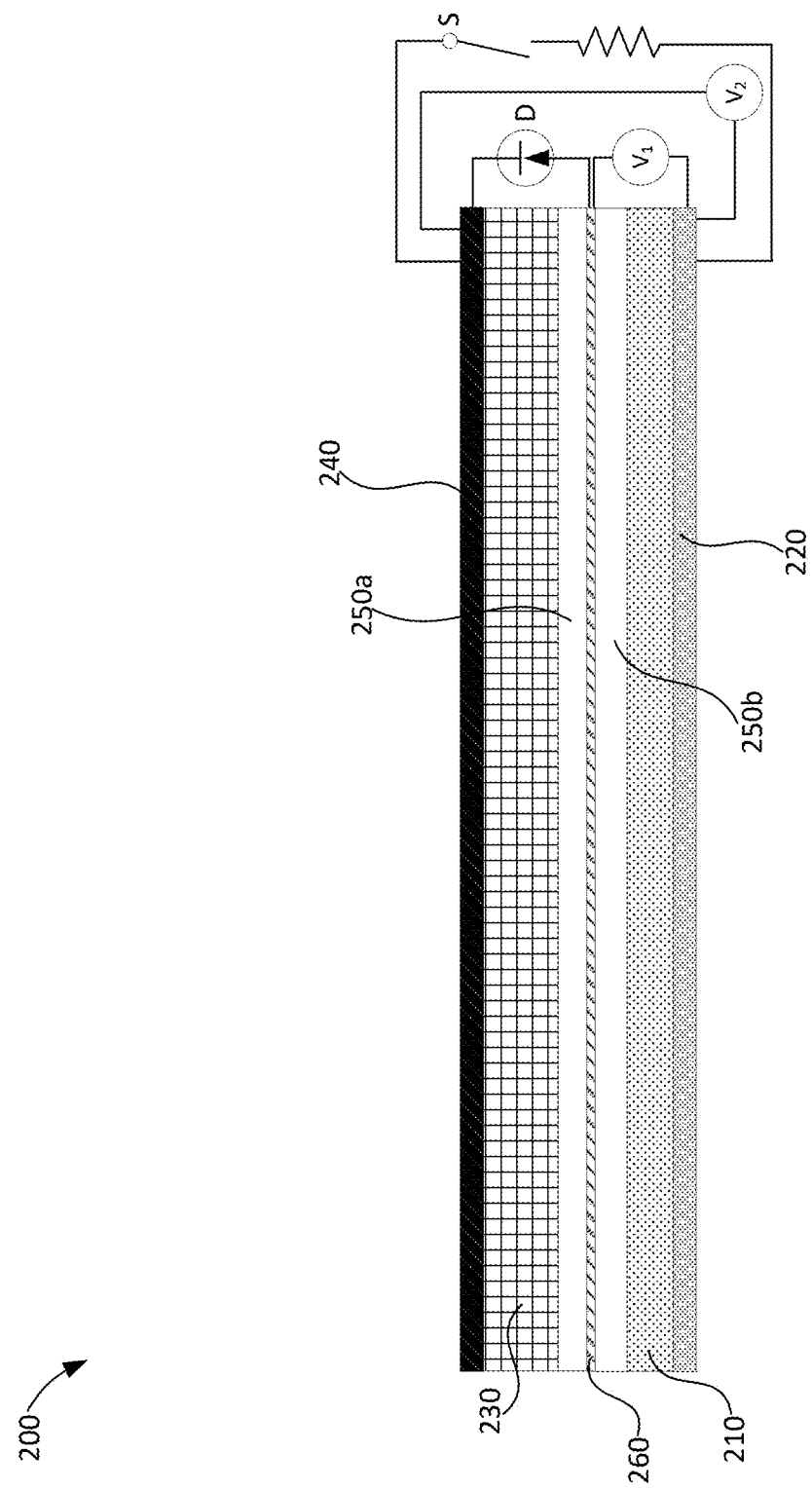
FIGS. 2A-2B are illustrations of an electrochemical cell with an interlayer, according to an embodiment.
Figure 2B:
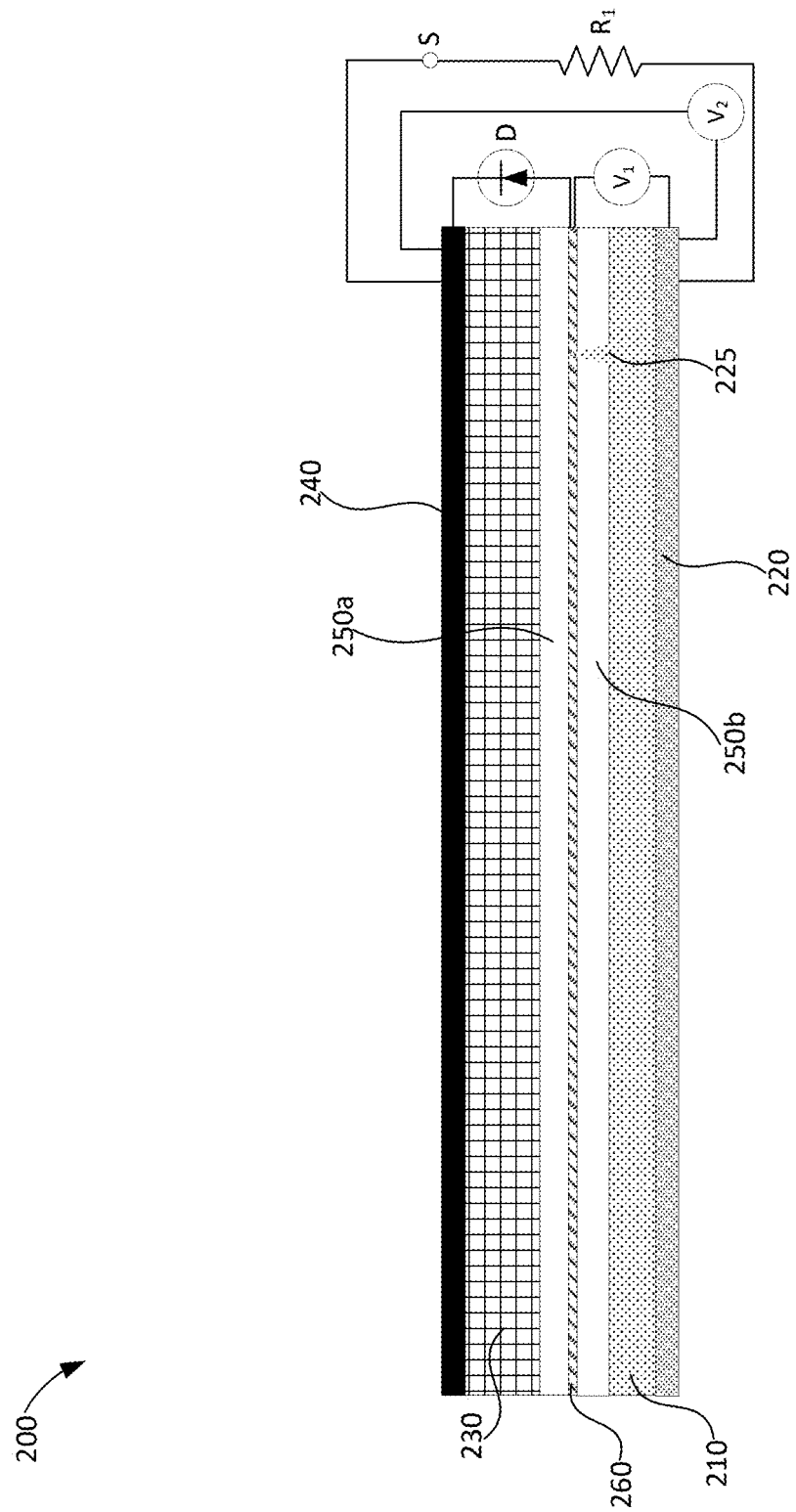

FIGS. 2A-2B are illustrations of an electrochemical cell 200 with an interlayer 260, according to an embodiment. As shown, the electrochemical cell 200 includes an anode 210 disposed on an anode current collector 220, a cathode 230 disposed on a cathode current collector 240, with a first separator 250a and a second separator 250b disposed between the anode 210 and the cathode 230. The interlayer 260 is disposed between the first separator 250a and the second separator 250b. In some embodiments, the anode 210, the anode current collector 220, the cathode 230, the cathode current collector 240, the first separator 250a, the second separator 250b, and the interlayer 260 can be the same or substantially similar to the anode 110, the anode current collector 120, the cathode 130, the cathode current collector 140, the first separator 150a, the second separator 150b, and the interlayer 160, as described above with reference to FIG. 1. Thus, certain aspects of the anode 210, the anode current collector 220, the cathode 230, the cathode current collector 240, the first separator 250a, the second separator 250b, and the interlayer 260 are not described in greater detail herein.

As shown, a voltage $V_1$ is measured between the anode current collector 220 and the interlayer 260, a voltage $V_2$ is measured between the anode current collector 220 and the cathode current collector 240. As shown, a diode D is coupled to the interlayer 260 and the cathode current collector 240 to direct the flow of current in a single direction from the interlayer 260 to the cathode current collector 240. In some embodiments, the diode D can be replaced by a resistor, a fuse, and/or a transistor (e.g., a bi-junction transistor, FET). The anode current collector 220 is coupled to the cathode current collector 240 via a resistor $R_1$ and a switch S.

In FIG. 2A, the switch S is open and the electrochemical cell 200 is functioning normally. In FIG. 2B, a dendrite 225 has formed. The dendrite 225 creates a short circuit between the anode 220 and the interlayer 260, such that the voltage $V_1$ is reduced below a threshold value. Upon detecting that $V_1$ is below the threshold value, the switch S closes, and the electrochemical cell 200 discharges through the resistor $R_1$. In some embodiments, the switch S can be closed during charge of the electrochemical cell 200. In some embodiments, the switch S can be closed during discharge of the electrochemical cell 200. In some embodiments, the threshold value of the voltage $V_1$ can be about 0.001 V, about 0.002 V, about 0.003 V, about 0.004 V, about 0.005 V, about 0.006 V, about 0.007 V, about 0.008 V, about 0.009 V, about 0.01 V, about 0.02 V, about 0.03 V, about 0.04 V, about 0.05 V, about 0.06 V, about 0.07 V, about 0.08 V, about 0.09 V, about 0.1 V, about 0.2 V, about 0.3 V, about 0.4 V, about 0.5 V, about 0.6 V, about 0.7 V, about 0.8 V, about 0.9 V, or about 1 V, inclusive of all values and ranges therebetween.

In some embodiments, multiple electrochemical cells can be connected in series and/or in parallel. As shown, when the switch S closes, a hardware triggered discharge can easily be used to automatically apply an external load to quickly discharge the electrochemical cell 200. This discharge can benefit the functional safety of the electrochemical cell 200. The Failure-in-time (FIT) number of the electrochemical cell 200 or multiple electrochemical cells can be detected for the reliability of detection of dendrites (e.g., based on a contaminant concentration (ppm) value corresponding to a particular voltage). Each electrochemical cell connected in parallel can require a separate monitor. This would increase the controls cost of such a system without individual hardware detection. In some embodiments all of the interlayers from parallel cells can be connected in parallel. Using a switching device can allow duplication of single components (i.e., single transistors are cheaper than BMS monitoring chips). When electrochemical cells are connected fully in series, a battery measurement chip can be used, connecting $V_1$ to a first channel and connecting $V_2$ to a next higher channel. In some embodiments, the BMS can measure/calculate a voltage $V_f$, equal to $V_2$-$V_1$ to allow a control decision to be made to protect the system. The BMS can react to a short circuit detection via standard balance circuitry or through additional controls. Low integration level monitors can be appropriate for such measurements, as they have a lower controls overhead and cost than more automated BMS devices. Using multiple chip sets can also create redundant safety measurements for voltage and temperature sensing giving additional flexibility to the safety design.

The resistor $R_1$ eases or reduces the flow of current through a direct path between the anode 210 and the cathode 230. In some embodiments, the current flowing along the closed switch S can be used to power an external device. In some embodiments, the current flowing along the closed switch S can be used to provide heat to an external device or heater. As shown, the diode D connects the interlayer 260 to the cathode current collector 240. In some embodiments, the diode D can connect the interlayer 260 to the anode current collector 220 while the voltage is measured between the interlayer 260 and the cathode current collector 240. In other words, the electrochemical energy can flow in the opposite direction to what is depicted in FIGS. 2A-2B.

In some embodiments, the anode 210 can include a semi-solid anode. In some embodiments, the anode 210 can include a conventional solid anode (i.e., with a binder). In some embodiments, the cathode 230 can include a semi-solid cathode. In some embodiments, the cathode 230 can include a conventional solid cathode (i.e., with a binder).

In some embodiments, the electrochemical cell 200 can be subject to high-potential (hipot) testing. In some embodiments, the cathode 230 can be subject to hipot testing. In some embodiments, the anode 210 can be subject to hipot testing. In some embodiments, a full hipot of the electrochemical cell 200 can be conducted with the interlayer 260 acting as a reference layer. In some embodiments, the hipot testing can be conducted with conventional electrode layers.

In some embodiments, the first separator 250a and/or the second separator 250b can be composed of a material that has minimal heat deformation. For example, the first separator 250a and/or the second separator 250b can be composed of cellulose, a cellulosic compound, a thermos-cured resin, a high melting temperature polymer, polyimide, or any combination thereof. In some embodiments, the first separator 250a and/or the second separator 250b can have a melting temperature of at least about 100° C., at least about 110° C., at least about 120° C., at least about 130° C., at least about 140° C., at least about 150° C., at least about 160° C., at least about 170° C., at least about 180° C., at least about 190° C., at least about 200° C., at least about 210° C., at least about 220° C., at least about 230° C., at least about 240° C., at least about 250° C., at least about 260° C., at least about 270° C., at least about 280° C., at least about 290° C., or at least about 300° C. This level of heat resistance prevents shrinkage by the first separator 250a and/or the second separator 250b. In some embodiments, the electrochemical cell 200 can be formed such that the first separator 250a and the second separator 250b do not contact pouch film encasing the electrochemical cell 200. Since dendrite formation is prevented, the first separator 250a and the second separator 250b need not extend substantially outward from the anode current collector 220 or the cathode current collector 240.

In some embodiments, the interlayer 260 can have a thickness of at least about 20 nm, at least about 30 nm, at least about 40 nm, at least about 50 nm, at least about 60 nm, at least about 70 nm, at least about 80 nm, at least about 90 nm, at least about 100 nm, at least about 200 nm, at least about 300 nm, at least about 400 nm, at least about 500 nm, at least about 1 µm, at least about 2 µm, at least about 3 µm, at least about 4 µm, at least about 5 µm, at least about 6 µm, at least about 7 µm, at least about 8 µm, at least about 9 µm, at least about 10 µm, at least about 20 µm, at least about 30 µm, at least about 40 µm, at least about 50 µm, at least about 60 µm, at least about 70 µm, at least about 80 µm, at least about 90 µm, at least about 100 µm, at least about 150 µm, at least about 200 µm, at least about 250 µm, at least about 300 µm, at least about 350 µm, at least about 400 µm, at least about 450 µm, at least about 500 µm, at least about 550 µm, at least about 600 µm, at least about 650 µm, at least about 700 µm, at least about 750 µm, at least about 800 µm, at least about 850 µm, at least about 900 µm, or at least about 950 µm. In some embodiments, the interlayer 260 can have a thickness of no more than about 1,000 µm, no more than about 950 µm, no more than about 900 µm, no more than about 850 µm, no more than about 800 µm, no more than about 750 µm, no more than about 700 µm, no more than about 650 µm, no more than about 600 µm, no more than about 550 µm, no more than about 500 µm, no more than about 450 µm, no more than about 400 µm, no more than about 350 µm, no more than about 300 µm, no more than about 250 µm, no more than about 200 µm, no more than about 150 µm, no more than about 100 µm, no more than about 90 µm, no more than about 80 µm, no more than about 70 µm, no more than about 60 µm, no more than about 50 µm, no more than about 40 µm, no more than about 30 µm, no more than about 20 µm, no more than about 10 µm, no more than about 9 µm, no more than about 8 µm, no more than about 7 µm, no more than about 6 µm, no more than about 5 µm, no more than about 4 µm, no more than about 3 µm, no more than about 2 µm, no more than about 1 µm, no more than about 500 nm, no more than about 400 nm, no more than about 300 nm, no more than about 200 nm, no more than about 100 nm, no more than about 90 nm, no more than about 80 nm, no more than about 70 nm, no more than about 60 nm, no more than about 50 nm, no more than about 40 nm, or no more than about 30 nm. Combinations of the above-referenced thickness values are also possible (e.g., at least about 20 nm and no more than about 1,000 µm or at least about 200 µm and no more than about 700 µm), inclusive of all values and ranges therebetween. In some embodiments, the interlayer 260 can have a thickness of about 20 nm, about 30 nm, about 40 nm, about 50 nm, about 60 nm, about 70 nm, about 80 nm, about 90 nm, about 100 nm, about 200 nm, about 300 nm, about 400 nm, about 500 nm, about 600 nm, about 700 nm, about 800 nm, about 900 nm, about 1 µm, about 2 µm, about 3 µm, about 4 µm, about 5 µm, about 6 µm, about 7 µm, about 8 µm, about 9 µm, about 10 µm, about 20 µm, about 30 µm, about 40 µm, about 50 µm, about 60 µm, about 70 µm, about 80 µm, about 90 µm, about 100 µm, about 150 µm, about 200 µm, about 250 µm, about 300 µm, about 350 µm, about 400 µm, about 450 µm, about 500 µm, about 550 µm, about 600 µm, about 650 µm, about 700 µm, about 750 µm, about 800 µm, about 850 µm, about 900 µm, about 950 µm, or about 1,000 µm.

In some embodiments, the interlayer 260 can have a conductivity of at least about $1\times10^{-3}$ S/m, at least about $2\times10^{-3}$ S/m, at least about $3\times10^{-3}$ S/m, at least about $4\times10^{-3}$ S/m, at least about $5\times10^{-3}$ S/m, at least about $6\times10^{-3}$ S/m, at least about $7\times10^{-3}$ S/m, at least about $8\times10^{-3}$ S/m, at least about $9\times10^{-3}$ S/m, at least about $1\times10^{-2}$ S/m, at least about $2\times10^{-2}$ S/m, at least about $3\times10^{-2}$ S/m, at least about $4\times10^{-2}$ S/m, at least about $5\times10^{-2}$ S/m, at least about $6\times10^{-2}$ S/m, at least about $7\times10^{-2}$ S/m, at least about $8\times10^{-2}$ S/m, at least about $9\times10^{-2}$ S/m, at least about 0.1 S/m, at least about 0.2 S/m, at least about 0.3 S/m, at least about 0.4 S/m, at least about 0.5 S/m, at least about 0.6 S/m, at least about 0.7 S/m, at least about 0.8 S/m, at least about 0.9 S/m. In some embodiments, the interlayer 260 can have a conductivity of no more than about 1 S/m, no more than about 0.9 S/m, no more than about 0.8 S/m, no more than about 0.7 S/m, no more than about 0.6 S/m, no more than about 0.5 S/m, no more than about 0.4 S/m, no more than about 0.3 S/m, no more than about 0.2 S/m, no more than about 0.1 S/m, no more than about $9\times10^{-2}$ S/m, no more than about $8\times10^{-2}$ S/m, no more than about $7\times10^{-2}$ S/m, no more than about $6\times10^{-2}$ S/m, no more than about $5\times10^{-2}$ S/m, no more than about $4\times10^{-2}$ S/m, no more than about $3\times10^{-2}$ S/m, no more than about $2\times10^{-2}$ S/m, no more than about $1\times10^{-2}$ S/m, no more than about $9\times10^{-3}$ S/m, no more than about $8\times10^{-3}$ S/m, no more than about $7\times10^{-3}$ S/m, no more than about $6\times10^{-3}$ S/m, no more than about $5\times10^{-3}$ S/m, no more than about $4\times10^{-3}$ S/m, no more than about $3\times10^{-3}$ S/m, or no more than about $2\times10^{-3}$ S/m. Combinations of the above-referenced conductivity values are also possible (e.g., at least about $1\times10^{-3}$ S/m and no more than about 1 S/m or at least about at least about $2\times10^{-3}$ S/m and no more than about 0.1 S/cm), inclusive of all values and ranges therebetween. In some embodiments, the interlayer 260 can have a conductivity of about $1\times10^{-3}$ S/m, about $2\times10^{-3}$ S/m, about $3\times10^{-3}$ S/m, about $4\times10^{-3}$ S/m, about $5\times10^{-3}$ S/m, about $6\times10^{-3}$ S/m, about $7\times10^{-3}$ S/m, about $8\times10^{-3}$ S/m, about $9\times10^{-3}$ S/m, about $1\times10^{-2}$ S/m, about $2\times10^{-2}$ S/m, about $3\times10^{-2}$ S/m, about $4\times10^{-2}$ S/m, about $5\times10^{-2}$ S/m, about $6\times10^{-2}$ S/m, about $7\times10^{-2}$ S/m, about $8\times10^{-2}$ S/m, about $9\times10^{-2}$ S/m, about 0.1 S/m, about 0.2 S/m, about 0.3 S/m, about 0.4 S/m, about 0.5 S/m, about 0.6 S/m, about 0.7 S/m, about 0.8 S/m, about 0.9 S/m, or about 1 S/m.

In some embodiments, the interlayer 260 can be electrically coupled to a cathode external to the electrochemical cell 200. In some embodiments, the external cathode can have a higher resistance than the interlayer 260. In some embodiments, the interlayer 260 can be electrically coupled to an anode external to the electrochemical cell 200. In some embodiments, the external anode can have a higher resistance than the interlayer 260. In some embodiments, the interlayer 260 can be electrically connected to an external electrochemical cell. In some embodiments, the interlayer 260 can be electrically connected to an external capacitor. In some embodiments, the interlayer 260 can be electrically connected to an external resistor.

In some embodiments, the potential of the interlayer 260 can be manipulated to dissolve or oxidize the dendrite 225 as the dendrite 225 penetrates the interlayer 260. This is particularly valid when the interlayer 260 includes cathode materials therein. In some embodiments, the voltage difference between the anode 210 and the interlayer 260 can be tuned to at least about 1 V, at least about 1.5 V, at least about 2 V, at least about 2.5 V, at least about 3 V, at least about 3.5 V, at least about 4 V, or at least about 4.5 V. In some embodiments, the voltage difference between the anode 210 and the interlayer 260 can be tuned to no more than about 5 V, no more than about 4.5 V, no more than about 4 V, no more than about 3.5 V, no more than about 3 V, no more than about 2.5 V, no more than about 2 V, or no more than about 1.5 V. Combinations of the above-referenced voltage ranges are also possible (e.g., at least about 1 V and no more than about 5 V or at least about 2 V and no more than about 4 V), inclusive of all values and ranges therebetween. In some embodiments, the voltage difference between the anode 210 and the interlayer 260 can be tuned to about 1 V, about 1.5 V, about 2 V, about 2.5 V, about 3 V, about 3.5 V, about 4 V, about 4.5 V, or about 5 V.

In some embodiments, the voltage difference between the cathode 230 and the interlayer 260 can be tuned to at least about 1 V, at least about 1.5 V, at least about 2 V, at least about 2.5 V, at least about 3 V, at least about 3.5 V, at least about 4 V, or at least about 4.5 V. In some embodiments, the voltage difference between the cathode 230 and the interlayer 260 can be tuned to no more than about 5 V, no more than about 4.5 V, no more than about 4 V, no more than about 3.5 V, no more than about 3 V, no more than about 2.5 V, no more than about 2 V, or no more than about 1.5 V. Combinations of the above-referenced voltage ranges are also possible (e.g., at least about 1 V and no more than about 5 V or at least about 2 V and no more than about 4 V), inclusive of all values and ranges therebetween. In some embodiments, the voltage difference between the cathode 230 and the interlayer 260 can be tuned to about 1 V, about 1.5 V, about 2 V, about 2.5 V, about 3 V, about 3.5 V, about 4 V, about 4.5 V, or about 5 V.

In some embodiments, the impedance through the structural components of the electrochemical cell 200 (i.e., the anode 210, the anode current collector 220, the cathode 230, the cathode current collector 240, and the separator 250) can be less than the impedance through the resistor $R_1$. In some embodiments, the impedance through the structural components of the electrochemical cell 200 can be less than the impedance through the diode D. In some embodiments, the ratio of the impedance through the structural components of the electrochemical cell 200 to the impedance through the resistor $R_1$ can be less than about 1:2, less than about 1:3, less than about 1:4, less than about 1:5, less than about 1:6, less than about 1:7, less than about 1:8, less than about 1:9, less than about 1:10, less than about 1:20, less than about 1:30, less than about 1:40, less than about 1:50, less than about 1:60, less than about 1:70, less than about 1:80, less than about 1:90, or less than about 1:100. In some embodiments, the ratio of the impedance through the structural components of the electrochemical cell 200 to the impedance through the diode D can be less than about 1:2, less than about 1:3, less than about 1:4, less than about 1:5, less than about 1:6, less than about 1:7, less than about 1:8, less than about 1:9, less than about 1:10, less than about 1:20, less than about 1:30, less than about 1:40, less than about 1:50, less than about 1:60, less than about 1:70, less than about 1:80, less than about 1:90, or less than about 1:100.

In some embodiments, the first separator 250a can have a first length and the second separator 250b can have a second length, the second length greater than the first length. In some embodiments, the first separator 250a can have a first width and the second separator 250b can have a second width, the second width greater than the first width. In some embodiments, the interlayer 260 can have a length and/or width greater than the first width and/or the second width, such that a portion of the interlayer 260 is adjacent to the second separator 250b but not the first separator 250a. In some embodiments, a tab (not shown) can be attached (e.g., via welding) to the interlayer 260. In some embodiments, the tab can be attached to a portion of the interlayer 260 extending beyond the first separator 250a.

In some embodiments, a portion of the first separator 250a and/or the second separator 250b can be removed (e.g., the first separator 250a and/or the second separator 250b can be punched), such that the tab can be attached to the interlayer 260 through the removed section of the first separator 250a and/or the second separator 250b. In some embodiments, the electrochemical cell 200 can be contained inside a pouch (not shown). In some embodiments, the pouch can include a first film attached to the anode current collector 220 and a second film attached to the cathode current collector 240. In some embodiments, portion of the pouch can be removed (e.g., punched), such that the tab can be attached to the interlayer 260 through the removed section of the pouch.

Figure 3A:
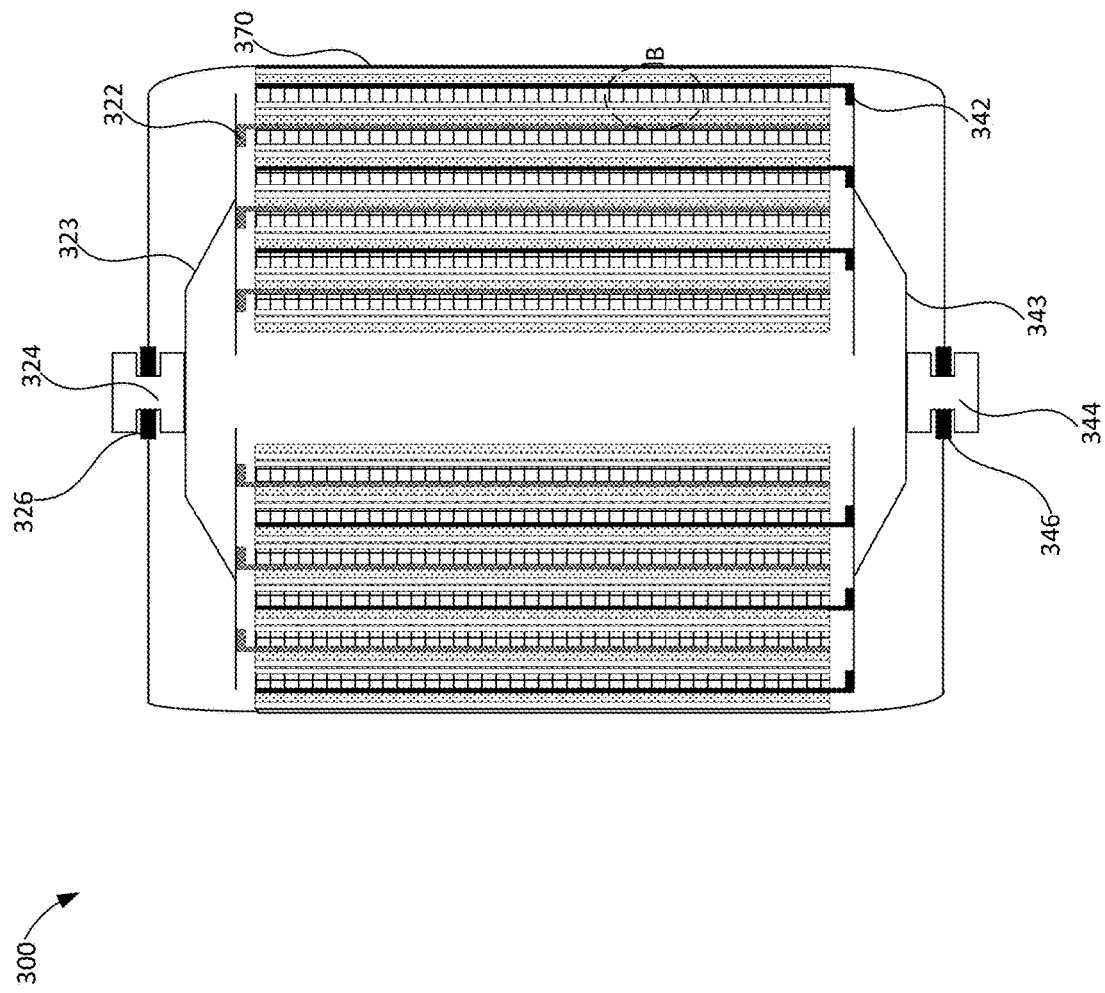
FIGS. 3A-3B are illustrations of an electrochemical cell with an interlayer, according to an embodiment.
Figure 3B:
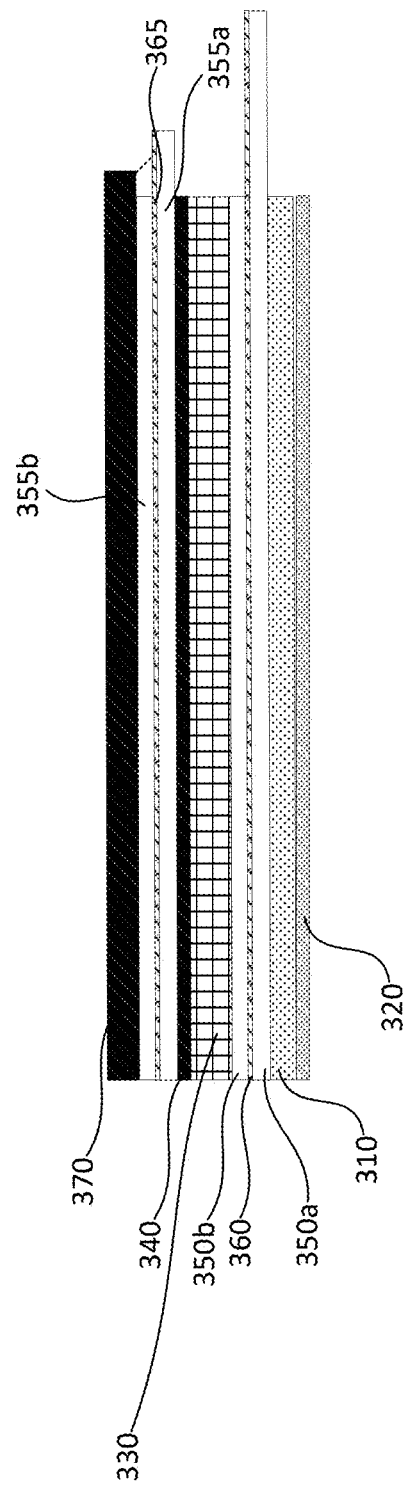

FIGS. 3A-3B are illustrations of an electrochemical cell 300 with interlayers 360a, 365, according to an embodiment. As shown, the electrochemical cell 300 includes an anode material 310 disposed on an anode current collector 320 and a cathode material 330 disposed on a cathode current collector 340. A first separator 350a is disposed on the anode material 310 and a second separator 350b is disposed on the cathode material 330. The interlayer 360 is disposed between the first separator 350a and the second separator 350b. A third separator 355a and a fourth separator 355b are disposed on an outer surface of the cathode current collector 340 with a second interlayer 365 disposed therebetween. A casing 370 encases the aforementioned components of the electrochemical cell 300. As shown, a bent portion 322 of the anode current collector 320 contacts a conductive plate 323. A negative button 324 is coupled to the conductive plate 323. An insulator 326 is disposed around the negative button 324, electrically isolating the negative button 324 from the rest of the casing 370. A bent portion 342 of the cathode current collector 340 contacts a conductive plate 343. A positive button 344 is coupled to the conductive plate 343. An insulator 346 is disposed around the positive button 344, electrically isolating the positive button 344 from the rest of the casing 370. FIG. 3B shows a close-up view of the dotted region B, as indicated in FIG. 3A.

As shown, the bent portion 322 of the anode current collector 320 contacts the conductive plate 323. In some embodiments, the anode material 310 can be coated onto the bent portion 322 of the anode current collector 320, such that the anode material 310 contacts the conductive plate 323. In some embodiments, the bent portion 322 can be welded, braised, and/or adhered (via conductive adhesive) to the conductive plate 323. The negative button 324 is coupled to the conductive plate 323. In some embodiments, the negative button 324 can be welded to the conductive plate 323. In some embodiments, the conductive plate 323 can include multiple portions welded together. The insulator 326 is disposed around the outside of the negative button 324 and prevents electrical contact between the negative button 324 and the casing 370. In some embodiments, the conductive plate 323 can be composed of the same material as the anode current collector 320. In some embodiments, the conductive plate 323 can be composed of copper.

As shown, the bent portion 342 of the cathode current collector 340 contacts the conductive plate 343. In some embodiments, the cathode material 330 can be coated on the bent portion 342 of the cathode current collector 340, such that the cathode material 330 contacts the conductive plate 343. In some embodiments, the bent portion 342 can be welded, braised, and/or adhered (via conductive adhesive) to the conductive plate 343. The positive button 344 is coupled to the conductive plate 343. In some embodiments, the positive button 344 can be welded to the conductive plate 344. In some embodiments, the conductive plate 343 can include multiple portions welded together. The insulator 347 is disposed around the outside of the positive button 344 and prevents electrical contact between the positive button 344 and the casing 370. In some embodiments, the conductive plate 343 can be composed of the same material as the cathode current collector 340. In some embodiments, the conductive plate 343 can be composed of aluminum.

The casing 370 is electrically connected to the first interlayer 360 and the second interlayer 365. The first interlayer 360 can be connected to the second interlayer 365 in several different ways. In some embodiments, the second interlayer 365 can be folded over to contact the first interlayer 360 (e.g., along the dotted line shown in FIG. 3B). In some embodiments, a conductive material (not shown) can bridge the first interlayer 360 and the second interlayer 365. In some embodiments, the conductive material can include a tape with a conductive adhesive, a conductive polymer, a conductive carbon tape, a conductive glue, or any combination thereof.

As shown, the casing 370 acts as a "button" for the first interlayer 360 and the second interlayer 365. In some embodiments, the second interlayer 365 can be folded over to contact the casing 370. In use, a first voltage difference can be measured between the positive button 344 and the negative button 324 and a second voltage difference can be measured between the casing 370 and the negative button 324.

Figure 4B:
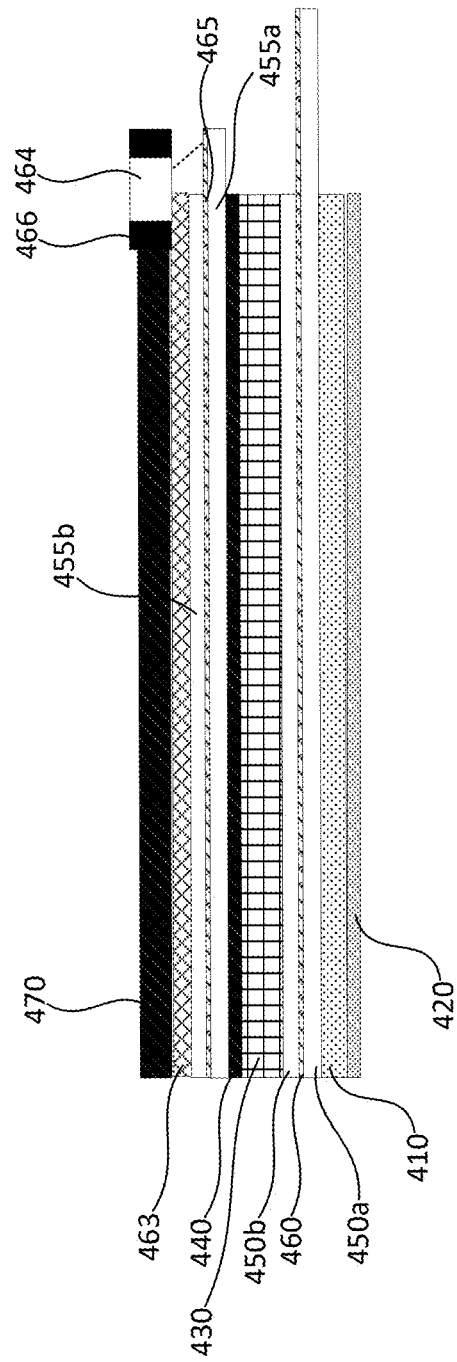

FIGS. 4A-4B are illustrations of an electrochemical cell 400 with interlayers 460, 465, according to an embodiment. As shown, the electrochemical cell 400 includes an anode material 410 disposed on an anode current collector 420 and a cathode material 430 disposed on a cathode current collector 440. A first separator 450a is disposed on the anode material 410 and a second separator 450b is disposed on the cathode material 430. The interlayer 460 is disposed between the first separator 450a and the second separator 450b. A third separator 455a and a fourth separator 455b are disposed on an outer surface of the cathode current collector 440 with a second interlayer 465 disposed therebetween. A casing 470 encases the aforementioned components of the electrochemical cell 400. As shown, a bent portion 422 of the anode current collector 420 contacts a conductive plate 423. A negative button 424 is coupled to the conductive plate 423. An insulator 426 is disposed around the negative button 424, electrically isolating the negative button 424 from the rest of the casing 470. A bent portion 442 of the cathode current collector 440 contacts a conductive plate 443. A positive button 444 is coupled to the conductive plate 443. An insulator 446 is disposed around the positive button 444, electrically isolating the positive button 444 from the rest of the casing 470. An insulator 463 is disposed around the outside of the separator 455b, isolating the interlayer 465 from the casing 470. An interlayer button 464 is electrically coupled to the interlayer 465 and the interlayer 460. An insulator 466 is disposed around the interlayer button 464, electrically isolating the interlayer button 464 from the rest of the casing 470. FIG. 4B shows a close-up view of the dotted region B, as indicated in FIG. 4A.

In some embodiments, the anode material 410, the anode current collector 420, the bent portion 422, the negative button 424, the insulator 426, the cathode material 430, the cathode current collector 440, the bent portion 442, the positive button 444, the insulator 446, the first separator 450a, the second separator 450b, the third separator 455a, the fourth separator 455b, the interlayer 460, the interlayer 465, and the casing 470 can be the same or substantially similar to the anode material 310, the anode current collector 320, the bent portion 322, the negative button 324, the insulator 326, the cathode material 330, the cathode current collector 340, the bent portion 342, the positive button 344, the insulator 346, the first separator 350a, the second separator 350b, the third separator 355a, the fourth separator 355b, the interlayer 360, the interlayer 365, and the casing 370, as described above with reference to FIGS. 3A-3B. Thus, certain aspects of the anode material 410, the anode current collector 420, the bent portion 422, the negative button 424, the insulator 426, the cathode material 430, the cathode current collector 440, the bent portion 442, the positive button 444, the insulator 446, the first separator 450a, the second separator 450b, the third separator 455a, the fourth separator 455b, the interlayer 460, the interlayer 465, and the casing 470 are not described in greater detail herein.

As shown, the interlayer button 464 is coupled to the interlayer 465 (e.g., via the dotted line in FIG. 4B). The interlayer button 464 is electrically coupled to the interlayer 465 and the interlayer 460. The insulator 466 electrically isolates the interlayer button 464 from the rest of the casing 470. In use, a first voltage difference can be measured between the negative button 424 and the positive button 444 and a second voltage difference can be measured between the negative button 424 and the interlayer button 464.

Figure 5A:
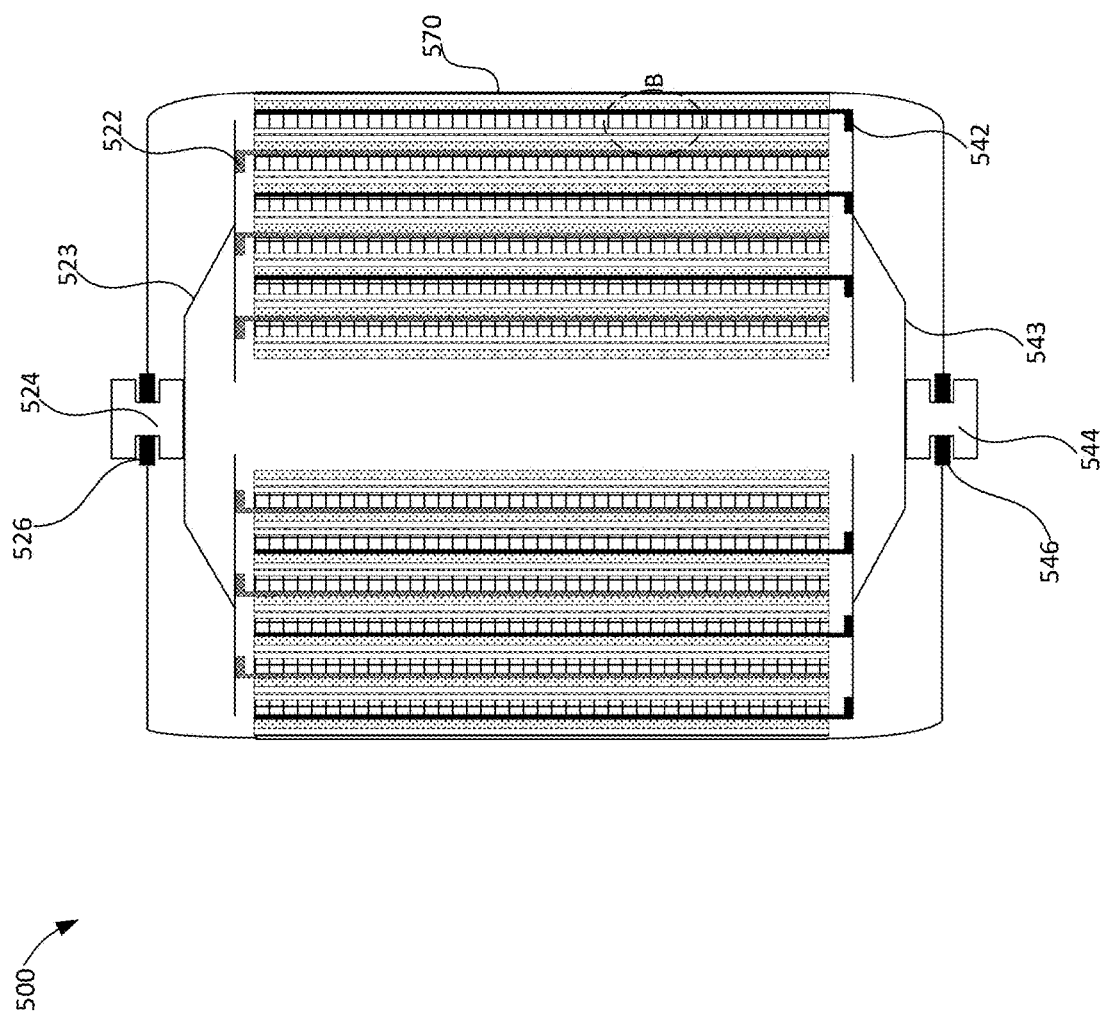
FIGS. 5A-5B are illustrations of an electrochemical cell with an interlayer, according to an embodiment.
Figure 5B:
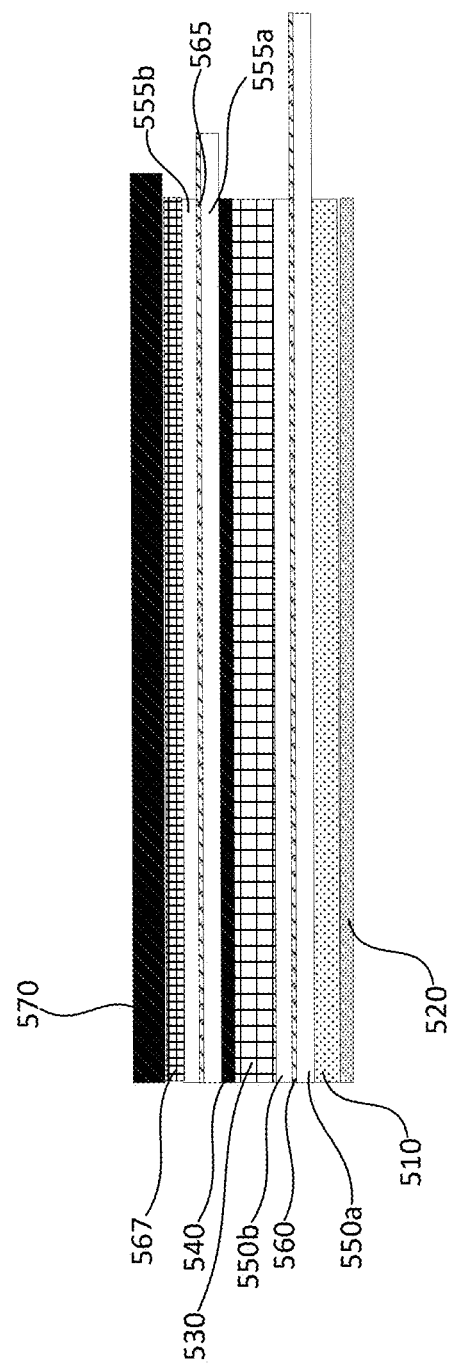

FIGS. 5A-5B are illustrations of an electrochemical cell 500 with interlayers 560, 565, according to an embodiment. As shown, the electrochemical cell 400 includes an anode material 510 disposed on an anode current collector 520 and a cathode material 530 disposed on a cathode current collector 540. A first separator 550a is disposed on the anode material 510 and a second separator 550b is disposed on the cathode material 530. The interlayer 560 is disposed between the first separator 550a and the second separator 550b. A third separator 555a and a fourth separator 555b are disposed on an outer surface of the cathode current collector 540 with a second interlayer 565 disposed therebetween. A casing 570 encases the aforementioned components of the electrochemical cell 500. A conductive layer 567 is disposed between the casing 570 and the separator 555b. As shown, a bent portion 522 of the anode current collector 520 contacts a conductive plate 523. A negative button 524 is coupled to the conductive plate 523. An insulator 526 is disposed around the negative button 524, electrically isolating the negative button 524 from the rest of the casing 570. A bent portion 542 of the cathode current collector 540 contacts a conductive plate 543. A positive button 544 is coupled to the conductive plate 543. An insulator 546 is disposed around the positive button 544, electrically isolating the positive button 544 from the rest of the casing 570. FIG. 5B shows a close-up view of the dotted region B, as indicated in FIG. 5A.

In some embodiments, the anode material 510, the anode current collector 520, the bent portion 522, the negative button 524, the insulator 526, the cathode material 530, the cathode current collector 540, the bent portion 542, the positive button 544, the insulator 546, the first separator 550a, the second separator 550b, the third separator 555a, the fourth separator 555b, the interlayer 560, the interlayer 565, and the casing 570 can be the same or substantially similar to the anode material 310, the anode current collector 320, the bent portion 322, the negative button 324, the insulator 326, the cathode material 330, the cathode current collector 340, the bent portion 342, the positive button 344, the insulator 346, the first separator 350a, the second separator 350b, the third separator 355a, the fourth separator 355b, the interlayer 360, the interlayer 365, and the casing 370, as described above with reference to FIGS. 3A-3B. Thus, certain aspects of the anode material 510, the anode current collector 520, the bent portion 522, the negative button 524, the insulator 526, the cathode material 530, the cathode current collector 540, the bent portion 542, the positive button 544, the insulator 546, the first separator 550a, the second separator 550b, the third separator 555a, the fourth separator 555b, the interlayer 560, the interlayer 565, and the casing 570 are not described in greater detail herein.

The conductive coating 567 is disposed between the casing 570 and the fourth separator 555b. In some embodiments, the conductive coating 567 can be coated to the fourth separator 555b. In some embodiments, the conductive coating 567 can be coated to the interior wall of the casing 570. The conductive coating 567 facilitates passage of electrons between the interlayer 565 and the casing 570. In some embodiments, the interlayer 565 can be folded to contact the conductive coating 570. In use, the casing 570 acts as a "button" and is in electrical contact with the interlayer 560 and the interlayer 565. A first voltage can be measured between the negative button 524 and the positive button 544 and a second voltage can be measured between the negative button 524 and the casing 570. In some embodiments, the conductive coating 567 can be composed of gold, silver, copper, zinc, nickel, platinum, or any combination thereof.

Figure 6A:
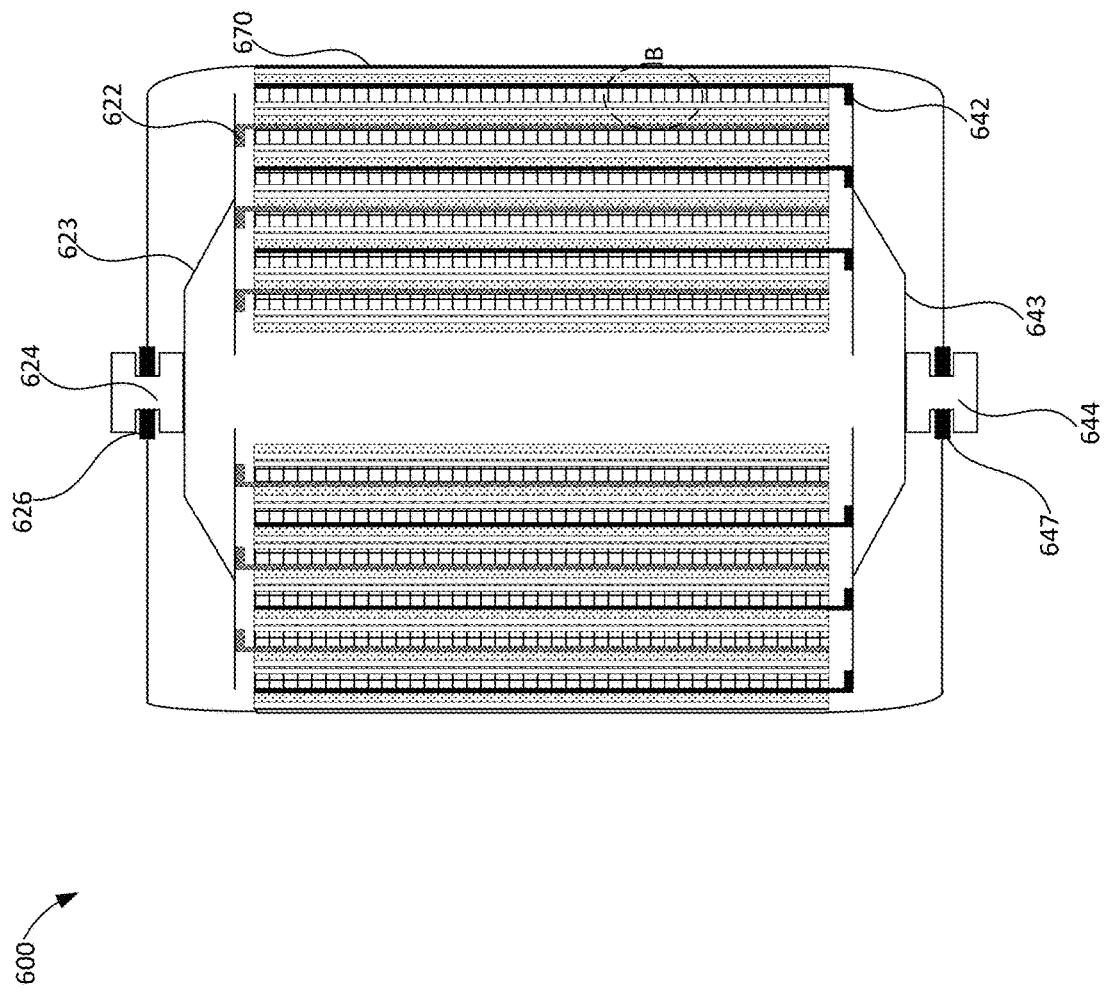
FIGS. 6A-6B are illustrations of an electrochemical cell with an interlayer, according to an embodiment.
Figure 6B:
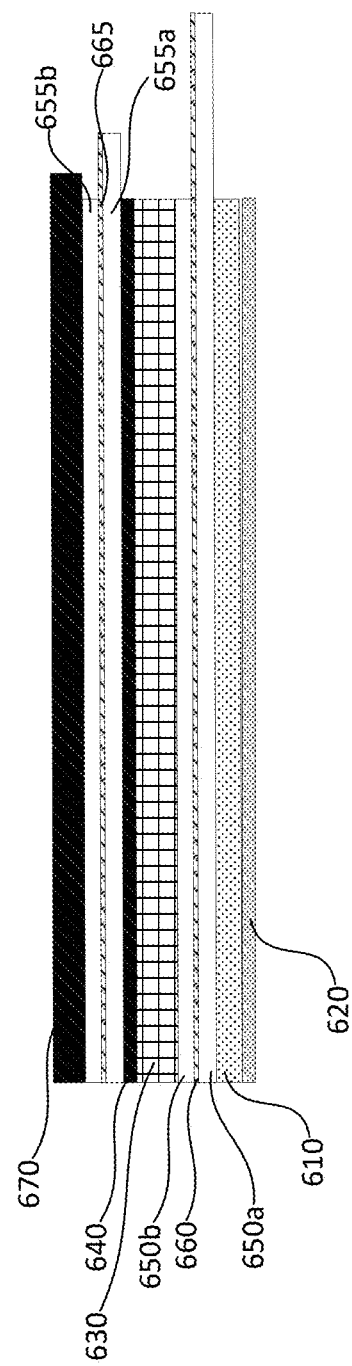

FIGS. 6A-6B are illustrations of an electrochemical cell 600 with interlayers 660, 665, according to an embodiment. As shown, the electrochemical cell 600 includes an anode material 610 disposed on an anode current collector 620 and a cathode material 630 disposed on a cathode current collector 640. A first separator 650a is disposed on the anode material 610 and a second separator 650b is disposed on the cathode material 630. The interlayer 660 is disposed between the first separator 650a and the second separator 650b. A third separator 655a and a fourth separator 655b are disposed on an outer surface of the cathode current collector 640 with a second interlayer 665 disposed therebetween. A casing 670 encases the aforementioned components of the electrochemical cell 600. As shown, a bent portion 622 of the anode current collector 620 contacts a conductive plate 623. A negative button 624 is coupled to the conductive plate 623. An insulator 626 is disposed around the negative button 624, electrically isolating the negative button 624 from the rest of the casing 670. A bent portion 642 of the cathode current collector 640 contacts a conductive plate 643. A positive button 644 is coupled to the conductive plate 643. A semiconductor 67 is disposed around the positive button 644 allowing current to flow in only one direction between the cathode material 630 and the interlayer 660. The casing 670 is electrically coupled to the interlayers 660, 665. FIG. 6B shows a close-up view of the dotted region B, as indicated in FIG. 6A.

In some embodiments, the anode material 610, the anode current collector 620, the bent portion 622, the negative button 624, the cathode material 630, the cathode current collector 640, the bent portion 642, the positive button 644, the first separator 650a, the second separator 650b, the third separator 655a, the fourth separator 655b, the interlayer 660, the interlayer 665, and the casing 670 can be the same or substantially similar to the anode material 310, the anode current collector 320, the bent portion 322, the negative button 324, the cathode material 330, the cathode current collector 340, the bent portion 342, the positive button 344, the first separator 350a, the second separator 350b, the third separator 355a, the fourth separator 355b, the interlayer 360, the interlayer 365, and the casing 370, as described above with reference to FIGS. 3A-3B. Thus, certain aspects of the anode material 610, the anode current collector 620, the bent portion 622, the negative button 624, the cathode material 630, the cathode current collector 640, the bent portion 642, the positive button 644, the first separator 650a, the second separator 650b, the third separator 655a, the fourth separator 655b, the interlayer 660, the interlayer 665, and the casing 670 are not described in greater detail herein.

The casing 670 acts as a "button" for the interlayers 660, 665, as the casing 670 is in electrical contact with the interlayers 660, 665. The semiconductor 647 allows flow of current through the positive button 644 In a single direction. As shown, the semiconductor 647 surrounds the positive button 644. In some embodiments, the semiconductor 647 can surround the negative button 624. In some embodiments, the semiconductor 647 can be composed of silicon, germanium, gallium arsenide, selenium, or any combination thereof.

Figure 7A:
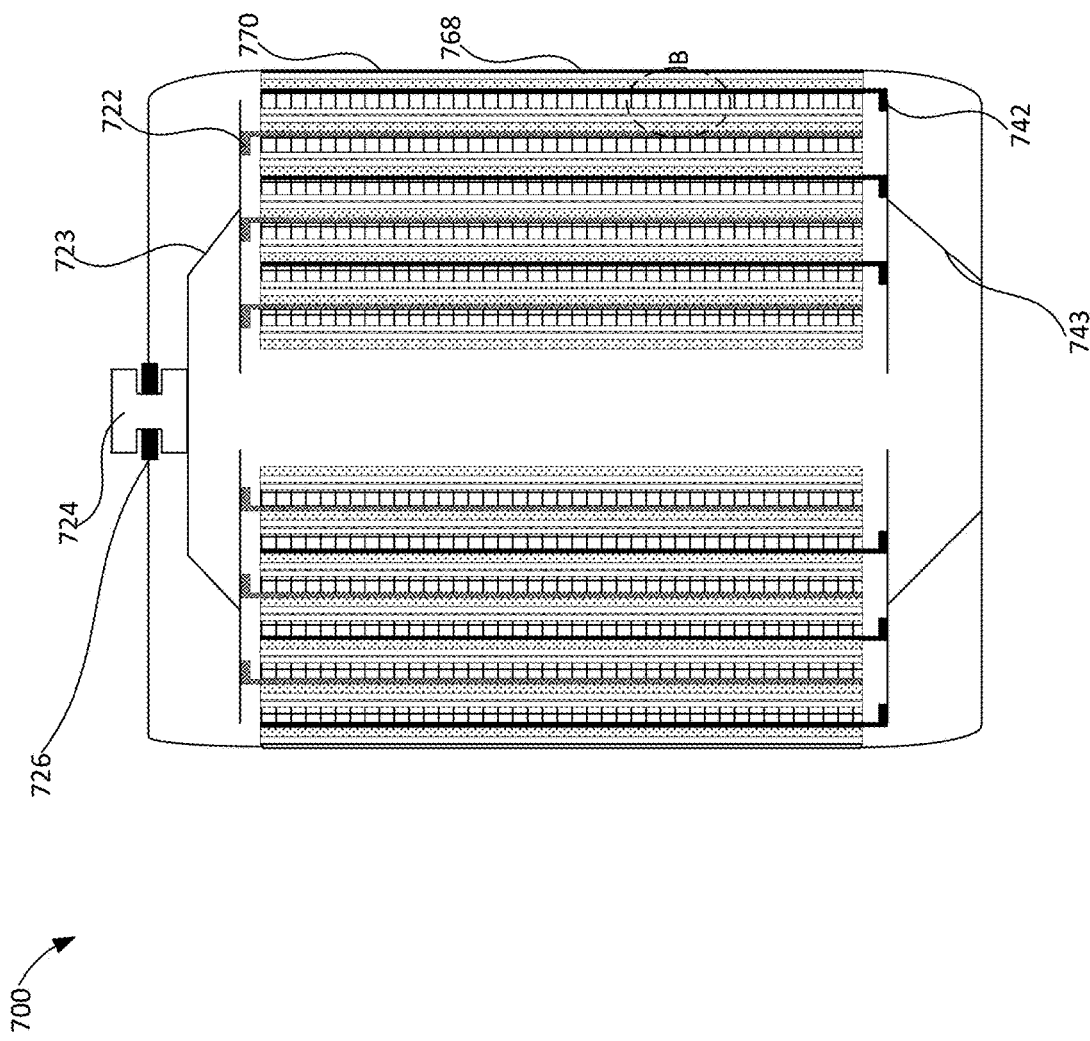
FIGS. 7A-7B are illustrations of an electrochemical cell with an interlayer, according to an embodiment.
Figure 7B:
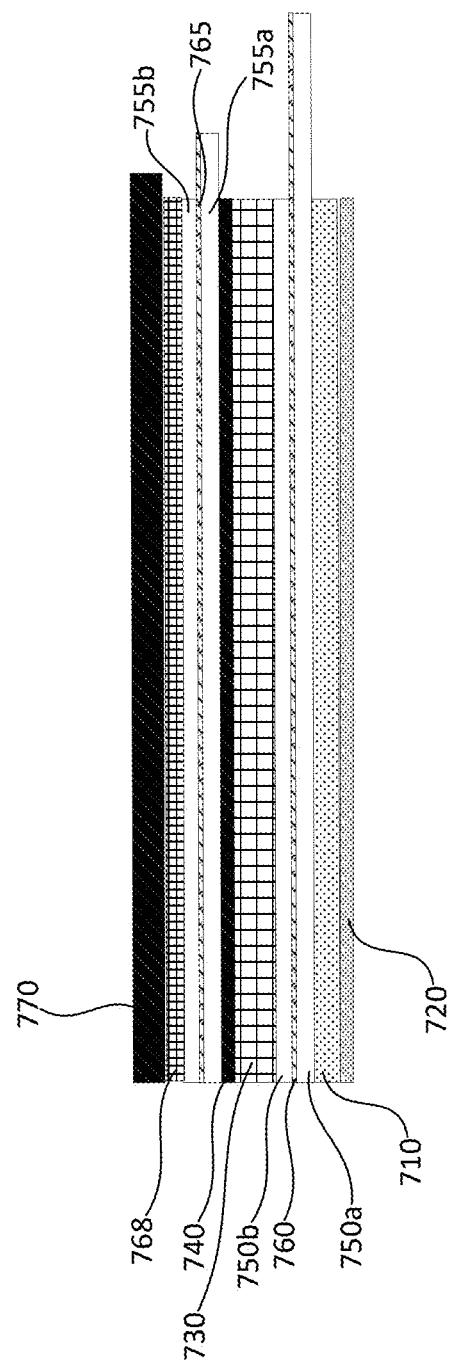

FIGS. 7A-7B are illustrations of an electrochemical cell 700 with interlayers 760, 765, according to an embodiment. As shown, the electrochemical cell 700 includes an anode material 710 disposed on an anode current collector 720 and a cathode material 730 disposed on a cathode current collector 740. A first separator 750a is disposed on the anode material 710 and a second separator 750b is disposed on the cathode material 730. The interlayer 760 is disposed between the first separator 750a and the second separator 750b. A third separator 755a and a fourth separator 755b are disposed on an outer surface of the cathode current collector 740 with a second interlayer 765 disposed therebetween. A casing 770 encases the aforementioned components of the electrochemical cell 700. As shown, a bent portion 722 of the anode current collector 720 contacts a conductive plate 723. A negative button 724 contacts the conductive plate 723. An insulator 726 prevents electrical coupling between the negative button 724 and the rest of the casing 770. A bent portion 742 of the cathode current collector 740 contacts a conductive plate 743. The conductive plate 743 contacts the casing 770. The casing 770 is electrically coupled to the interlayers 760, 765 via a semiconductive coating 768. FIG. 7B shows a close-up view of the dotted region B, as indicated in FIG. 7A.

In some embodiments, the anode material 710, the anode current collector 720, the bent portion 722, the negative button 724, the insulator 726, the cathode material 730, the cathode current collector 740, the bent portion 742, the positive button 744, the insulator 746, the first separator 750a, the second separator 750b, the third separator 755a, the fourth separator 755b, the interlayer 760, the interlayer 765, and the casing 770 can be the same or substantially similar to the anode material 310, the anode current collector 320, the bent portion 322, the negative button 324, the insulator 326, the cathode material 330, the cathode current collector 340, the bent portion 342, the positive button 344, the insulator 346, the first separator 350a, the second separator 350b, the third separator 355a, the fourth separator 355b, the interlayer 360, the interlayer 365, and the casing 370, as described above with reference to FIGS. 3A-3B. Thus, certain aspects of the anode material 710, the anode current collector 720, the bent portion 722, the negative button 724, the insulator 726, the cathode material 730, the cathode current collector 740, the bent portion 742, the positive button 744, the insulator 746, the first separator 750a, the second separator 750b, the third separator 755a, the fourth separator 755b, the interlayer 760, the interlayer 765, and the casing 770 are not described in greater detail herein.

The semiconductor coating 768 is coupled to the inside of the casing 770 and contacts the interlayer 765. In use, the casing 770 acts as a positive "button" at lower temperatures. At low temperatures, the semiconductor coating 768 prevents electrical coupling between the casing 770 and the interlayer 765. At high temperatures, the semiconductor coating 768 creates an electrical coupling between the casing 770 and the interlayer 765, thereby creating a short circuit between the cathode material 730 and the interlayers 760, 765. As shown, the electrochemical cell 700 includes only a negative button 724. In some embodiments, the electrochemical cell 700 can include a positive button (not shown) without the negative button 724. In such cases, the casing 770 acts as a negative "button." In some embodiments, the semiconductor coating 768 can transition from non-conductive to conductive at a temperature of about 0° C., about 10° C., about 20° C., about 30° C., about 40° C., about 50° C., about 60° C., about 70° C., about 80° C., about 90° C., about 100° C., about 110° C., about 120° C., about 130° C., about 140° C., about 150° C., about 160° C., about 170° C., about 180° C., about 190° C., about 200° C., about 210° C., about 220° C., about 230° C., about 240° C., about 250° C., about 260° C., about 270° C., about 280° C., about 290° C., or about 300° C., inclusive of all values and ranges therebetween.

Figure 8A:
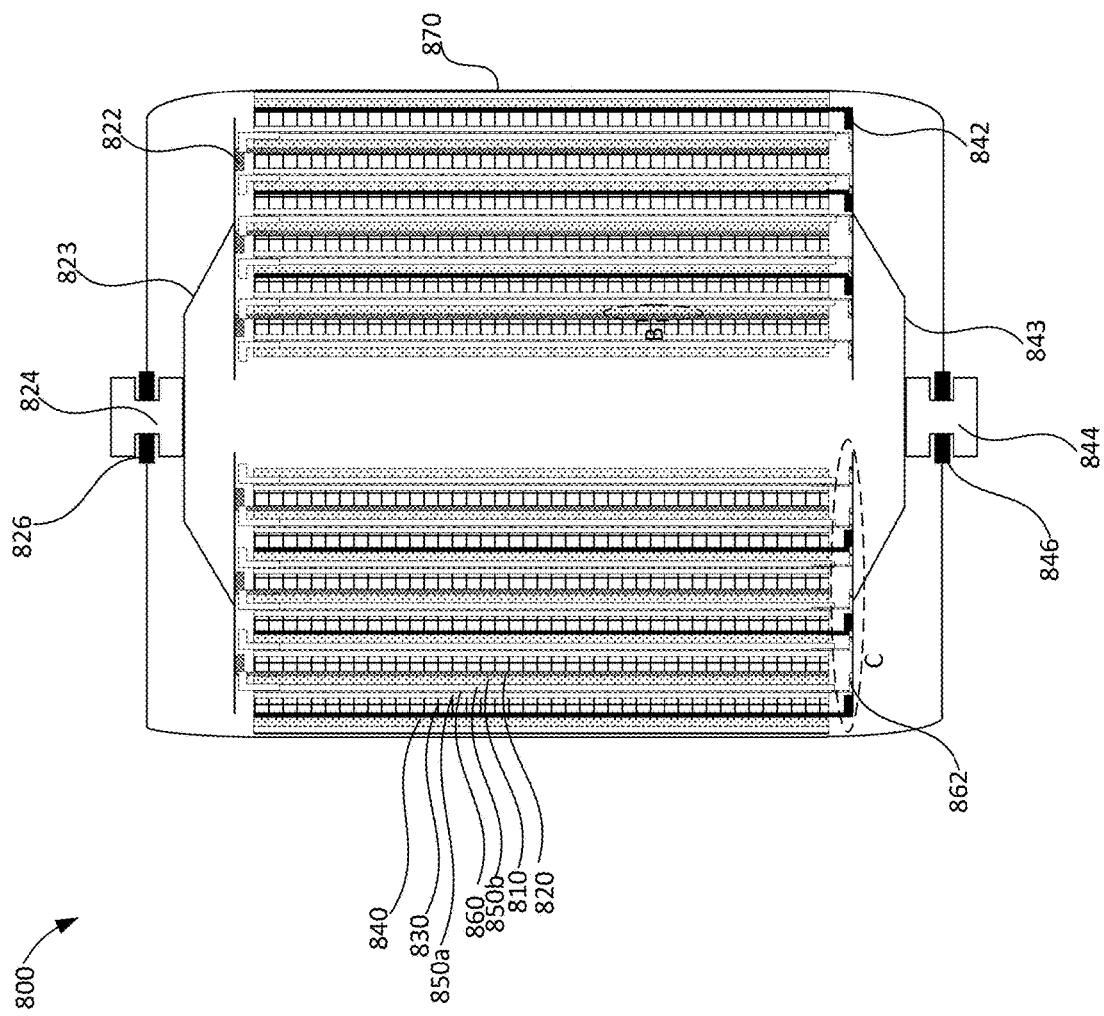
FIGS. 8A-8C are illustrations of an electrochemical cell with an interlayer, according to an embodiment.
Figure 8B:
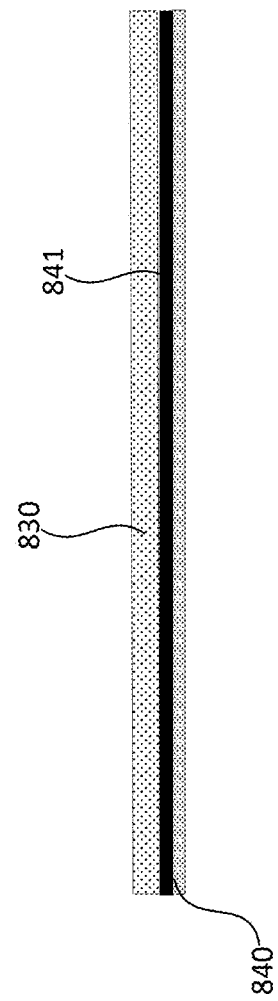
Figure 8C:
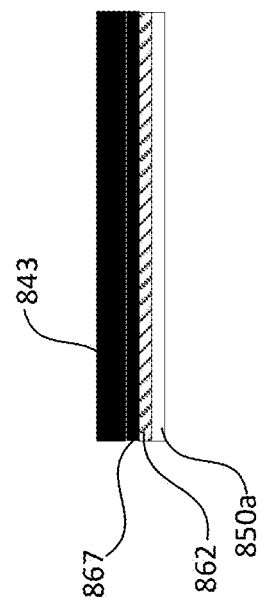

FIGS. 8A-8C are illustrations of an electrochemical cell 800 with interlayers 860, 865, according to an embodiment. As shown, the electrochemical cell 800 includes an anode material 810 disposed on an anode current collector 820 and a cathode material 830 disposed on a cathode current collector 840. A first separator 850a is disposed on the anode material 810 and a second separator 850b is disposed on the cathode material 830. The interlayer 860 is disposed between the first separator 850a and the second separator 850b. A third separator 855a and a fourth separator 855b are disposed on an outer surface of the cathode current collector 840 with a second interlayer 865 disposed therebetween. A casing 870 encases the aforementioned components of the electrochemical cell 800. As shown, a bent portion 822 of the anode current collector 820 contacts a conductive plate 823. A negative button 824 is coupled to the conductive plate 823. An insulator 826 is disposed around the negative button 824, electrically isolating the negative button 824 from the rest of the casing 870. A bent portion 842 of the cathode current collector 840 contacts a conductive plate 843. A positive button 844 is coupled to the conductive plate 843. As shown, an insulative coating 841 is disposed between the cathode material 830 and the cathode current collector 840. A bent portion 862 of the interlayer 860 contacts the conductive plate 843. A semiconductive material 867 is disposed between the interlayer 860 and the conductive plate 843. An insulator 846 is disposed around the positive button 844, electrically isolating the positive button 844 from the rest of the casing 870. FIG. 8B shows a close-up view of the dotted region B, as indicated in FIG. 8A. FIG. 8C shows a close-up view of the dotted region C, as indicated in FIG. 8A.

In some embodiments, the anode material 810, the anode current collector 820, the bent portion 822, the negative button 824, the insulator 826, the cathode material 830, the cathode current collector 840, the bent portion 842, the positive button 844, the insulator 846, the first separator 850a, the second separator 850b, the third separator 855a, the fourth separator 855b, the interlayer 860, the interlayer 865, and the casing 870 can be the same or substantially similar to the anode material 310, the anode current collector 320, the bent portion 322, the negative button 324, the insulator 326, the cathode material 330, the cathode current collector 340, the bent portion 342, the positive button 344, the insulator 346, the first separator 350a, the second separator 350b, the third separator 355a, the fourth separator 355b, the interlayer 360, the interlayer 365, and the casing 370, as described above with reference to FIGS. 3A-3B. Thus, certain aspects of the anode material 810, the anode current collector 820, the bent portion 822, the negative button 824, the insulator 826, the cathode material 830, the cathode current collector 840, the bent portion 842, the positive button 844, the insulator 846, the first separator 850a, the second separator 850b, the third separator 855a, the fourth separator 855b, the interlayer 860, the interlayer 865, and the casing 870 are not described in greater detail herein.

FIG. 8B shows the interaction between the cathode material 830 and the cathode current collector 840 with the insulative coating 841. FIG. 8C shows the interaction between the bent portion 862 of the interlayer 860 and the conductive plate 843. As shown, the semiconductive material 867 is disposed between the bent portion 862 and the conductive plate 843. The semiconductive material 867 can function similarly to the semiconductive coating 768, as described above, becoming conductive at higher temperatures and creating a short circuit between the anode material 810 and the interlayer 860. The insulative coating 841 on the cathode current collector 840 prevents short circuiting between the cathode material 830 and the interlayer 860. In the electrochemical cell 800, the cathode current collector 840 and the conductive plate 843 are in electrical contact via the semiconductive material 867, such that current can flow in only one direction. The insulative coating 841 is coupled to the cathode material 830 to prevent direct contact between the cathode material 830 and the conductive plate 843 as well as between the cathode material 830 and the anode material 810.

Figure 9:
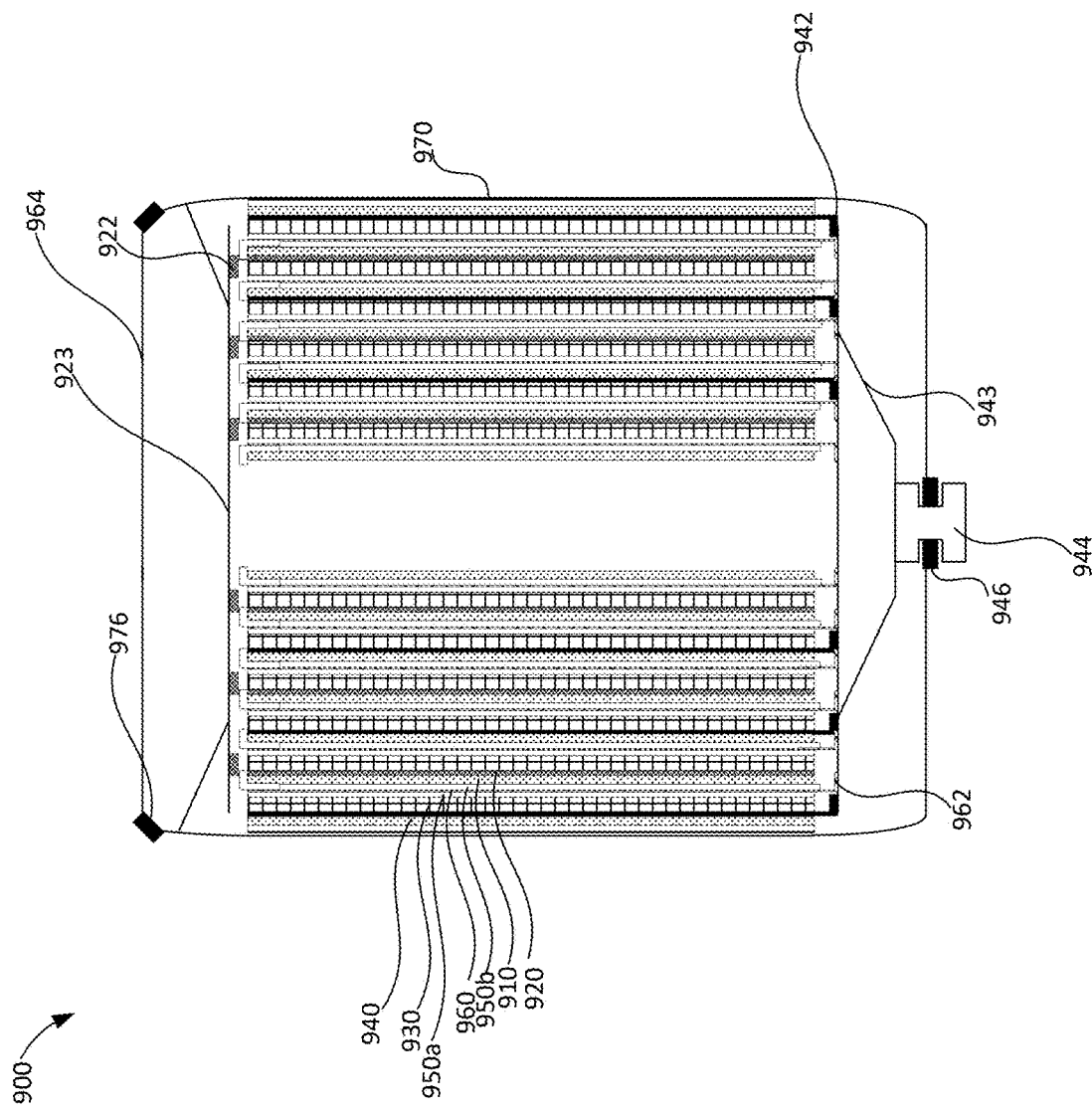
FIG. 9 is an illustration of an electrochemical cell with an interlayer, according to an embodiment.

FIG. 9 is an illustration of an electrochemical cell 900 with interlayers 960, 965, according to an embodiment. As shown, the electrochemical cell 900 includes an anode material 910 disposed on an anode current collector 920 and a cathode material 930 disposed on a cathode current collector 940. A first separator 950a is disposed on the anode material 910 and a second separator 950b is disposed on the cathode material 930. The interlayer 960 is disposed between the first separator 950a and the second separator 950b. A third separator 955a and a fourth separator 955b are disposed on an outer surface of the cathode current collector 940 with a second interlayer 965 disposed therebetween. A casing 970 encases the aforementioned components of the electrochemical cell 900. As shown, a bent portion 922 of the anode current collector 920 contacts a conductive plate 923. A bent portion 942 of the cathode current collector 940 contacts a conductive plate 943. A positive button 944 is coupled to the conductive plate 943. A neutral cap 964 is disposed opposite the positive button 944. The rest of the casing 970 acts as a negative "button." An insulator 976 keeps the neutral cap insulated from the rest of the casing 970. A folded portion 962 of the interlayer 960 contacts the conductive plate 943. The interlayer 960 is able to electrically couple to the cathode material 930 via a semiconductive coating (not shown) on the folded portion 962 of the interlayer 960 contacting the conductive plate 943.

In some embodiments, the anode material 910, the anode current collector 920, the bent portion 922, the negative button 924, the insulator 926, the cathode material 930, the cathode current collector 940, the bent portion 942, the negative button 944, the insulator 946, the first separator 950a, the second separator 950b, the third separator 955a, the fourth separator 955b, the interlayer 960, the interlayer 965, and the casing 970 can be the same or substantially similar to the anode material 810, the anode current collector 820, the bent portion 822, the cathode material 830, the cathode current collector 840, the bent portion 842, the positive button 844, the insulator 846, the first separator 850a, the second separator 850b, the third separator 855a, the fourth separator 855b, the interlayer 860, the interlayer 865, and the casing 870, as described above with reference to FIGS. 8A-8B. Thus, certain aspects the anode material 910, the anode current collector 920, the bent portion 922, the negative button 924, the insulator 926, the cathode material 930, the cathode current collector 940, the bent portion 942, the negative button 944, the insulator 946, the first separator 950a, the second separator 950b, the third separator 955a, the fourth separator 955b, the interlayer 960, the interlayer 965, and the casing 970 are not described in greater detail herein.

Figure 10A:
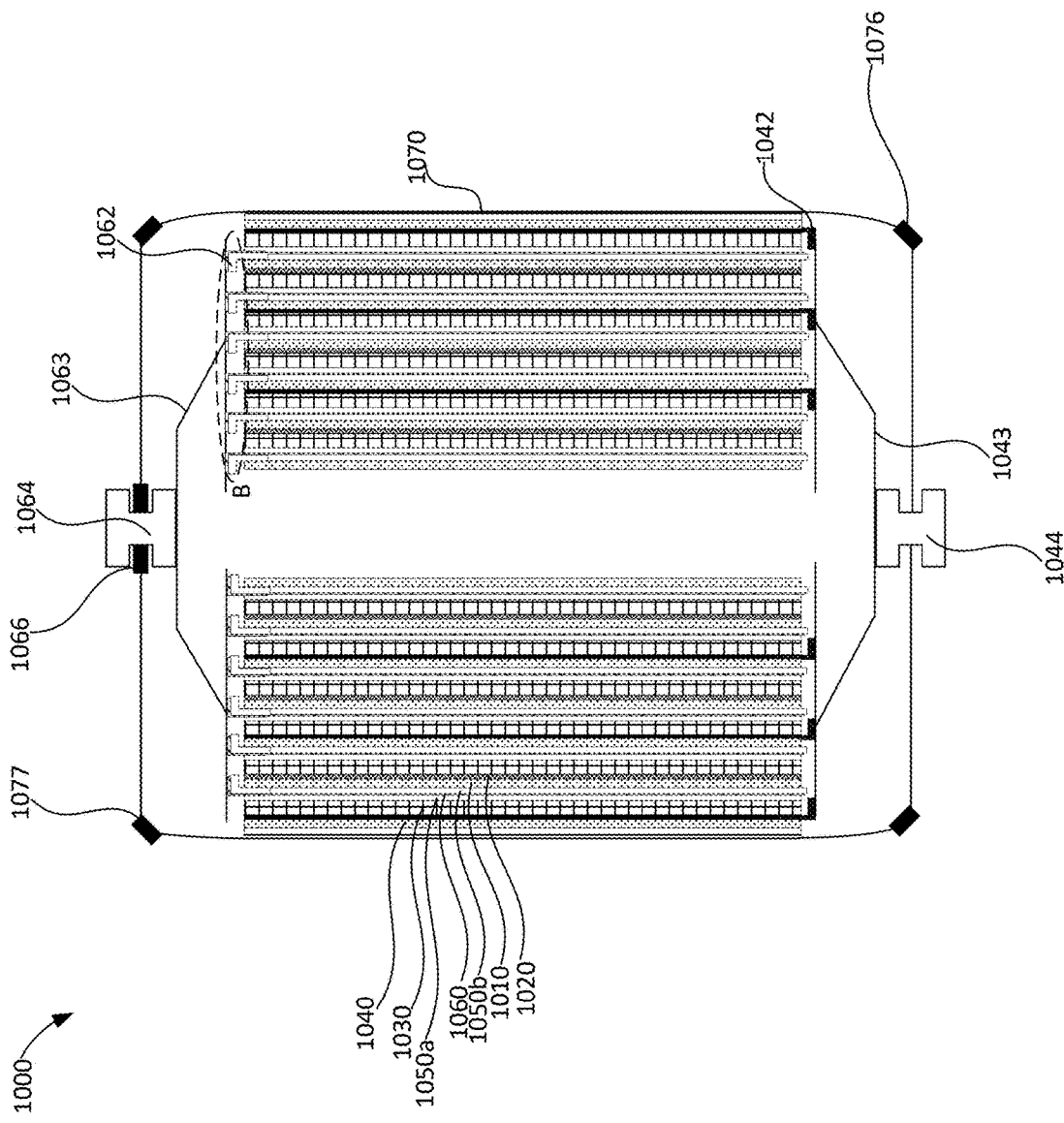
FIGS. 10A-10B are illustrations of an electrochemical cell with an interlayer, according to an embodiment.
Figure 10B:
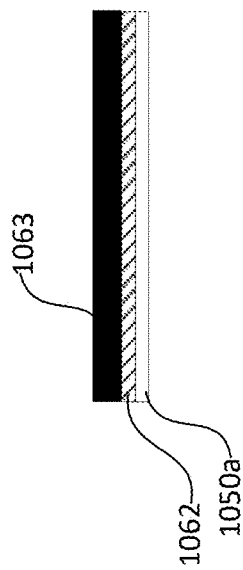

FIGS. 10A-10B are illustrations of an electrochemical cell 1000 with interlayers 1060, 1065, according to an embodiment. As shown, the electrochemical cell 1000 includes an anode material 1010 disposed on an anode current collector 1020 and a cathode material 1030 disposed on a cathode current collector 1040. A first separator 1050a is disposed on the anode material 1010 and a second separator 1050b is disposed on the cathode material 1030. The interlayer 1060 is disposed between the first separator 1050a and the second separator 1050b. A third separator 1055a and a fourth separator 1055b are disposed on an outer surface of the cathode current collector 1040 with a second interlayer 1065 disposed therebetween. A casing 1070 encases the aforementioned components of the electrochemical cell 1000. As shown, a bent portion 1062 of the interlayer 1060 contacts a conductive plate 1063. An interlayer button 1064 is coupled to the conductive plate 1063. A semiconductive material 1067 is disposed around the interlayer button 1064, allowing current to flow only in one direction. An insulator 1077 electrically isolates a region of the casing 1070 surrounding the interlayer button 1064 from the rest of the casing 1070. A bent portion 1042 of the cathode current collector 1040 contacts a conductive plate 1043. A positive button 1044 is coupled to the conductive plate 1043. An insulator 1076 is disposed around a region of the casing 1070 surrounding the positive button 1044, electrically isolating the positive button 1044 and a surrounding region of the casing 1070 from the rest of the casing 1070. The anode current collector 1020 is electrically coupled to the sides of the casing 1070, creating a negative "button" in the casing. FIG. 10B shows a close-up view of the dotted region B, as indicated in FIG. 10A. In some embodiments, the semiconductive material 1067 can be replaced by an insulator, in which case the insulator 1077 can be removed. In some embodiments, if the semiconductive material 1067 is replaced by an insulator, a semiconductive material can be placed between the bent portion 1062 of the interlayer 1060 and the conductive place 1063.

In some embodiments, the anode material 1010, the anode current collector 1020 the cathode material 1030, the cathode current collector 1040, the bent portion 1042, the positive button 1044, the insulator 1046, the first separator 1050a, the second separator 1050b, the third separator 1055a, the fourth separator 1055b, the interlayer 1060, the interlayer 1065, and the casing 1070 can be the same or substantially similar to the anode material 310, the anode current collector 320, the cathode material 330, the cathode current collector 340, the bent portion 342, the positive button 344, the insulator 346, the first separator 350a, the second separator 350b, the third separator 355a, the fourth separator 355b, the interlayer 360, the interlayer 365, and the casing 370, as described above with reference to FIGS. 3A-3B. In some embodiments, the semiconductive material 1067 can be the same or substantially similar to the semiconductive material 867 described above with reference to FIGS. 8A-8B. Thus, certain aspects of the anode material 1010, the anode current collector 1020 the cathode material 1030, the cathode current collector 1040, the bent portion 1042, the positive button 1044, the insulator 1046, the first separator 1050a, the second separator 1050b, the third separator 1055a, the fourth separator 1055b, the interlayer 1060, the interlayer 1065, the semiconductive material 1067, and the casing 1070 are not described in greater detail herein.

FIG. 11 is an illustration of an electrochemical cell 1100 with interlayers 1160, 1165, according to an embodiment. As shown, the electrochemical cell 1100 includes an anode material 1110 disposed on an anode current collector 1120 and a cathode material 1130 disposed on a cathode current collector 1140. A first separator 1150a is disposed on the anode material 1110 and a second separator 1150b is disposed on the cathode material 1130. The interlayer 1160 is disposed between the first separator 1150a and the second separator 1150b. A third separator 1155a and a fourth separator 1155b are disposed on an outer surface of the cathode current collector 1140 with a second interlayer 1165 disposed therebetween. A casing 1170 encases the aforementioned components of the electrochemical cell 1100. As shown, a bent portion 1162 of the interlayer 1162 contacts a conductive plate 1163. An interlayer button 1164 is coupled to the conductive plate 1163. An insulator 1177 electrically isolates a region of the casing 1170 surrounding the interlayer button 1164 from the rest of the casing 1170. A bent portion 1042 of the cathode current collector 1040 contacts a conductive plate 1043. A positive button 1044 is coupled to the conductive plate 1043. An insulator 1146 is disposed around the positive button 1144, electrically isolating the positive button 1144 from the rest of the casing 1170. The anode current collector 1120 is electrically coupled to the sides of the casing 1170, creating a negative "button" in the casing. In some embodiments, the insulator 1146 can be replaced by a semiconductor to allow the flow of current in only one direction. If the insulator 1146 is replaced by a semiconductor, an insulator (not shown) can be disposed around a region of the casing 1170 surrounding the positive button 1144, electrically isolating the region of the casing 1170 surrounding the positive button 1144 from the rest of the casing 1170. In such embodiments, a semiconductive material (not shown) can be disposed between the bent portion 1162 of the interlayer 1160 and the conductive plate 1163.

In some embodiments, the anode material 1110, the anode current collector 1120 the cathode material 1130, the cathode current collector 1140, the bent portion 1142, the positive button 1144, the insulator 1146, the first separator 1150*a*, the second separator 1150*b*, the third separator 1155*a*, the fourth separator 1155*b*, the interlayer 1160, the conductive plate 1163, the interlayer button 1164, the interlayer 1065, the casing 1070, and the insulator 1177 can be the same or substantially similar to the anode material 1010, the anode current collector 1020 the cathode material 1030, the cathode current collector 1040, the bent portion 1042, the positive button 1044, the insulator 1046, the first separator 1050*a*, the second separator 1050*b*, the third separator 1055*a*, the fourth separator 1055*b*, the interlayer 1060, the conductive plate 1063, the interlayer button 1064, the interlayer 1065, the casing 1070, and the insulator 1077, as described above with reference to FIGS. 10A-10B. Thus, certain aspects of the anode material 1110, the anode current collector 1120 the cathode material 1130, the cathode current collector 1140, the bent portion 1142, the positive button 1144, the insulator 1146, the first separator 1150*a*, the second separator 1150*b*, the third separator 1155*a*, the fourth separator 1155*b*, the interlayer 1160, the conductive plate 1163, the interlayer button 1164, the interlayer 1065, the casing 1070, and the insulator 1177 are not described in greater detail herein.

Figure 12:
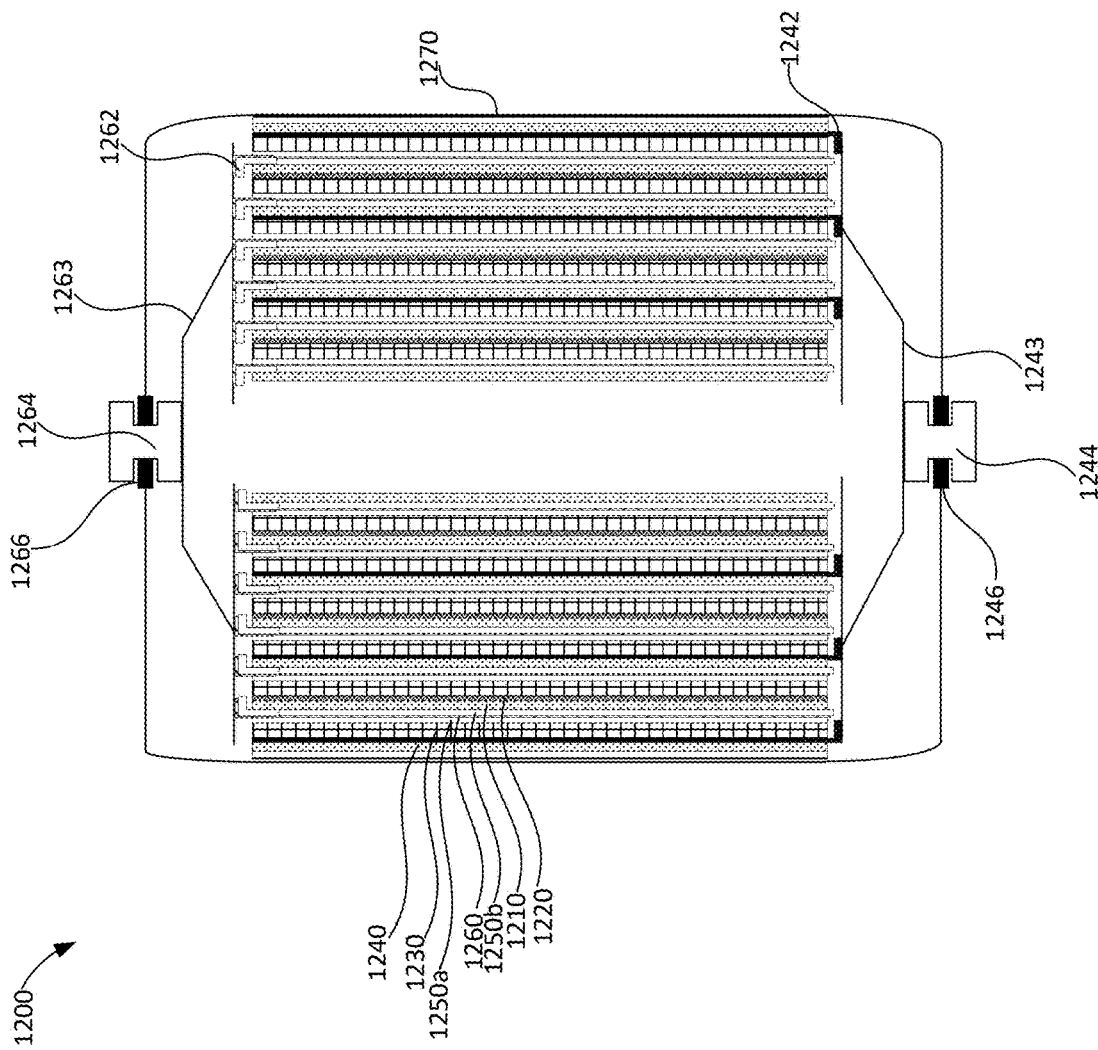
FIG. 12 is an illustration of an electrochemical cell with an interlayer, according to an embodiment.

FIG. 12 is an illustration of an electrochemical cell 1200 with interlayers 1260, 1265, according to an embodiment. As shown, the electrochemical cell 1200 includes an anode material 1210 disposed on an anode current collector 1220 and a cathode material 1230 disposed on a cathode current collector 1240. A first separator 1250*a* is disposed on the anode material 1210 and a second separator 1250*b* is disposed on the cathode material 1230. The interlayer 1260 is disposed between the first separator 1250*a* and the second separator 1250*b*. A third separator 1255*a* and a fourth separator 1255*b* are disposed on an outer surface of the cathode current collector 1240 with a second interlayer 1265 disposed therebetween. A casing 1270 encases the aforementioned components of the electrochemical cell 1200. A bent portion 1262 of the interlayer 1260 contacts the conductive plate 1263. An interlayer button 1264 is coupled to the conductive plate 1263. An insulator 1266 is disposed around the interlayer button 1264, electrically isolating the interlayer button 1264 from the rest of the casing 1270. A bent portion 1242 of the cathode current collector 1240 contacts a conductive plate 1243. A positive button 1244 is coupled to the conductive plate 1243. As shown, the casing 1270 acts as a negative "button." An insulator 1246 is disposed around the positive button 1244, electrically isolating the positive button 1244 from the rest of the casing 1270.

In some embodiments, the anode material 1210, the anode current collector 1220 the cathode material 1230, the cathode current collector 1240, the bent portion 1242, the positive button 1244, the insulator 1246, the first separator 1250*a*, the second separator 1250*b*, the third separator 1255*a*, the fourth separator 1255*b*, the interlayer 1260, the conductive plate 1263, the interlayer button 1264, the interlayer 1265, and the casing 1270, can be the same or substantially similar to the anode material 1010, the anode current collector 1020 the cathode material 1030, the cathode current collector 1040, the bent portion 1042, the positive button 1044, the insulator 1046, the first separator 1050*a*, the second separator 1050*b*, the third separator 1055*a*, the fourth separator 1055*b*, the interlayer 1060, the conductive plate 1063, the interlayer button 1064, the interlayer 1065, and the casing 1070, as described above with reference to FIGS. 10A-10B. Thus, certain aspects of the anode material 1210, the anode current collector 1220 the cathode material 1230, the cathode current collector 1240, the bent portion 1242, the positive button 1244, the insulator 1246, the first separator 1250*a*, the second separator 1250*b*, the third separator 1255*a*, the fourth separator 1255*b*, the interlayer 1260, the conductive plate 1263, the interlayer button 1264, the interlayer 1265, and the casing 1270 are not described in greater detail herein.

Figure 13A:
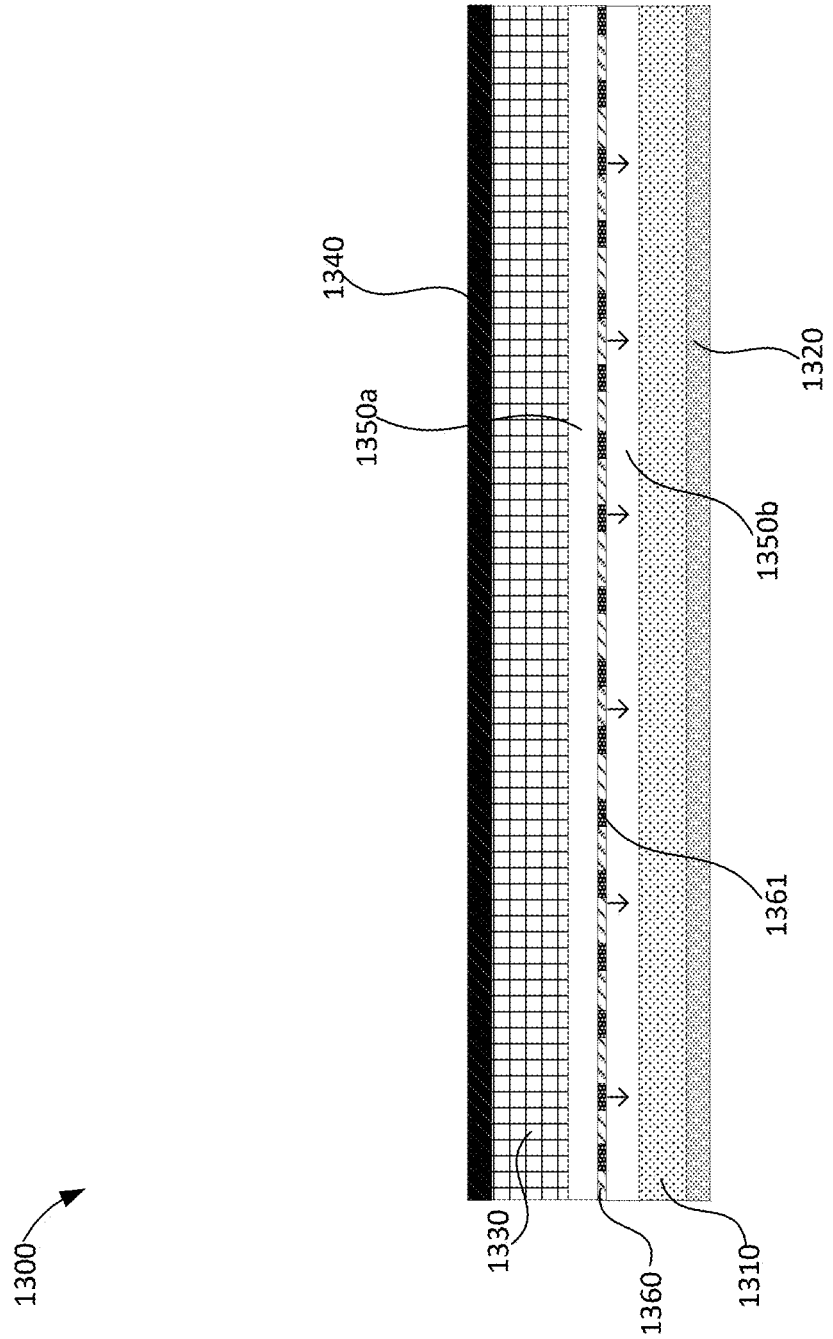
FIGS. 13A-13F are illustrations of an electrochemical cell with an interlayer having a lithium ion migration mechanism, according to an embodiment.
Figure 13B:
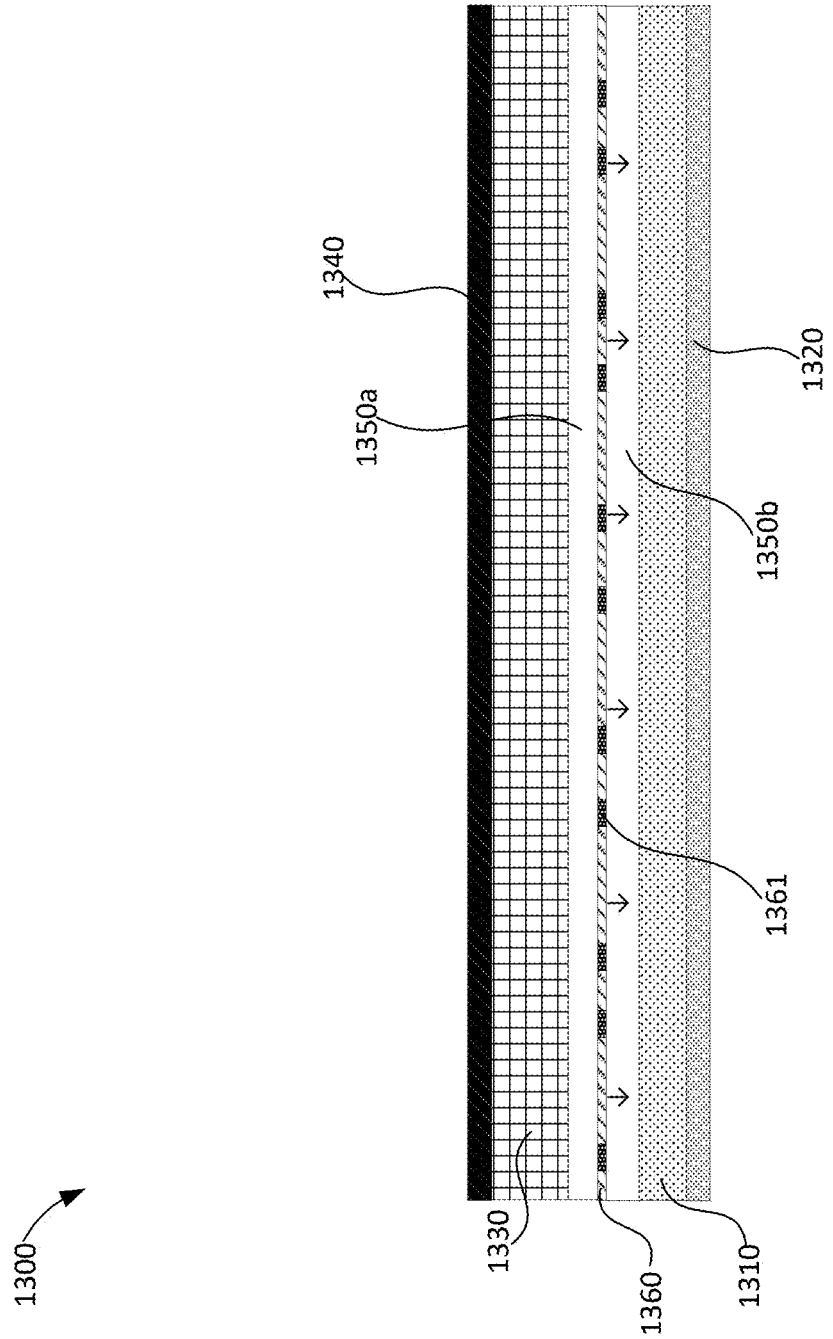
Figure 13C:
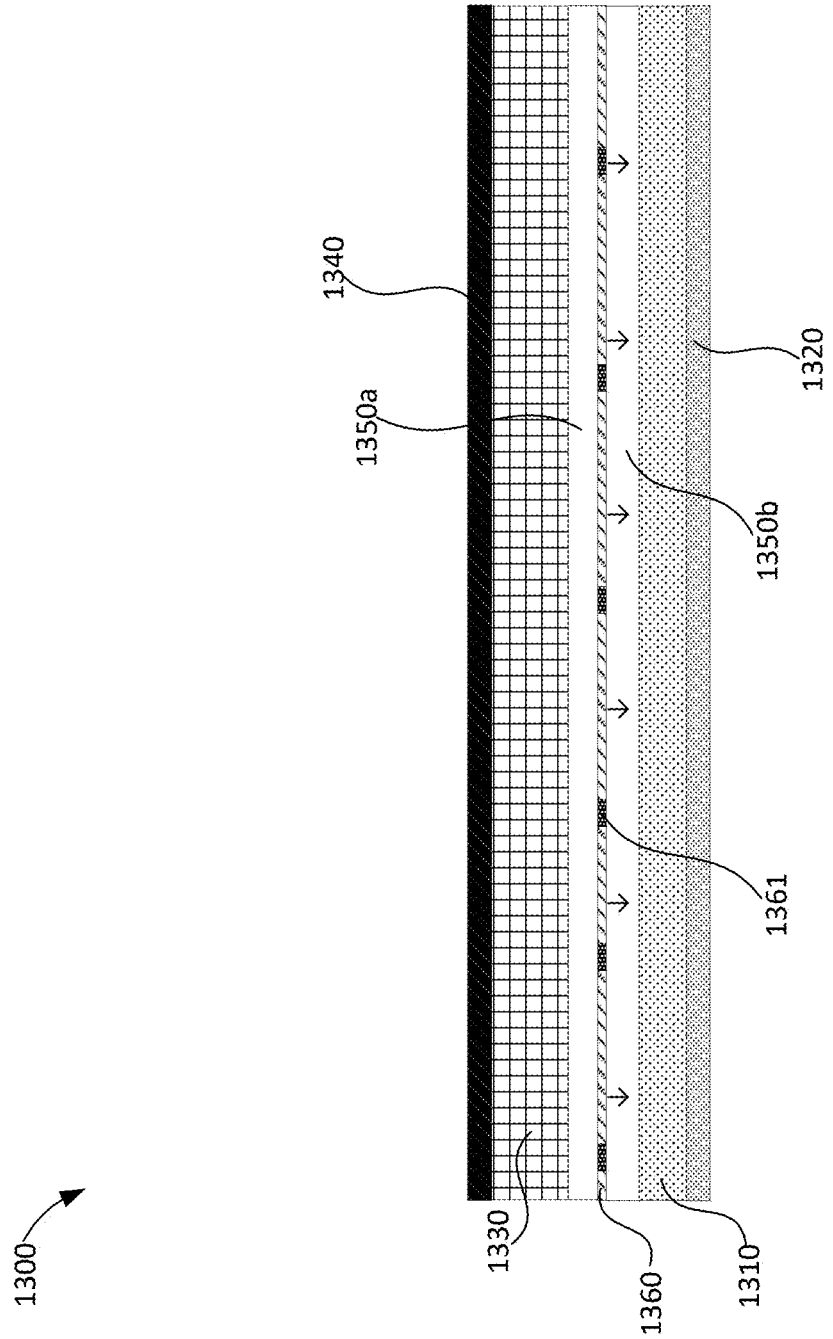
Figure 13D:
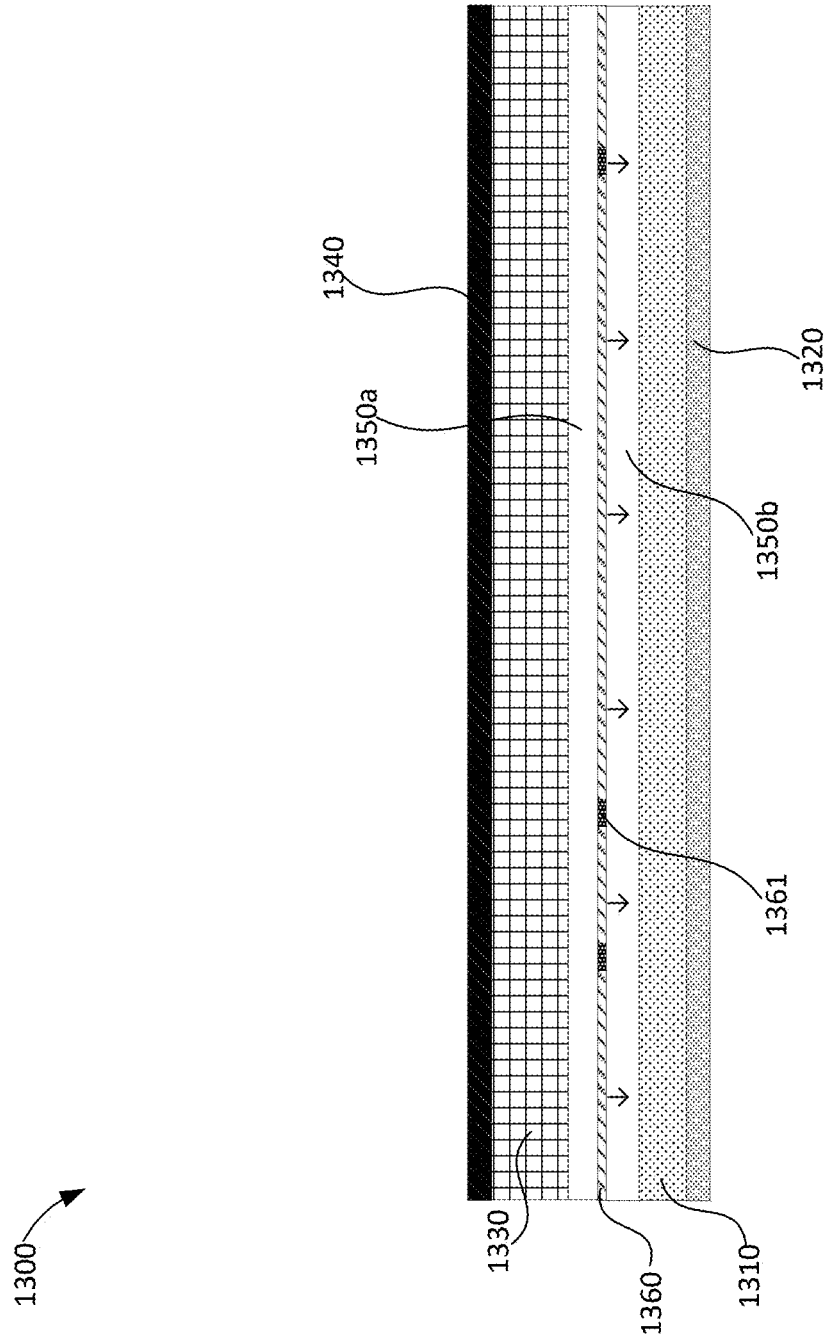
Figure 13E:
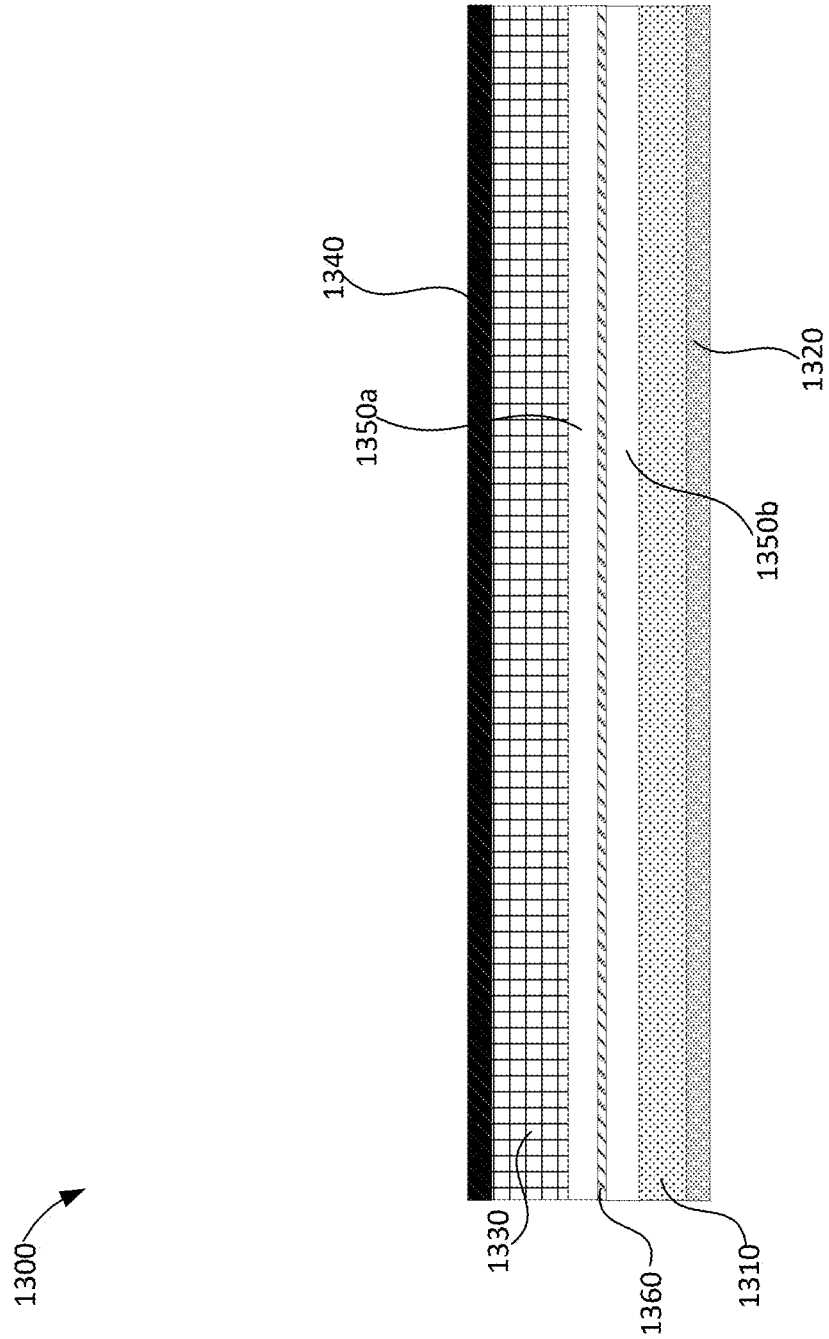
Figure 13F:
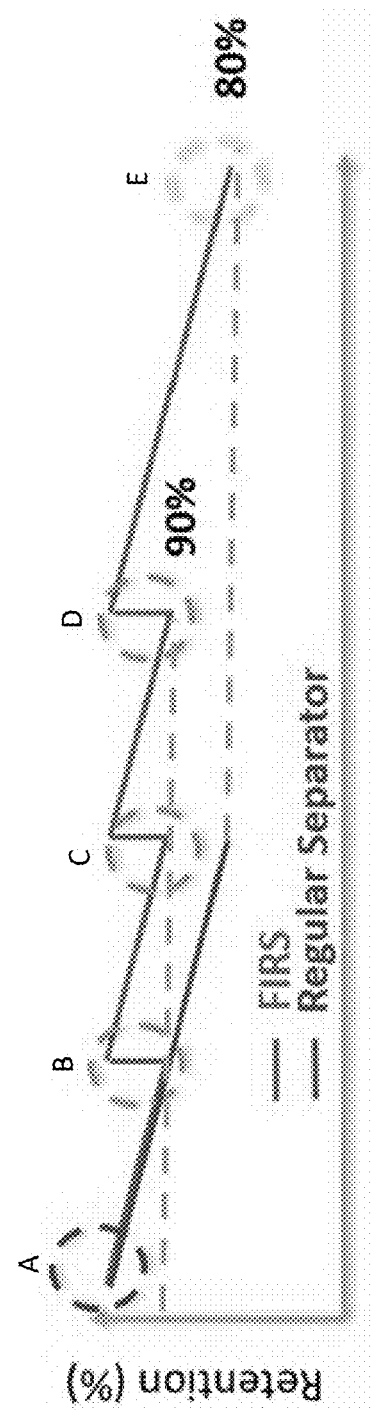

FIGS. 13A-13F are illustrations of an electrochemical cell 1300 with an interlayer 1360 having a lithium ion releasing mechanism, according to an embodiment. The electrochemical cell 1300 includes a FIRS system. As shown, the electrochemical cell 1300 includes an anode material 1310 disposed on an anode current collector 1320 and a cathode material 1330 disposed on a cathode current collector 1340. A first separator 1350*a* is disposed on the anode material 1310 and a second separator 1350*b* is disposed on the cathode material 1330. The interlayer 1360 is disposed between the first separator 1350*a* and the second separator 1350*b*. The interlayer 1360 includes a replenishing ion source 1361 (also referred to herein as a lithium source 1361, however, in non lithium-ion batteries, the replenishing ion source 1361 can include non-lithium materials). FIG. 13A shows the electrochemical cell 1300 with a high concentration of lithium ions in the lithium source 1361. FIGS. 13B, 13C, and 13D show partial migration of the lithium source 1361 into the anode material 1310. Migration is restricted to the lithium ion released from the lithium source 1361 (a lithium containing compound). As an example, the mechanism of $Li_2C_4O_4$ as the lithium source is that the $Li_2C_4O_4$ decomposes into a lithium ion (which migrates to the anode material 1310) and gas (which vents to outside a container for the electrochemical cell 1300. In FIG. 13E, the lithium source 1361 has been fully consumed and released all of the lithium ions to the anode material 1310. FIG. 13F shows capacity retention of the battery at stages A (corresponding to FIG. 13A), B (corresponding to FIG. 13B), C (corresponding to FIG. 13C), D (corresponding to FIGS. 13D), and E (corresponding to FIG. 13E), as compared to an electrochemical cell with a regular separator.

In some embodiments, the anode material 1310, the anode current collector 1320, the cathode material 1330, the cathode current collector 1340, the first separator 1350*a*, the second separator 1350b, and the interlayer 1360 can be the same or substantially similar to the anode material 110, the anode current collector 120, the cathode material 130, the cathode current collector 140, the first separator 150a, the second separator 150b, and the interlayer 160, as described above with reference to FIG. 1. Thus, certain aspects of the anode material 1310, the anode current collector 1320, the cathode material 1330, the cathode current collector 1340, the first separator 1350a, the second separator 1350b, and the interlayer 1360 are not described in greater detail herein.

The lithium source 1361 creates an on-demand lithium supply. In use, lithium ions released from the lithium source 1361 migrates from the interlayer 1360 to the anode material 1310 as the anode material 1310 loses lithium. Further, the inclusion of the lithium ions can allow the user/producer to avoid lithium metal handling during production of the electrochemical cell 1300. The lithium source 1361 can also prevent solid residual formation (e.g., CO+2Li$^+$). Several lithium sources do not result in solid residual formation, a desirable property for practical use. The lithium source 1361 can be implemented in systems with semi-solid electrodes as well as conventional solid electrodes. In other words, the anode material 1310 and/or the cathode material 1330 can include a semi-solid electrode, a conventional solid electrode, or any combination thereof.

Desired properties of the lithium source 1361 include high capacity, stability in air, insolubility in electrolyte, low cost, low toxicity, low activation voltage (i.e., less than about 4.5 V), and no reaction byproducts. In some embodiments, the lithium source 1361 can include $Li_2C_4O_4$ (425 mAh/g capacity, 3.9-4.3 V activation voltage), $Li_2C_2O_4$ (525 mAh/g capacity, 4.3-4.7 V activation voltage), $Li_2O$ (1793 mAh/g capacity, 4.4-4.7 V activation voltage), $Li_2NiO_2$ (513 mAh/g capacity, 3.5-4.7 V activation voltage), or any combination thereof. $Li_2C_4O_4$, for example, exhibits many desired properties of the lithium source 1361. Specifically, $Li_2C_4O_4$ is stable for at least 180 days in air (Energy Environ. Sci., 2024, 17, 1163-1174), has a high capacity of about 3845 mAh/g, excluding gas, is low cost, produces no solid residual materials after reaction (Li$^+$+CO/CO$_2$), has scalable synthesis (via squaric acid and $Li_2CO_3$), has low activation voltage (3.9-4.3 V), and is insoluble in organic solvent. In production, the lithium source 1361 is embedded into the materials that make up the interlayer 1360 and subsequently coated onto the separator 1350a and/or the separator 1350b along with the interlayer 1360 materials.

In some embodiments, lithium ions released from the lithium source 1361 can migrate toward the anode current collector 1320 at a voltage (i.e., between the interlayer 1360 and the anode material 1310) of at least about 3 V, at least about 3.1 V, at least about 3.2 V, at least about 3.3 V, at least about 3.4 V, at least about 3.5 V, at least about 3.6 V, at least about 3.7 V, at least about 3.8 V, at least about 3.9 V, at least about 4 V, at least about 4.1 V, at least about 4.2 V, at least about 4.3 V, at least about 4.4 V, at least about 4.5 V, at least about 4.6 V, at least about 4.7 V, at least about 4.8 V, or at least about 4.9 V. In some embodiments, lithium ions released from the lithium source 1361 can migrate toward the anode current collector 1320 at a voltage of no more than about 5 V, no more than about 4.9 V, no more than about 4.8 V, no more than about 4.7 V, no more than about 4.6 V, no more than about 4.5 V, no more than about 4.4 V, no more than about 4.3 V, no more than about 4.2 V, no more than about 4.1 V, no more than about 4 V, no more than about 3.9 V, no more than about 3.8 V, no more than about 3.7 V, no more than about 3.6 V, no more than about 3.5 V, no more than about 3.4 V, no more than about 3.3 V, no more than about 3.2 V, or no more than about 3.1 V. Combinations of the above-referenced voltages are also possible (e.g., at least about 3 V and no more than about 5 V or at least about 3.5 V and no more than about 4.5 V), inclusive of all values and ranges therebetween. In some embodiments, lithium ions released from the lithium source 1361 can migrate toward the anode current collector 1320 at a voltage of about 3 V, about 3.1 V, about 3.2 V, about 3.3 V, about 3.4 V, about 3.5 V, about 3.6 V, about 3.7 V, about 3.8 V, about 3.9 V, about 4 V, about 4.1 V, about 4.2 V, about 4.3 V, about 4.4 V, about 4.5 V, about 4.6 V, about 4.7 V, about 4.8 V, about 4.9 V, or about 5 V.

In some embodiments, the lithium source 1361 can have a concentration in the interlayer 1360 of at least about 1 mg/L, at least about 2 mg/L, at least about 3 mg/L, at least about 4 mg/L, at least about 5 mg/L, at least about 6 mg/L, at least about 7 mg/L, at least about 8 mg/L, at least about 9 mg/L, at least about 10 mg/L, at least about 20 mg/L, at least about 30 mg/L, at least about 40 mg/L, at least about 50 mg/L, at least about 60 mg/L, at least about 70 mg/L, at least about 80 mg/L, at least about 90 mg/L, at least about 100 mg/L, at least about 200 mg/L, at least about 300 mg/L, at least about 400 mg/L, at least about 500 mg/L, at least about 600 mg/L, at least about 700 mg/L, at least about 800 mg/L, at least about 900 mg/L, at least about 1 g/L, at least about 2 g/L, at least about 3 g/L, at least about 4 g/L, at least about 5 g/L, at least about 6 g/L, at least about 7 g/L, at least about 8 g/L, at least about 9 g/L, at least about 10 g/L, at least about 20 g/L, at least about 30 g/L, at least about 40 g/L, at least about 50 g/L, at least about 60 g/L, at least about 70 g/L, at least about 80 g/L, at least about 90 g/L, at least about 100 g/L, at least about 200 g/L, at least about 300 g/L, or at least about 400 g/L. In some embodiments, the lithium source 1361 can have a concentration in the interlayer 1360 of no more than about 500 g/L, no more than about 400 g/L, no more than about 300 g/L, no more than about 200 g/L, no more than about 100 g/L, no more than about 90 g/L, no more than about 80 g/L, no more than about 70 g/L, no more than about 60 g/L, no more than about 50 g/L, no more than about 40 g/L, no more than about 30 g/L, no more than about 20 g/L, no more than about 10 g/L, no more than about 9 g/L, no more than about 8 g/L, no more than about 7 g/L, no more than about 6 g/L, no more than about 5 g/L, no more than about 4 g/L, no more than about 3 g/L, no more than about 2 g/L, no more than about 1 g/L, no more than about 900 mg/L, no more than about 800 mg/L, no more than about 700 mg/L, no more than about 600 mg/L, no more than about 500 mg/L, no more than about 400 mg/L, no more than about 300 mg/L, no more than about 200 mg/L, no more than about 100 mg/L, no more than about 90 mg/L, no more than about 80 mg/L, no more than about 70 mg/L, no more than about 60 mg/L, no more than about 50 mg/L, no more than about 40 mg/L, no more than about 30 mg/L, no more than about 20 mg/L, no more than about 10 mg/L, no more than about 9 mg/L, no more than about 8 mg/L, no more than about 7 mg/L, no more than about 6 mg/L, no more than about 5 mg/L, no more than about 4 mg/L, no more than about 3 mg/L, or no more than about 2 mg/L. Combinations of the above-referenced concentrations are also possible (e.g., at least about 1 mg/L and no more than about 500 g/L or at least about 40 mg/L and no more than about 40 g/L), inclusive of all values and ranges therebetween. In some embodiments, the lithium source 1361 can have a concentration in the interlayer 1360 of about 1 mg/L, about 2 mg/L, about 3 mg/L, about 4 mg/L, about 5 mg/L, about 6 mg/L, about 7 mg/L, about 8 mg/L, about 9 mg/L, about 10 mg/L, about 20 mg/L, about 30 mg/L, about 40 mg/L, about 50 mg/L, about 60 mg/L, about 70 mg/L, about 80 mg/L, about 90 mg/L, about 100 mg/L, about 200 mg/L, about 300 mg/L, about 400 mg/L, about 500 mg/L, about 600 mg/L, about 700 mg/L, about 800 mg/L, about 900 mg/L, about 1 g/L, about 2 g/L, about 3 g/L, about 4 g/L, about 5 g/L, about 6 g/L, about 7 g/L, about 8 g/L, about 9 g/L, about 10 g/L, about 20 g/L, about 30 g/L, about 40 g/L, about 50 g/L, about 60 g/L, about 70 g/L, about 80 g/L, about 90 g/L, about 100 g/L, about 200 g/L, about 300 g/L, about 400 g/L, or about 500 g/L.

In some embodiments, the lithium source 1361 can have a concentration of lithium ions in the interlayer 1360 that compensates for about 50%, about 60%, about 70%, about 80% about 90%, or about 100% of the initial capacity loss of lithium in the electrochemical cell 1300 (i.e., the loss during initial cycling), inclusive of all values and ranges therebetween. In some embodiments, the lithium source 1361 can have a concentration of lithium ions in the interlayer 1360 in excess of what is lost during cycling (e.g., about 5% excess, about 10% excess, about 15% excess, about 20% excess, about 25% excess, about 30% excess, about 35% excess, about 40% excess, about 45% excess, or about 50% excess, inclusive of all values and ranges therebetween). By providing 20% excess, the cycle life of the electrochemical cell 1300 and the duration of its ability to maintain full capacity can be approximately doubled.

Several advantages can be realized in embodiments with just enough lithium source 1361 to restore depleted lithium (i.e., about 100% of the initial capacity loss without excess lithium source 1361). For example, there is negligible increase in the thickness of the interlayer 1360 after the formation of the electrochemical cell 1300. The lithium source 1361 can also be customizable in its amount to compensate lost lithium in order to approach 0% initial capacity loss (ICL). The no-excess embodiment is also compatible with high ICL anodes (silicon, hard carbon, tin, etc.) and cathodes (sulfur, P2-layered oxide, end-of-life (EOL) cathodes, etc.).

Several advantages can be realized in embodiments with excess lithium ions in the lithium source 1361. Such embodiments improve cyclability and control capacity fade. Excess lithium ion embodiments are also tailorable for different chemistries and applications. Such embodiments also create less than about 15 μm thickness increase in the electrochemical cell 1300 when doubling the cycle life at beginning-of-life (BOL). For example, this would correspond to 3 mAh/cm² in a LFP electrode.

In some embodiments, the lithium source 1361 can have a capacity of at least about 200 mAh/g, at least about 300 mAh/g, at least about 400 mAh/g, at least about 500 mAh/g, at least about 600 mAh/g, at least about 700 mAh/g, at least about 800 mAh/g, at least about 900 mAh/g, at least about 1,000 mAh/g, at least about 1,100 mAh/g, at least about 1,200 mAh/g, at least about 1,300 mAh/g, at least about 1,400 mAh/g, at least about 1,500 mAh/g, at least about 1,600 mAh/g, at least about 1,700 mAh/g, at least about 1,800 mAh/g, at least about 1,900 mAh/g, at least about 2,000 mAh/g, at least about 2,100 mAh/g, at least about 2,200 mAh/g, at least about 2,300 mAh/g, or at least about 2,400 mAh/g. In some embodiments, the lithium source 1361 can have a capacity of no more than about 2,500 mAh/g, no more than about 2,400 mAh/g, no more than about 2,300 mAh/g, no more than about 2,200 mAh/g, no more than about 2,100 mAh/g, no more than about 2,000 mAh/g, no more than about 1,900 mAh/g, no more than about 1,800 mAh/g, no more than about 1,700 mAh/g, no more than about 1,600 mAh/g, no more than about 1,500 mAh/g, no more than about 1,400 mAh/g, no more than about 1,300 mAh/g, no more than about 1,200 mAh/g, no more than about 1,100 mAh/g, no more than about 1,000 mAh/g, no more than about 900 mAh/g, no more than about 800 mAh/g, no more than about 700 mAh/g, no more than about 600 mAh/g, no more than about 500 mAh/g, no more than about 400 mAh/g, no more than about 300 mAh/g, or no more than about 200 mAh/g. Combinations of the above-referenced capacities are also possible (e.g., at least about 100 mAh/g and no more than about 2,000 mAh/g or at least about 500 mAh/g and no more than about 1,500 mAh/g), inclusive of all values and ranges therebetween. In some embodiments, the lithium source 1361 can have a capacity of about 200 mAh/g, about 300 mAh/g, about 400 mAh/g, about 500 mAh/g, about 600 mAh/g, about 700 mAh/g, about 800 mAh/g, about 900 mAh/g, about 1,000 mAh/g, about 1,100 mAh/g, about 1,200 mAh/g, about 1,300 mAh/g, about 1,400 mAh/g, about 1,500 mAh/g, about 1,600 mAh/g, about 1,700 mAh/g, about 1,800 mAh/g, about 1,900 mAh/g, about 2,000 mAh/g, about 2,100 mAh/g, about 2,200 mAh/g, about 2,300 mAh/g, about 2,400 mAh/g, or about 2,500 mAh/g.

FIG. 13F is a graphical representation of retention replenishment of the electrochemical cell 1300 through successive replenishments. Point A on the graph represents the electrochemical cell 1300 as depicted in FIG. 13A, point B represents the electrochemical cell 1300 as depicted in FIG. 13B, point C represents the electrochemical cell 1300 as depicted in FIG. 13C, point D represents the electrochemical cell 1300 as depicted in FIG. 13D, and point E represents the electrochemical cell 1300 as depicted in FIG. 13E. As shown, the lithium source 1361 becomes depleted as it replenishes the lithium in the anode material 1320. As shown at point E, once the lithium source 1361 is completely depleted, the capacity of the electrochemical cell 1300 begins to decrease more substantially. Compared to an electrochemical cell with a conventional separator, the electrochemical cell 1300 maintains its initial capacity significantly longer.

The replenishing ion source 1361 can restore damaged SEI/CEI by releasing fresh electrolyte additives. The replenishing ion source 1361 can neutralize hydrofluoric acid (HF) by releasing HF-reactive electrolyte additives. Low solubility electrolyte additives (e.g., $LiNO_3$, $LiPO_2F_2$, LiBOB, etc.) can be embedded within $Li_2C_4O_4$ via ball milling or encapsulated within the $Li_2C_4O_4$/carbon/binder matrix.

In some embodiments, the electrochemical cell 1300 is a sodium-ion battery. In some embodiments, $Na_2CO_3$ can act as the ion replenishment source 1361 in Na-ion batteries. $Na_2CO_3$ is electrochemically active to release sodium ions between 3.5 V and 4.2 V. Additionally, only $CO_2$ and $O_2$ are generated as byproducts of $Na_2CO_3$ reaction. Further advantages of $Na_2CO_3$ include an established raw material supply chain, higher density (2.11 g/cm³) than $Li_2C_4O_4$ (1.9 g/cm³), air stability, insolubility in electrolyte, and compatibility with the fabrication process of FIRS.

Figure 14A:
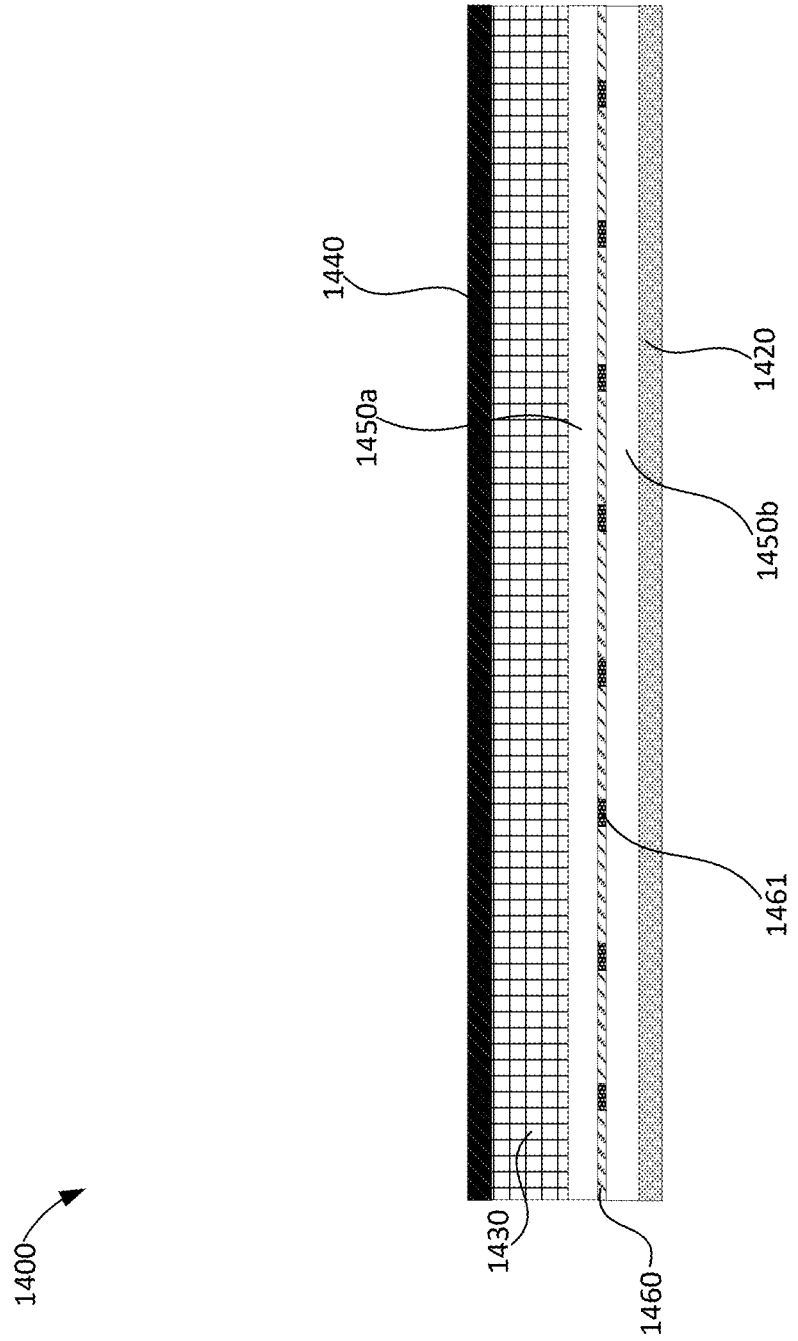
FIGS. 14A-14B are illustrations of an electrochemical cell with an interlayer having a lithium ion migration mechanism, according to an embodiment.
Figure 14B:
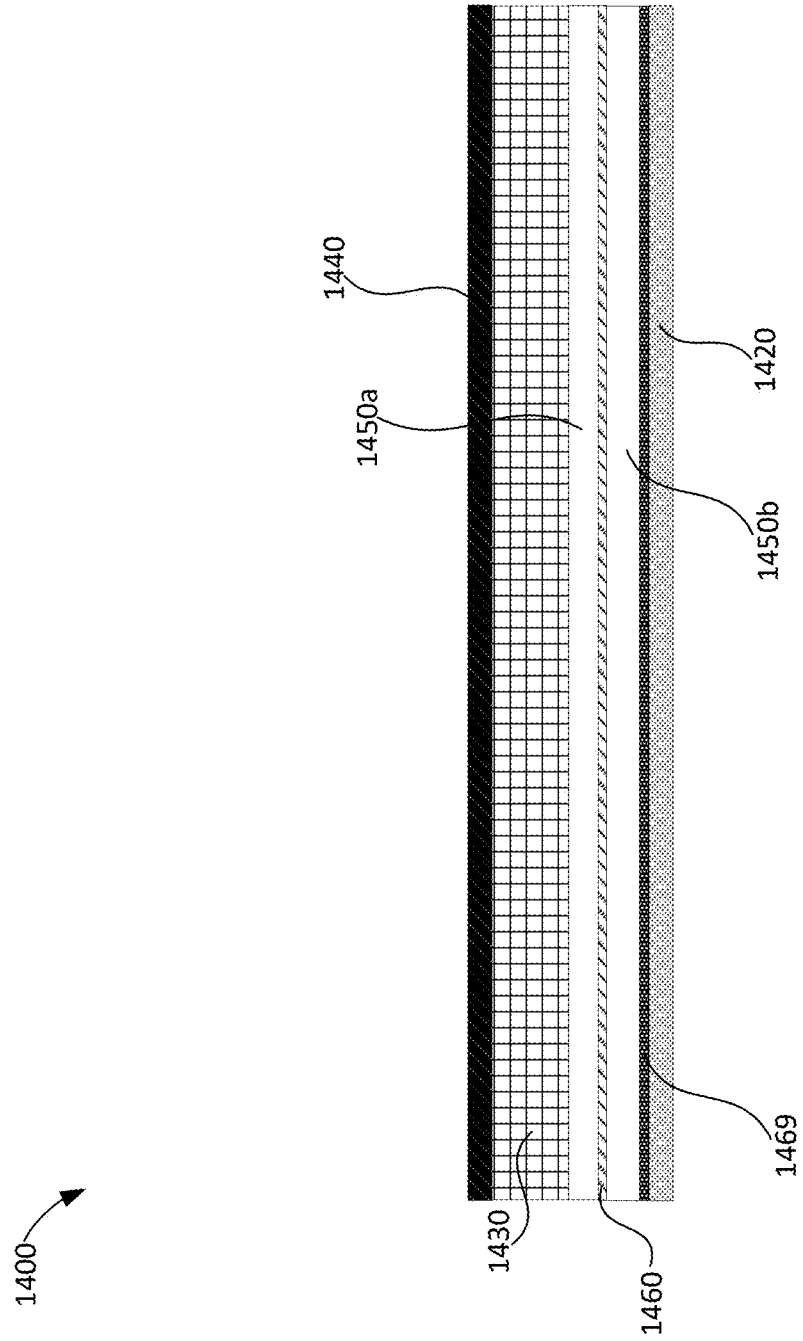

FIGS. 14A-14B are illustrations of an electrochemical cell 1400 with an interlayer 1460 having a lithium ion migration mechanism, according to an embodiment. The electrochemical cell 1400 includes a FIRS system. As shown, the electrochemical cell 1400 includes an anode current collector 1420 (without an anode material disposed thereon) and a cathode material 1430 disposed on a cathode current collector 1440. A first separator 1450*a* is disposed on the anode material 1410 and a second separator 1450*b* is disposed on the cathode material 1430. The interlayer 1460 is disposed between the first separator 1450*a* and the second separator 1450*b*. The interlayer 1460 includes a lithium source 1461. FIG. 14A shows the interlayer 1460 with the lithium source 1461 disposed there, while FIG. 14B shows the lithium source 1461 depleted form the interlayer 1460 to form a lithium deposit 1469 on the anode current collector 1420.

In some embodiments, the anode material 1410, the anode current collector 1420, the cathode material 1430, the cathode current collector 1440, the first separator 1450*a*, the second separator 1450*b*, the interlayer 1460, and the lithium source 1461 can be the same or substantially similar to the anode material 1310, the anode current collector 1320, the cathode material 1330, the cathode current collector 1340, the first separator 1350*a*, the second separator 1350*b*, the interlayer 1360, and the lithium source 1361, as described above with reference to FIGS. 13A-13F. Thus, certain aspects of the anode material 1410, the anode current collector 1420, the cathode material 1430, the cathode current collector 1440, the first separator 1450*a*, the second separator 1450*b*, the interlayer 1460, and the lithium source 1461 are not described in greater detail herein.

Advantages of the electrochemical cell 1400 without an anode material disposed on the anode current collector 1420 include elimination the need for a thin film lithium metal handling and storage. The increase in thickness of the interlayer 1460 and the separators 1450*a*, 1450*b* is less than about 5 μm after formation of the lithium deposit 1469 having a thickness of 10 μm. Also, void space created between the separator 1450*b* and the anode current collector 1420 can serve as an electrolyte reservoir. The design of the electrochemical cell 1400 is also compatible with many different anode current collector 1410 materials (e.g., copper, stainless steel, titanium, tin, nickel, silver, gold, platinum, or any combination thereof).

Figure 15A:
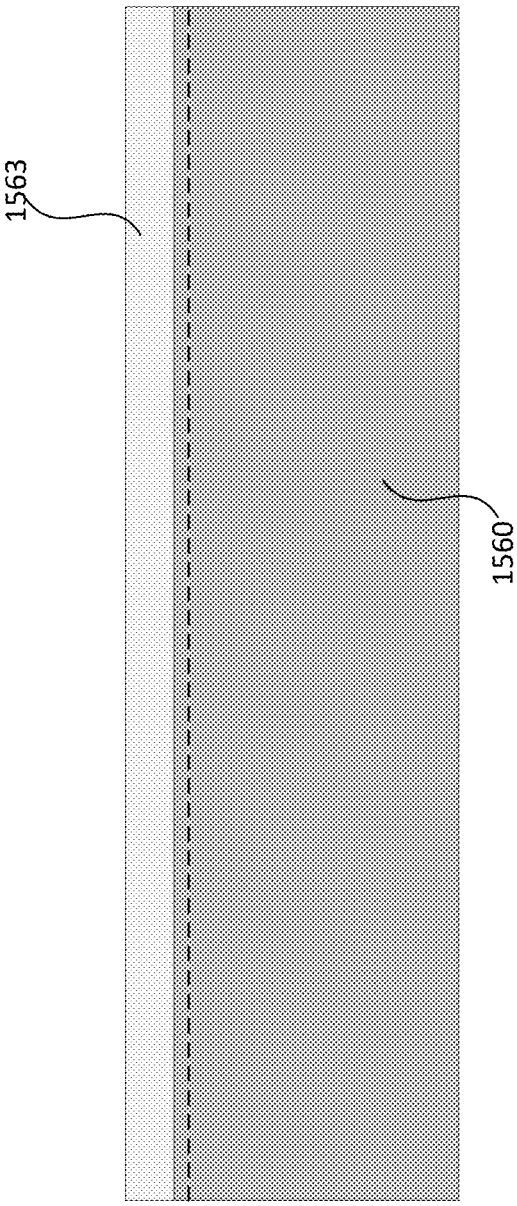
FIGS. 15A-15B are illustrations of an interlayer and its surrounding components in an electrochemical cell, according to an embodiment.
Figure 15B:
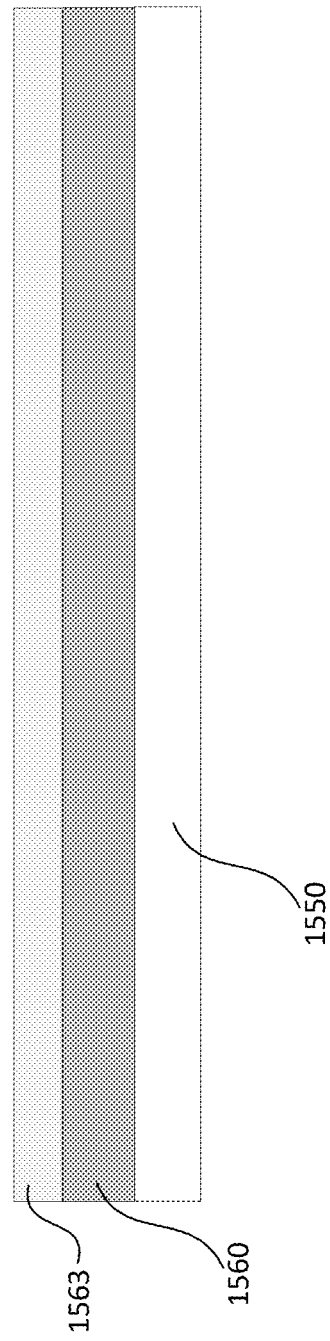

FIGS. 15A-15B illustrate an interlayer 1560 and its surrounding components, according to an embodiment. As shown, FIG. 15A shows a bottom view of the interlayer 1560 and an interlayer tab 1563, while FIG. 15B shows a side view of the interlayer 1560 placed on a separator 1550 with the interlayer tab 1563 coupled to the interlayer 1560. As shown, the interlayer tab 1563 includes a strip of current collector material attached to the edge of the surface of the interlayer 1560. The portion of the interlayer tab 1563 that hangs over the edge of the interlayer 1560 serves as a tabbing area for connection of a voltage source or voltage measurement device. As shown, the interlayer tab 1563 includes a single piece of current collector material extending approximately the full width of the interlayer 1560.

In some embodiments, the interlayer tab 1563 can be heat sealed to the interlayer 1560 and/or the separator 1550. In some embodiments, the interlayer tab 1563 can be heat sealed to the interlayer 1560 and/or the separator 1550 with a conductive binder. In some embodiments, the interlayer tab 1563 can be heat sealed to the interlayer 1560 and/or the separator 1550 without a conductive binder. In some embodiments, the interlayer tab 1563 can be ultrasonic welded to the interlayer 1560 and/or the separator 1550. In some embodiments, the interlayer tab 1563 can be taped to the interlayer 1560 and/or the separator 1550. In some embodiments, the interlayer tab 1563 can be composed of a metal. In some embodiments, the interlayer tab 1563 can be composed of aluminum, nickel, copper, and/or any other suitable material. In some embodiments, the interlayer tab 1563 and the interlayer tab 1563 can be folded in a Z-fold arrangement, the same or substantially similar to the folds described in U.S. Provisional Patent Application No. 63/622,201, filed Jan. 18, 2024 and titled "Systems and Methods of Folding Electrochemical Cell Tabs for Energy Density Improvement," the disclosure of which is hereby incorporated by reference in its entirety. In some embodiments, the interlayer 1560 and the interlayer tab 1563 can be folded in a jelly roll format. In some embodiments, the interlayer 1560 can include an area for tab connection. In some embodiments, the interlayer tab 1563 can be coated directly onto the interlayer 1560. In some embodiments, the interlayer tab 1563 can be patterned onto the interlayer 1560 via spraying or injection, or followed by a laser or die cut (i.e., in a notching process). In some embodiments, an extra area is left, without cutting, for tabbing after winding the separator 1550 and the interlayer 1560 with electrodes.

In some embodiments, the connection between the interlayer tab 1563 and the interlayer 1560 can be established via ultrasonic welding, taping, clipping, and/or heat sealing methods. In some embodiments, the interlayer tab 1563 can be produced by heat sealing a stacking tab (e.g., aluminum foil) and a conductive layer (i.e., interlayer 1560) in between two polymer films (i.e., separators) and then heat pressing the stack. In some embodiments, the interlayer tab 1563 can be notch welded along an exposed conductive area of the interlayer 1560. In some embodiments, the interlayer tab 1563 can include a single tab (i.e., a long strip of conductive material) welded across an entire exposed conductive layer area with an exposed portion of the interlayer tab 1563.

Figure 16A:
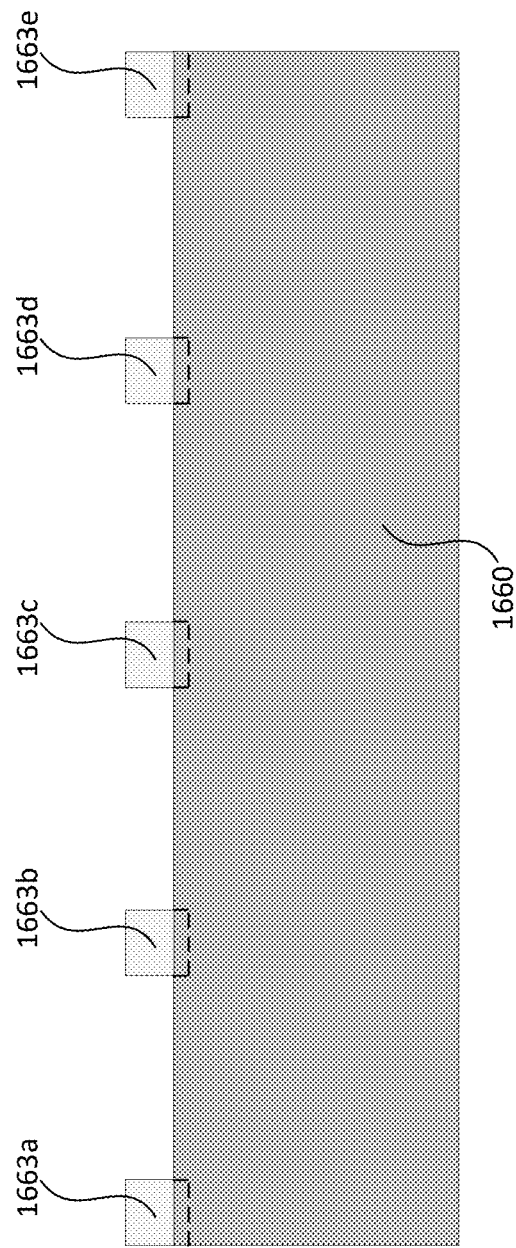
FIGS. 16A-16B are illustrations of an interlayer and its surrounding components in an electrochemical cell, according to an embodiment.
Figure 16B:
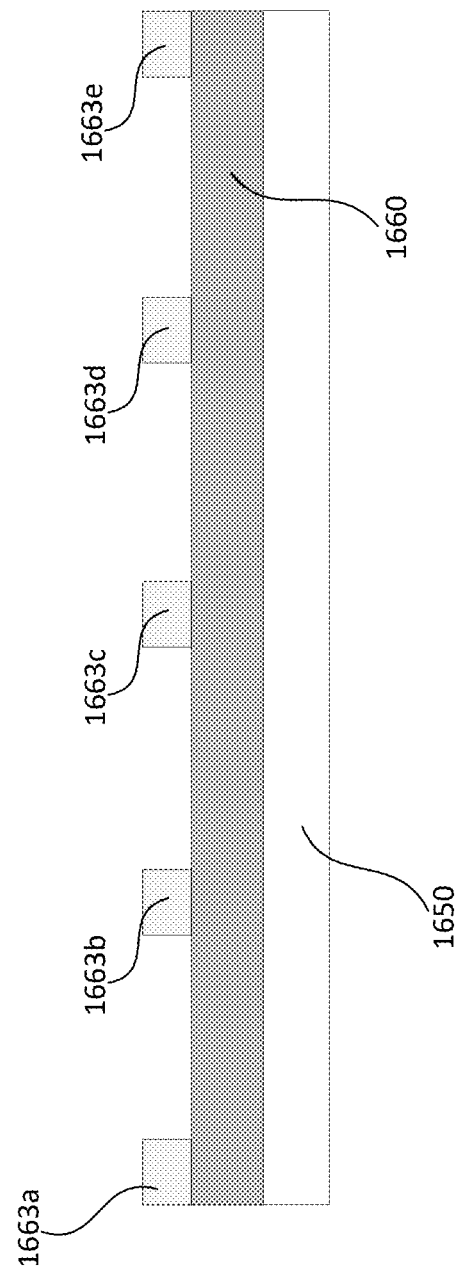

FIGS. 16A-16B illustrate an interlayer 1660 and its surrounding components, according to an embodiment. As shown, FIG. 16A shows a bottom view of the interlayer 1660 and a collection of interlayer tabs 1663*a*, 1663*b*, 1663*c*, 1663*d*, 1663*e* (collectively referred to herein as interlayer tabs 1663), while FIG. 16B shows a side view of the interlayer 1660 placed on a separator 1650 with the interlayer tabs 1663 coupled to the interlayer 1660. In some embodiments, the separator 1650, the interlayer 1660, and the interlayer tabs 1663 can be the same or substantially similar to the separator 1550, the interlayer 1560, and the interlayer tab 1563, as described above with reference to FIGS. 15A-15B. Thus, certain aspects of the separator 1650, the interlayer 1660, and the interlayer tabs 1663 are not described in greater detail herein.

As shown, the interlayer tabs 1663 are notched from a current collector material to form repeating tabs. In some embodiments, the interlayer tabs 1663 can be connected via a single length of current collector material. In some embodiments, the notching of the interlayer tabs 1663 can be done via laser cutting, die cutting, or any combination thereof. As shown, five interlayer tabs 1663 are coupled to the interlayer 1660. In some embodiments, about 1, about 2, about 3, about 4, about 5, about 6, about 7, about 8, about 9, about 10, about 20, about 30, about 40, about 50, about 60, about 70, about 80, about 90, or about 100 interlayer tabs 1663 can be coupled to the interlayer 1660, inclusive of all values and ranges therebetween.

In some embodiments, the interlayer 1660 can include an area for tab connection. In some embodiments, the interlayer tab 1663 can be coated directly onto the interlayer 1660. In some embodiments, the interlayer tab 1663 can be patterned onto the interlayer 1660 via spraying or injection, or followed by a laser or die cut (i.e., in a notching process). In some embodiments, an extra area is left, without cutting, for tabbing after winding the separator 1650 and the interlayer 1660 with electrodes.

Figure 17A:
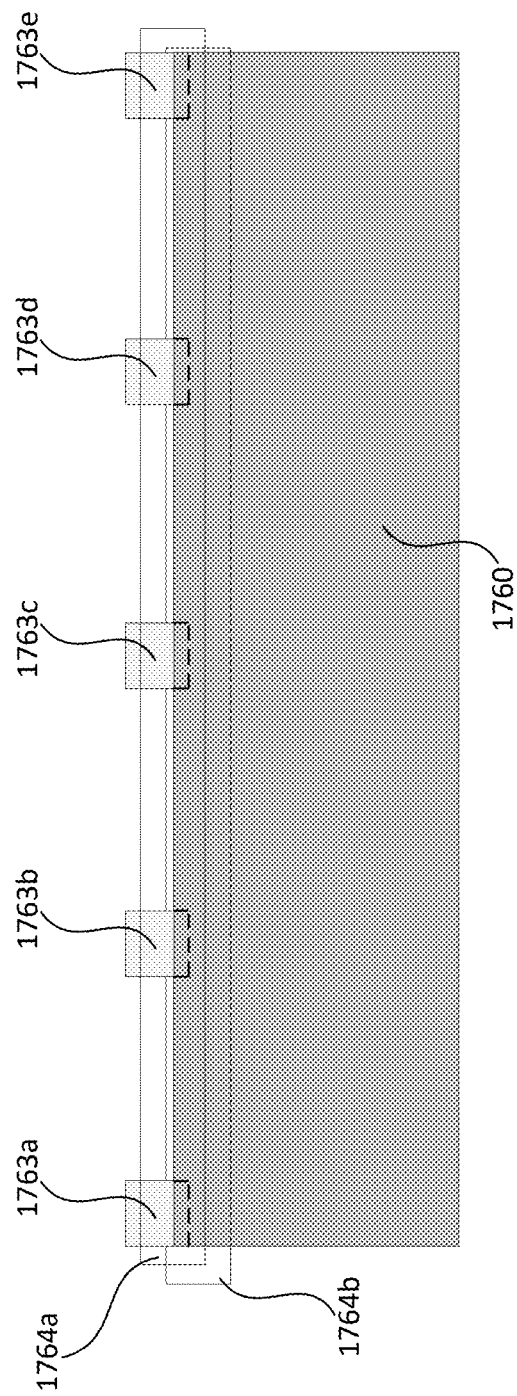
FIGS. 17A-17B are illustrations of an interlayer and its surrounding components in an electrochemical cell, according to an embodiment.
Figure 17B:
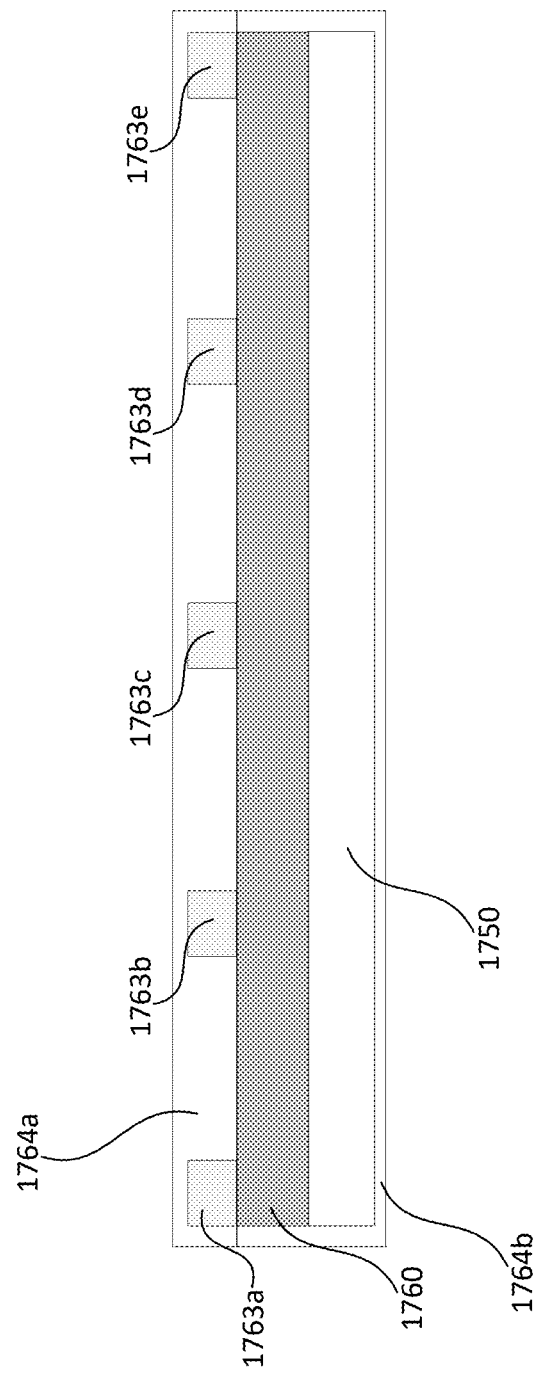

FIGS. 17A-17B illustrate an interlayer 1760 and its surrounding components, according to an embodiment. As shown, FIG. 17A shows a bottom view of the interlayer 1760 and a collection of interlayer tabs 1763*a*, 1763*b*, 1763*c*, 1763d, 1763e (collectively referred to herein as interlayer tabs 1763), while FIG. 17B shows a side view of the interlayer 1760 placed on a separator 1750 with the interlayer tabs 1763 coupled to the interlayer 1760 and lamination films 1764a, 1764b (collectively referred to as lamination films 1764) sealing the interlayer tabs 1763 to the interlayer 1760. In some embodiments, the separator 1750, the interlayer 1760, and the interlayer tabs 1763 can be the same or substantially similar to the separator 1650, the interlayer 1660, and the interlayer tabs 1663, as described above with reference to FIGS. 16A-16B. Thus, certain aspects of the separator 1750, the interlayer 1760, and the interlayer tabs 1763 are not described in greater detail herein.

As shown, the interlayer tabs 1763 are laminated to the interlayer 1760 and/or the separator by two lamination films 1764. The lamination films 1764 sandwich the interlayer tabs 1763 via a heat seal. The lamination films 1764 partially cover the interlayer tabs 1763 and partially cover the separator 1750. In some embodiments, the lamination films 1764 can be composed of a polymer, a plastic, a porous separator material, polyethylene, polypropylene, polystyrene, or any combination thereof.

Figure 18:
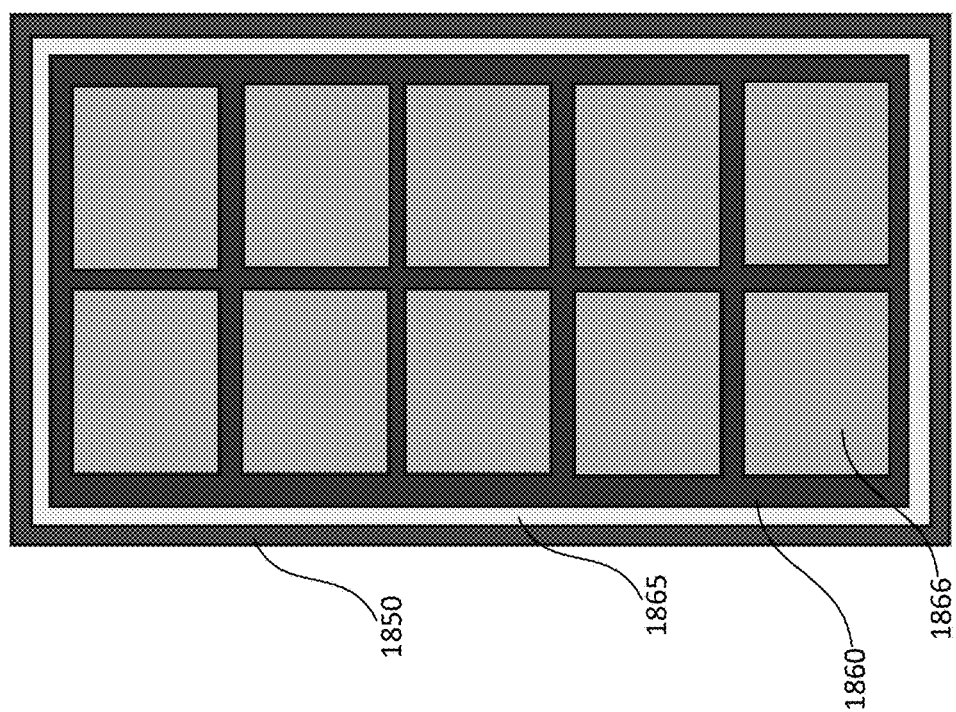
FIG. 18 is an illustration of a patterned multi-layer coating for processing and assembly of an interlayer, according to an embodiment.

FIG. 18 is an illustration of a patterned multi-layer coating for processing and assembly of an interlayer, according to an embodiment. As shown, a separator material 1850 is covered with an interlayer material 1860 with a strengthening coating 1865 between the separator material 1850 and the interlayer material 1860 and a patterned insulating interlayer material 1866 covering the interlayer material 1860. As shown, the separator material 1850 and each of the components covering the separator material 1850 are integrated into a single collection of material that is sandwiched between an anode (not shown) and a cathode (not shown) to form a collection of electrochemical cells. As shown, each of the sections of patterned insulating interlayer material 1866 are arranged in approximately congruent form factors. The separator material 1850 can include any of the materials described above with respect to the separators 150a, 150b with reference to FIG. 1. In some embodiments, the patterned insulating interlayer material 1866 can be composed of the same material as the separator material 1850. In some embodiments, the patterned insulating interlayer material 1866 can be composed of a different material from the separator material 1850. In some embodiments, the patterned insulating interlayer material 1866 can include polyethylene, polypropylene, polyimide, cellulose, PEO polymer, glass fiber, polyolefin, polystyrene, polyethylene terephthalate, PTFE, PVDF, or any combination thereof. In some embodiments, the patterned insulating interlayer material 1866 can include a ceramic. In some embodiments, the patterned insulating interlayer material 1866 can include a ceramic coating. In some embodiments, the ceramic coating can include $Al_2O_3$, boehmite, $TiO_2$, and/or $SiO_2$.

Figure 19:
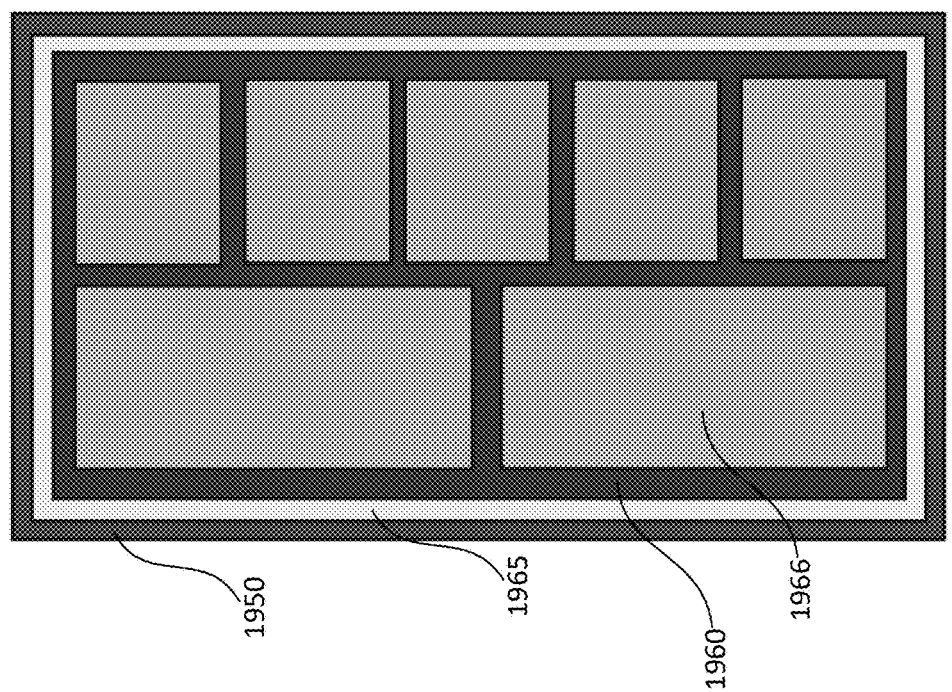
FIG. 19 is an illustration of a patterned multi-layer coating for processing and assembly of an interlayer, according to an embodiment.

FIG. 19 is an illustration of a patterned multi-layer coating for processing and assembly of an interlayer, according to an embodiment. As shown, a separator material 1950 is covered with an interlayer material 1960 with a strengthening coating 1965 between the separator material 1950 and the interlayer material 1960 and a patterned insulating interlayer material 1966 covering the interlayer material 1960. As shown, the separator material 1950 and each of the components covering the separator material 1950 are integrated into a single collection of material that is sandwiched between an anode (not shown) and a cathode (not shown) to form a collection of electrochemical cells. As shown, the sections of patterned insulating interlayer material 1966 have varying form factors. The form factors of the sections of patterned insulating interlayer material 1966 can be altered depending on cell assembly and cutting process. In some embodiments, the sections of patterned insulating interlayer material 1966 can have a square shape and/or a rectangular shape.

Figure 20B:
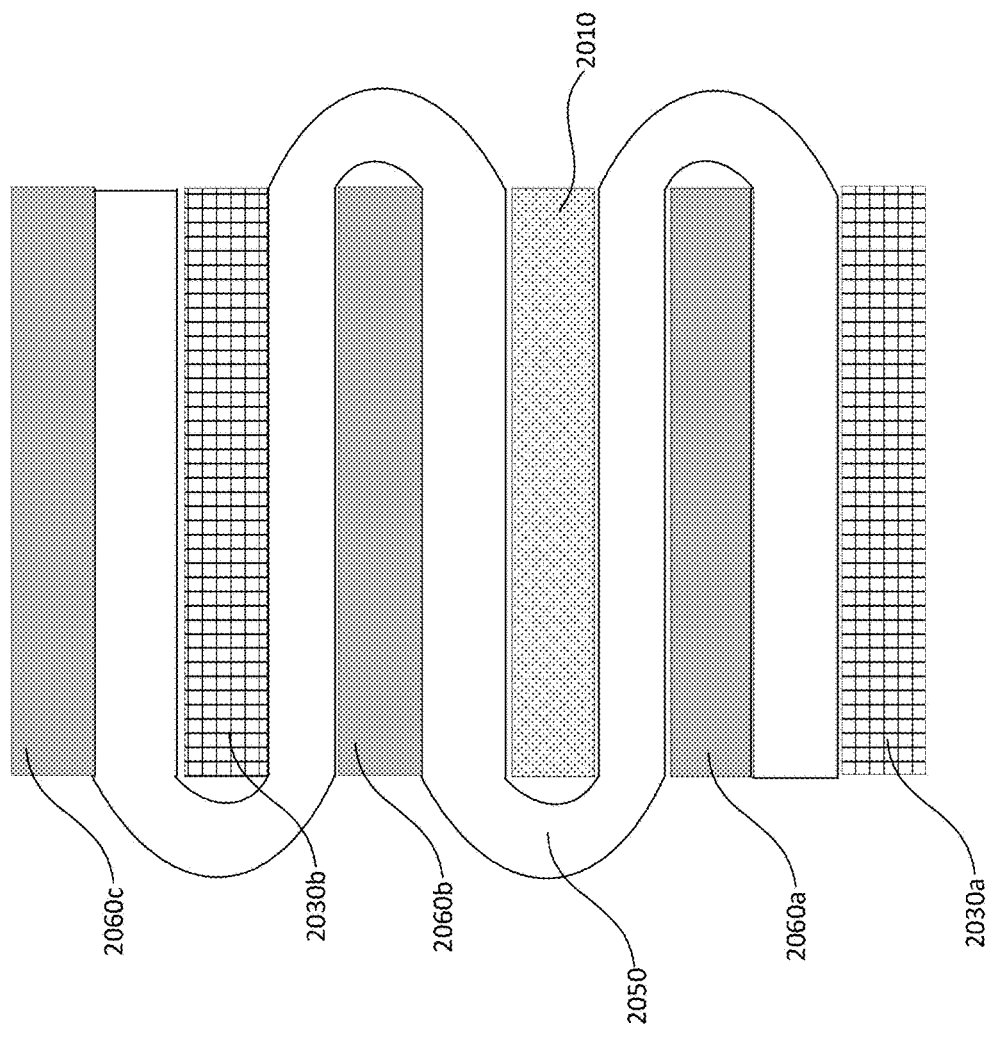

FIGS. 20A-20B are illustrations of the production of an electrochemical cell stack 2000 with interlayers 2060a, 2060b, 2060c (collectively referred to as interlayers 2060), according to an embodiment. As shown, a separator 2050 is shown in FIG. 20A with three interlayers 2060a, 2060b, 2060b disposed thereon. In production, the separator 2050 is conveyed along a web direction W. The separator 2050 is folded in a serpentine form with an anode material 2010, a first cathode material 2030a, and a second cathode material 2030b to form the electrochemical cell stack 2000.

As shown, the separator 2050 is folded, such that a portion of the separator 2050 contacts the anode material 2030a with the interlayer 2060a on the other side of the separator 2050. An additional portion of the separator 2050 is folded over the interlayer 2060a with the anode material 2010 disposed opposite the interlayer 2060a. An additional portion of the separator 2050 is folded over the anode material 2010 with the interlayer 2060b on the other side of the separator 2050, opposite the anode material 2010. The cathode material 2030b is disposed on the separator 2050, opposite the interlayer 2060b. An additional portion of the separator 2050 is folded over the cathode material 2030b and the interlayer 2060c is disposed on the separator 2050 opposite the cathode material 2030b. In some embodiments, current collectors (not shown) can be coupled to the anode material 2010, the cathode material 2030a, and/or the cathode material 2030b. As shown, the electrochemical cell stack 2000 includes two cathode materials 2030a, 2030b disposed on either side of the anode material 2010. In some embodiments, the electrochemical cell stack 2000 can include two anode materials disposed on either side of a cathode material. In some embodiments, the electrochemical cell stack 2000 can include any number of sections of anode material, cathode material, or interlayer material (i.e., about 1, about 2, about 3, about 4, about 5, about 6, about 7, about 8, about 9, about 10, about 20, about 30, about 40, about 50, about 60, about 70, about 80, about 90, about 100, inclusive of all values and ranges therebetween). In some embodiments, the separator 2050 can be wound, z-folded, and/or stacked with electrodes during assembly of the electrochemical cell stack 2000. In some embodiments, the separator 2050 can be in contact with one or more cathodes. In some embodiments, the separator 2050 can be in contact with one or more anodes. In some embodiments, the separator 2050 can be wound, z-folded, and/or stacked with another free-standing base separator during cell assembly.

In some embodiments, the interlayers 2060 can be coated in predesigned patters on the separator 2050 for Z-folded or stacked jelly roll form factors. The serpentine configuration of the separator 2050 and the interlayers 2060 can eliminate a need to incorporate a second separator into the electrochemical cell stack 2000 (i.e., the separator 2050 can act as multiple separators by winding through spaces between multiple pairs of electrodes). The patterned interlayers 2060 can alternate between electrode sized conductive layers and a bare base section of the separator 2050. In some embodiments, the interlayers 2060 can have similar thicknesses, lengths, and/or widths to the anode material 2010 or the cathode materials 2030a, 2030b. In some embodiments, the interlayers 2060 can have different thicknesses, lengths, and/or widths from the anode material 2010 or the cathode materials 2030*a*, 2030*b*. In production, a coated section of the separator 2050 (i.e., coated via interlayer 2060 material) can be stacked on a first electrode, and an uncoated base film section is folded and stacked on top of the interlayer 2060 material, then a second electrode is stacked on a back side of the uncoated portion of the separator 2050, opposite the interlayer 2060 material. In some embodiments, the separator 2050 and the interlayers 2060 can be wound together with another base separator during assembly of the electrochemical cell stack 2000.

FIG. 21 is a flow diagram of a method 10 of forming an electrochemical cell stack, according to an embodiment. In some embodiments, the electrochemical cell stack can be the same or substantially similar to the electrochemical cell stack 2000, as described above with reference to FIGS. 20A-20B. As shown, the method 10 optionally includes pretreating a separator material at step 11, coating the separator material with a strengthening coating at step 12, and coating the separator material with an insulating layer at step 13. The method 10 further includes coating the separator material with a conductive material at step 14 and incorporating the separator material into an electrochemical cell stack at step 15.

Step 11 is optional and include pretreating the separator material. In some embodiments, the separator material can include an extended length of separator material having a length of about 1, about 2, about 3, about 4, about 5, about 6, about 7, about 8, about 9, about 10, about 20, about 30, about 40, about 50, about 60, about 70, about 80, about 90, or about 100 separators, inclusive of all values and ranges therebetween. In some embodiments, the pretreatment can alter the surface properties of the separator material. In some embodiments, the pretreatment can improve the purity of the separator material (i.e., by removing foreign contaminants present on the surface of the separator material). In some embodiments, the pretreatment can include plasma treatment. In some embodiments, the pretreatment can include corona treatment.

Step 12 is optional and includes coating the separator material with a strengthening coating to improve the physical properties of the separator material and prevent defects from surface treatment of the separator material. In some embodiments, the strengthening coating can include PVDF, a ceramic, and/or an oil. The pore size of the strengthening coating can be controlled via non-solvent induced phase separation and thermally induced phase separation.

In some embodiments, the strengthening coating can have a pore size of at least about 100 nm, at least about 200 nm, at least about 300 nm, at least about 400 nm, at least about 500 nm, at least about 600 nm, at least about 700 nm, at least about 800 nm, at least about 900 nm, at least about 1 µm, at least about 2 µm, at least about 3 µm, or at least about 4 µm. In some embodiments, the strengthening coating can have a pore size of no more than about 5 µm, no more than about 4 µm, no more than about 3 µm, no more than about 2 µm, no more than about 1 µm, no more than about 900 nm, no more than about 800 nm, no more than about 700 nm, no more than about 600 nm, no more than about 500 nm, no more than about 400 nm, no more than about 300 nm, or no more than about 200 nm. Combinations of the above-referenced pore sizes are also possible (e.g., at least about 100 nm and no more than about 5 µm or at least about 500 nm and no more than about 2 µm), inclusive of all values and ranges therebetween. In some embodiments, the strengthening coating can have a pore size of about 100 nm, about 200 nm, about 300 nm, about 400 nm, about 500 nm, about 600 nm, about 700 nm, about 800 nm, about 900 nm, about 1 µm, about 2 µm, about 3 µm, about 4 µm, or about 5 µm. In some embodiments, the strengthening coating can be applied in-line via a roll-to-roll process. In some embodiments, the strengthening coating can be applied via a Mayer coating rod, a micro-gravure, a doctor blade, a gravure, a spray coating, and/or an ink jet coating.

Step 13 is optional and includes coating the separator material with an additional insulative material. In some embodiments, step 13 can include coating multiple lengths of separator material (i.e., a first length of separator material and a second length of separator material) with insulative material. In some embodiments, the insulative material can include PVDF, ceramic, or any combination thereof. In some embodiments, the insulative material can prevent conductive material (e.g., the interlayers 2060) from penetrating through the separator material on either side of the interlayers 2060.

In some embodiments, the insulating material can have a thickness of at least about 10 nm, at least about 20 nm, at least about 30 nm, at least about 40 nm, at least about 50 nm, at least about 60 nm, at least about 70 nm, at least about 80 nm, at least about 90 nm, at least about 100 nm, at least about 200 nm, at least about 300 nm, at least about 400 nm, at least about 500 nm, at least about 600 nm, at least about 700 nm, at least about 800 nm, at least about 900 nm, at least about 1 µm, at least about 2 µm, at least about 3 µm, at least about 4 µm, at least about 5 µm, at least about 6 µm, at least about 7 µm, at least about 8 µm, at least about 9 µm, at least about 10 µm, at least about 11 µm, at least about 12 µm, at least about 13 µm, at least about 14 µm, at least about 15 µm, at least about 16 µm, at least about 17 µm, at least about 18 µm, or at least about 19 µm. In some embodiments, the insulative material can have a thickness of no more than about 20 µm, no more than about 19 µm, no more than about 18 µm, no more than about 17 µm, no more than about 16 µm, no more than about 15 µm, no more than about 14 µm, no more than about 13 µm, no more than about 12 µm, no more than about 11 µm, no more than about 10 µm, no more than about 9 µm, no more than about 8 µm, no more than about 7 µm, no more than about 6 µm, no more than about 5 µm, no more than about 4 µm, no more than about 3 µm, no more than about 2 µm, no more than about 1 µm, no more than about 900 nm, no more than about 800 nm, no more than about 700 nm, no more than about 600 nm, no more than about 500 nm, no more than about 400 nm, no more than about 300 nm, no more than about 200 nm, no more than about 100 nm, no more than about 90 nm, no more than about 80 nm, no more than about 70 nm, no more than about 60 nm, no more than about 50 nm, no more than about 40 nm, no more than about 30 nm, or no more than about 20 nm. Combinations of the above-referenced thicknesses are also possible (e.g., at least about 10 nm and no more than about 20 µm or at least about 50 nm and no more than about 1 µm), inclusive of all values and ranges therebetween. In some embodiments, the insulating material can have a thickness of about 10 nm, about 20 nm, about 30 nm, about 40 nm, about 50 nm, about 60 nm, about 70 nm, about 80 nm, about 90 nm, about 100 nm, about 200 nm, about 300 nm, about 400 nm, about 500 nm, about 600 nm, about 700 nm, about 800 nm, about 900 nm, about 1 µm, about 2 µm, about 3 µm, about 4 µm, about 5 µm, about 6 µm, about 7 µm, about 8 µm, about 9 µm, about 10 µm, about 11 µm, about 12 µm, about 13 µm, about 14 µm, about 15 µm, about 16 µm, about 17 µm, about 18 µm, about 19 µm, or about 20 µm.

In some embodiments, the insulating material can be applied via a roll-to-roll process. In some embodiments, the insulating material can be applied via a patterning process. In some embodiments, the insulating layer can be applied via a Mayer coating rod, a micro-gravure, a slot-die, a doctor blade, a gravure, a spray, an ink jet coating, or any combination thereof. In some embodiments, the insulating material can be applied in patterns, leaving an uncoated section on the separator material for tabbing and assembly. In some embodiments, the insulating material can be applied at any width, across multiple sections, via any of the aforementioned application methods to fully cover the conductive material or leave sections open for tabbing and assembly.

Step 14 includes applying a conductive material to the separator material. If the separator material has a ceramic coating, the conductive material can be applied without surface corona or plasma treatment. The porosity of the conductive material can be finely controlled along each section of the electrochemical cell stack over the porosity ranges described above via at least one of non-solvent induced phase separation, thermally induced phase separation, adjustment of the thickness of the individual layers (i.e., the separator material, the insulative layer, the conductive material), or composition of the materials used in the conductive material and the insulating material. In some embodiments, the conductive material can be applied in-line via a roll-to-roll process. In some embodiments, the conductive material can be applied via a Mayer coating rod, a micro-gravure, a slot-die, a doctor blade, a gravure, a spray, an ink jet coating, or any combination thereof. In some embodiments, the conductive material can be applied in patterns, leaving an uncoated section of the separator material or the strengthening interlayer for cutting, slitting, and/or processing. In some embodiments, the conductive material can be applied in patterns to leave intermittent, repeating sections of conductive coated and uncoated film that can be used in a multi-cell assembly.

Step 15 includes incorporating the separator material into an electrochemical cell stack. In some embodiments, the separator material can be wound, z-folded, and/or stacked with electrodes to form the electrochemical cell stack. In some embodiments, multiple lengths of separator material with sections of conductive material placed therebetween can be incorporated into an electrochemical cell stack. In some embodiments, the second length of separator material can be coupled to the first length of the separator material with the conductive material disposed on the first length of separator material. In some embodiments, the electrochemical cell stack can be the same or substantially similar to the electrochemical cell stack 2000, as described above with reference to FIGS. 20A-20B.

In some embodiments, individual layers and combinations of different interlayers can be wound, unwound, slit, and/or spliced during production and assembly of the electrochemical cell stack. In some embodiments, multiple layers of conductive material (i.e., interlayers) and/or surface treatments can be applied in-line continuously during production and in different orders and configurations. For example, the base film can be subject to a strengthening coating, a surface treatment, a conductive coating, and/or an insulating coating. In some embodiments, the first length of separator material and the second layer of separator material can be joined by using the conductive layer as a "glue," stacking the first length of separator material, the conductive material, and the second length of conductive material before the conductive material dries.

Figure 22:
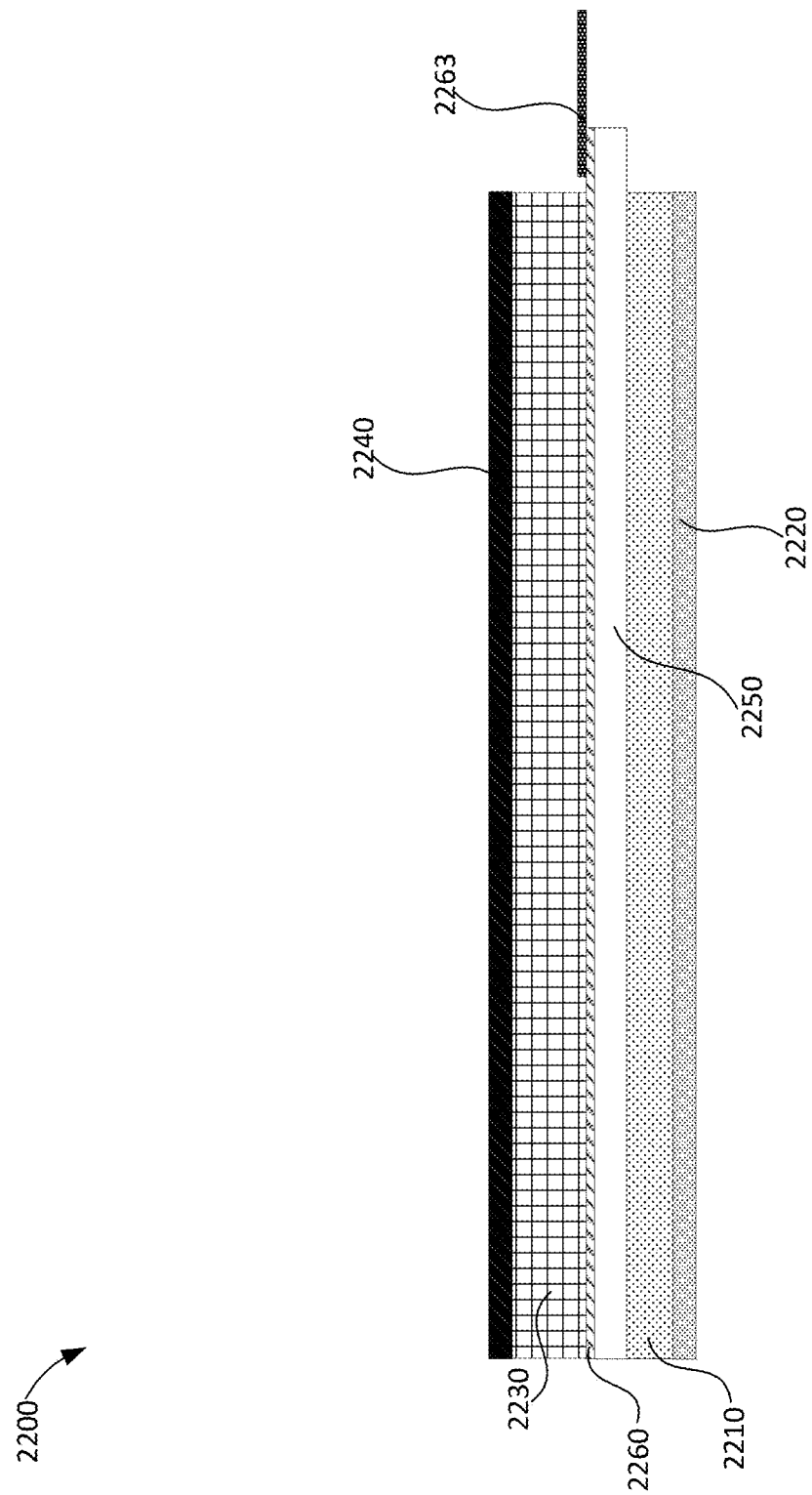
FIG. 22 is an illustration of an electrochemical cell with an interlayer, according to an embodiment.

FIG. 22 is an illustration of an electrochemical cell 2200, according to an embodiment. As shown, the electrochemical cell 2200 includes an anode 2210 disposed on an anode current collector 2220, a cathode 2230 disposed on a cathode current collector 2240, and a separator 2250 disposed between the anode 2210 and the cathode 2230, with an interlayer 2260 disposed on the separator 2250. An interlayer tab 2263 is coupled to the interlayer 2260. In some embodiments, the anode 2210, the anode current collector 2220, the cathode 2230, the cathode current collector 2240, the separator 2250, and the interlayer 2260 can be the same or substantially similar to the anode 210, the anode current collector 220, the cathode 230, the cathode current collector 240, the separator 250b, and the interlayer 260, as described above with respect to FIGS. 2A-2B. In some embodiments, the interlayer tab 2263 can be the same or substantially similar to the interlayer tab 1563, as described above with reference to FIGS. 15A-15B. Thus, certain aspects of the anode 2210, the anode current collector 2220, the cathode 2230, the cathode current collector 2240, the separator 2250, the interlayer 2260, and the interlayer tab 2263 are not described in greater detail herein.

In some embodiments, the interlayer 2260 is coated onto the separator 2250. In some embodiments, the interlayer 2260 can be coated onto the cathode 2230. The interlayer 2260 can have low electron conductivity. In some embodiments, the interlayer 2260 can have a resistance of at least about 0.1 m $\Omega$/sq, at least about 0.5 m $\Omega$/sq, at least about 1 m$\Omega$/sq, at least about 5 m $\Omega$/sq, at least about 10 m$\Omega$/sq, at least about 50 m $\Omega$/sq, at least about 100 m$\Omega$/sq, at least about 500 m$\Omega$/sq, at least about 1 $\Omega$/sq, at least about 5 $\Omega$/sq, at least about 10 $\Omega$/sq, at least about 50 $\Omega$/sq, at least about 100 $\Omega$/sq, at least about 500 $\Omega$/sq, at least about 1 k$\Omega$/sq, at least about 5 k$\Omega$/sq, at least about 10 k$\Omega$/sq, at least about 50 k$\Omega$/sq, at least about 100 k$\Omega$/sq, or at least about 500 k$\Omega$/sq. In some embodiments, the interlayer 2260 can have a resistance of no more than about 1 M$\Omega$/sq, no more than about 500 k$\Omega$/sq, no more than about 100 k$\Omega$/sq, no more than about 50 k$\Omega$/sq, no more than about 10 k$\Omega$/sq, no more than about 5 k$\Omega$/sq, no more than about 1 k$\Omega$/sq, no more than about 500 $\Omega$/sq, no more than about 100 $\Omega$/sq, no more than about 50 $\Omega$/sq, no more than about 10 $\Omega$/sq, no more than about 5 $\Omega$/sq, no more than about 1 $\Omega$/sq, no more than about 500 m$\Omega$/sq, no more than about 100 m$\Omega$/sq, no more than about 50 m $\Omega$/sq, no more than about 10 m $\Omega$/sq, no more than about 5 m $\Omega$/sq, no more than about 1 m$\Omega$/sq, or no more than about 0.5 m$\Omega$/sq. Combinations of the above-referenced resistances are also possible (e.g., at least about 0.1 m$\Omega$/sq and no more than about 1 M$\Omega$/sq or at least about 1 $\Omega$/sq and no more than about 10 k$\Omega$/sq), inclusive of all values and ranges therebetween. In some embodiments, the interlayer 2260 can have a resistance of about 0.1 m$\Omega$/sq, about 0.5 m $\Omega$/sq, about 1 m$\Omega$/sq, about 5 m$\Omega$/sq, about 10 m$\Omega$/sq, about 50 m $\Omega$/sq, about 100 m$\Omega$/sq, about 500 m$\Omega$/sq, about 1 $\Omega$/sq, about 5 $\Omega$/sq, about 10 $\Omega$/sq, about 50 $\Omega$/sq, about 100 $\Omega$/sq, about 500 $\Omega$/sq, about 1 k$\Omega$/sq, about 5 k$\Omega$/sq, about 10 k$\Omega$/sq, about 50 k$\Omega$/sq, about 100 k$\Omega$/sq, about 500 k$\Omega$/sq, or about 1 M$\Omega$/sq.

In some embodiments, the interlayer 2260 can have a resistivity greater than a resistivity of the cathode 2230 by a factor of at least about 1.1, at least about 1.2, at least about 1.3, at least about 1.4, at least about 1.5, at least about 1.6, at least about 1.7, at least about 1.8, at least about 1.9, at least about 2, at least about 3, at least about 4, at least about 5, at least about 6, at least about 7, at least about 8, at least about 9, at least about 10, at least about 20, at least about 30, at least about 40, at least about 50, at least about 60, at least about 70, at least about 80, at least about 90, at least about 100, at least about 500, at least about 1,000, at least about 5,000, at least about 10,000, at least about 50,000, or at least about 100,000. In some embodiments, the interlayer 2260 can have a resistivity greater than a resistivity of the cathode 2230 by a factor of no more than about 500,000, no more than about 100,000, no more than about 50,000, no more than about 10,000, no more than about 5,000, no more than about 1,000, no more than about 500, no more than about 100, no more than about 90, no more than about 80, no more than about 70, no more than about 60, no more than about 50, no more than about 40, no more than about 30, no more than about 20, no more than about 10, no more than about 9, no more than about 8, no more than about 7, no more than about 6, no more than about 5, no more than about 4, no more than about 3, no more than about 2, no more than about 1.9, no more than about 1.8, no more than about 1.7, no more than about 1.6, no more than about 1.5, no more than about 1.4, no more than about 1.3, no more than about 1.2, or no more than about 1.1. Combinations of the above-referenced resistivity ratios are also possible (e.g., at least about 1.1 and no more than about 500,000 or at least about 5 and no more than about 50), inclusive of all values and ranges therebetween. In some embodiments, the interlayer 2260 can have a resistivity greater than a resistivity of the cathode 2230 by a factor of about 1.1, about 1.2, about 1.3, about 1.4, about 1.5, about 1.6, about 1.7, about 1.8, about 1.9, about 2, about 3, about 4, about 5, about 6, about 7, about 8, about 9, about 10, about 20, about 30, about 40, about 50, about 60, about 70, about 80, about 90, about 100, about 500, about 1,000, about 5,000, about 10,000, about 50,000, about 100,000, or about 500,000.

In some embodiments, the anode 2210 can include a conventional solid anode. In some embodiments, the anode 2210 can include a semi-solid anode. In some embodiments, the cathode 2230 can include a conventional solid cathode. In some embodiments, the cathode 2230 can include a semi-solid cathode. In some embodiments, the anode 2210 and/or the cathode 2230 can have a conductivity of at least about 0.1 mS/cm, at least about 1 mS/cm, at least about 10 mS/cm, at least about 20 mS/cm, at least about 30 mS/cm, at least about 40 mS/cm, at least about 50 mS/cm, at least about 60 mS/cm, at least about 70 mS/cm, at least about 80 mS/cm, at least about 90 mS/cm, at least about 100 mS/cm, at least about 150 mS/cm, at least about 100 mS/cm, at least about 150 mS/cm, at least about 200 mS/cm, at least about 250 mS/cm, at least about 300 mS/cm, at least about 350 mS/cm, at least about 400 mS/cm, or at least about 450 mS/cm at least about 1 S/cm, or at least about 10 S/cm. In some embodiments, the anode 2210 and/or the cathode 2230 can have a conductivity of no more than about 10 S/cm, no more than about 1 mS/cm, no more than about 500 mS/cm, no more than about 450 mS/cm, no more than about 400 mS/cm, no more than about 350 mS/cm, no more than about 300 mS/cm, no more than about 250 mS/cm, no more than about 200 mS/cm, no more than about 150 mS/cm, no more than about 100 mS/cm, no more than about 90 mS/cm, no more than about 80 mS/cm, no more than about 70 mS/cm, no more than about 60 mS/cm, no more than about 50 mS/cm, no more than about 40 mS/cm, no more than about 30 mS/cm, no more than about 20 mS/cm, or no more than about 10 mS/cm. Combinations of the above-referenced conductivities are also possible (e.g., at least about 5 mS/cm and no more than about 500 mS/cm or at least about 30 mS/cm and no more than about 300 mS/cm), inclusive of all values and ranges therebetween. In some embodiments, the anode 2210 and/or the cathode 2230 can have a conductivity of about 5 mS/cm, about 10 mS/cm, about 20 mS/cm, about 30 mS/cm, about 40 mS/cm, about 50 mS/cm, about 60 mS/cm, about 70 mS/cm, about 80 mS/cm, about 90 mS/cm, about 100 mS/cm, about 150 mS/cm, about 100 mS/cm, about 150 mS/cm, about 200 mS/cm, about 250 mS/cm, about 300 mS/cm, about 350 mS/cm, about 400 mS/cm, about 450 mS/cm, or about 500 mS/cm.

In some embodiments, the interlayer 2260 can include PVDF, carbon, and/or ceramic. In some embodiments, the interlayer 2260 can have a carbon content of at least about 0.0001 wt %, at least about 0.0005 wt %, at least about 0.001 wt %, at least about 0.005 wt %, at least about 0.01 wt %, at least about 0.05 wt %, at least about 0.1 wt %, at least about 0.5 wt %, at least about 0.5 wt %, at least about 1 wt %, at least about 5 wt %, at least about 10 wt %, at least about 20 wt %, at least about 30 wt %, at least about 40 wt %, at least about 50 wt %, at least about 60 wt %, at least about 70 wt %, at least about 80 wt %, at least about 90 wt %, at least about 95 wt %, or at least about 99 wt %. In some embodiments, the interlayer 2260 can have a carbon content of no more than about 99 wt %, no more than about 95 wt %, no more than about 90 wt %, no more than about 80 wt %, no more than about 70 wt %, no more than about 60 wt %, no more than about 50 wt %, no more than about 40 wt %, no more than about 30 wt %, no more than about 20 wt %, no more than about 10 wt %, no more than about 5 wt %, no more than about 2 wt %, no more than about 1 wt %, no more than about 0.5 wt %, no more than about 0.1 wt %, no more than about 0.05 wt %, no more than about 0.01 wt %, no more than about 0.005 wt %, no more than about 0.001 wt %, or no more than about 0.0005 wt %. Combinations of the above-referenced weight percentages are also possible (e.g., at least about 0.0001 wt % and no more than about 99 wt % or at least about 0.001 wt % and no more than about 20 wt %), inclusive of all values and ranges therebetween. In some embodiments, the interlayer 2260 can have a carbon content of about 0.0001 wt %, about 0.0005 wt %, about 0.001 wt %, about 0.005 wt %, about 0.01 wt %, about 0.05 wt %, about 0.1 wt %, about 0.5 wt %, about 0.5 wt %, about 1 wt %, about 2 wt %, about 5 wt %, about 10 wt %, about 20 wt %, about 30 wt %, about 40 wt %, about 50 wt %, about 60 wt %, about 70 wt %, about 80 wt %, about 90 wt %, about 95 wt %, or about 99 wt %.

Figure 23:
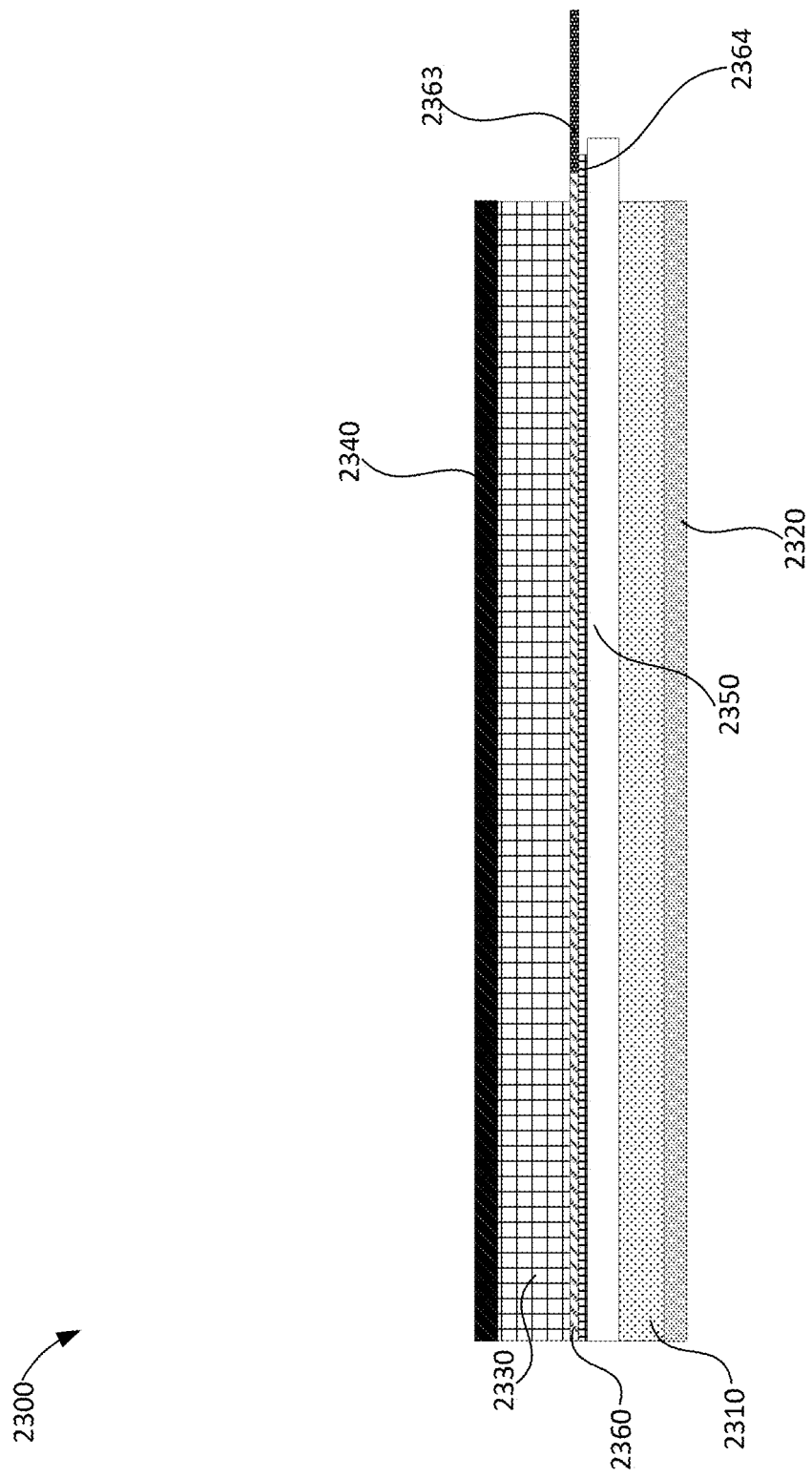
FIG. 23 is an illustration of an electrochemical cell with an interlayer, according to an embodiment.

FIG. 23 is an illustration of an electrochemical cell 2300, according to an embodiment. As shown, the electrochemical cell 2300 includes an anode 2310 disposed on an anode current collector 2320, a cathode 2330 disposed on a cathode current collector 2340, and a separator 2350 disposed between the anode 2310 and the cathode 2330, with an interlayer 2360 disposed on the separator 2350. An interlayer tab 2363 and a conductive coating 2264 are coupled to the interlayer 2360. In some embodiments, the anode 2310, the anode current collector 2320, the cathode 2330, the cathode current collector 2340, the separator 2350, the interlayer 2360, and the interlayer tab 2363 can be the same or substantially similar to the anode 2210, the anode current collector 2220, the cathode 2230, the cathode current collector 2240, the separator 2250*b*, the interlayer 2260, and the interlayer tab 2263, as described above with respect to FIG. 22. Thus, certain aspects of anode 2310, the anode current collector 2320, the cathode 2330, the cathode current collector 2340, the separator 2350, the interlayer 2360, and the interlayer tab 2363 are not described in greater detail herein.

The conductive coating 2364 can aid in achieving a better reading of the voltage between the interlayer 2364 and the anode 2310 or the cathode 2330, as compared to without the conductive coating 2364. In some embodiments, the conductive coating 2364 can include LFP, NMC, LMO, LMFP, LCO, LNO, LNMO, or any other electrode material or combinations thereof. In some embodiments, the conductive coating 2364 can include aluminum, platinum, gold, silver, copper, or any combination thereof. In some embodiments, the conductive coating 2364 can include aluminum powder, platinum powder, gold powder, or any combination thereof. As shown, the conductive coating 2364 is disposed between the separator 2350 and the interlayer 2360. In some embodiments, the conductive coating 2364 can be disposed on the side of the interlayer 2360 opposite the separator 2350.

In some embodiments, the conductive coating 2364 can have a thickness of at least about 500 nm, at least about 1 µm, at least about 2 µm, at least about 3 µm, at least about 4 µm, at least about 5 µm, at least about 6 µm, at least about 7 µm, at least about 8 µm, at least about 9 µm, at least about 10 µm, at least about 20 µm, at least about 30 µm, at least about 40 µm, at least about 50 µm, at least about 60 µm, at least about 70 µm, at least about 80 µm, at least about 90 µm, at least about 100 µm, at least about 150 µm, at least about 200 µm, at least about 250 µm, at least about 300 µm, at least about 350 µm, at least about 400 µm, at least about 450 µm, at least about 500 µm, at least about 550 µm, at least about 600 µm, at least about 650 µm, at least about 700 µm, at least about 750 µm, at least about 800 µm, at least about 850 µm, at least about 900 µm, or at least about 950 µm. In some embodiments, the conductive coating 2364 can have a thickness of no more than about 1,000 µm, no more than about 950 µm, no more than about 900 µm, no more than about 850 µm, no more than about 800 µm, no more than about 750 µm, no more than about 700 µm, no more than about 650 µm, no more than about 600 µm, no more than about 550 µm, no more than about 500 µm, no more than about 450 µm, no more than about 400 µm, no more than about 350 µm, no more than about 300 µm, no more than about 250 µm, no more than about 200 µm, no more than about 150 µm, no more than about 100 µm, no more than about 90 µm, no more than about 80 µm, no more than about 70 µm, no more than about 60 µm, no more than about 50 µm, no more than about 40 µm, no more than about 30 µm, no more than about 20 µm, no more than about 10 µm, no more than about 9 µm, no more than about 8 µm, no more than about 7 µm, no more than about 6 µm, no more than about 5 µm, no more than about 4 µm, no more than about 3 µm, no more than about 2 µm, no more than about 1 µm, no more than about 500 nm, no more than about 400 nm, no more than about 300 nm, no more than about 200 nm, no more than about 100 nm, no more than about 90 nm, no more than about 80 nm, no more than about 70 nm, no more than about 60 nm, no more than about 50 nm, no more than about 40 nm, or no more than about 30 nm. Combinations of the above-referenced thickness values are also possible (e.g., at least about 20 nm and no more than about 1,000 µm or at least about 200 µm and no more than about 700 µm), inclusive of all values and ranges therebetween. In some embodiments, conductive coating 2364 can have a thickness of about 20 nm, about 30 nm, about 40 nm, about 50 nm, about 60 nm, about 70 nm, about 80 nm, about 90 nm, about 100 nm, about 200 nm, about 300 nm, about 400 nm, about 500 nm, about 600 nm, about 700 nm, about 800 nm, about 900 nm, about 1 µm, about 2 µm, about 3 µm, about 4 µm, about 5 µm, about 6 µm, about 7 µm, about 8 µm, about 9 µm, about 10 µm, about 20 µm, about 30 µm, about 40 µm, about 50 µm, about 60 µm, about 70 µm, about 80 µm, about 90 µm, about 100 µm, about 150 µm, about 200 µm, about 250 µm, about 300 µm, about 350 µm, about 400 µm, about 450 µm, about 500 µm, about 550 µm, about 600 µm, about 650 µm, about 700 µm, about 750 µm, about 800 µm, about 850 µm, about 900 µm, about 950 µm, or about 1,000 µm.

Figure 24A:
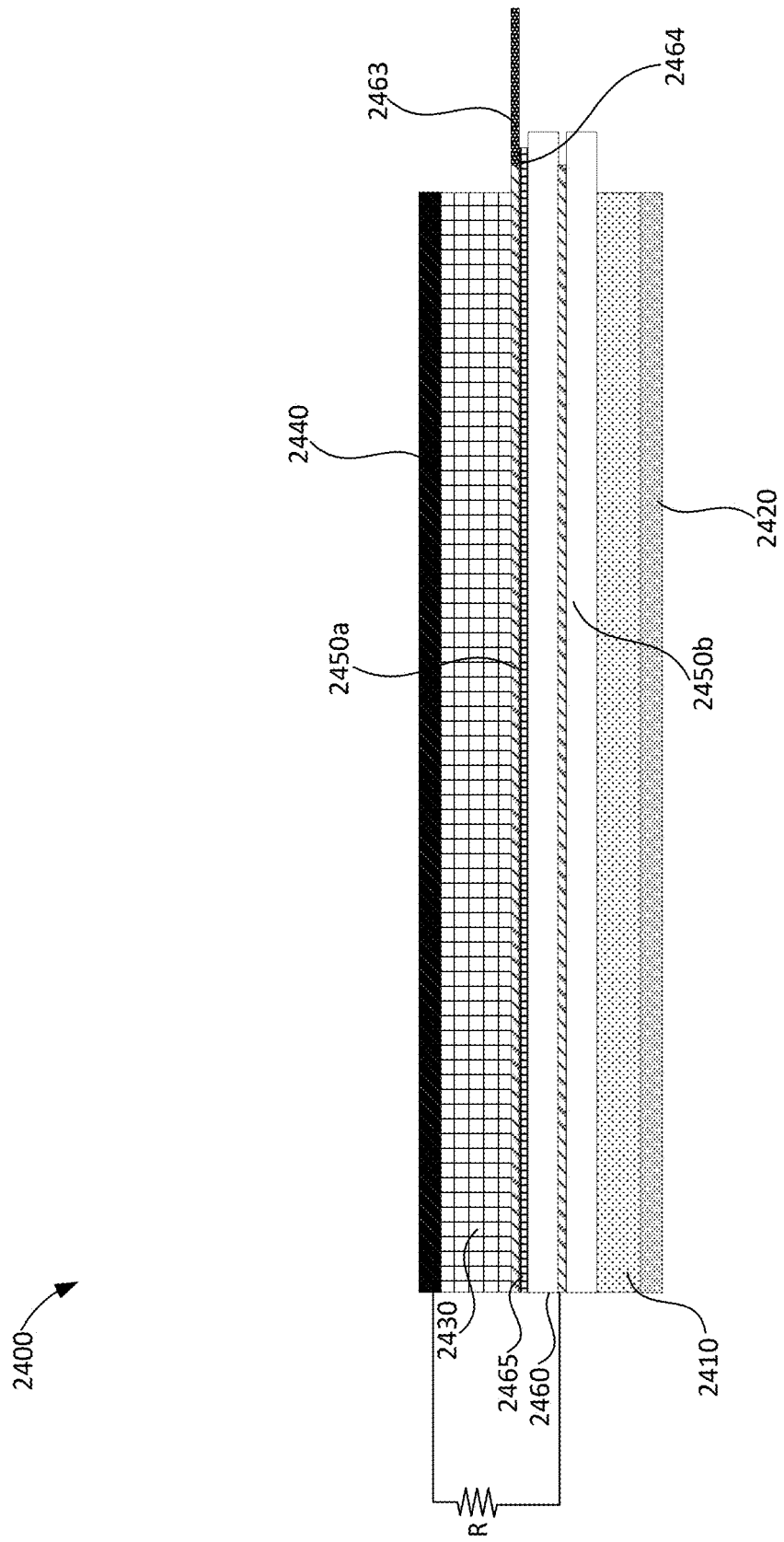
FIGS. 24A-24B are illustrations of an electrochemical cell with an interlayer, according to an embodiment.
Figure 24B:
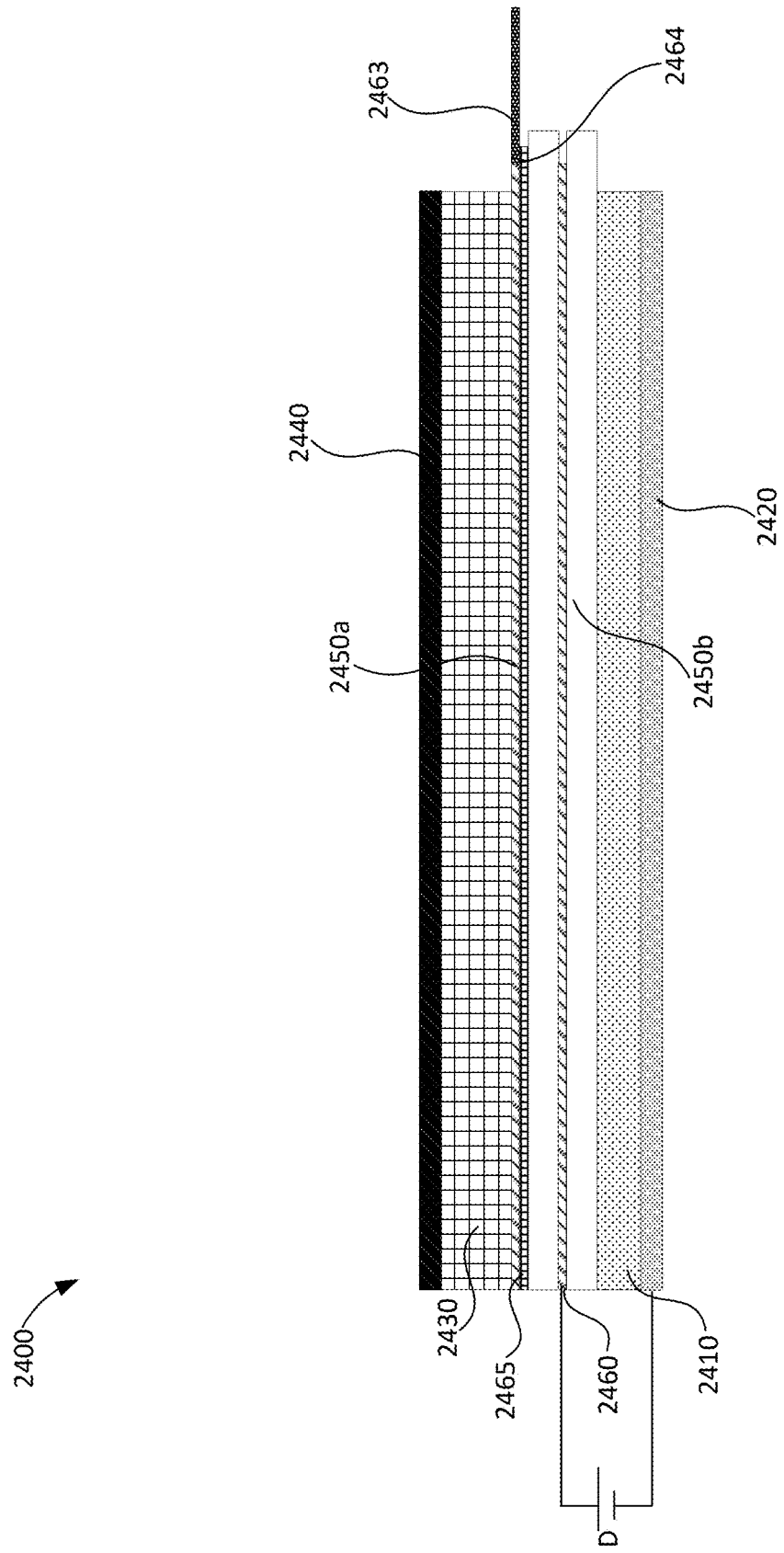

FIGS. 24A-24B are illustrations of an electrochemical cell 2400, according to an embodiment. As shown, the electrochemical cell 2400 includes an anode 2410 disposed on an anode current collector 2420, a cathode 2430 disposed on a cathode current collector 2440, a first separator 2450a and a second separator 2450b disposed between the anode 2410 and the cathode 2430, with a first interlayer 2460 disposed between the first separator 2450a and the second separator 2450b and a second interlayer 2465 disposed on the first separator 2450a opposite the first interlayer 2460. An interlayer tab 2463 is coupled to the interlayer 2460 and a conductive coating 2464 is disposed on the interlayer 2460. In some embodiments, the anode 2410, the anode current collector 2420, the cathode 2430, the cathode current collector 2440, the first separator 2450a, the second separator 2450b, and the interlayer 2460 can be the same or substantially similar to the anode 210, the anode current collector 220, the cathode 230, the cathode current collector 240, the first separator 250a, the second separator 250b, and the interlayer 260, as described above with respect to FIGS. 2A-2B. In some embodiments, the interlayer tab 2463 can be the same or substantially similar to the interlayer tab 1563, as described above with reference to FIGS. 15A-15B. In some embodiments, the interlayer 2465 can be the same or substantially similar to the interlayer 2360, as described above with reference to FIG. 23. In some embodiments, the conductive coating 2464 can be the same or substantially similar to the conductive coating 2364, as described above with reference to FIG. 23. Thus, certain aspects of the anode 2410, the anode current collector 2420, the cathode 2430, the cathode current collector 2240, the separator 2250, the interlayer 2260, the interlayer tab 2263, the conductive coating 2464, and the interlayer 2465 are not described in greater detail herein.

As shown, in FIG. 24A, a circuit is formed between the cathode current collector 2440 and the interlayer 2460 with a resistor R thereon. As shown in FIG. 24B, a circuit is formed between the interlayer 2460 and the anode current collector 2420 with a diode D thereon. In some embodiments, a constant voltage can be applied on either of the circuits shown via an external power supply, a BMS, or any other suitable means.

Figure 29A:
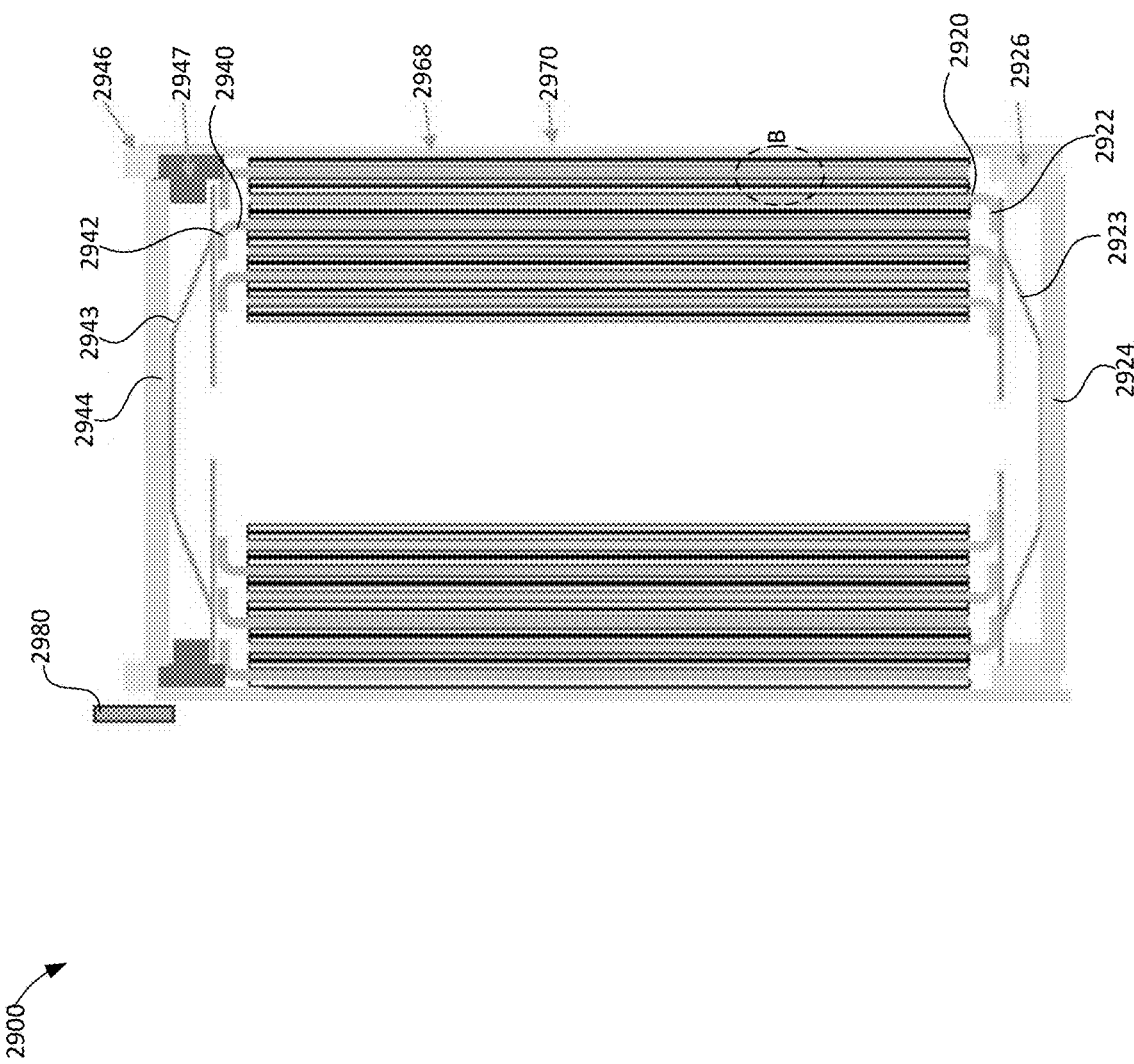
FIGS. 29A-29B are illustration of an electrochemical cell with an interlayer, according to an embodiment.
Figure 29B:
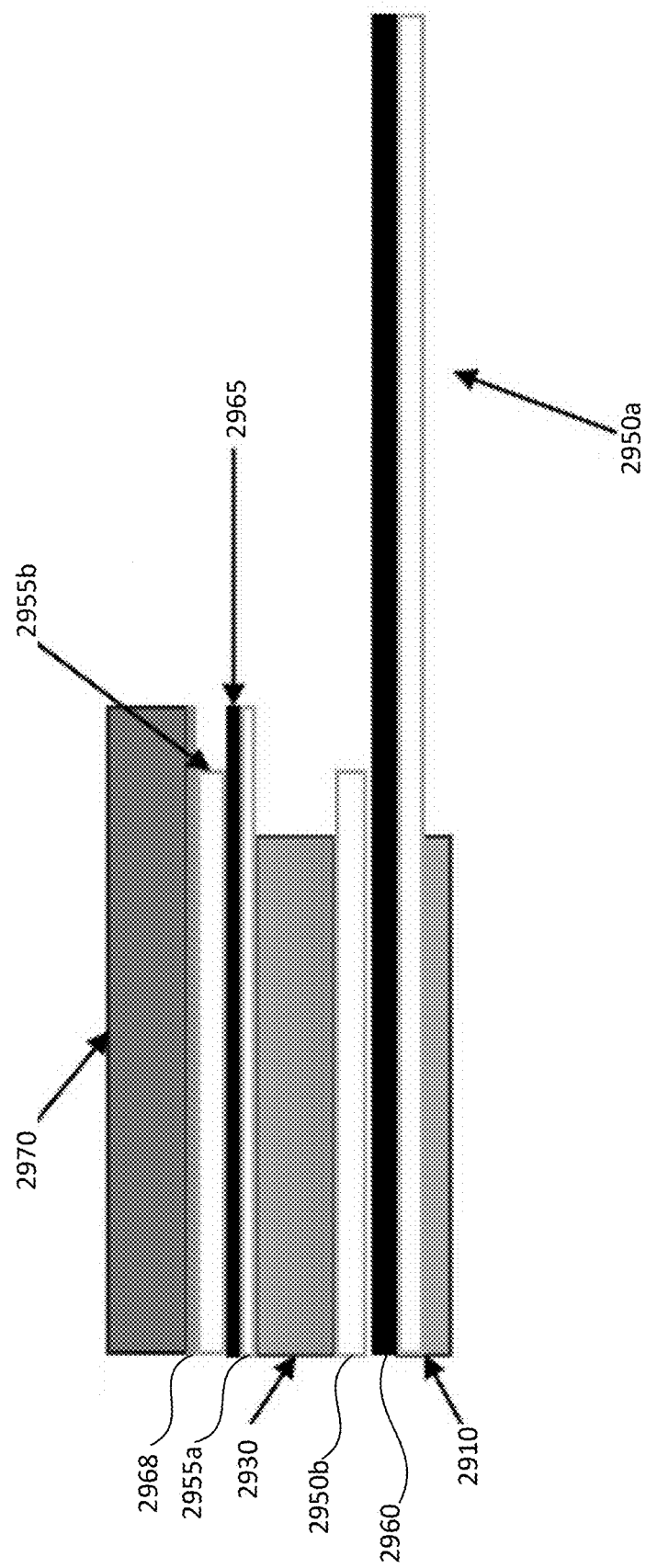

FIGS. 29A-29B are illustrations of an electrochemical cell 2900 with interlayers 2960, 2965, according to an embodiment. FIG. 29B shows a close-up view of the dotted region B, as indicated in FIG. 29A. As shown, the electrochemical cell 2900 includes an anode material 2910 and a cathode material 2930. A first separator 2950a is disposed on the anode material 2910 and a second separator 2950b is disposed on the cathode material 2930. The interlayer 2960 is disposed between the first separator 2950a and the second separator 2950b, and may be longer than the second separator 2950b. A third separator 2955a and a fourth separator 2955b are disposed on an outer surface of the cathode 2930 with a second interlayer 2965 disposed therebetween. The second interlayer 2965 may be longer than at least the third separator 2955a allowing the interlayer 2950a to be electrically coupled to the second interlayer 2965 and/or the second interlayer 2965 to be electrically coupled to a casing 2970. Moreover, this may allow the exposed portion of the second interlayer 2965 to be coupled to the casing 2970 without using a coupling tab, thus reducing material usage and cost.

The casing 2970 encases the aforementioned components of the electrochemical cell 2900. As shown, a bent portion 2922 of an anode current collector 2920 contacts a conductive plate 2923. A negative surface 2924, for example, an negative cap functioning as a "button" contacts the conductive plate 2923. The negative surface 2924 forms a first end or bottom end of the casing 2970 and closes a first side of the casing 2970. An insulator 2926 is disposed around a periphery of the negative surface 2924 and prevents electrical coupling between the negative surface 2924 and the rest of the casing 2970, such that the negative surface 2924 is electrically isolated from the casing 2970. A bent portion 2942 of a cathode current collector 2940 disposed on the cathode 2930 and contacts a conductive plate 2943. A positive surface 2944, for example, a positive cap functioning as a "button" contacts the conductive plate 2943. The positive surface 2944 forms a second end or top end of the casing 2970 and closes a second side of the casing 2970 opposite the first side. An insulator 2946 is disposed around a periphery of the positive surface 2944 and prevents electrical coupling between the positive surface 2944 and the rest of the casing 2970 such that the positive surface 2944 is electrically isolated from the casing 2970. The casing 2970 is electrically coupled to the interlayers 2960, 2965 via a conductive or semiconductive coating 2968. The casing 2970 is further separated from the conductive plate 2943 by another insulator or semi-insulator 2947, which also electrically isolates the positive surface 2944 from the conductive plate 2943.

In some embodiments, the anode material 2910, the anode current collector, the cathode material 2930, the cathode current collector, the bent portion 2942, the positive button 2944, the insulator 2946, the insulator 2926 the first separator 2950a, the second separator 2950b, the third separator 2955a, the fourth separator 2955b, the interlayer 2960, the conductive plate 2963, the interlayer 2965, and the casing 2970, can be the same or substantially similar to the anode material 1110, the anode current collector 1120, the cathode material 1130, the cathode current collector 1140, the bent portion 1142, the positive button 1144, the insulator 1146, the first separator 1150a, the second separator 1150b, the third separator 1155a, the fourth separator 1155b, the interlayer 1160, the conductive plate 1163, the interlayer 1165, the casing 1170, and the insulator 1177, as described above with reference to FIG. 11. Thus, certain aspects of the anode material 2910, the anode current collector, the cathode material 2930, the cathode current collector, the bent portion 2942, the positive button 2944, the insulator 2946, the insulator 2926 the first separator 2950a, the second separator 2950b, the third separator 2955a, the fourth separator 2955b, the interlayer 2960, the conductive plate 2963, the interlayer 2965, and the casing 2970 are not described in greater detail herein.

The electrochemical cell 2900 further includes a tab 2980 disposed on the outside of the casing 2970, the tab 2980 being conductive so that a voltage associated with the electrochemical cell, for example, associated with the interlayer 2965 can be monitored through the casing 2970 via the tab 2980, as previously described herein. The casing 2970 acts as a conductive surface for the tab 2980. The tab 2980 can couple to a BMS to manage the electrochemical cell 2900 to prevent and/or mitigate battery failure and/or undesirable battery operation. In some embodiments in which voltage monitoring is not desired, the tab 2980 may be excluded.

Figure 30:
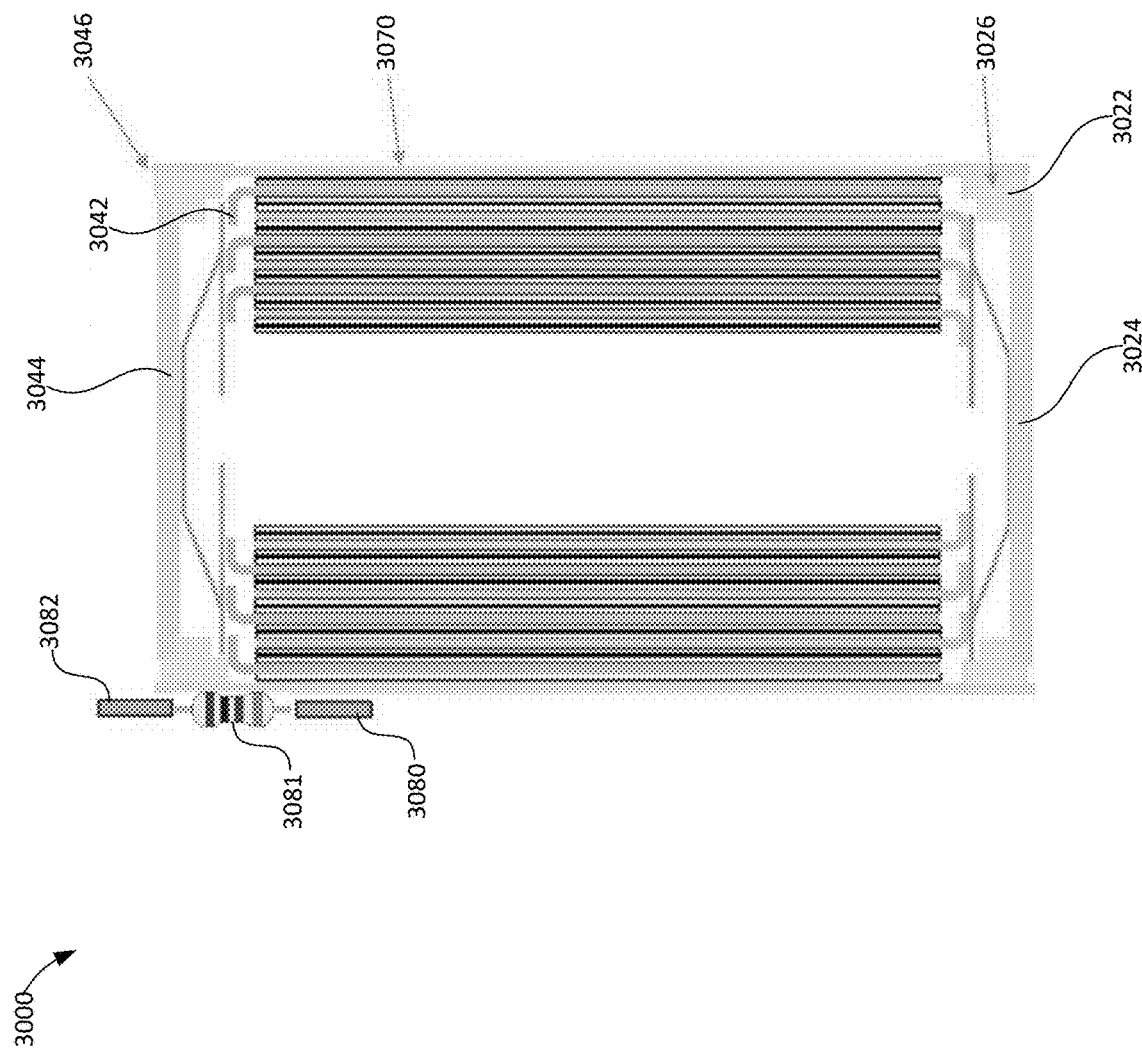
FIG. 30 is an illustration of an electrochemical cell with an interlayer, according to an embodiment.

FIG. 30 depicts a similar electrochemical cell 3000, which is structurally and/or functionally similar to the electrochemical cell 3000 as described in reference to FIGS. 29A-29B, and includes a casing 3070, a positive button 3044 electrically isolated from casing 3070 by insulator 3046, and negative button 3024 electrically isolated from casing 3070 by insulator 3026. Different from the electrochemical cell 2900, the tab 3080 of the electrochemical cell 3000 includes a resistor 3081 having a first end thereof electrically coupled to the tab 3080 (e.g., a first tab), and a second tab 3082 electrically coupled to a second end of the resistor 3081 opposite the first end. The resistor 3081 can allow for the voltage measured on the second tab 3082 to be lower, allowing for more accurate measurements. In some embodiments, the resistor 3081 can be included in the BMS instead of being coupled to the tabs 3080, 3082.

Figure 31A:
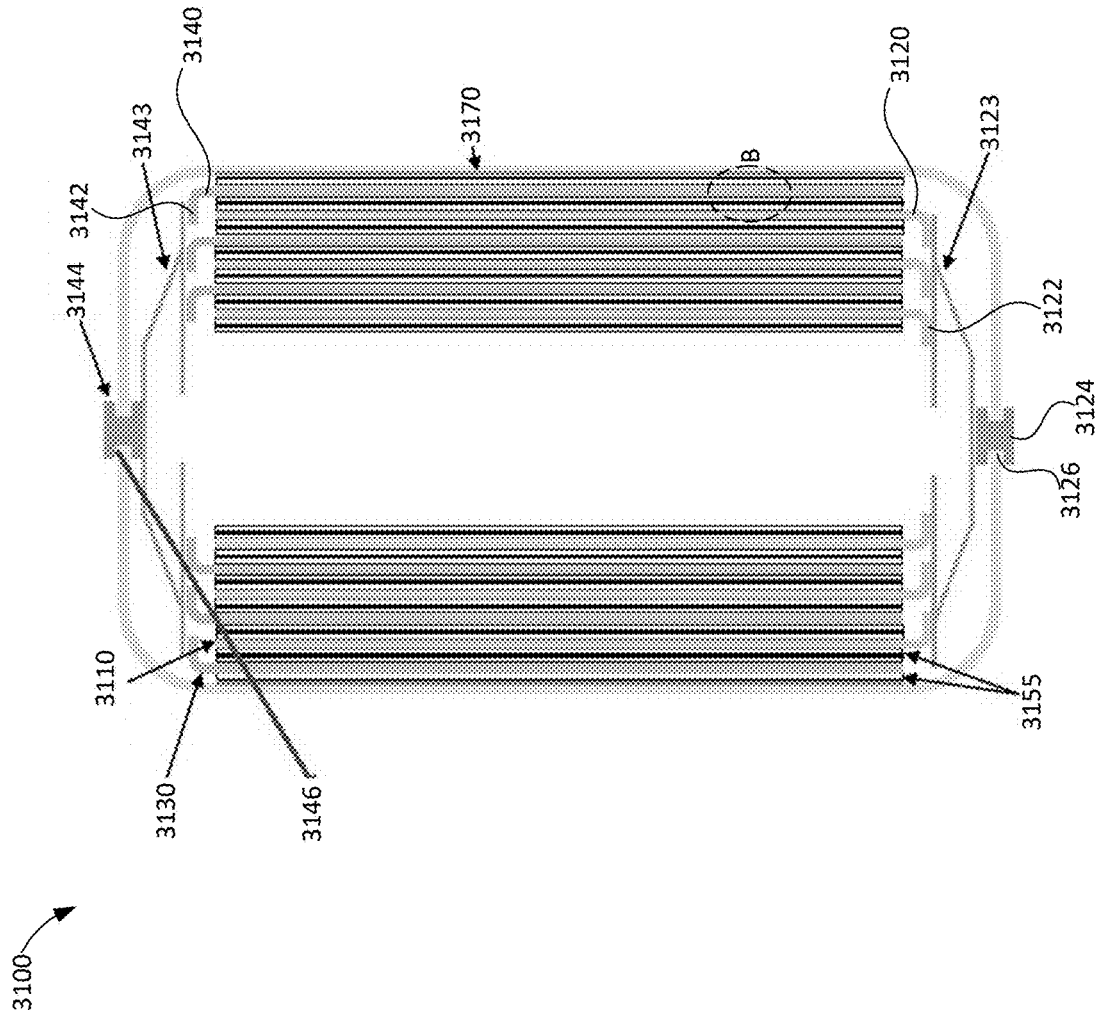
FIGS. 31A-31B are illustration of an electrochemical cell with an interlayer, according to an embodiment.
Figure 31B:
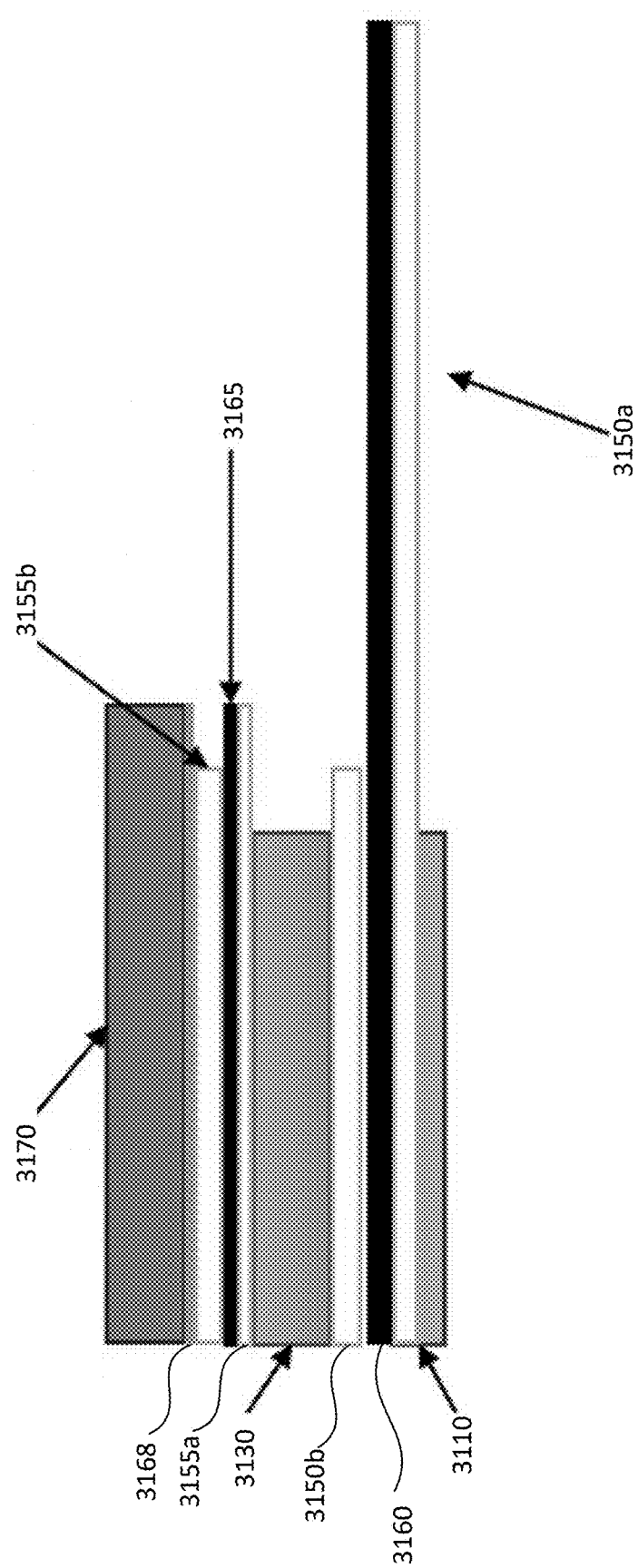

FIGS. 31A-31B are illustrations of an electrochemical cell 3100 with interlayers 3160, 3165, according to an embodiment. As shown, the electrochemical cell 3100 includes an anode material 3110 and a cathode material 3130. A first separator 3150a is disposed on the anode material 3110 and a second separator 3150b is disposed on the cathode material 3130. The interlayer 3160 is disposed between the first separator 3150a and the second separator 3150b and may be longer than at least the second separator 3150b, as previously described herein. A third separator 3155a and a fourth separator 3155b are disposed on an outer surface of the cathode 3130 with a second interlayer 3165 disposed therebetween. The second interlayer 3165 may be longer than at least the fourth separator 3155b, as previously described herein. A casing 3170 encases the aforementioned components of the electrochemical cell 3100. As shown, a bent portion 3122 of an anode current collector 3120 contacts a conductive plate 3123. A negative button 3124 contacts the conductive plate 3123, and can be disposed in an opening defined in a first end or bottom end of the casing 3170. An insulator 3126 is disposed around a radial periphery of the negative button 3124 between the casing 3170 and the negative button 3124 and prevents electrical coupling between the negative surface 3124 and the rest of the casing 3170. A bent portion 3142 of a cathode current collector 3140 disposed on the cathode 3130 contacts a conductive plate 3143. A positive button 3144 contacts the conductive plate 3143, and can be disposed in an opening defined in a second end or top end of the casing 3170 opposite the first end. An insulator 3146 is disposed around a radial periphery of the positive button 3144 between the casing 3170 and the positive button 3144 and prevents electrical coupling between the positive button 3144 and the rest of the casing 3170. The casing 3170 may be electrically coupled to the interlayers 3960, 3965 via a conductive or semiconductive coating 3968. FIG. 31B shows a close-up view of the dotted region B, as indicated in FIG. 31A.

In some embodiments, the anode material 3110, the anode current collector 3120, the cathode material 3130, the cathode current collector 3140, the bent portion 3142, the positive button 3144, the insulator 3146, the insulator 3126 the first separator 3150a, the second separator 3150b, the third separator 3155a, the fourth separator 3155b, the interlayer 3160, the conductive plate 3163, the interlayer 3165, and the casing 3170, can be the same or substantially similar to the anode material 2910, the anode current collector 2920, the cathode material 2930, the cathode current collector 2940, the bent portion 2942, the positive button 2944, the insulator 2946, the insulator 2926 the first separator 2950a, the second separator 2950b, the third separator 2955a, the fourth separator 2955b, the interlayer 2960, the conductive plate 2963, the interlayer 2965, and the casing 2970, as described above with reference to FIGS. 29A-29B. Thus, certain aspects of the anode material 3110, the anode current collector 3120, the cathode material 3130, the cathode current collector 3140, the bent portion 3142, the positive button 3144, the insulator 3146, the insulator 3126 the first separator 3150a, the second separator 3150b, the third separator 3155a, the fourth separator 3155b, the interlayer 3160, the conductive plate 3163, the interlayer 3165, and the casing 3170 are not described in greater detail herein.

As the positive button 3144 and the negative button 3124 are electrically insulated from the casing 3170 via the insulators 3146, 3126, the casing 3170 can function similar to the tab 2980 as described in reference to FIGS. 29-30. The casing 3170 can be used to determine an operating voltage associated with the electrochemical cell 3170, for example, associated with the interlayer 3165, as previously described herein. In some embodiments, the insulators 3146, 3126 are O-rings located around the positive button 3144 and the negative button 3124. This allows for nearly the entire surface of the electrochemical cell 3100 to be accessible for determining the voltage associated with the electrochemical cell 3170.

Figure 32A:
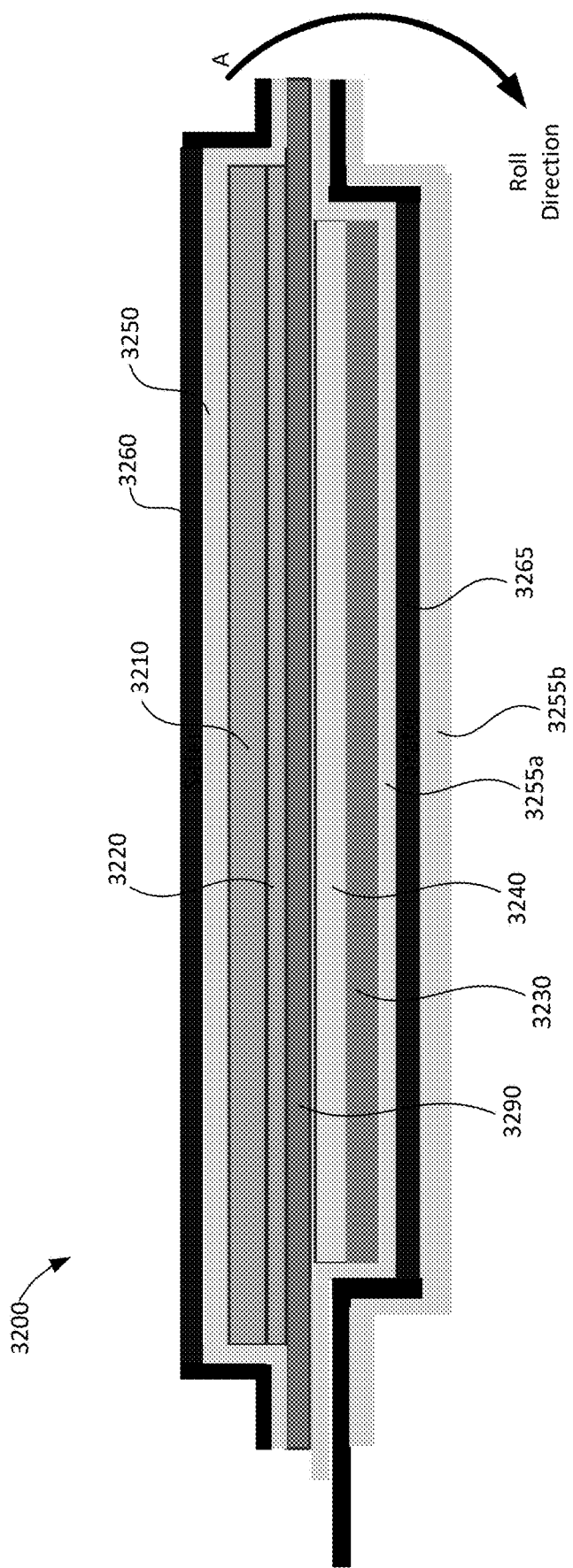
FIG. 32A is an illustration of an electrochemical cell including an interlayer, which is configured to be rolled or wound into a wound cell, according to an embodiment.
Figure 32B:
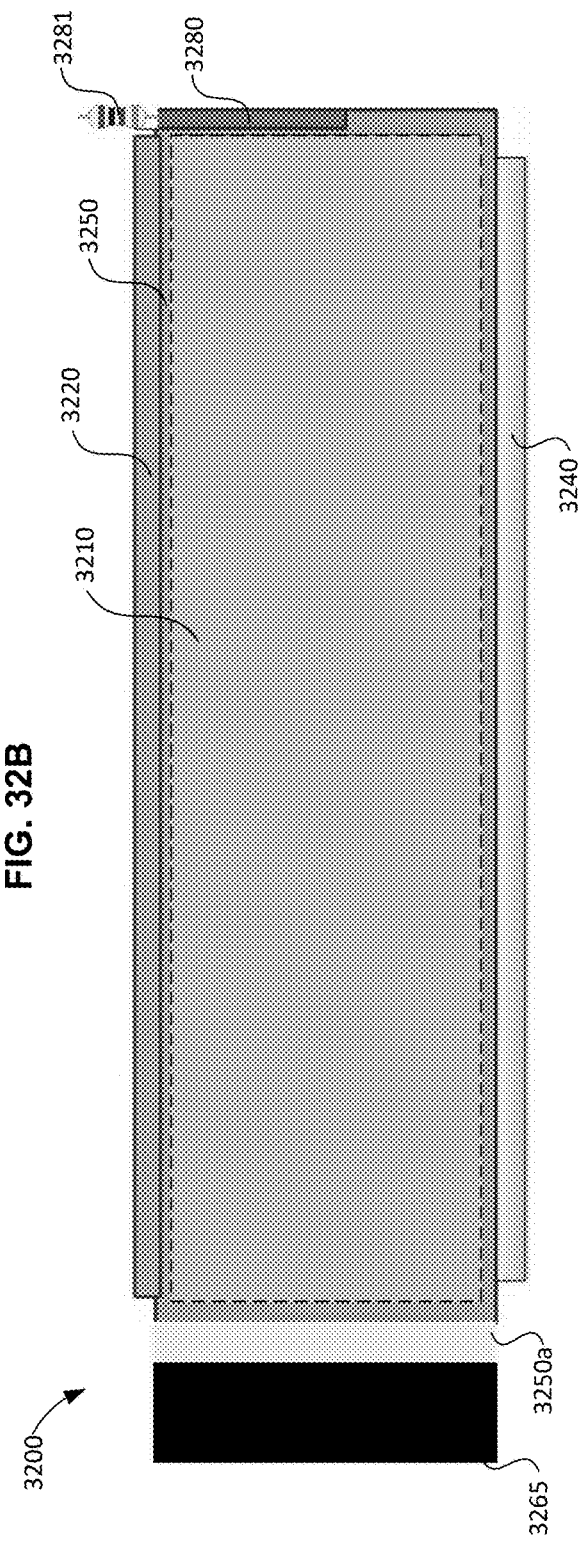
FIG. 32B is top view of the electrochemical cell from an anode side.
Figure 32C:
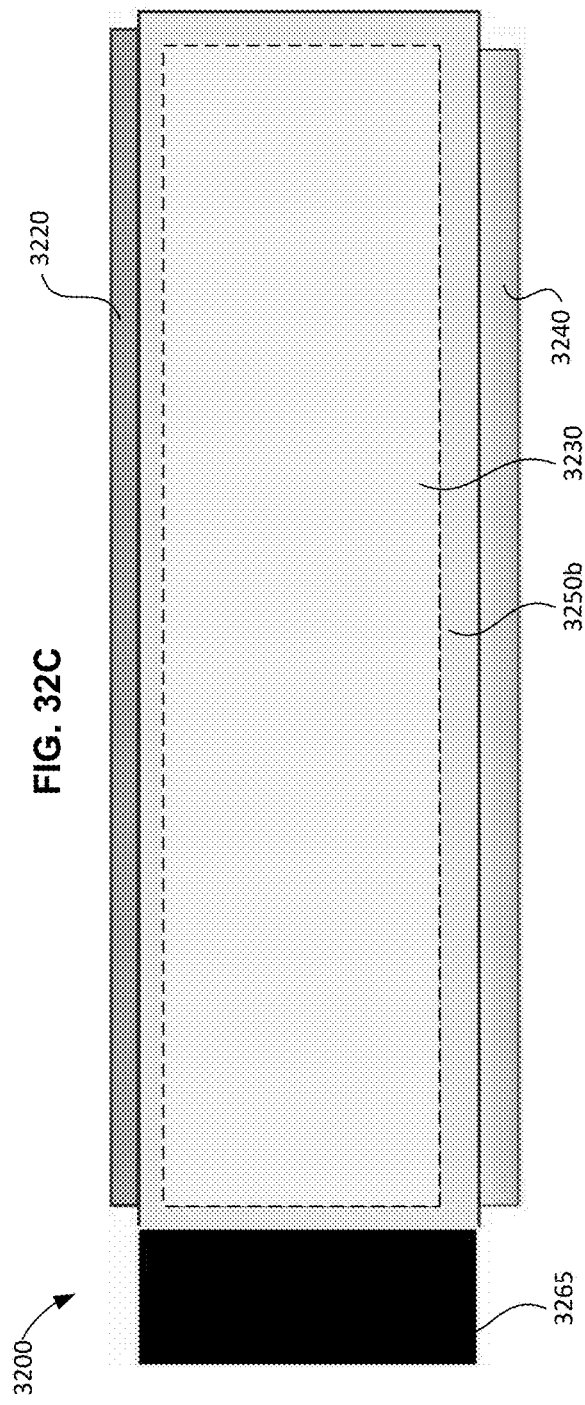
FIG. 32C is a bottom view of the electrochemical cell from a cathode side of the electrochemical cell.

FIGS. 32A-32C are illustrations of an electrochemical cell 3200 with interlayers 3260, 3265, according to an embodiment. In some embodiments, the electrochemical cell 3200 may be configured to be wound or rolled along the direction shown by the arrow A in FIG. 32A. As shown, the electrochemical cell 3200 includes an anode material 3210 and a cathode material 3230. In some embodiments, the anode material 3210 may include an alkali metal, for example, a lithium metal. A first separator 3250 is disposed on an outer surface of the anode material 3210 and a first interlayer 3260 is disposed on an outer surface of the first separator 3250. As shown in FIG. 32B, a tab 3280 may be electrically coupled to the first interlayer 3260. A resistor 3281 may be coupled to the tab 3280. The resistor 3281 may be disposed inside or outside the casing, and coupled to the first interlayer 3260 (e.g., via a feedthrough such as in embodiments in which the resistor 3281 is disposed outside the casing). In some embodiments, the first interlayer 3260 may be coupled to the cathode material 3230 via the resistor 3281. In some embodiments, the first interlayer 3260 may be configured to remove dendrites, as previously described herein. In some embodiments, the first interlayer 3260 may optionally, also be used for monitoring a voltage between the interlayer 3260 and the cathode material 3230, as previously described herein.

An inner surface of the anode material 3210 is disposed on an anode current collector 3220 (e.g., a copper current collector). An inner surface of the cathode material 3230 that is proximate to the anode material 3210 is disposed on a cathode current collector 3240 (e.g., an aluminum current collector). A second separator 3255a and a third separator 3255b (e.g., a ceramic layer) are disposed on an outer surface of the cathode material 3230 opposite the inner surface of the cathode material 3230 with a second interlayer 3265 disposed therebetween. The second interlayer 3265 may be longer than at least the third separator 3255b, and in some embodiments, also the second separator 3255a, as previously described herein. In some embodiments, the second interlayer 3265 may be configured for voltage monitoring and/or for discharging or deactivating the electrochemical cell 3200, for examples, when the voltage between the second interlayer 3265 and anode material 3210 or cathode material 3230 exceeds a predetermined threshold or is outside a predetermined range, as previously described herein. As shown in FIGS. 32A and 32C, a portion of the second interlayer 3265 that is longer than at least the third separator 3255b is exposed and may be coupled to the casing in which the electrochemical cell 3200 is disposed, as previously described herein.

In some embodiments, the anode material 3210, the anode current collector 3220, the cathode material 3230, the cathode current collector 3240, the first separator 3250, the second separator 3255a, the third separator 3255b, the first interlayer 3260, and the second interlayer 3265 can be the same or substantially similar to the anode material 2910, the anode current collector 2920, the cathode material 2930, the cathode current collector 2940, the first separator 2950a, the third separator 2955a, the fourth separator 2955b, and the interlayer 2960 as described above with reference to FIGS. 29A-29B. Thus, certain aspects of the anode material 3210, the anode current collector 3220, the cathode material 3230, the cathode current collector 3240, the first separator 3250, the second separator 3255a, the third separator 3255b, the first interlayer 3260, and the second interlayer 3265 are not described in greater detail herein.

An insulator layer 3290 is interposed between the anode current collector 3220 and the cathode current collector 3240. In some embodiments, the insulator layer 3290 may include a polymer layer (e.g., polyethylene, polytetrafluoroethylene, or any other electrically insulative polymer) and may include an adhesive disposed on both sides thereof (i.e., a double sided adhesive layer) allowing the insulator layer 3290 to be coupled (e.g., adhered or laminated) to each of the anode current collector 3220 and the cathode current collector 3240. As shown in FIGS. 32A and 32B, the first separator 3250 is disposed on or wraps around the edges of the anode material 3210 and the anode current collector 3220 about which the electrochemical cell 3200 is rolled or wound. Moreover, edges of the first separator 3250 are coupled to a first side of the insulator layer 3290 to form a first cavity within which the anode material 3210 is disposed. Similarly, as shown in FIGS. 32A and 32C, the second separator 3255a is disposed on or wraps around the edges of the cathode material 3230 and the cathode current collector 3240 about which the electrochemical cell 3200 is rolled or wound. Moreover, edges of the second separator 3255a are coupled to a second side of the insulator layer 3290 opposite the first side to form a second cavity within which the cathode material 3230 is disposed. In this manner, the anode material 3210 and the cathode material 3230 are wrapped or otherwise protected or isolated from each other via the combination of the separators 3250, 3255a, and the insulator layer 3290, inhibit the anode material 3210 and the cathode material 3230 from contacting each other when the electrochemical cell 3200 is rolled or wound to form a wound cell. In some embodiments, the electrochemical cell 3200 may be wound or rolled around a center rod that may conductive, semi-conductive, or resistive (e.g., as shown with respect to the electrochemical cell 3700 described in FIGS. 37A-37B).

Figure 33:
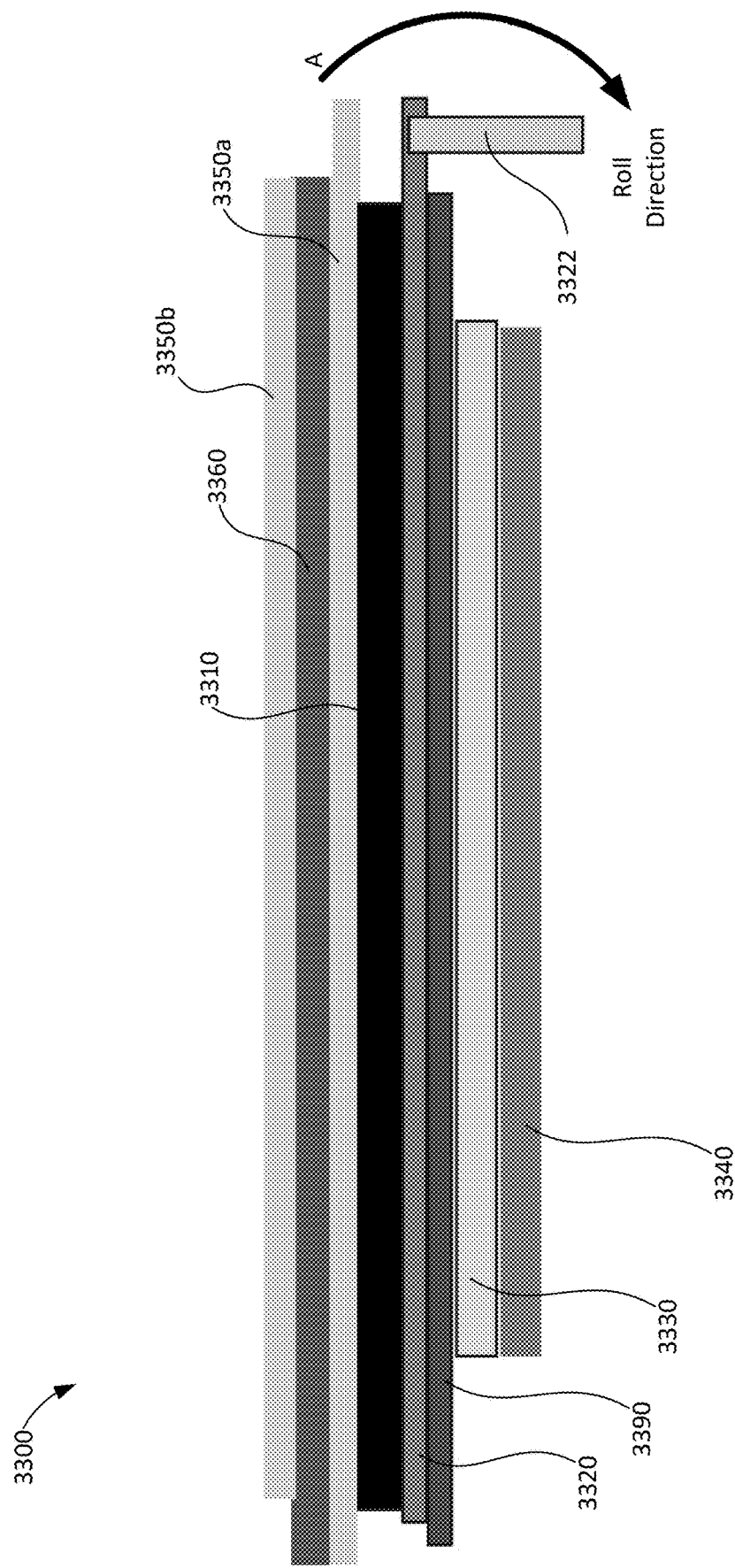
FIG. 33 is an illustration of an electrochemical cell including an interlayer, according to an embodiment.

FIG. 33 is an illustration of an electrochemical cell 3300 with an interlayer 3360, according to an embodiment. In some embodiments, the electrochemical cell 3300 may be configured to be wound or rolled along the direction shown by the arrow A in FIG. 33. As shown, the electrochemical cell 3300 includes an anode material 3310 and a cathode material 3330. In some embodiments, the anode material 3310 may include an alkali metal, for example, a lithium metal. A first separator 3350a and a second separator 3350b are disposed on an outer surface of the anode material 3310 with an interlayer 3360 disposed therebetween. An inner surface of the anode material 3310 may be disposed on an anode current collector 3320 (e.g., a copper current collector) that may have a tab 3322 extending therefrom or coupled to an outer edge thereof. In some embodiments, the anode material 3310 may include lithium metal. In such embodiments, the anode current collector 3320 may be excluded, and the tab 3322 may be directly coupled to an outer edge of the anode material 3310. In some embodiments, the tab 3322 may be coupled to the anode current collector 3320 or the anode material 3310 (e.g., via an adhesive or laminated thereto), prior to stacking the various components of the electrochemical cell 3300 to form the electrochemical cell 3300.

In some embodiments, the first interlayer 3360 may be coupled to the cathode material 3330, for example, via a resistor (e.g., the resistor 3281). In some embodiments, the interlayer 3350 may be configured to remove dendrites, as previously described herein. In some embodiments, the first interlayer 3360 may optionally, also be used for monitoring a voltage between the interlayer 3360 and the cathode material 3330, as previously described herein. In some embodiments, the interlayer 3360 may be longer than at least the second separator 3350 such that a portion of the interlayer 3360 is exposed, and may face outwards and remains exposed with respect to an axis about which the electrochemical cell 3300 is wound or rolled, after winding or rolling. The exposed portion of the interlayer 3360 may be coupled to a casing or can in which the electrochemical cell 3300 is disposed, or to a resistor, as previously described herein.

An inner surface of the cathode material 3330 that is proximate to the anode material 3310 is disposed on a cathode current collector 3340 (e.g., an aluminum current collector). In some embodiments, each of the anode material 3310 and the cathode material 3330 may be pre-compressed or pressed before stacking or including (e.g., via lamination) in the electrochemical cell stack 3300. This may provide the advantage of providing higher energy density, for example, by compacting or pre-pressurizing the anode material 3310 and cathode material 3330, because pressing both the anode material 3310 and the cathode material 3330 together once the electrochemical cell 3300 has been formed may be more challenging.

In some embodiments, the anode material 3310, the anode current collector 3320, the cathode material 3330, the cathode current collector 3340, the first separator 3350*a*, the second separator 3350*b*, and the interlayer 3360, can be the same or substantially similar to the anode material 2910, the anode current collector 2920, the cathode material 2930, the cathode current collector 2940, the first separator 2950*a*, the second separator 2950*b*, and the interlayer 2960 as described above with reference to FIGS. 29A-29B. Thus, certain aspects of the anode material 3310, the anode current collector 3320, the cathode material 3330, the cathode current collector 3340, the first separator 3350*a*, the second separator 3350*b*, and the interlayer 3360 are not described in greater detail herein.

An insulator layer 3390 is interposed between the anode current collector 3320 (or the anode material 3310 in embodiments in which the anode current collector 3320 is excluded) and the cathode current collector 3340. In some embodiments, the insulator layer 3390 may include a polymer layer (e.g., polyethylene, polyester, polytetrafluoroethylene, or any other electrically insulative polymer) and may include an adhesive disposed on both sides thereof (i.e., a double sided adhesive layer) allowing the insulator layer 3390 to be coupled or adhered (e.g., laminated) to each of the anode current collector 3320 (or the anode material 3310) and the cathode current collector 3340. The insulator layer 3390 may be substantially similar in structure and function to the insulator 3290 and therefore, not described in further detail herein.

Figure 35:
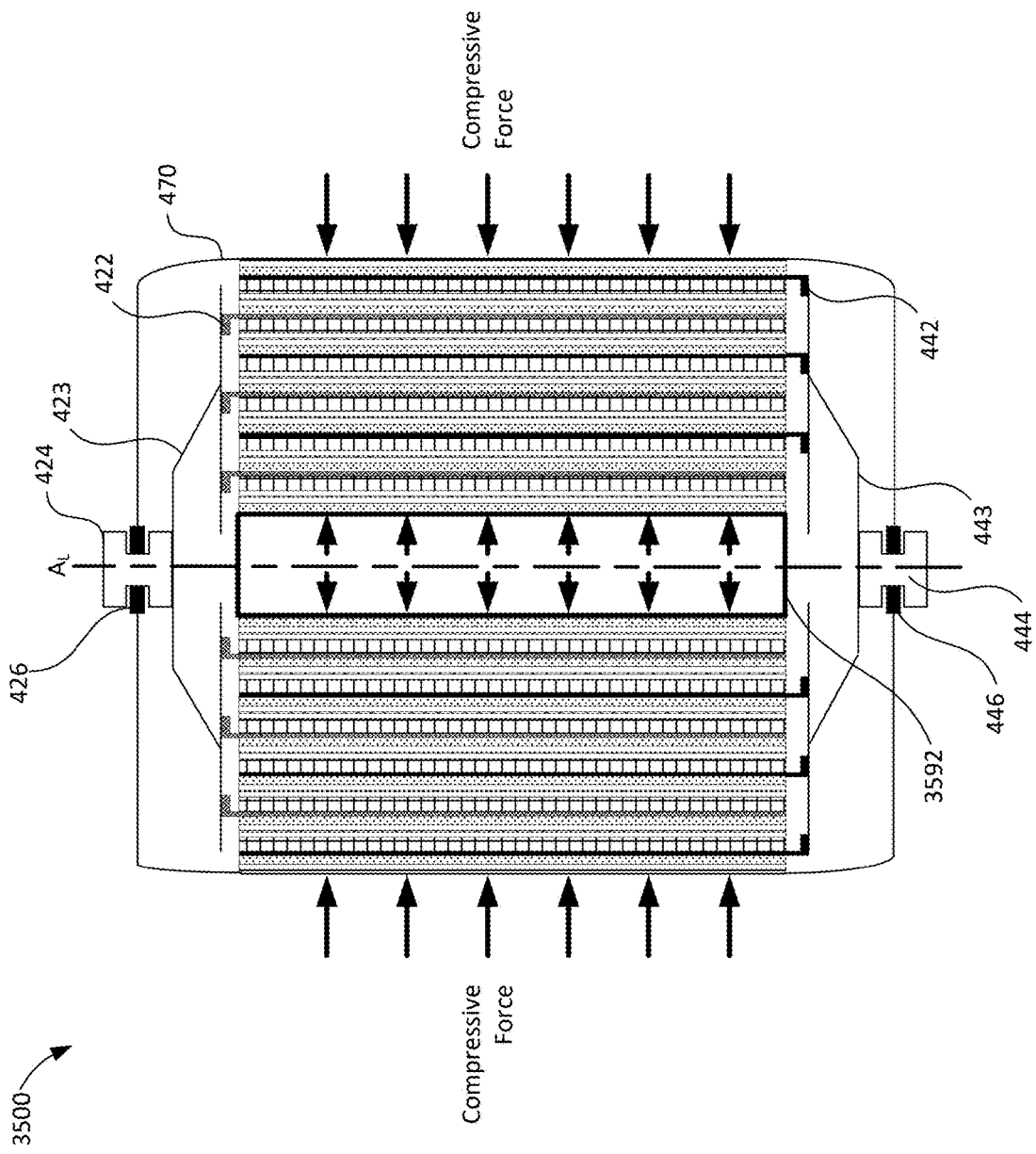
FIG. 35 is an illustration of an electrochemical cell with an interlayer and a center tube, according to an embodiment.

In some embodiments, an electrochemical cell may include a center tube. For example, FIG. 35 is an illustration of an electrochemical cell 3500 with interlayers 460, 465 and a center tube 3592, according to an embodiment. The electrochemical cell includes the components that are shown in detail in FIGS. 4A and 4B as previously described herein, with certain differences as described herein. Specifically, referring to FIG. 4B, the electrochemical cell 3500 includes the anode material 410 disposed on the anode current collector 420 and the cathode material 430 disposed on the cathode current collector 440. The first separator 450*a* is disposed on the anode material 410 and the second separator 450*b* is disposed on the cathode material 430. The interlayer 460 is disposed between the first separator 450*a* and the second separator 450*b*. The third separator 455*a* and the fourth separator 455*b* are disposed on the outer surface of the cathode current collector 440 with the second interlayer 465 disposed therebetween. The casing 470 encases the aforementioned components of the electrochemical cell 400. The bent portion 422 of the anode current collector 420 contacts the conductive plate 423. The negative button 424 is coupled to the conductive plate 423. The insulator 426 is disposed around the negative button 424, and the bent portion 442 of the cathode current collector 440 contacts the conductive plate 443. The positive button 444 is coupled to the conductive plate 443. The insulator 446 is disposed around the positive button 444, electrically isolating the positive button 444 from the rest of the casing 470. The insulator 463 is disposed around the outside of the separator 455*b*, isolating the interlayer 465 from the casing 470. The interlayer button 464 is electrically coupled to the interlayer 465 and the interlayer 460. The insulator 466 is disposed around the interlayer button 464, electrically isolating the interlayer button 464 from the rest of the casing 470.

Different from the electrochemical cell 400, the electrochemical cell 3500 includes the center tube 3592 or mandrel disposed in the casing 470 along a longitudinal axis $A_L$ of the electrochemical cell 3500, with the components of the electrochemical cell 3500 wound therearound to form a wound cell or a jelly roll. In other words, the center tube 3592 is disposed co-axially within the wound cell. The center tube 3592 is configured to apply a compressive force on the rolled components of the electrochemical cell 3500 to improve performance and enable the wound electrochemical cell to maintain its shape within the casing 470. Expanding further, the center tube 3592 may exert a radially outward force on the wound cell or jelly roll as shown by the arrows in FIG. 35. Since the wound cell is constrained in the casing 470, the casing applies an inward compressive force on the wound cell as shown by the arrows in FIG. 35, thus causing the wound cell to be under compression.

The center tube 3592 can be formed from any suitable material, for example, a strong and rigid material to apply a compressive force on the wound cell or jelly roll. Suitable materials may include, but are not limited to metals such as iron, titanium, aluminum, stainless steel, copper, nickel-coated copper, gold, etc., polymers such as polytetrafluoroethylene (PTFE), polyurethane (PU), polyethylene (PE), polypropylene (PP), etc., conductive polymers such as polypyrrole, poly(3,4-ethylenedioxythiophene) (PEDOT), polyaniline (PANi), etc., ceramics (e.g., aluminum oxide), any other suitable material or any suitable combination thereof. In some embodiments, the center tube 3592 is configured to have a mechanical strength to resist deformation for providing a compressive force on the wound cell or jelly roll. In some embodiments, the center tube 3592 may be configured to have a mechanical strength sufficient to apply a compressive force in a range of about 0.1 MPa to about 40 MPa, inclusive (e.g., 0.1, 0.5, 1, 5, 10, 15, 20, 25, 30, 35, or 40 MPa, inclusive).

In some embodiments, the center tube 3592 may be configured to shrink and/or expand co-axially with during charge of the electrochemical cell 3500 (associated with volumetric expansion of the cathode material 430) or discharge (associated with volumetric contraction of the cathode material 430). In some embodiments, the center tube 3592 is solid. In some embodiments, the center tube 3592 may be hollow. In such embodiments, the center tube 3592 may have a wall thickness in a range of about 0.1 mm to about 2 mm, inclusive (e.g., 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 mm, inclusive). In some embodiments, the center tube 3592 may be, or include at least a portion that is conductive or semi-conductive.

Figure 36A:
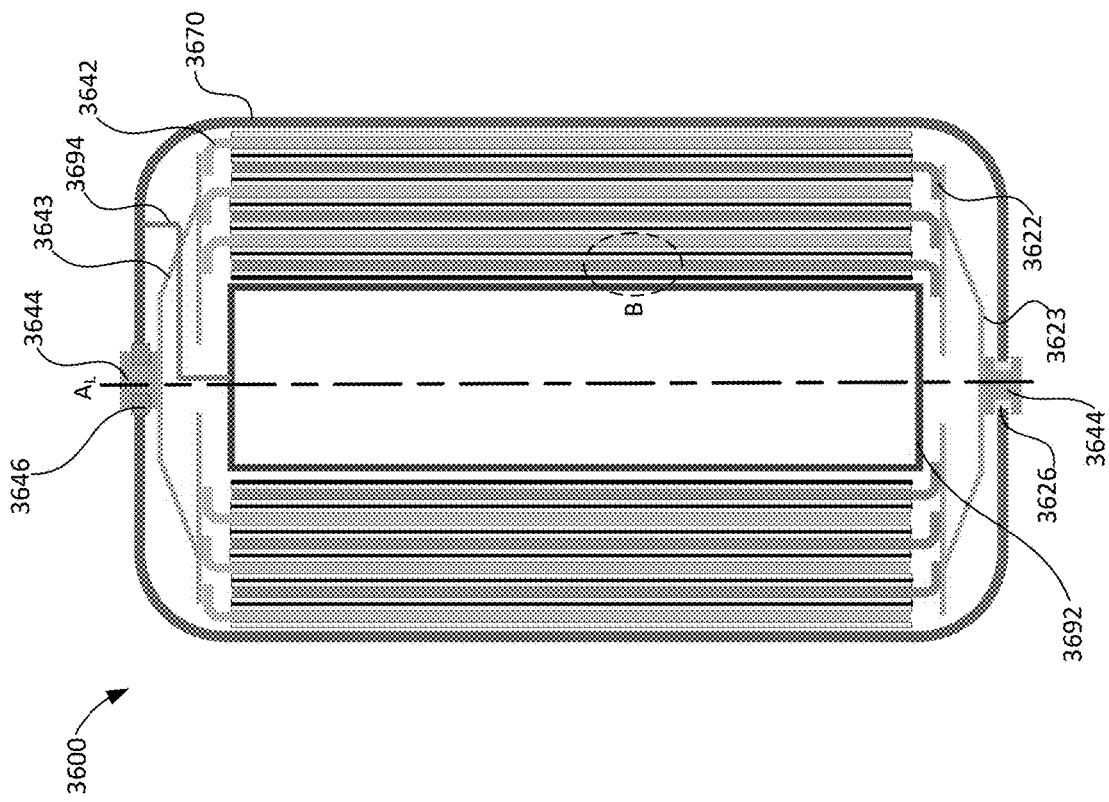
FIGS. 36A-36B are illustrations of an electrochemical cell with an interlayer and a center tube, according to an embodiment.
Figure 36B:
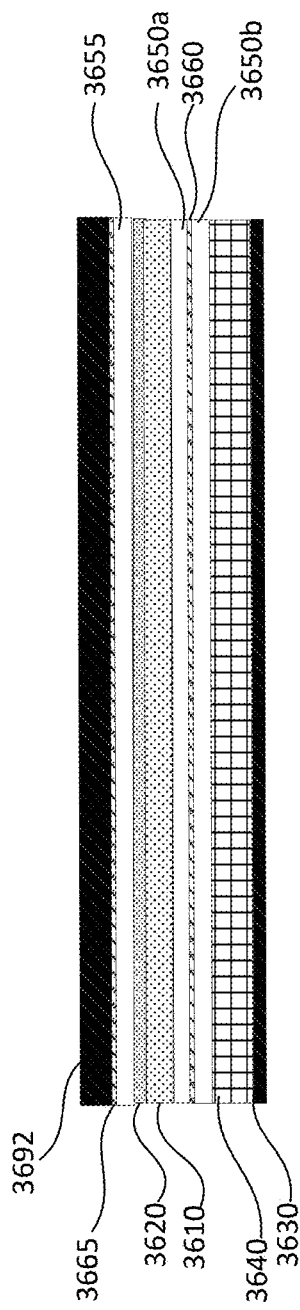

In some embodiments, an electrochemical cell may include a center tube that may be used to form an electrical interface with an interlayer and/or to a portion of a casing in which the electrochemical cell is disposed. For example, FIGS. 36A-36B are illustrations of an electrochemical cell 3600 with interlayers 3660, 3665 and including a center tube 3692, according to an embodiment. As shown, the electrochemical cell 3600 includes an anode material 3610 disposed on an anode current collector 3620 and a cathode material 3630 disposed on a cathode current collector 3640. A first separator 3650a is disposed on the anode material 3610 and a second separator 3650b is disposed on the cathode material 3630. The first interlayer 3360 is disposed between the first separator 3650a and the second separator 3650b. A third separator 3655 is disposed on an inner surface of the anode current collector 3620 that is oriented away from the cathode material 3630 with the second interlayer 3665 disposed on the third separator 3655. A casing 3670 encases the aforementioned components of the electrochemical cell 3600.

As shown, a bent portion 3622 of the anode current collector 3620 contacts a conductive plate 3623. A negative button 3624 is coupled to the conductive plate 3623. An insulator 3626 is disposed around the negative button 3624, electrically isolating the negative button 3624 from the rest of the casing 3670. A bent portion 3642 of the cathode current collector 3640 contacts a conductive plate 3643. A positive button 3644 is coupled to the conductive plate 3643. An insulator 3646 is disposed around the positive button 3644, electrically isolating the positive button 3644 from the rest of the casing 3670.

In some embodiments, the anode material 3610, the anode current collector 3620, the bent portion 3622, the negative button 3624, the insulator 3626, the cathode material 3630, the cathode current collector 3640, the bent portion 3642, the positive button 3644, the insulator 3646, the first separator 3650a, the second separator 3650b, the third separator 3655, the interlayer 3660, the interlayer 3665, and the casing 3670 can be the same or substantially similar to the anode material 310, the anode current collector 320, the bent portion 322, the negative button 324, the insulator 326, the cathode material 330, the cathode current collector 340, the bent portion 342, the positive button 344, the insulator 346, the first separator 350a, the second separator 350b, the third separator 355a, the interlayer 360, the interlayer 365, and the casing 370, as described above with reference to FIGS. 3A-3B. Thus, certain aspects of the anode material 3610, the anode current collector 3620, the bent portion 3622, the negative button 3624, the insulator 3626, the cathode material 3630, the cathode current collector 3640, the bent portion 3642, the positive button 3644, the insulator 3646, the first separator 3650a, the second separator 3650b, the third separator 3655, the interlayer 3660, the interlayer 3665, and the casing 3670 are not described in greater detail herein.

A center tube 3692 or mandrel disposed in the casing 3670 along a longitudinal axis $A_L$ of the electrochemical cell 3600, with the components of the electrochemical cell 3600 wound therearound to form a wound cell or a jelly roll. The center tube 3692 may be formed from an electrically conductive material (e.g., metals such as iron, titanium, aluminum, stainless steel, copper, nickel-coated copper, gold, etc.) or conductive polymers (e.g., polypyrrole, poly(3,4-ethylenedioxythiophene) (PEDOT), polyaniline (PANi)), or formed from an insulating material (e.g., plastics or polymers such as polytetrafluoroethylene (PTFE), polyurethane (PU), polyethylene (PE), polypropylene (PP), or ceramics such as aluminum oxide) and coated with a conductive material (e.g., metals or conductive polymer). Different from the center tube 3592, the center tube 3692 includes a center tube tab 3694 electrically coupled to the casing 3470.

FIG. 36B shows a close-up view of the dotted region B, as indicated in FIG. 36A. Different from the various embodiments described herein, the second interlayer 3655 disposed on the third separator 3655 that is coupled to the anode current collector 3620, faces the center tube 3692 is in electrically coupled thereto, for example, in physical contact therewith. In this manner, the second interlayer 3665 is electrically coupled to the casing 3670 via the center tube 3692 and the center tube tab 3694, allowing electrical interface with the second interlayer 3665 via the casing 3670, as previously described herein. In some embodiments, the center tube 3692 may also be configured to apply a compressive force on the wound cell or jelly roll in cooperation with the casing 3670, as previously described herein with respect to the center tube 3592.

FIGS. 37A-37B are illustrations of an electrochemical cell 3700 with interlayers 3760, 3765, and a center tube 3792, according to an embodiment. FIG. 37A shows the electrochemical cell 3700 before being rolled or wound, and FIG. 37B shows the electrochemical cell 3700 after being rolled or wound around the center tube 3792 (center tube not shown in FIG. 37B) along the direction shown by the arrow A in FIG. 37A, and coupled to a casing 3770.

As shown, the electrochemical cell 3700 includes an anode material 3710 and a cathode material 3730. In some embodiments, the anode material 3710 may include an alkali metal, for example, a lithium metal. A first separator 3750 is disposed on an outer surface of the anode material 3710 and a first interlayer 3760 is disposed on an outer surface of the first separator 3750. A tab may be electrically coupled to the first interlayer 3760. As show in FIG. 37B, a resistor 3781 may be coupled to the tab. The resistor 3781 may be disposed inside or outside the casing 3770 and coupled to the first interlayer 3760 (e.g., via a feedthrough such as in embodiments in which the resistor 3781 is disposed outside the casing 3770). In some embodiments, the first interlayer 3760 may be coupled to the anode material 3710 via the resistor and an anode current collector 3720, for example, to allow dendrite removal and/or voltage monitoring, as previously described herein. In some embodiments, the second interlayer 3765 may be coupled to the casing 3770 (e.g., via the center tube 3792), as previously described herein. As shown in FIG. 37B, the second interlayer 3765 may be electrically coupled to the anode current collector 3720 via the casing 3770, for example, to allow monitoring of a voltage V therebetween.

An inner surface of the anode material 3710 is disposed on the anode current collector 3720 (e.g., a copper current collector). An inner surface of the cathode material 3730 that is proximate to the anode material 3710 is disposed on a cathode current collector 3740 (e.g., an aluminum current collector). A second separator 3755a and a third separator 3755b (e.g., a ceramic layer) are disposed on an outer surface of the cathode material 3730 opposite the inner surface of the cathode material 3730 with a second interlayer 3765 disposed therebetween. The second interlayer 3765 may be longer than at least the third separator 3755b, and in some embodiments, also the second separator 3755a, as previously described herein. The anode material 3710, the anode current collector 3720, the cathode material 3730, the cathode current collector 3740, the first separator 3750, the second separator 3755a, the third separator 3755b, the first interlayer 3760, and the second interlayer 3765 are wound around the center tube 3792, for example, a conductive, semi-conductive, or resistive center tube, as previously described herein. An insulator layer 3790 is interposed between the anode current collector 3720 and the cathode current collector 3740. The insulator layer 3790 may be substantially similar to the insulator layer 3290 described with respect to FIGS. 32A-32C and therefore, not described in further detail herein.

In some embodiments, the anode material 3710, the anode current collector 3720, the cathode material 3730, the cathode current collector 3740, the first separator 3750, the second separator 3755a, the third separator 3755b, the first interlayer 3760, and the second interlayer 3765 can be the same or substantially similar to the anode material 2910, the anode current collector 2920, the cathode material 2930, the cathode current collector 2940, the first separator 2950a, the third separator 2955a, the fourth separator 2955b, and the interlayer 2960 as described above with reference to FIGS. 29A-29B. Moreover, the center tube 3792 may be substantially similar to the center tube 3592 described with respect to FIG. 35, or the center tube 3692 described with respect to FIG. 36A-36B. Thus, certain aspects of the anode material 3710, the anode current collector 3720, the cathode material 3730, the cathode current collector 3740, the first separator 3750, the second separator 3755a, the third separator 3755b, the first interlayer 3760, the second interlayer 3765, and the center tube 3792 are not described in greater detail herein.

Examples

Figure 25A:
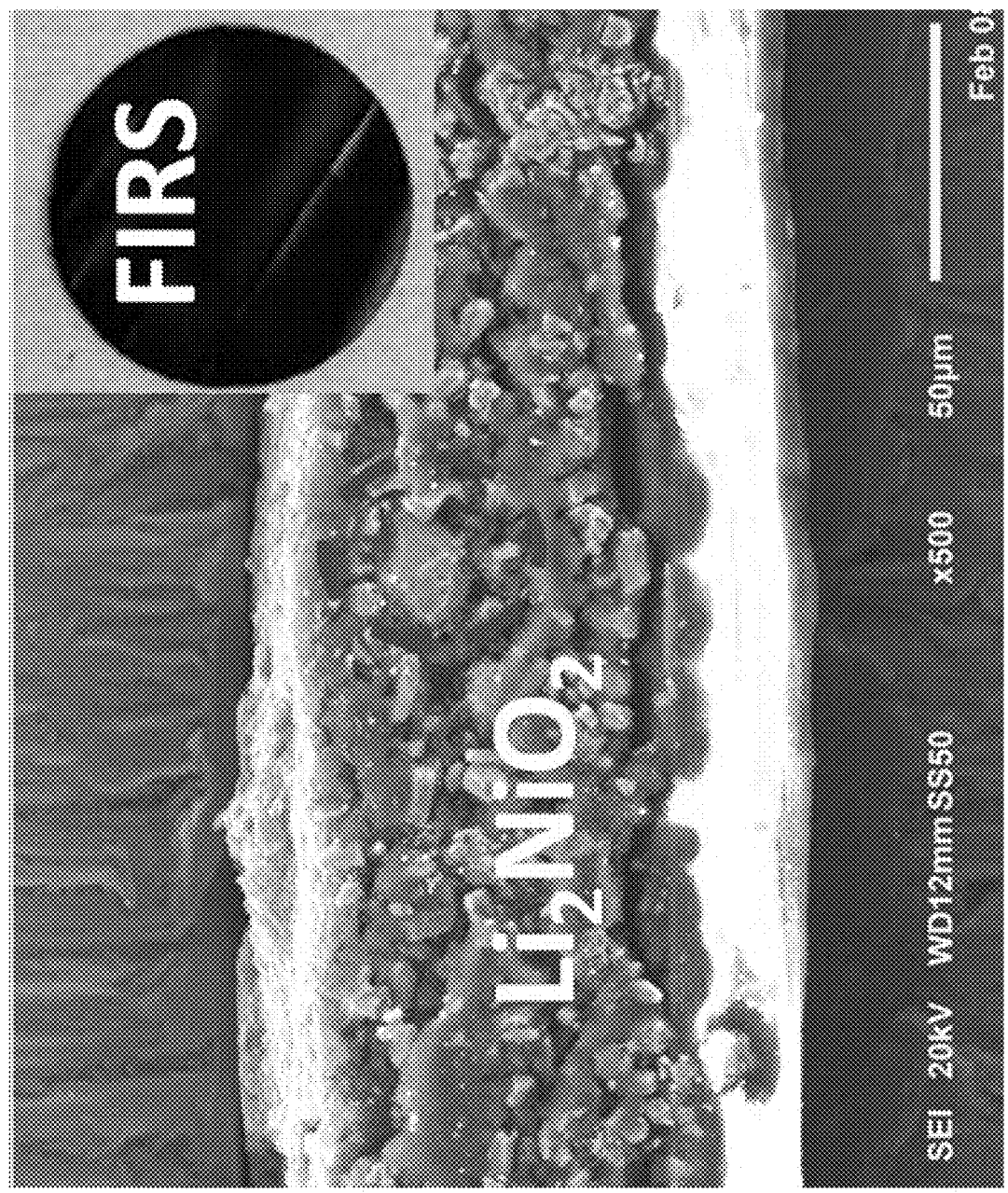
FIGS. 25A-25C show images of a functional ion replenishable separator (FIRS) system in dormant and active states, with associated data.
Figure 25B:
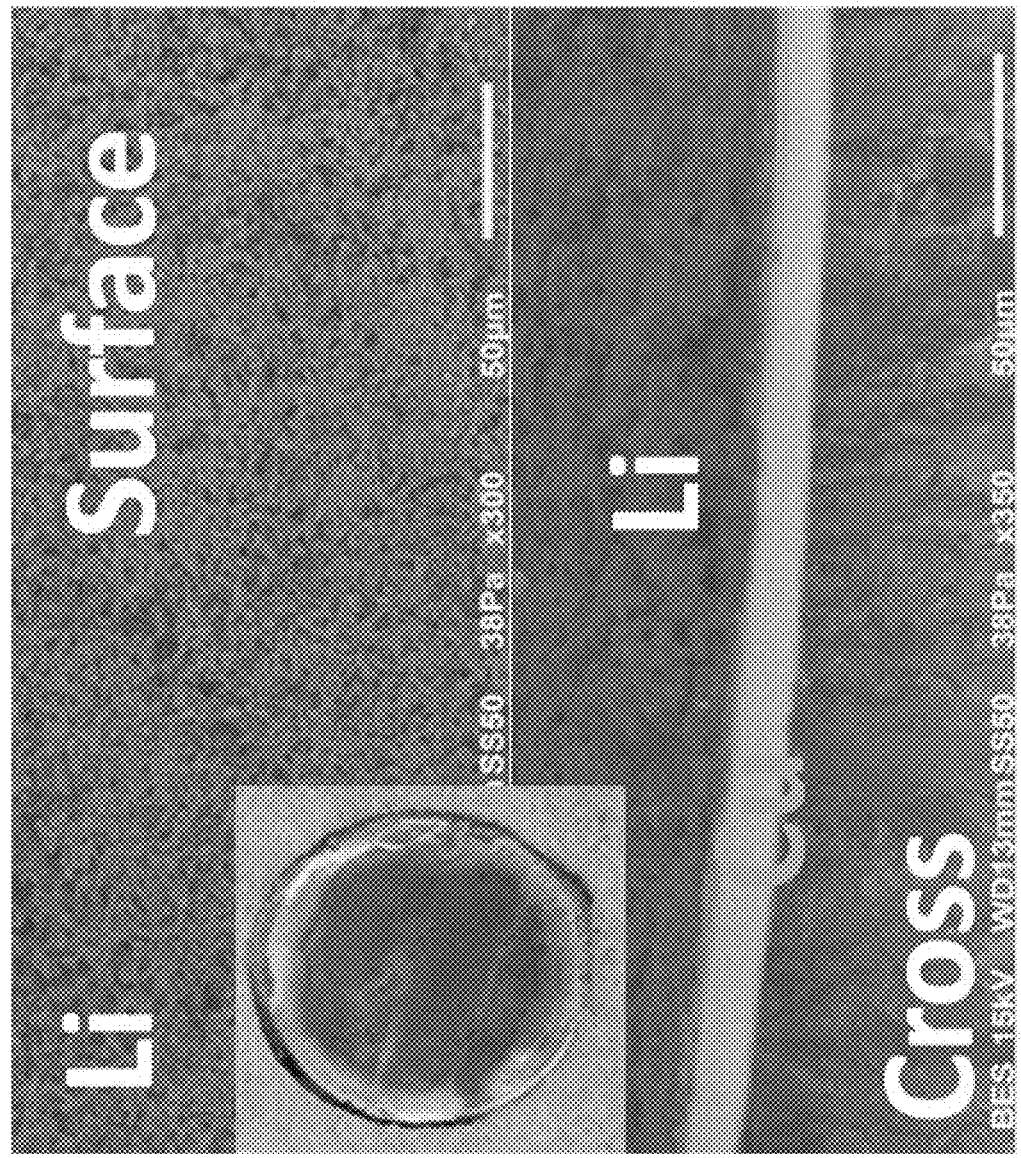
Figure 25C:
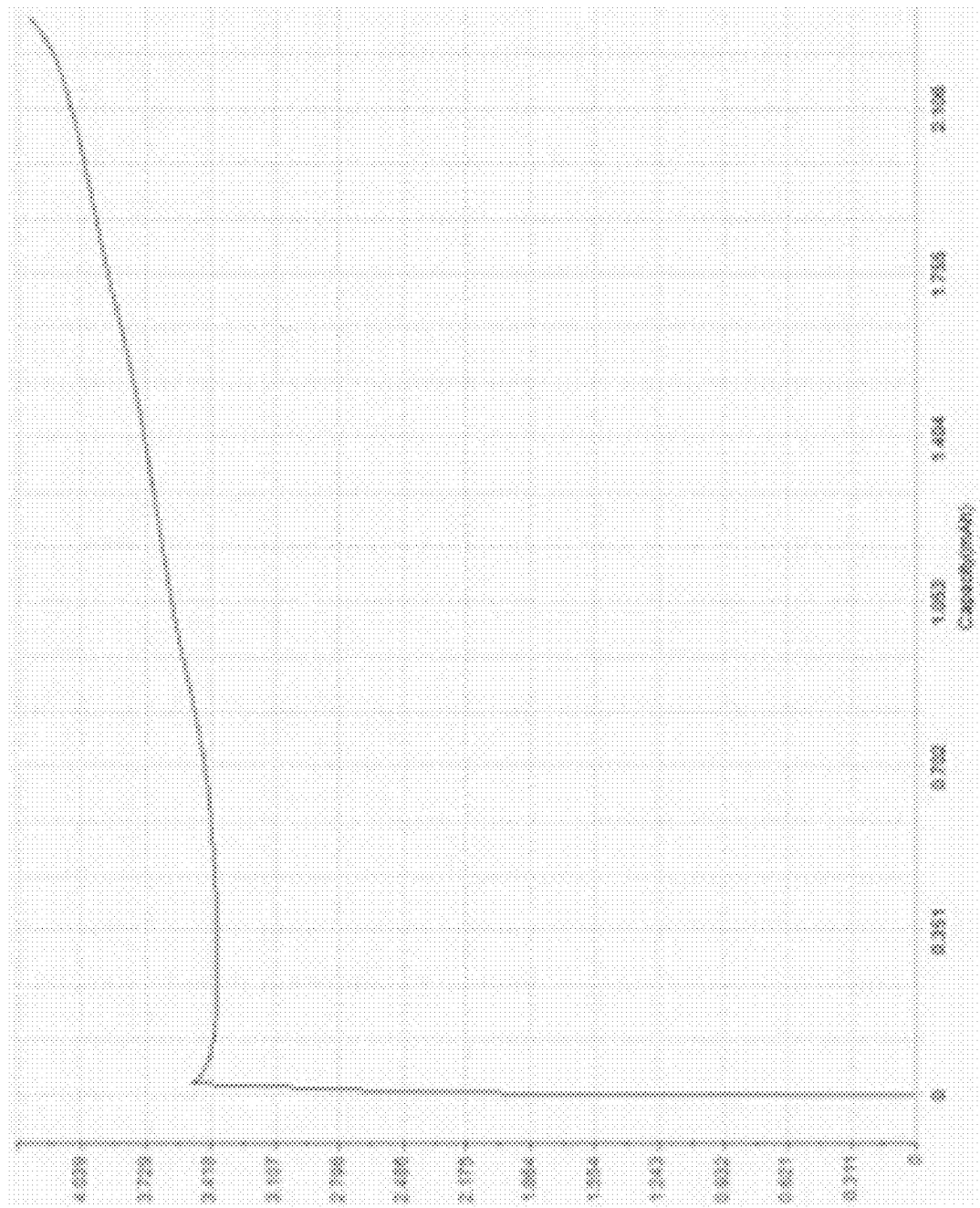

FIGS. 25A and 25B show a FIRS in a dormant state and an active state, respectively. The FIRS in FIG. 15A has a conservative composition, including about 60 wt % active material, 20 wt % carbon, and 20 wt % binder. $Li_2NiO_2$ is used as the lithium source. FIG. 25B shows a successful lithium deposition. Delithiation occurs around 3.5-4.3V. As shown in FIG. 25B, the SEI is fully formed. The graph in FIG. 25C shows a composition of about 373 mAh/g or 1.37 mAh/cm$^2$ while delithiating between 3.5 V and 4.3 V.

Figure 26A:
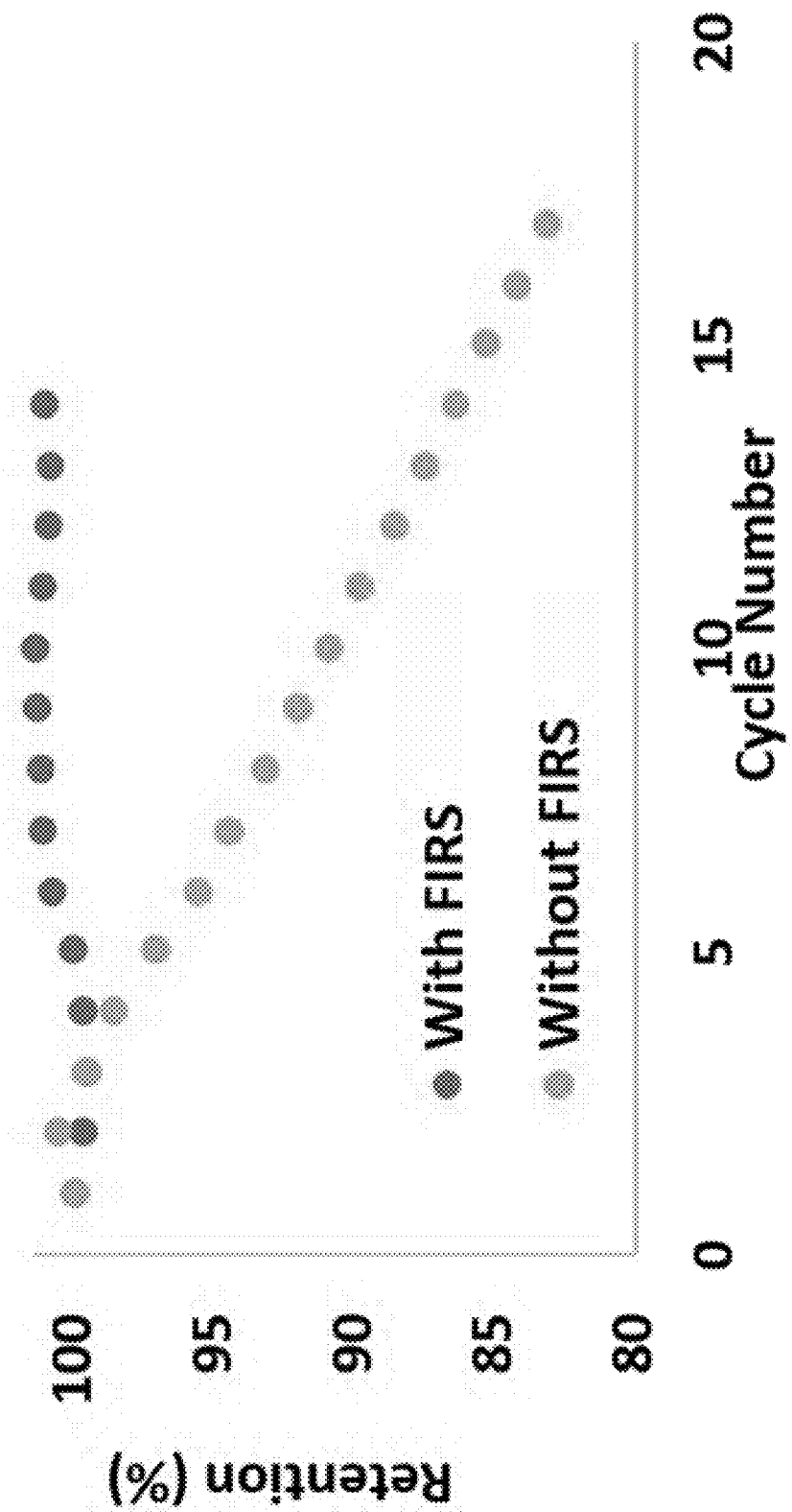
FIGS. 26A-26C show graphical representations of capacity retention in electrochemical cells with and without FIRS.
Figure 26B:
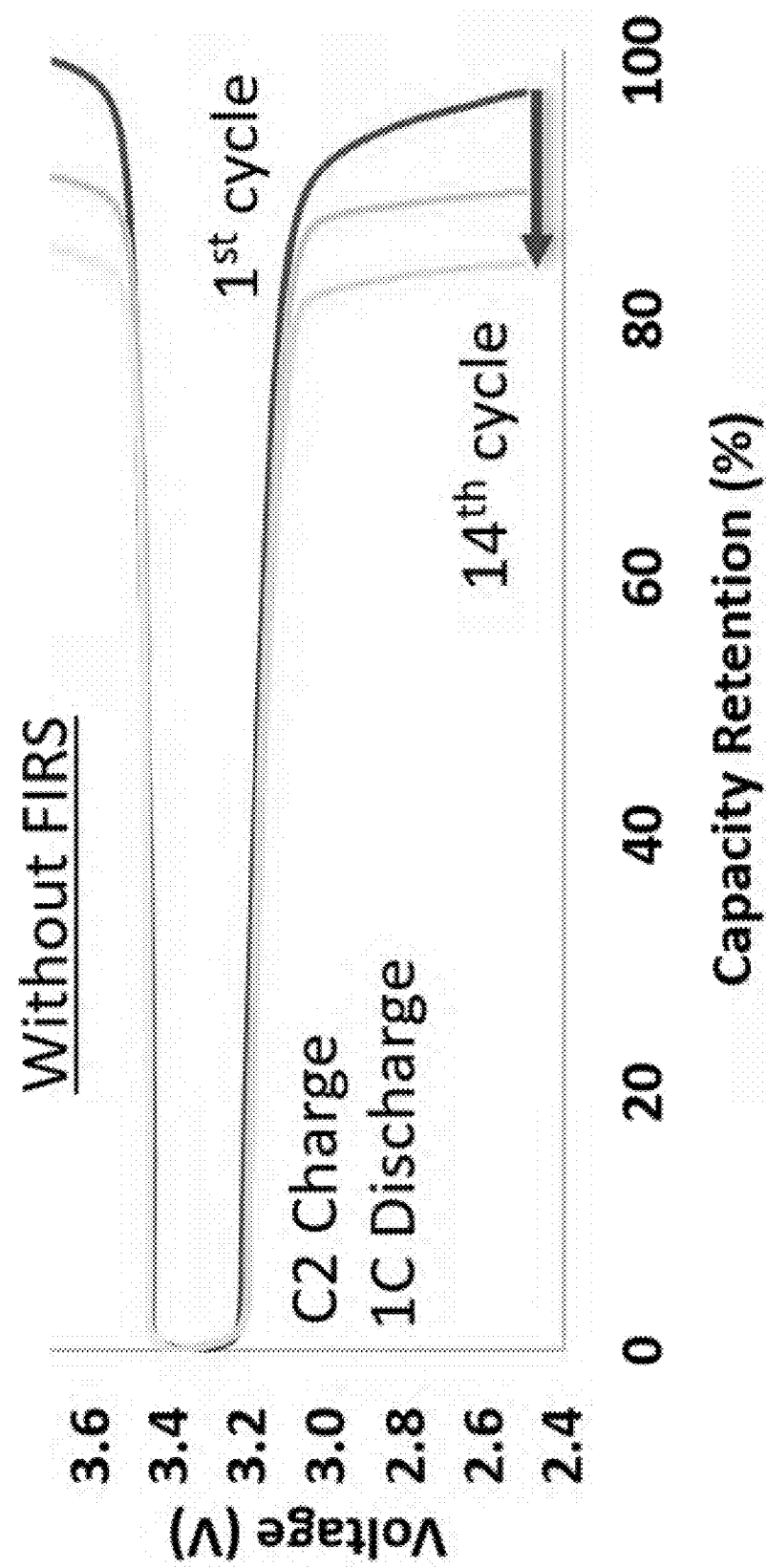
Figure 26C:
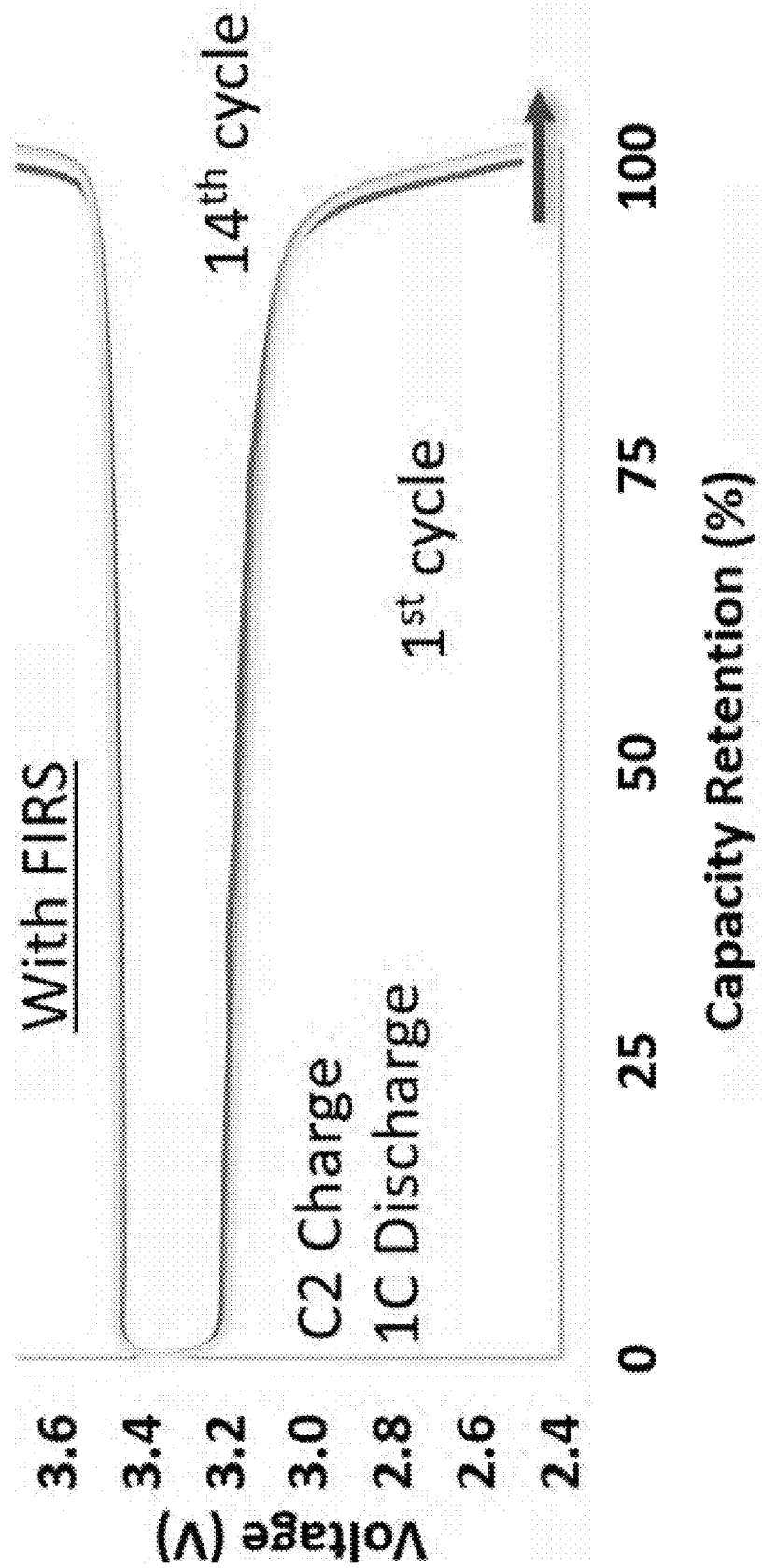

FIGS. 26A-26C show performance comparisons of FIRS electrochemical cells to electrochemical cells without FIRS. The cell used was a coin cell with copper anode, 2.5 mAh/cm$^2$ capacity LFP cathode, charged at C/2, and discharged at 1C at 25° C. As shown in FIG. 26A, the electrochemical cell with FIRS maintains about 100% of its initial capacity through the first 14 cycles, and actually gains about 1% of its capacity upon activation of the LFP. The cell without FIRS decreases to about 85% of its initial capacity due to active lithium loss. FIGS. 26B and 26C the control cell without FIRS show the capacity retention of the FIRS cell compared to the control cell on a voltage plot.

Figure 27A:
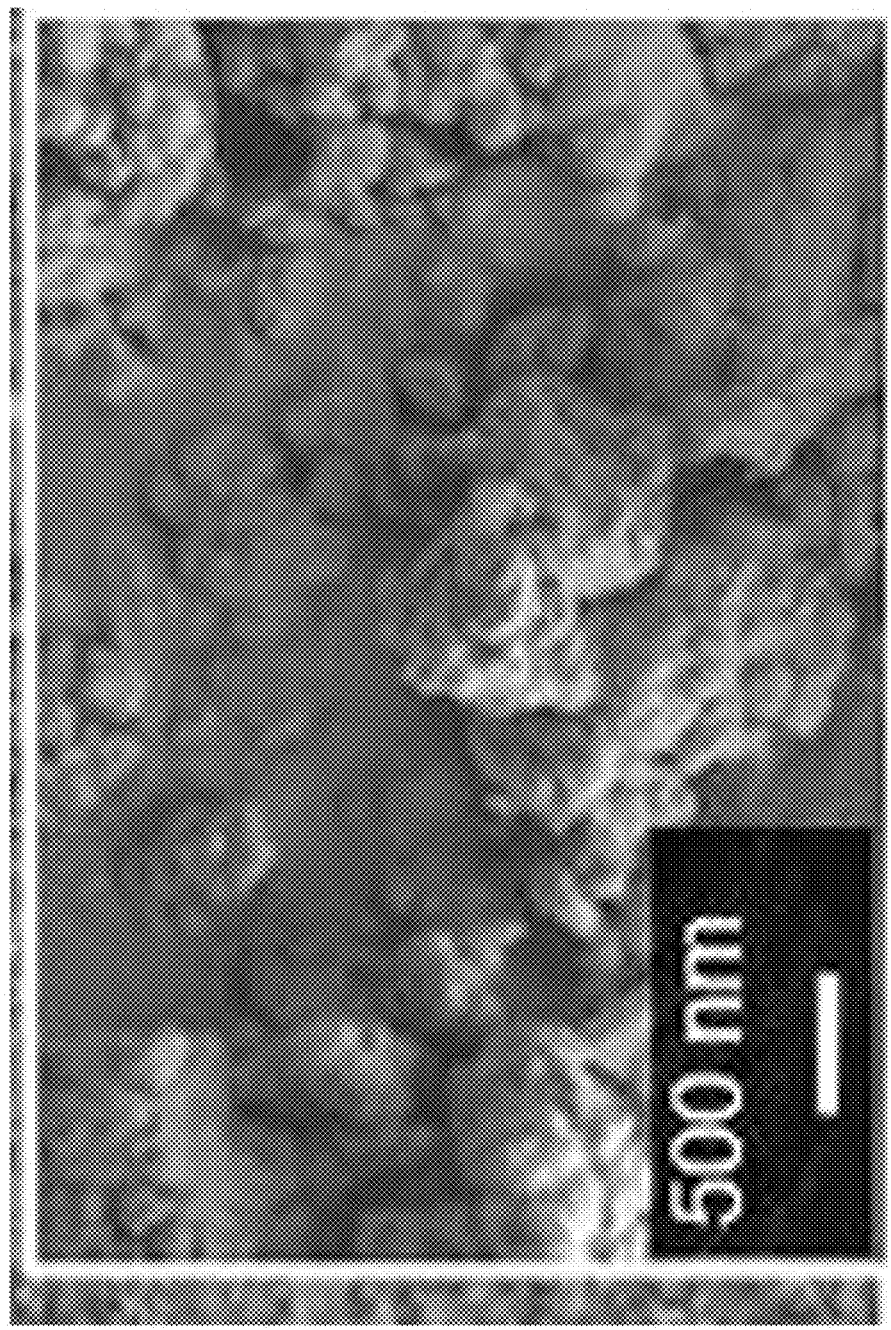
FIGS. 27A-27B show functionalization of FIRS systems and associated data.
Figure 27B:
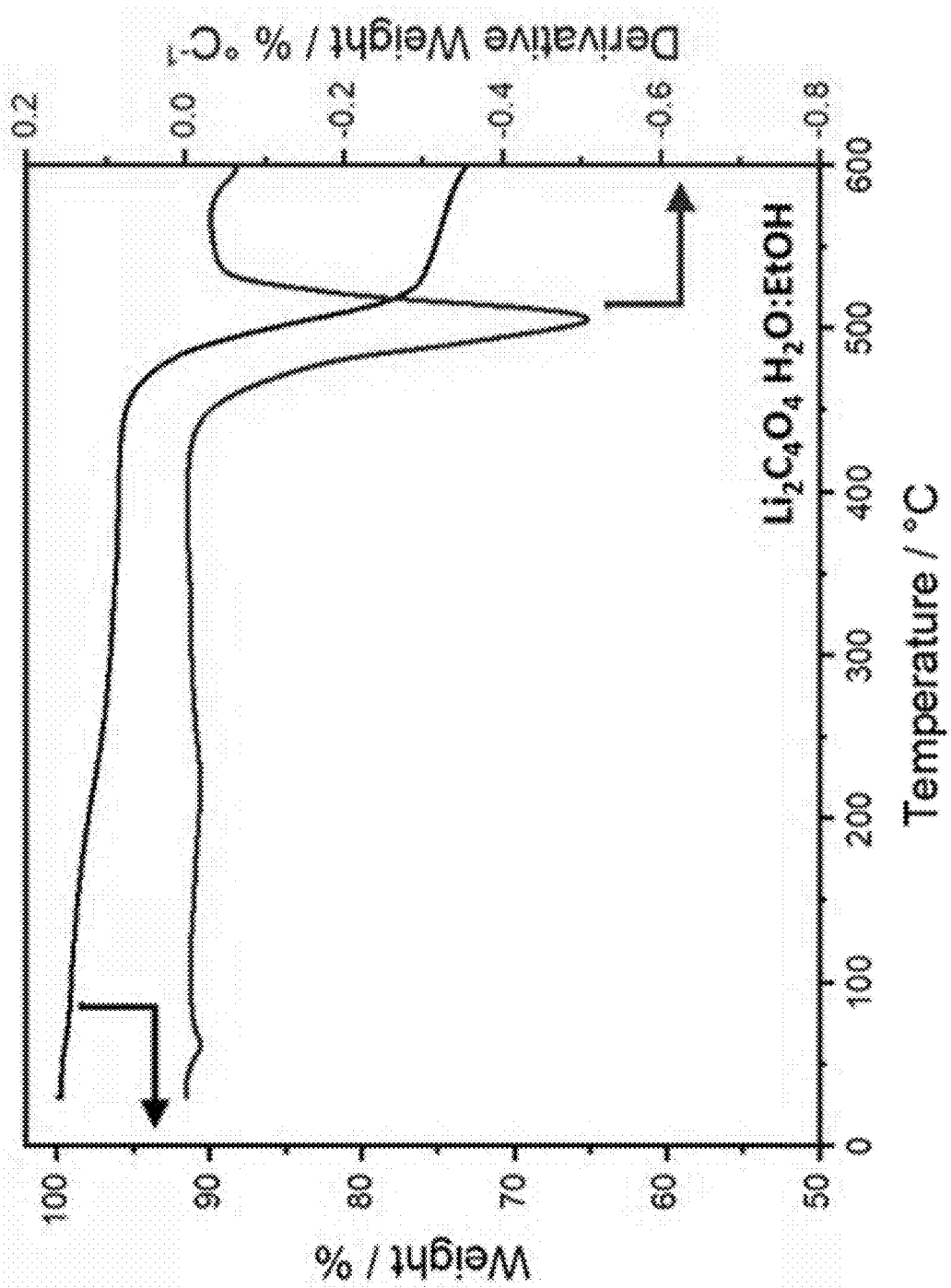

FIG. 27A shows a controlled and gradual release of an additive achieved via decomposition of $Li_2C_4O_4$ as a lithium ion source upon gas release or diffusion (*Advanced Science* 9.24 (2022): 2201742.). FIG. 27B shows the weight and derivative weight of decomposing $Li_2C_4O_4$. As shown, the most significant derivative weight decrease occurs around 500° C. (*Batteries & Supercaps*: e202400009).

FIG. 28 shows current density of cells with $Na_2CO_3$ in a 5 wt % proportion in the interlayer and a 10 wt % proportion in the interlayer. As shown, the current density is higher in a $Na_2CO_3$-rich system. As noted above, advantages of $Na_2CO_3$ include an established raw material supply chain, higher density than $Li_2C_4O_4$, air stability, insolubility in electrolyte, and compatibility with the fabrication process of FIRS. A microscopic view of the interlayer is shown, as well as the decomposition reaction of the $Na_2CO_3$. FIG. 28 shows that the $Na_2CO_3$ can be activated with a low onset potential of 3.5 V. The active voltage window is 3.5-4.5 V vs $Na^{+/0}$, which is equivalent to 3.8-4.8 V vs $Li^{+/0}$. The results imply that $Li_2CO_3$ is potentially applicable as a lithium source for a lithium system.

Figure 34A:
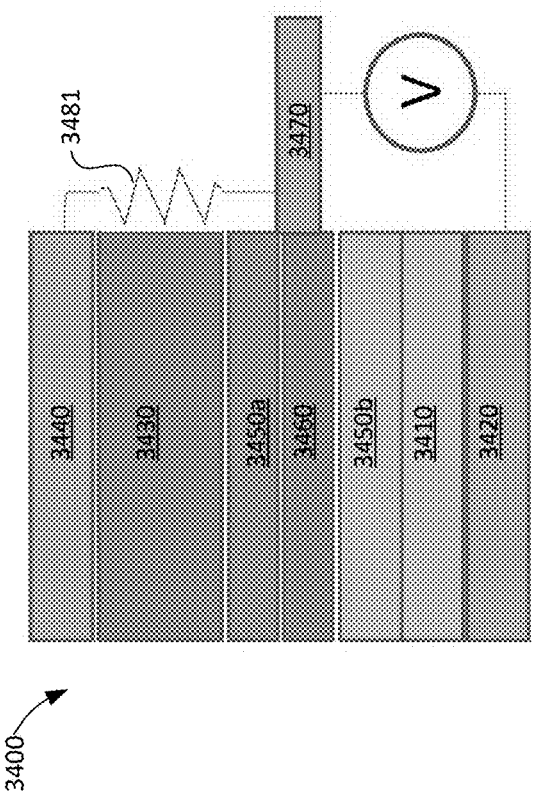
FIG. 34A is an illustration of an example electrochemical including an interlayer, according to an embodiment.

FIG. 34A is an illustration of an example electrochemical 3400 including an interlayer 3460, according to an embodiment. The electrochemical cell 3400 includes a graphite anode material 3410 disposed on a copper anode current collector 3420, and a LFP cathode material 3430 disposed on an aluminum cathode current collector 3440. A first separator 3450a and a second separator 3450b are disposed between the anode material 3410 and the cathode material 3430, and includes the interlayer 3460 disposed therebetween. The electrochemical cell 3400 is disposed in a casing 3470, and the interlayer 3460 is coupled to the casing 3470. The interlayer 3460 can be coupled to a resistor 3481 in between the cathode material 3430 and the casing 3470. The interlayer 3460 can be coupled to the anode current collector 3420 via the casing 3470 to allow measuring of first voltage V therebetween.

Figure 34B:
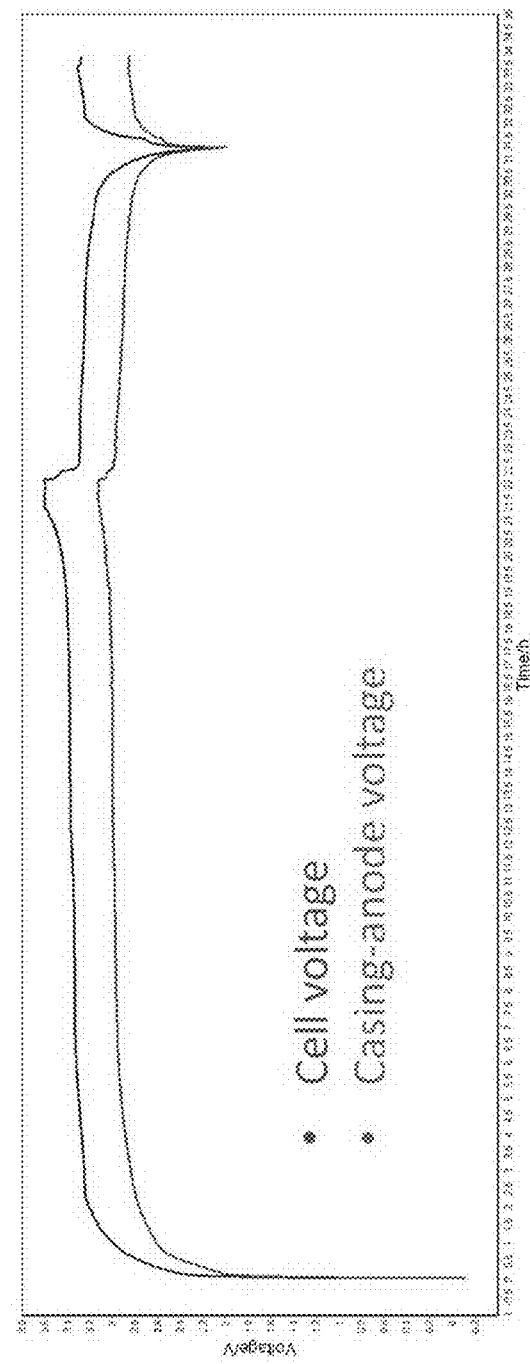
FIG. 34B are plots of voltage monitored between an anode and a cathode, between the anode and an interlayer via a casing, and directly between the anode and the interlayer of the electrochemical cell during formation of the electrochemical cell.

FIG. 34B are plots of voltage monitored between the anode material 3410 and the cathode material 3430, and between the anode material 3410 and the interlayer 3460 via the casing 3470 during formation of the electrochemical cell 3400. The plots show that the voltage profiles of the interlayer 3460 are aligned with the formation potential applied to the electrochemical cell 3400.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. An electrochemical cell, comprising:
an anode material disposed on an anode current collector;
a cathode material disposed on a cathode current collector;
a first separator disposed on the anode material;
a second separator disposed on the cathode material;
a first interlayer disposed between the first separator and the second separator, the first interlayer including electroactive material;
a third separator disposed on the anode current collector;
a second interlayer disposed on the third separator;
a housing configured to contain the anode material, the anode current collector, the cathode material, the cathode current collector, the first separator, the second separator, the third separator, the first interlayer, and the second interlayer; and a center tube disposed along a longitudinal axis of the housing, the center tube electrically coupled to the housing, wherein:

the anode material is electrically coupled to a first portion of the housing, the cathode material is electrically coupled to a second portion of the housing, the second interlayer is electrically coupled to a third portion of the housing via the center tube, the first portion of the housing includes a negative button located at a first terminal end of the housing, the negative button electrically isolated from the second portion of the housing and the third portion of the housing, and the second portion of the housing includes a positive button located at a second terminal end of the housing, the second button electrically isolated from the first portion of the housing and the third portion of the housing, the second terminal end opposite the first terminal end.

2. The electrochemical cell of claim 1, wherein the third portion of the housing includes a region of the housing surrounding the anode material, the anode current collector, the cathode material, the cathode current collector, the first separator, the second separator, and the first interlayer.

3. The electrochemical cell of claim 2, wherein the housing includes a gold coated can in physical contact with a hard carbon layer included in the first interlayer.

4. The electrochemical cell of claim 1, wherein the anode material, the anode current collector, the cathode material, the cathode current collector, the first separator, the second separator, and the first interlayer are rolled into a jelly roll disposed around the center tube.

5. The electrochemical cell of claim 4, wherein the center tube is configured to exert a compressive force on the jelly roll in cooperation with the housing.

* * * * *